May 10, 1966 S. LUBKIN 3,250,367
ELECTRONIC CALCULATOR
Original Filed Feb. 24, 1956 49 Sheets-Sheet 1

INVENTOR.
Samuel Lubkin
BY
ATTORNEY

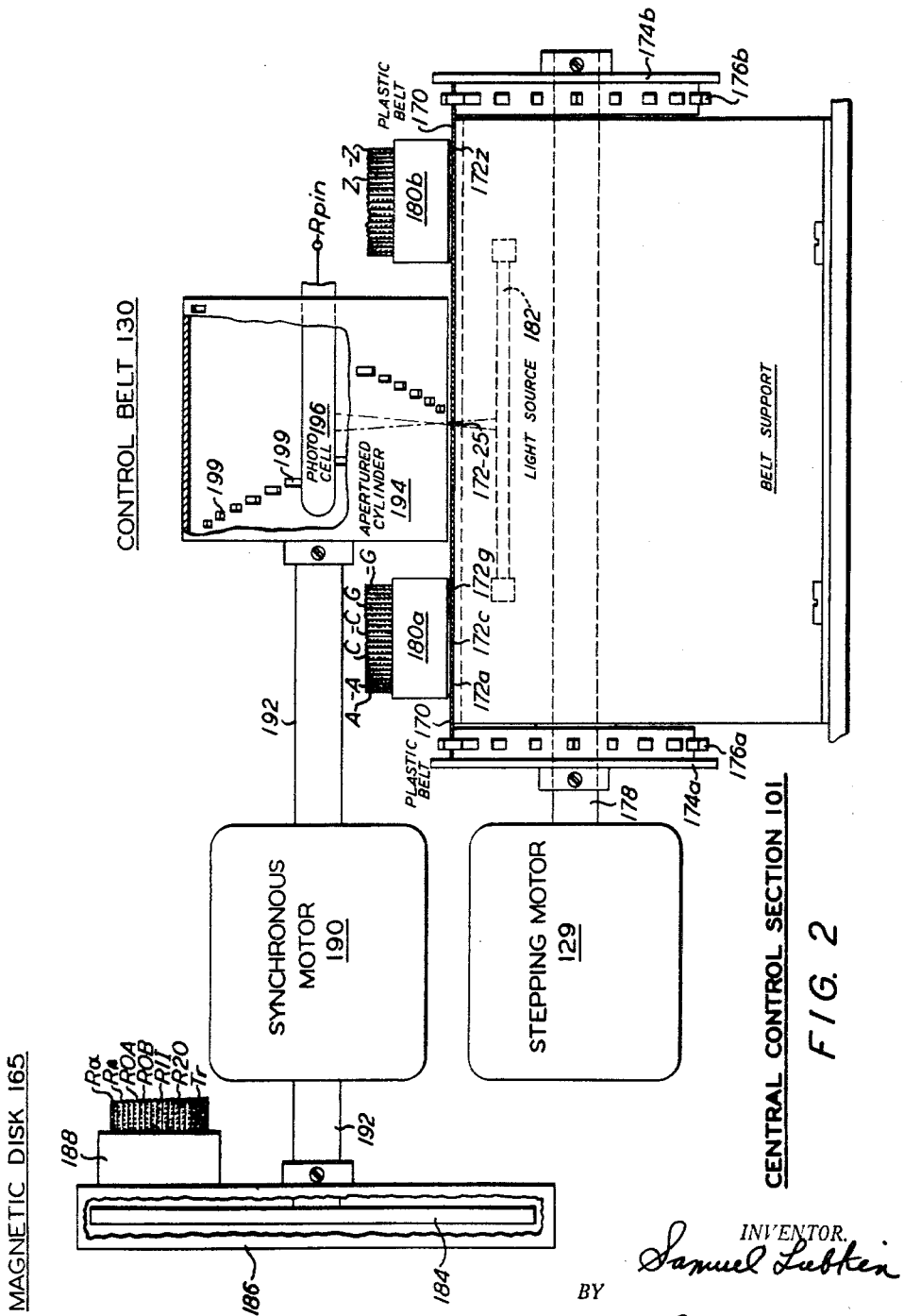

May 10, 1966     S. LUBKIN     3,250,367
ELECTRONIC CALCULATOR
Original Filed Feb. 24, 1956     49 Sheets—Sheet 3
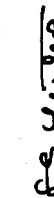
INVENTOR.
Samuel Lubkin
BY
ATTORNEY

*GENERAL INFORMATION SIGNAL FLOW*

General Program Step Cycle

May 10, 1966     S. LUBKIN     3,250,367
ELECTRONIC CALCULATOR
Original Filed Feb. 24, 1956     49 Sheets-Sheet 6

*INITIATE OPERATION*

Clear Memory Register
Add Accumulator to Memory Register
Subtract Accumulator from Memory Register
Add Accumulator to Cleared Memory Register May 10, 1966     S. LUBKIN     3,250,367
ELECTRONIC CALCULATOR
Original Filed Feb. 24, 1956     49 Sheets-Sheet 8

Add Memory Register to Accumulator
Subtract Memory Register from Accumulator
Clear Accumulator and Add Memory Register INVENTOR
Samuel Lubkin
BY
ATTORNEY Enter Number via Keyboard into Memory Register.
Enter Number via Keyboard into Cleared Memory Register.

Enter Number via Paper Tape Unit
into Memory Register.
Enter Number via Paper Tape Unit
into Cleared Memory Register.

May 10, 1966 — S. LUBKIN — 3,250,367
ELECTRONIC CALCULATOR
Original Filed Feb. 24, 1956 — 49 Sheets-Sheet 11

Multiplication

Proof Figure Check

MEMORY REGISTER SELECTION VIA KEYBOARD
MEMORY REGISTER SELECTION VIA PAPER TAPE

MEMORY REGISTER SELECTION
VIA ACCUMULATOR

*EXPRESS CONTROL BELT MOVEMENT*

May 10, 1966     S. LUBKIN     3,250,367

ELECTRONIC CALCULATOR

Original Filed Feb. 24, 1956     49 Sheets-Sheet 18

INTRODUCTION TO AUXILIARY PRINTER MOVEMENTS
AUXILIARY PRINTER TAB.
AUXILIARY PRINTER CARRIAGE RETURN
AUXILIARY PRINTER FORWARD LINE FEED
AUXILIARY PRINTER REVERSE LINE FEED

INVENTOR.
Samuel Lubkin
BY
ATTORNEY

Main Printer Print Operations.
Auxiliary Printer Print Operations.

May 10, 1966  S. LUBKIN  3,250,367
ELECTRONIC CALCULATOR
Original Filed Feb. 24, 1956  49 Sheets-Sheet 22

PAPER TAPE OUTPUT
OPERATION

INVENTOR
Samuel Lubkin
BY
ATTORNEY

May 10, 1966 S. LUBKIN 3,250,367
ELECTRONIC CALCULATOR
Original Filed Feb. 24, 1956 49 Sheets-Sheet 27

GATE 2306

BUFFER 2209

DELAY LINE 2230

PULSE AMPLIFIER 2322

INVENTOR.
Samuel Lubkin
BY
ATTORNEY.

May 10, 1966        S. LUBKIN        3,250,367
ELECTRONIC CALCULATOR

Original Filed Feb. 24, 1956        49 Sheets-Sheet 24

DRUM READING AMPLIFIER 1000

DELAY FLOP 3490

THYRATRON CIRCUIT 5210

INVENTOR
Samuel Lubkin
BY
Omi R. Severn
ATTORNEY

May 10, 1966 S. LUBKIN 3,250,367
ELECTRONIC CALCULATOR
Original Filed Feb. 24, 1956
49 Sheets-Sheet 25

D-C AMPLIFIER 2321

SET DOMINANT FLIP FLOP 3211

RESET DOMINANT FLIP FLOP 3412

INVENTOR.
Samuel Lubkin
BY
ATTORNEY

Memory In-Out Control
111

May 10, 1966  S. LUBKIN  3,250,367
ELECTRONIC CALCULATOR
Original Filed Feb. 24, 1956  49 Sheets-Sheet 27

ADD-ONE REGISTER IN-OUT CONTROL 112

INVENTOR,
Samuel Lubkin
BY
ATTORNEY

May 10, 1966 S. LUBKIN 3,250,367
ELECTRONIC CALCULATOR
Original Filed Feb. 24, 1956 49 Sheets-Sheet 28

INVENTOR.
Samuel Lubkin
BY
ATTORNEY

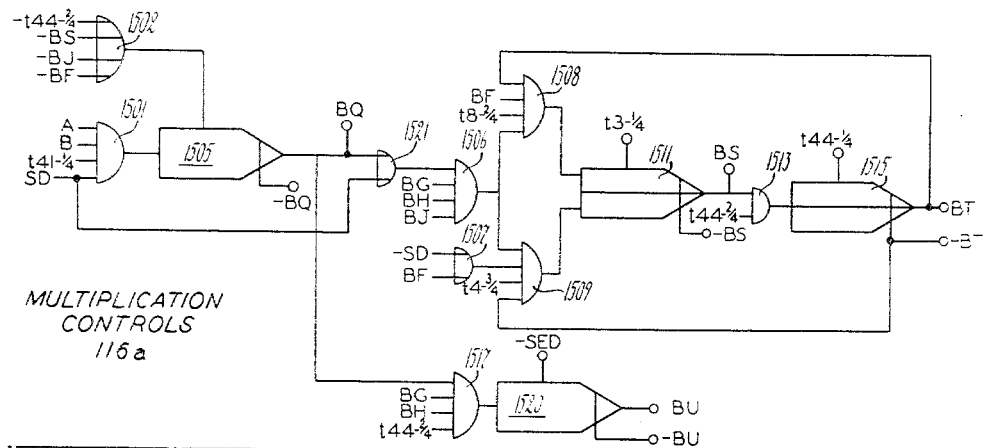
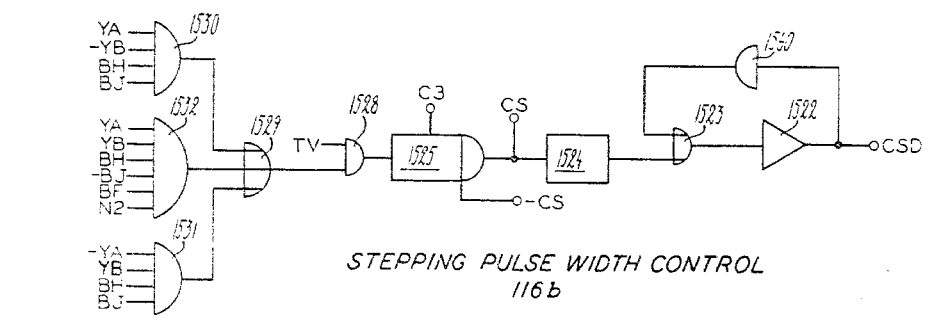
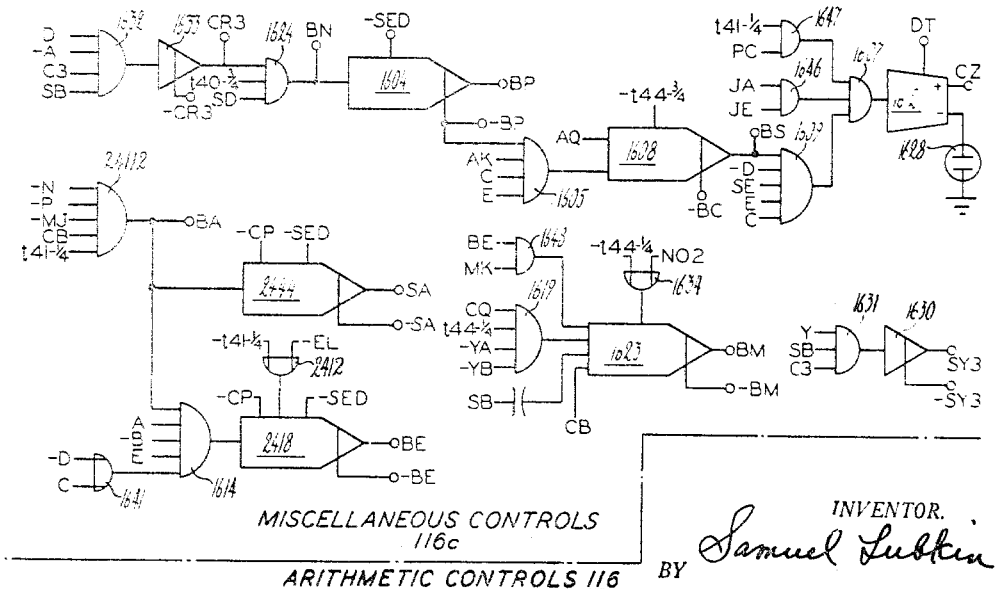
FIG. 40

Operand Funnel 121

May 10, 1966 — S. LUBKIN — 3,250,367
ELECTRONIC CALCULATOR
Original Filed Feb. 24, 1956 — 49 Sheets-Sheet 33

ADDITION PROCEDURE SIGNALS
INVENTOR Samuel Lubkin
ATTORNEY

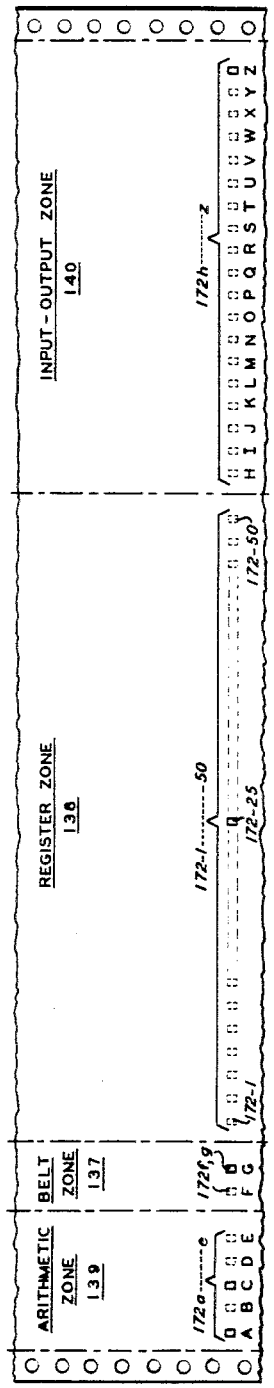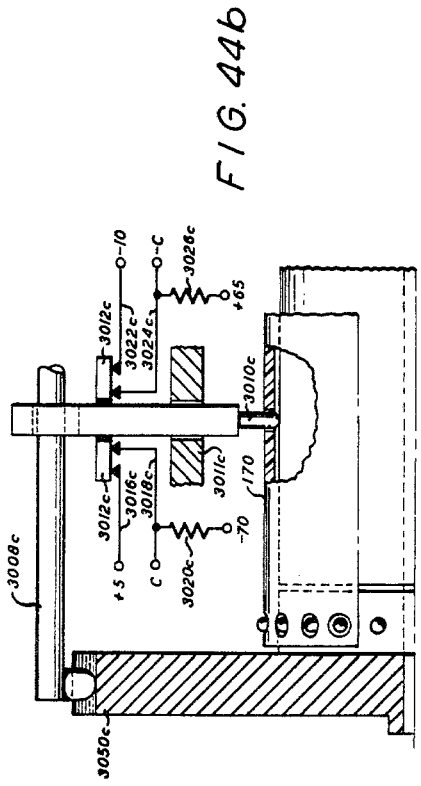

May 10, 1966 S. LUBKIN 3,250,367
ELECTRONIC CALCULATOR
Original Filed Feb. 24, 1956 49 Sheets-Sheet 36

Cycle Generators 131

INVENTOR.
Samuel Lubkin
BY
Om R. Severn
ATTORNEY

PROGRAM SELECTOR 132

FORMAT CONTROL 136

NUMBER THYRATRONS 141

May 10, 1966  S. LUBKIN  3,250,367
ELECTRONIC CALCULATOR
Original Filed Feb. 24, 1956  49 Sheets-Sheet 41

Enter & Index Control 143

PAPER TAPE INPUT-OUTPUT 145

May 10, 1966 S. LUBKIN 3,250,367
ELECTRONIC CALCULATOR
Original Filed Feb. 24, 1956 49 Sheets-Sheet 44

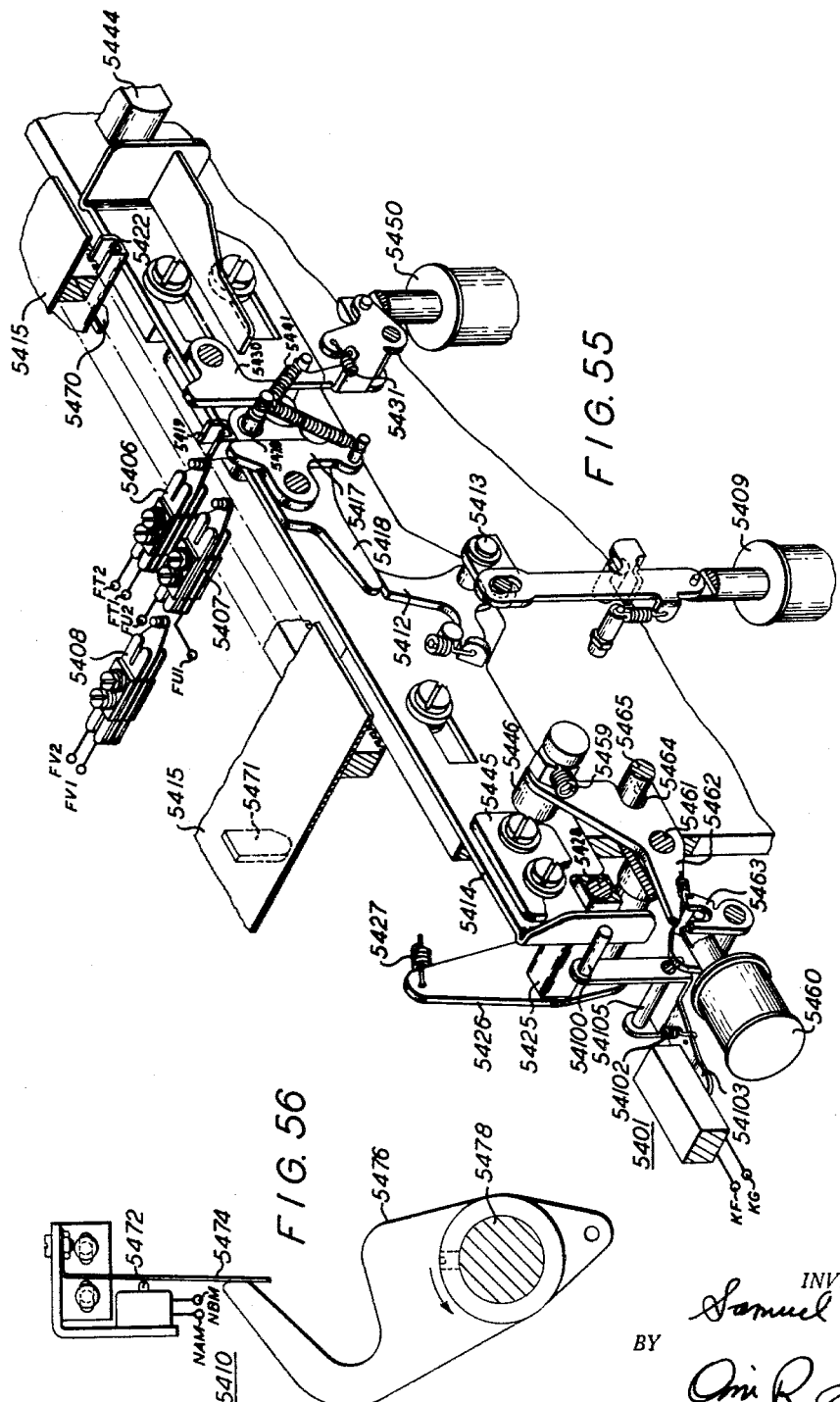

TIMER 160

TIMING WAVE FORMS

Magnetic Disk 165

INVENTOR.
Samuel Lubkin
BY
Oim R. Severn
ATTORNEY

United States Patent Office 3,250,367
Patented May 10, 1966

3,250,367
ELECTRONIC CALCULATOR
Samuel Lubkin, Bayside, N.Y., assignor, by mesne assignments, to Curtiss-Wright Corporation, Carlstadt, N.J., a corporation of Delaware
Original application Feb. 24, 1956, Ser. No. 567,566, now Patent No. 2,945,213, dated July 12, 1960. Divided and this application July 11, 1960, Ser. No. 41,840
2 Claims. (Cl. 197—19)

This invention relates to calculating and data processing apparatus, and more particularly to a high-speed electronic digital computer of relatively low cost. The computer is especially useful for solving the data processing problems of small and medium sized companies.

This application is a division of my co-pending application Serial No. 567,566 filed February 24, 1956, now Patent No. 2,945,213, granted on July 12, 1960.

Any data processing problem can be broken down into a sequence of simple arithmetic and logical operations. Electronic digital computers are capable of carrying out these arithmetic and logical operations at extremely high speeds. An electronic digital computer can therefore be used to solve data processing problems of great length and complexity in a small fraction of the time required by a human being.

Heretofore, high-speed electronic digital computers have been in the medium, large or super calculator class and of prohibitive cost from the point of view of most small and medium sized business, industrial and scientific institutions.

The primary object of the invention, therefore, is to provide a compact fully-automatic digital computer of relatively low cost compared with the cost of the average electronic digital computer system.

A major object of the invention is to provide an electronic digital computer which is especially suitable for solving many of the data processing and business problems of small and medium sized companies.

Another major object of the invention is to provide a small and relatively low cost electronic digital computer for solving scientific problems.

While the digital computer system which is the subject of this application may readily be employed for solving scientific problems, it will be described primarily in terms of business applications.

The advantages of an electronic digital computer system for business applications in comparison with business machines of the mechanical type are many. An electronic digital computer system: remembers what is told it; adds, subtracts, multiplies and divides; looks up numbers in tables; performs operations in sequence; inspects computation results and makes a decision; computes an answer and checks its accuracy; sorts data and arranges it in sequence; can tell when the problem is finished and goes on to the next problem; and works with minimum supervision.

It is these abilities which make it so suitable for data processing. Thus, the electronic digital computer saves time and money by reducing clerical help in the following ways:

(1) Reduces operating steps;
(2) Combines operations;
(3) Routinizes exceptions by the ability to follow complicated instructions; and
(4) Handles new applications. Problems requiring judgment and decision can be handled and the only limitation is the ability to translate a problem into language which the machine can understand.

Some of the applications of the computer system are: payroll to handle the payroll records and cost analyses; sales analysis and market forecasts for giving proper weight to all factors; inventory control for keeping up to the minute track of sales, purchasing, manufacture and stock of many items; production control to eliminate the gap between production schedule preparation and actual performance; projecting labor requirements from the bill of material to determine requirements by operation and skill; and reports giving current sales, costs and forecasts, instead of history.

I. INTRODUCTION

The computer system which is the subject of this application is a high-speed electronic digital computer of the serial type which functions to solve data processing problems by arithmetically manipulating data.

The data of a problem is inserted into the computer system from a punched paper tape or by typing the numerical digits of the information on a keyboard of an electro-mechanical business machine which is a part of the computer system.

The computer system is designed to manipulate information which is composed of binary-coded decimal numbers, that is, of decimal numbers expressed in the binary system. As the only digits used in the binary system are one and zero, the binary system is readily adaptable to electronic expression by the presence or absence of a pulse signal. The presence of a pulse signal is used to represent the binary digit one and the absence of a pulse signal is used to represent the binary digit zero.

The electronic circuitry converts decimal numbers into arrangements of these binary digits (commonly called bits) on a rotating magnetic disk or elsewhere in the equipment. Four bits represent a digit and the value of the bit is determined by its location in the group:

0=0000 no bit in any position
1=0001 a bit in the first position
2=0010 a bit in the second position
4=0100 a bit in the third position
8=1000 a bit in the fourth position It should be noted that the numerical value of each bit is doubled as it is moved from right to left.

All other digits are made up of combinations of the bits as follows:

3=0011 a combination of the bits for 2 and 1
5=0101 a combination of the bits for 4 and 1
6=0110 a combination of the bits for 4 and 2
7=0111 a combination of the bits for 4 and 2 and 1
9=1001 a combination of the bits for 8 and 1

Mathematically the binary system is a numerical means of expressing a quantity in terms of coefficients of powers of two. For example, the decimal digit 7 is expressed as 0111 in the binary system as shown below:

As used         0111
As understood   $0(2)^3 + 1(2)^2 + 1(2)^1 + 1(2)^0$
Or              $0 + 4 + 2 + 1 = 7$ In summation, the following table contains the decimal numbers from zero through ten and their binary equivalents.

*Table I*

| Decimal Number | Binary Equivalent |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |

The basic unit of information handled by the computer is a number comprising ten decimal digits. Included with the number is a combined sign and switching blank position. Thus each number consists of forty bits for numerical information, plus one bit for a sign (plus or minus) plus three bits for switching or a total of forty-four bits. The number is sometimes called a "word" of information. The storage space on the magnetic disk occupied by the forty-four bits of the ten digit number is known as the word length and corresponds to the register of the conventional accounting machine.

All digital computers perform the following operations: input, storage, arithmetic, control and output. Data is inserted through one or more of the input mechanisms, held in the storage devices until required, and then acted upon by the arithmetic unit; after which it is returned to the storage device, and written out by one or more of the output devices.

All this is done under the direction of the control mechanism or programming unit.

A problem to be solved by the computer system is broken down into a sequence of simple operations or steps. Each of these steps is specified by an instruction and the sequence of instructions is called the program. All necessary data is entered into the computer storage device. The computer thereafter carries out the instructions automatically and at high speed under control of the programming unit.

In the present computer system there are two devices for introducing data into the computer: punched tape and a business machine keyboard. However, other devices such as magnetic tape, punched cards, or typewriters may be used.

As the data is entered it is converted to the appropriate binary form for storage. The storage device is a rotating magnetic disk, but other storage devices such as a magnetic drum, vacuum tubes or magnetic cores could be employed. The information stored could be data constants or intermediate answers. Heretofore instructions have usually also been stored in the memory. Each item in the memory has its own location or "address."

The arithmetic unit of this computer system handles the addition, subtraction, and multiplication operations. All other computations are combinations of these three activities. Addition and subtraction usually take place by passing the two numbers to be combined through the arithmetic unit at the same time. Suitable electronic controls are also provided for handling the figures in multiplication. When an arithmetic operation is completed the results can be stored for further action, printed out through the output mechanism, or both.

When the computer has finished its work the resulting data must be written out. This can be done on punched tape and line printers. Magnetic tape, punched cards and typewriters could also be employed. The output data can be put on the desired forms directly by the line printers or by using the resulting tape to control suitable printing mechanisms.

All the actions of the computer, the computations, and the sequence of operations, are determined by the program data. Heretofore, the program data has usually been stored in the memory; for example, as a group of instructions in a sequence of addresses on a rotating magnetic storage device. The instructions are fed to the control unit one at a time from their location in the memory. Each instruction describes the location of each item which is to be used in the computation, what is to be done to it and where the results are to be stored. Relatively complex and therefore expensive apparatus for locating each address at the proper time is necessary. In other computing systems the sequence of steps of the program is recorded on a long punched paper tape and each step is arranged to follow immediately the preceding step; that is, the tape moves step by step in one direction. However, while simpler, this system is very inflexible and impractical and has generally been discarded in favor of the stored program type of system described above.

A major feature of the disclosed system (claimed in the parent Patent 2,945,213) is a programming unit comprising a long control belt containing indicia; for example, punched holes. The data for each step or instruction of a program is recorded along a line across the width of the control belt. Apparatus is provided for moving the control belt one or more steps either in the forward or reverse direction. Sensing apparatus senses the control data at each step. Means are provided for moving the control belt forward or backward to any particular step.

Another feature of the disclosed system (also claimed in the parent patent) is the control of the input, storage, arithmetic and output operations of the computer system directly from the control belt by suitable indicia. Further the control belt also controls its own movement if other indicia is present.

A further feature of the invention is apparatus for moving the control belt in the forward direction or the reverse direction to a predetermined instruction step as indicated by indicia recorded in a position corresponding to the predetermined instruction step.

One of the features responsible for the versatility of modern electronic digital computer systems is the provision of apparatus for performing either of two alternative operations depending on an intermediate computation result. For example, complicated equations may be solved by repeatedly and automatically testing different values for the unknowns. The result of each test is examined and if the tested value is wrong the process is repeated with a new value. However, when the correct solution is determined and the equation solved, a new sequence of operations is begun. This ability to repeat the same sequence of operations or to start a new sequence of operations depending on the result of the computation is called the conditional transfer or branch instruction. The introduction of apparatus for performing this function enabled the design of electronic digital computers capable of solving long and involved problems without constant supervision by mathematical experts and increased the field of use of a computer without the need for special control apparatus. However, extensive and relatively complex and therefore expensive equipment has been required to perform conditional transfer instructions.

Another outstanding feature of this disclosed system (also claimed in the parent patent) is conditional transfer apparatus comprising a control belt having control data recorded in different positions, testing means for testing intermediate computer results obtained under the control of the control belt, and means for moving the control belt to either of two positions (in either the forward or reverse direction) depending on the result of the computation as indicated by the test.

Most computer systems provide for manually entering data into the computer by a keyboard. Manual insertion is particularly desirable when some of the stored data is to be updated. However, when a sequence of information items is entered manually there is a possibility of human error. Mechanical office equipment has allowed for this possibility by providing for the entry of a proof figure which is the sum of the information items entered, and the machine then compares the proof figure with the sum of the entries to determine if any entry error has occurred.

Another object of the invention is to provide improved apparatus for checking the correctness of a series of manual data entries after the data entries have been stored in an electronic digital computer.

Another feature of the invention is apparatus for adding manually entered information items and for comparing the sum of the entries with a proof figure which is also manually entered, all under control of a control belt. If the compared numbers are the same the control belt is moved to the next sequential step, otherwise the control belt is moved back to an earlier step and an error indicator is activated. Thereafter the operator may repeat the entries.

As stated above all electronic computer systems require apparatus for locating particular registers (storage positions) to store specific data or to transfer the data. For example, in a payroll program the number of dependents of an employee is stored in a particular register and during the computation of the Federal tax deduction this data is transferred to the arithmetic unit of the computer. Relatively complex equipment has been required to locate particular registers.

Another major object of the invention is to provide relatively simple and inexpensive yet reliable apparatus for locating registers in an electronic digital computer.

Another major feature of the disclosed system (also claimed in the parent patent) is information storage and selection apparatus for a computer having a programming unit consisting of a movable control belt comprising a rotatable magnetic storage device having a channel containing a plurality of registers (data storage positions). The rotatable magnetic storage device is mechanically coupled to and therefore is in synchronism with a helical scanning device. The helical scanning device is positioned next to the control belt such that each indicia position in a line of indicia is sequentially sensed in synchronism with the rotatable magnetic device. Each indicia position corresponds to a particular register so that the sensing of particular indicia on the control belt by the helical scanning device indicates the location of the corresponding register.

Thus a major advantage of this feature is that the control belt functions both to control the operations of the computer system and to provide indicia for indicating the locations of the registers.

Another important feature of the disclosed system (also claimed in the parent patent) is apparatus for generating all of the control signals simultaneously to control the operations and generating the register locating signals sequentially.

In the preferred embodiment of this feature the control signal sensing apparatus employs mechanical feelers to sense holes punched in the tape that initiate the generation of the control signals, and photoelectric apparatus for sensing the holes corresponding to particular register locations.

In most of the basic operations carried out by a computer system, a transfer of data between the memory and the arithmetic unit occurs. New data is drawn from the memory, processed and returned to the memory. In order to shorten the overall processing time, it is desirable to minimize the time required for the data to be in the arithmetic unit and also to minimize the time for transferring the data to and from the memory.

In present day computers the time required for the data to be processed by the processing units is extremely short, while the time required to locate and transfer information between the memory and the processing units may be time consuming when cyclic memories such as rotating magnetic storage devices are employed for storing data.

A rotating magnetic storage device includes a transfer station which is a transducing head. The transducing head is placed opposite a track of the magnetic storage device so that the data positions sequentially pass the transducing head. Thus, a specific information position just passing the transducing head is not again available to participate in a transfer operation until all the remaining information positions have passed the transducing head. In other words, the data stored at any point can only enter into a transfer operation once a rotation.

During a step of a program the data is transferred from a position on the magnetic storage device, operated upon and usually returned to the same position on the magnetic storage device. The time for processing of the data is usually in the order of microseconds. Heretofore, upon completion of the processing operation the desired position was no longer opposite the transducing head so the processed data was temporarily stored awaiting the next arrival of the data position at the transducing head. Since the time required for a magnetic storage device to make a revolution is in the order of milliseconds, a relatively long time interval occurs before the processed data is transferred back to the magnetic storage device. It should be noted that the ratio of actual processing time to transfer time is usually in the order of about one to one hundred.

Some data processors have reduced this ratio by programming the processing problem differently. The data that is to be operated upon is drawn from one information position and returned to a second information position. The optimum choice of the second information position is the one just opposite the transducing head when the processing circuits complete processing the data.

Unfortunately, this type of programming requires additional information in the program and therefore requires more positions for storage in the memory. Secondly, more time is required to prepare the program for the data processor since greater thought and ingenuity are required in having the program utilize memory positions and time most efficiently. Further, in applications where it is necessary to store particular items in the same position in the memory, this type of programming cannot be used.

It is a very important object of the invention to provide apparatus for decreasing the transfer time between the processing circuits and a cyclic memory such as a rotating magnetic storage device.

Briefly, in accordance with a major feature of the invention (claimed in my Patent No. 2,832,064 granted April 22, 1958), apparatus is provided for processing data stored as signals in a cyclic memory. The units of data are stored in sequential positions of the cyclic memory such that each unit of data is available for sensing once each cycle of the memory. Each unit of data is sensed, then passed through the arithmetic unit. Then the processed data is immediately recorded in the original storage position.

More particularly, a first transfer station receives the units of data from the positions of the cyclic memory and transfers the units of data to the arithmetic unit. The data is processed and fed to a second transfer station. The second transfer station returns the processed data to the same position from which the originally unprocessed data was drawn. Interposed between the first and second transfer station is a delay means. The time of delay introduced by the delay means is adjusted so that the time required for data signals to pass from the first to the second transfer station via the arithmetic unit and the delay means is the same as the time required for the data signals to pass from the first to the second transfer station via the cyclic memory.

An advantage of this feature of the invention is that the delay means may readily be employed to store other data.

Another feature of the invention (also claimed in my Patent No. 2,832,064) is the use of a separate channel on the cyclical memory as the delay means. An advantage of employing a separate channel as a delay means is that the delay is obtained in a relatively inexpensive manner.

Thus, the contents of each register may be passed through the arithmetic unit once during each cycle of the rotatable magnetic device. In order to control this operation it is necessary to generate a control signal which lasts for a period of time corresponding to the time of transfer of all the contents in the registers. This time of transfer is the period from the beginning of the exit of the first word from the rotatable magnetic device to the end of the entrance of the last word into the rotatable magnetic device. Therefore the period of time during which the arithmetic unit is activated is equal to the time required to pass the contents of all of the registers through the arithmetic unit plus an amount of time corresponding to the period from the beginning to the end of the last word.

A further object of the invention is to provide apparatus for generating a signal which lasts for a period of time corresponding to the time of transfer of the contents of all of the registers from and back to a channel on a rotatable magnetic storage device.

A further feature of the invention is signal generating apparatus comprising a rotatable magnetic storage device having a channel which provides all of the storage register positions required, plus an additional register storage position which is not employed to store information. A pulse signal is recorded on the rotatable magnetic storage device so that the pulse signal appears once for every period of time corresponding to the time of transfer of the contents of all registers plus a period of time corresponding to the transfer of the contents of a single register. An electronic switch is activated by the first appearance of the recorded pulse and may be deactivated by the next appearance of the stored pulse to generate the desired control signal.

After the data is processed the results are printed out on a typewriter or printer. If the data is desired to be printed out on different forms, the forms are usually mounted on the same carriage and are printed sequentially or a number of printers are employed and each is activated at a different time. However, this process is very time-consuming.

Therefore another object of the invention is to provide improved apparatus for printing data on different forms at the same time.

A further feature of the invention is printing apparatus comprising a main printer for printing on one or more forms and an auxiliary printer for printing on other forms. Means are provided to control the two printers in the same way simultaneously, or to control each printer independently and thus in different ways.

Other features of the system are described and claimed in the co-pending application of Evelyn Berezin, Serial No. 567,567, filed February 24, 1956, now Patent No. 2,973,141, dated February 28, 1961.

II. DESCRIPTION OF FIGURES

Other objects, features and advantages of the invention will be readily appreciated as the apparatus becomes better understood by reference to the following detailed description when considered in connection with the accompanying drawings wherein:

FIG. 2 illustrates the central control section comprising the magnetic disk and the control belt.

FIG. 3 illustrates the pay check of an employee containing the employee's pay statement.

FIG. 4 illustrates the employer's check register record.

FIG. 5 illustrates the employer's record of the employee earnings and tax record.

FIGS. 25a–b through 35a–b illustrates the logical symbols which are used to describe the logical diagrams of the various block symbols, and includes the circuits of the logical symbols.

Figure 25A:
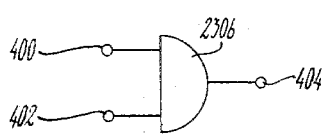
Figure 25B:
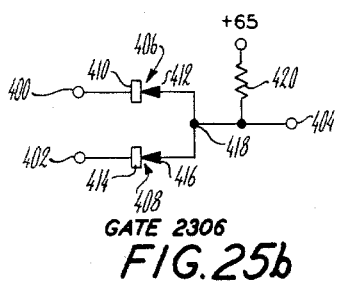
Figure 26A:
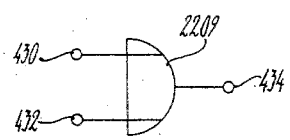
Figure 26B:
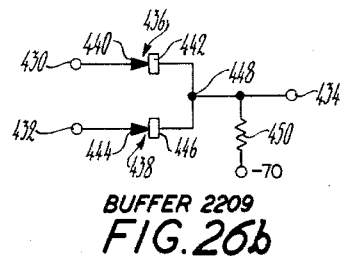
Figure 27A:
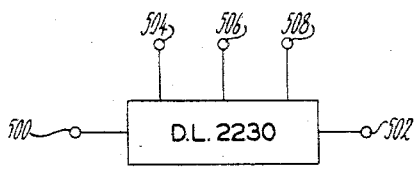
Figure 27B:
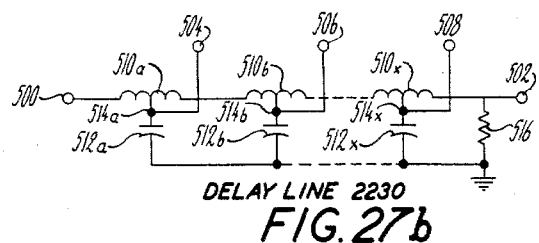
Figure 28A:
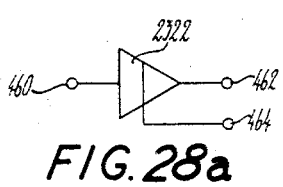
Figure 28B:
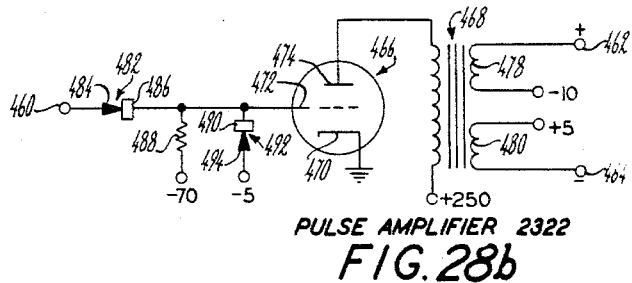
Figure 29A:
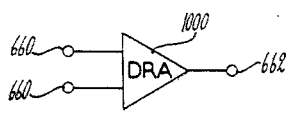
Figure 29B:
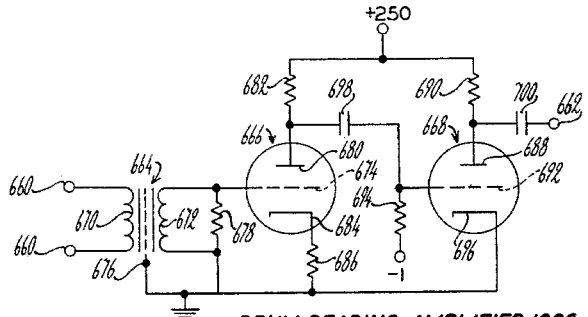
Figure 30A:
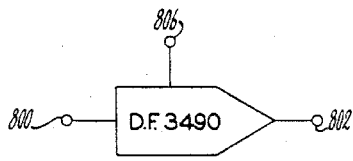
Figure 30B:
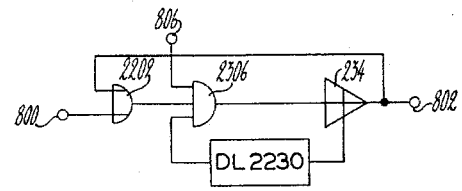
Figure 31A:
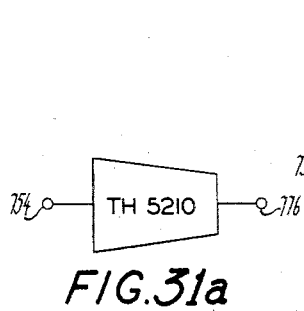
Figure 31B:
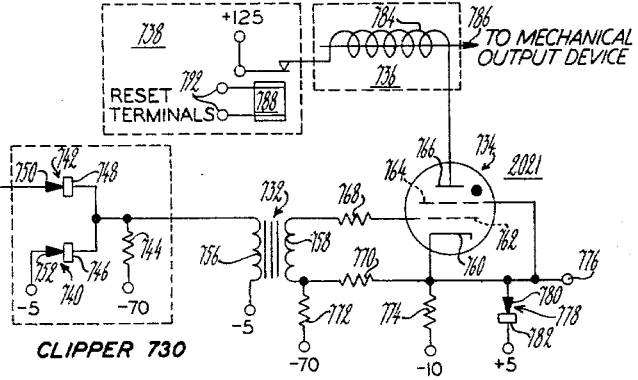
Figure 32A:
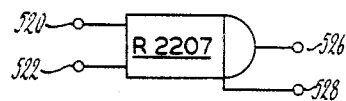
Figure 32B:
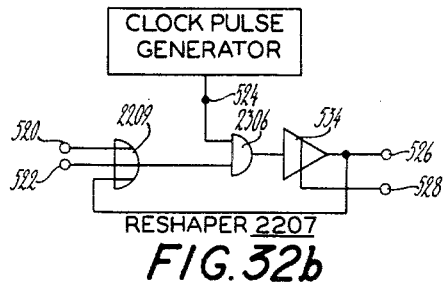
Figure 33A:
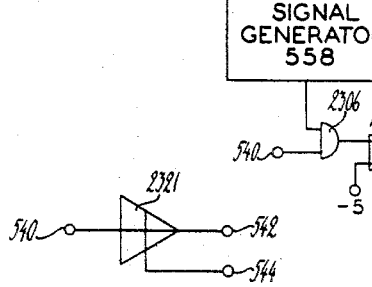
Figure 33B:
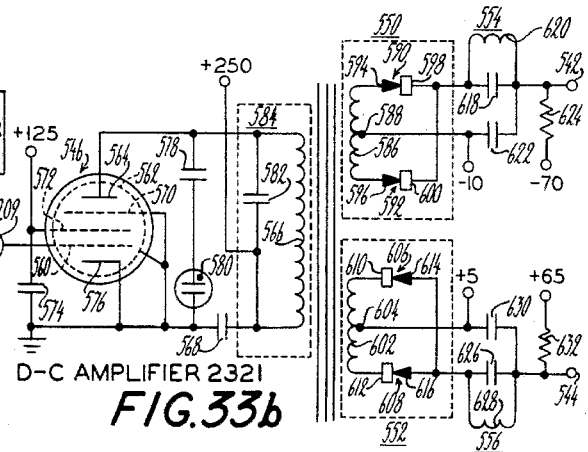
Figure 34A:
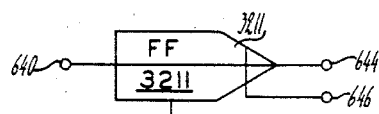
Figure 34B:
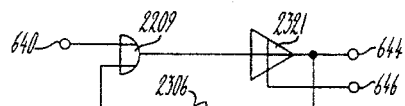
Figure 35A:
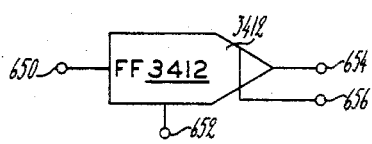
Figure 35B:
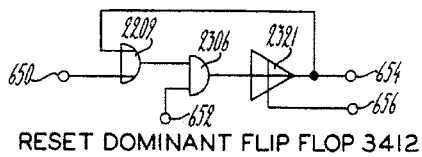
Figure 36:
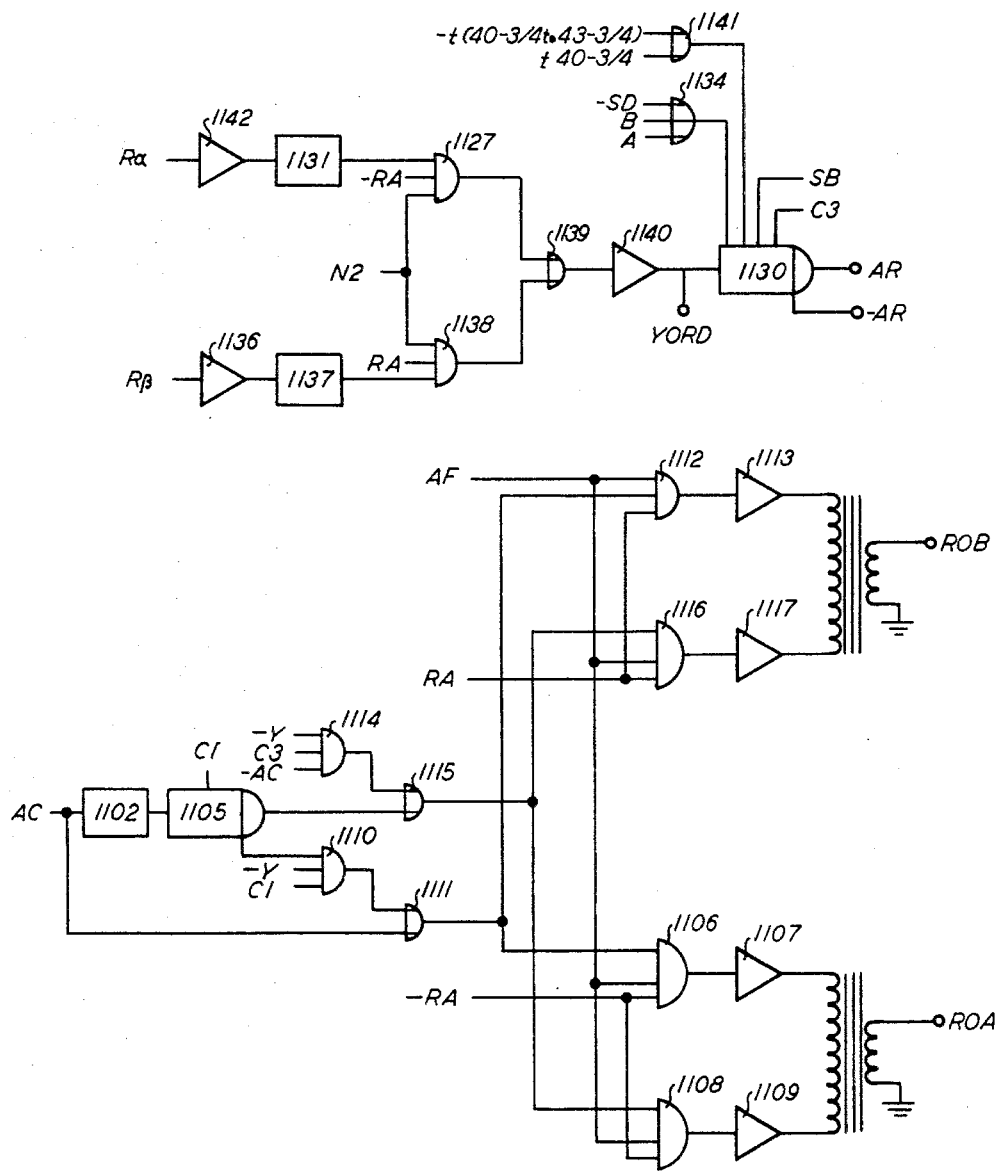
Figure 37:
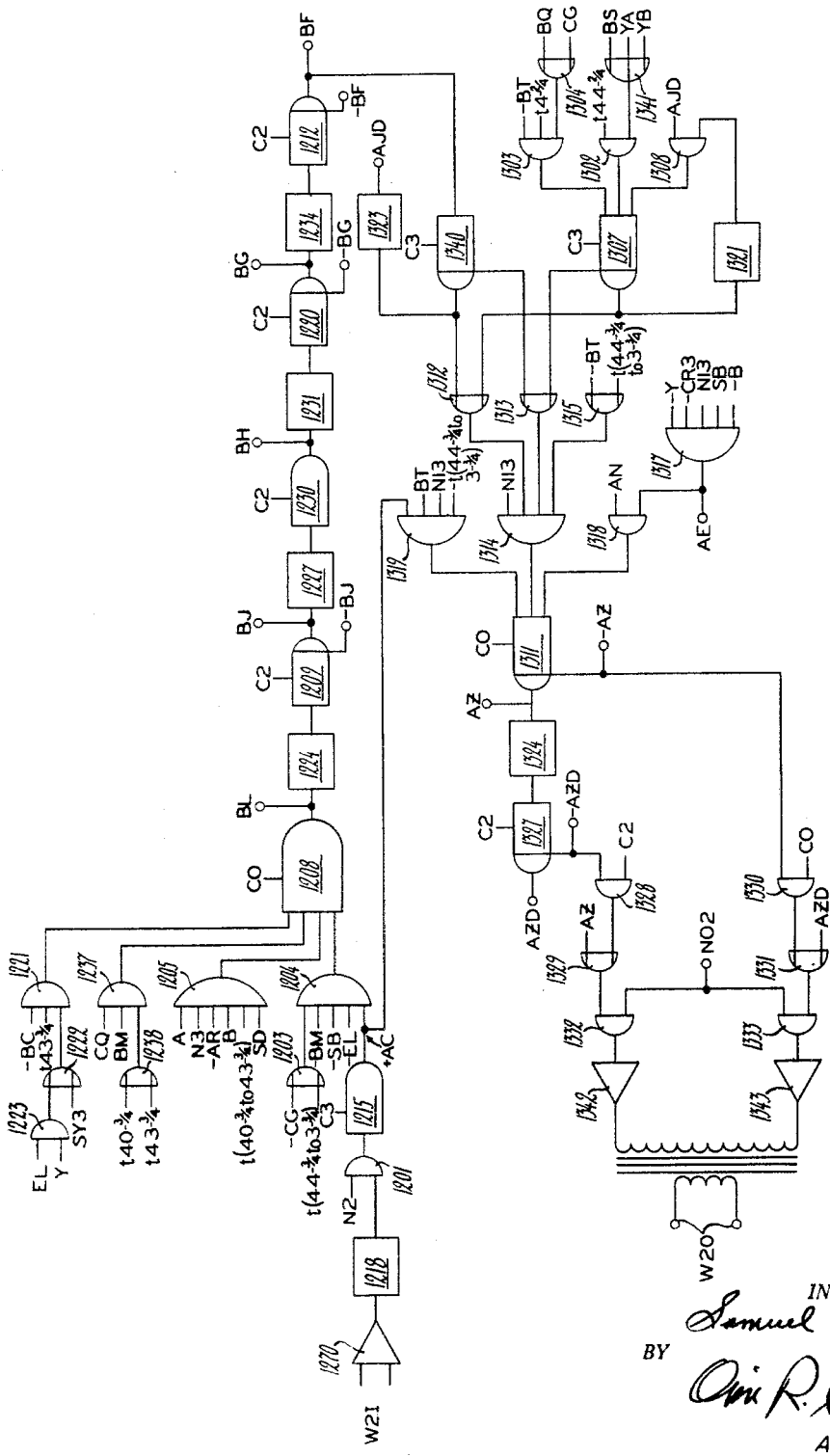
Figure 38:
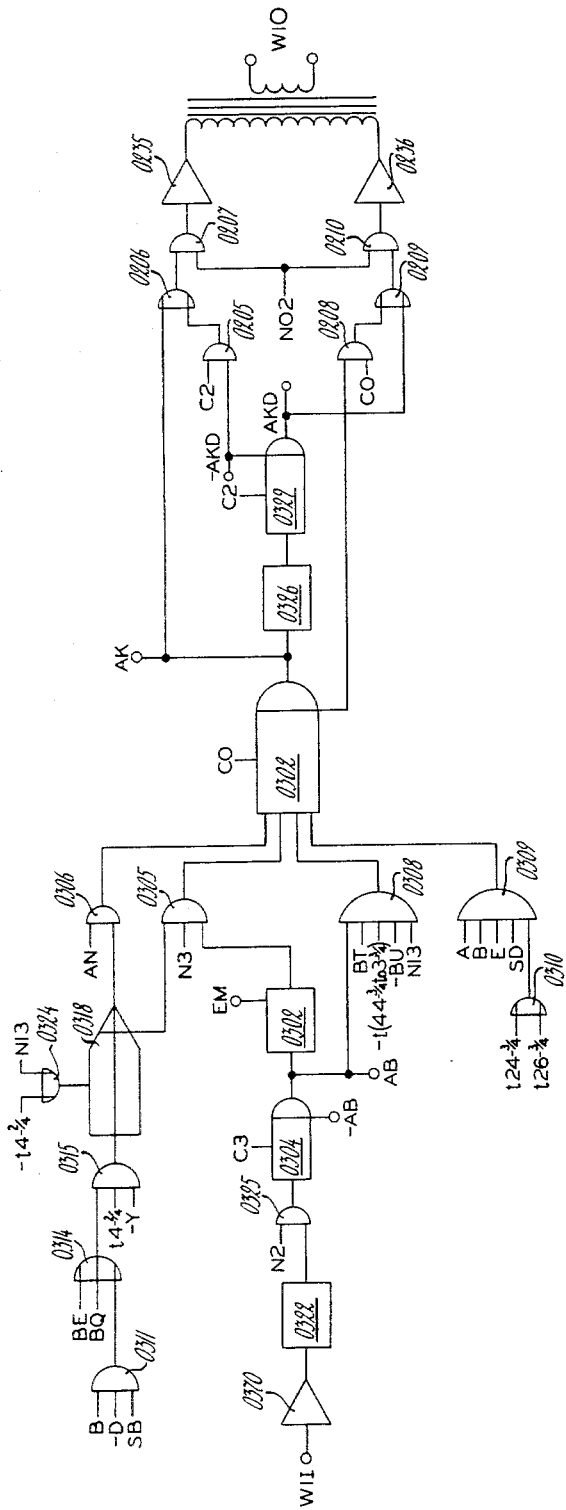
Figure 39:
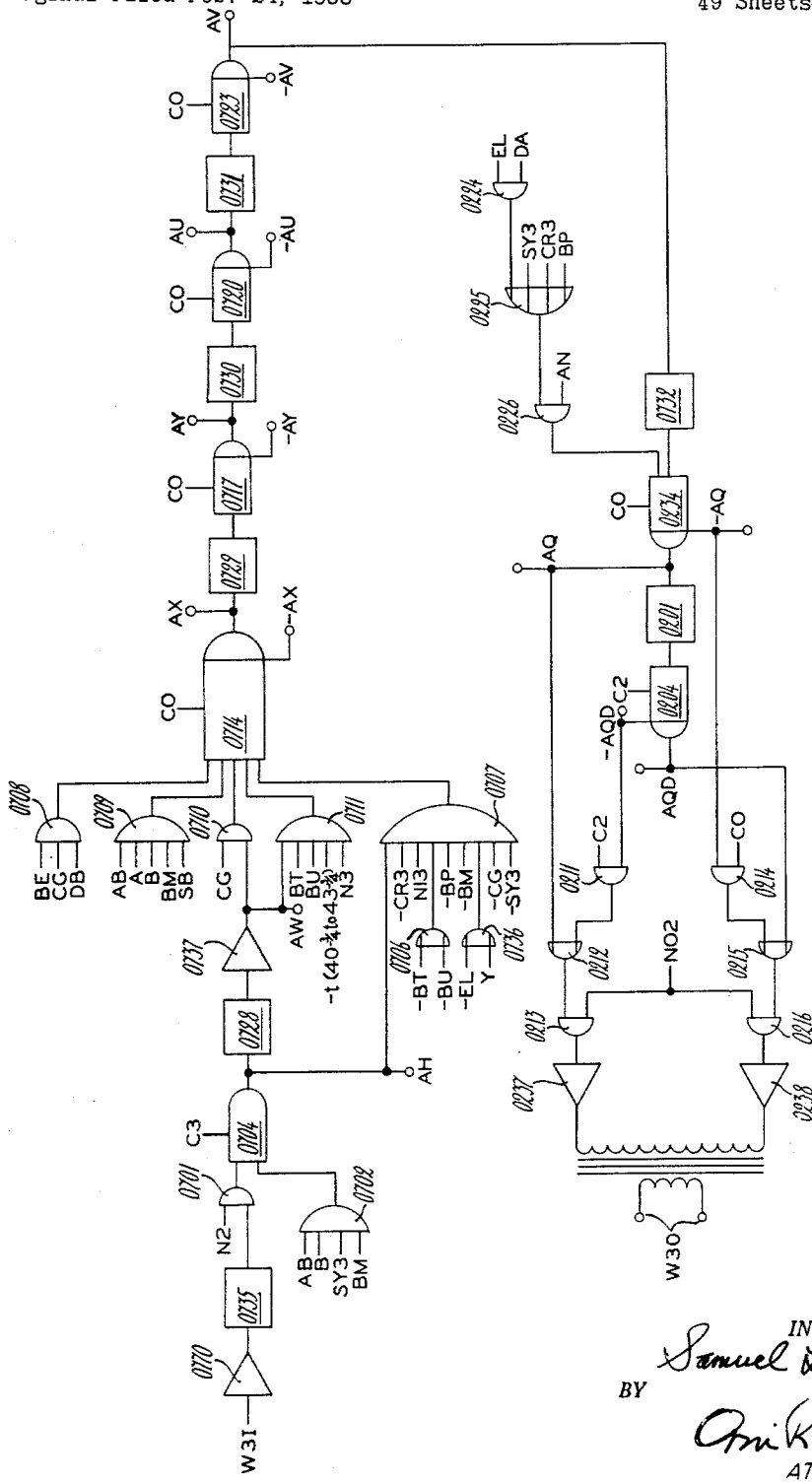
Figure 41:
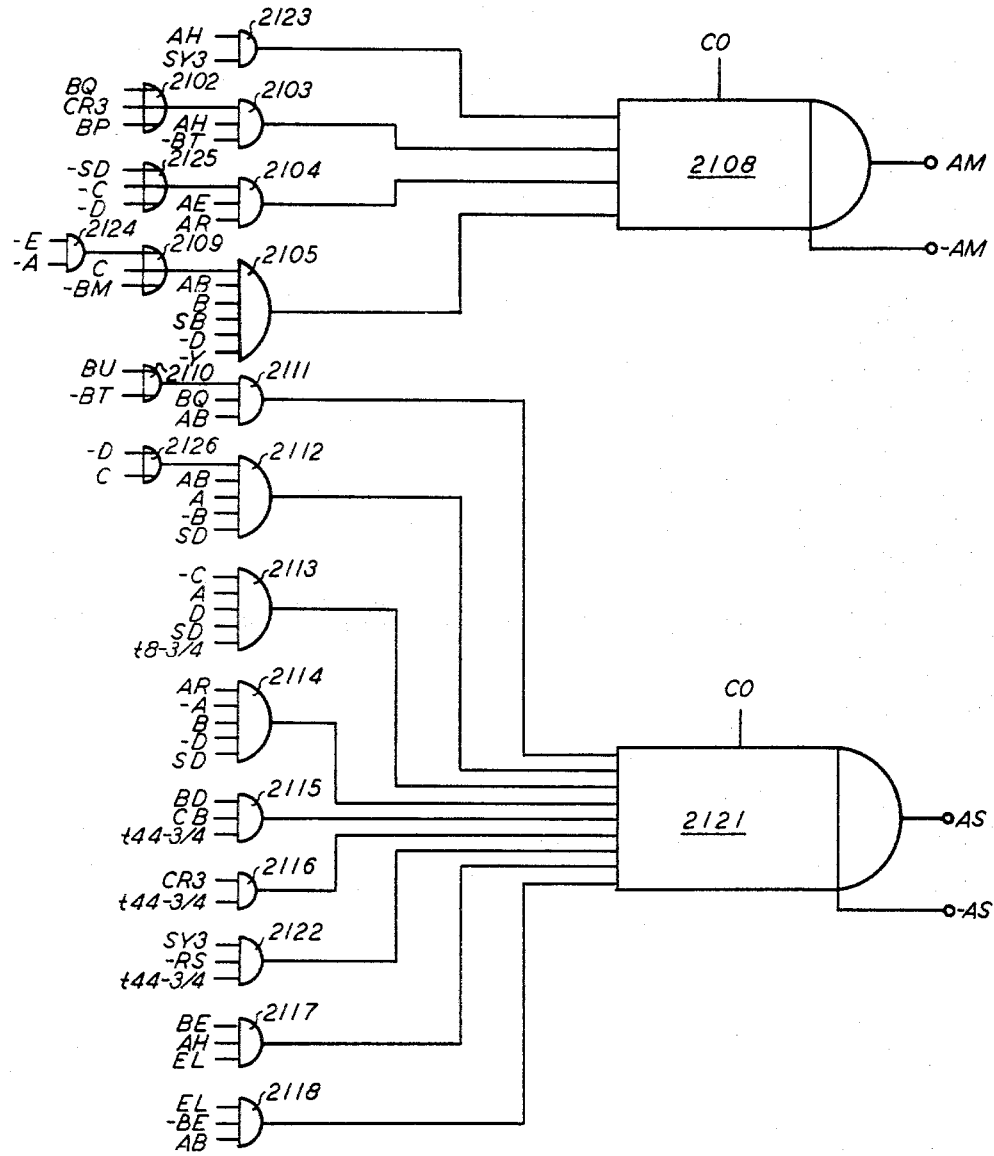
Figure 42A:
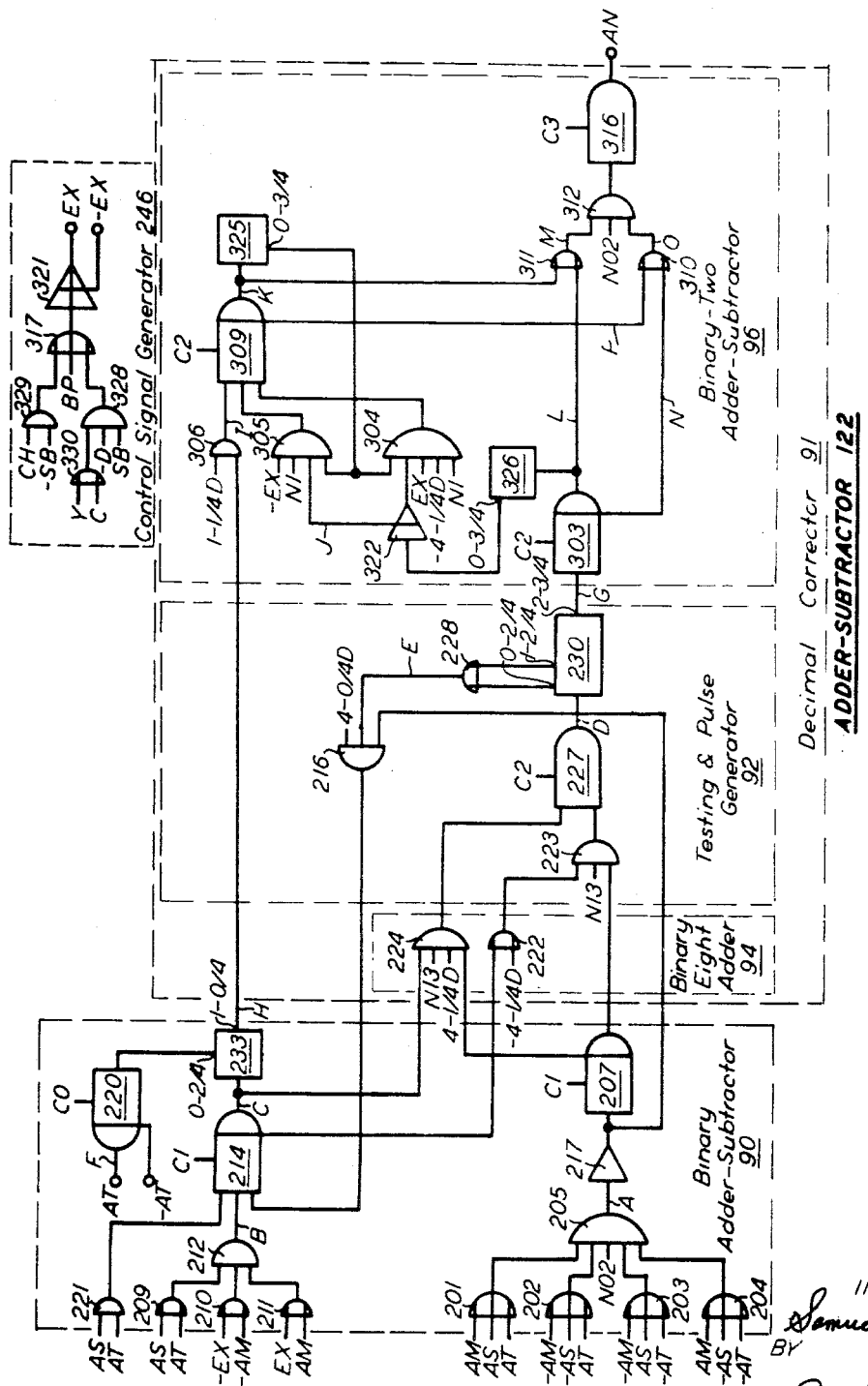
Figure 42B:
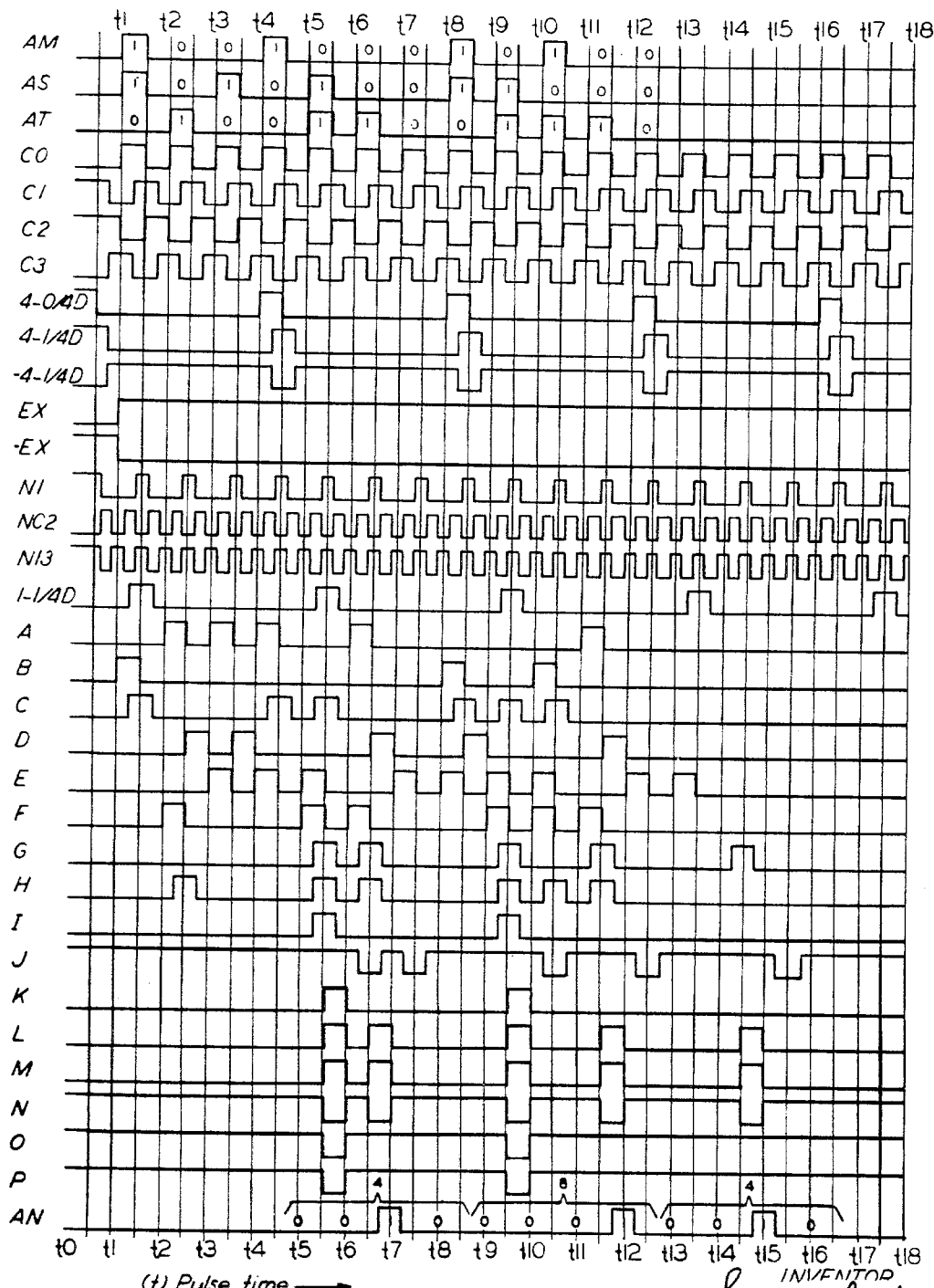
Figure 43:
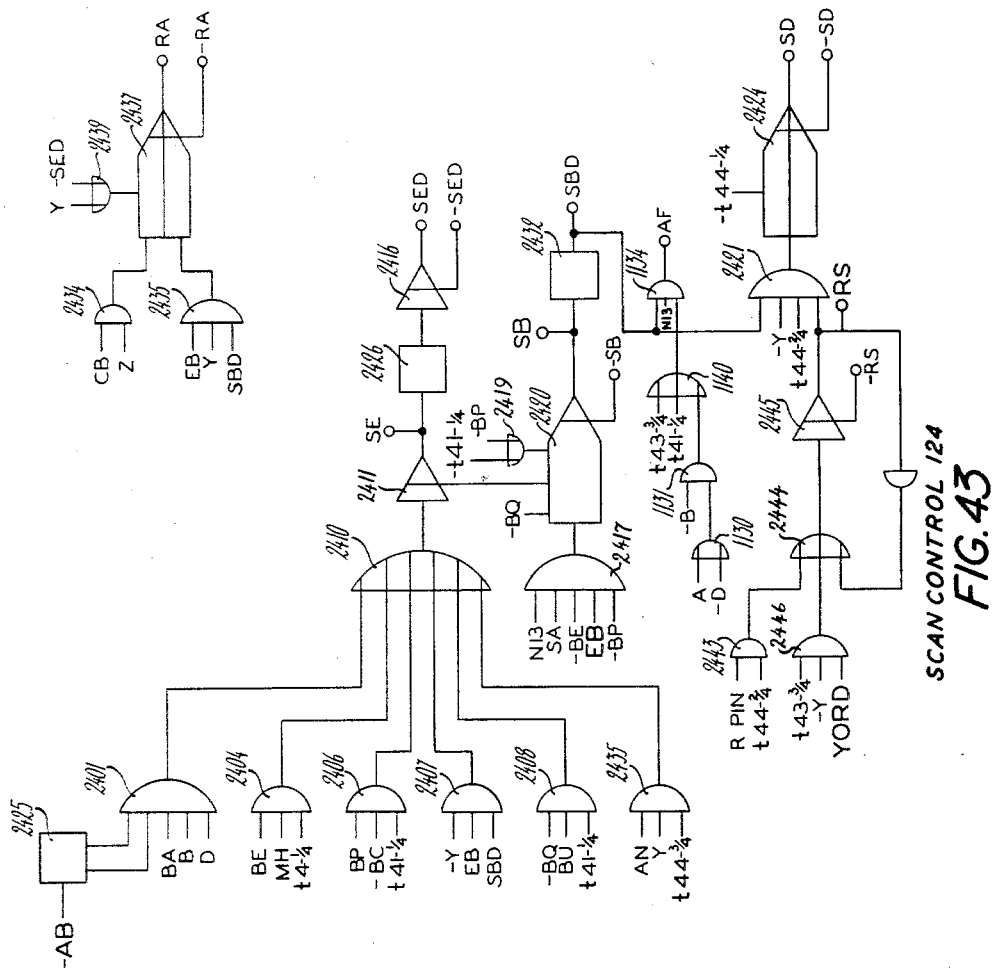
Figure 45:
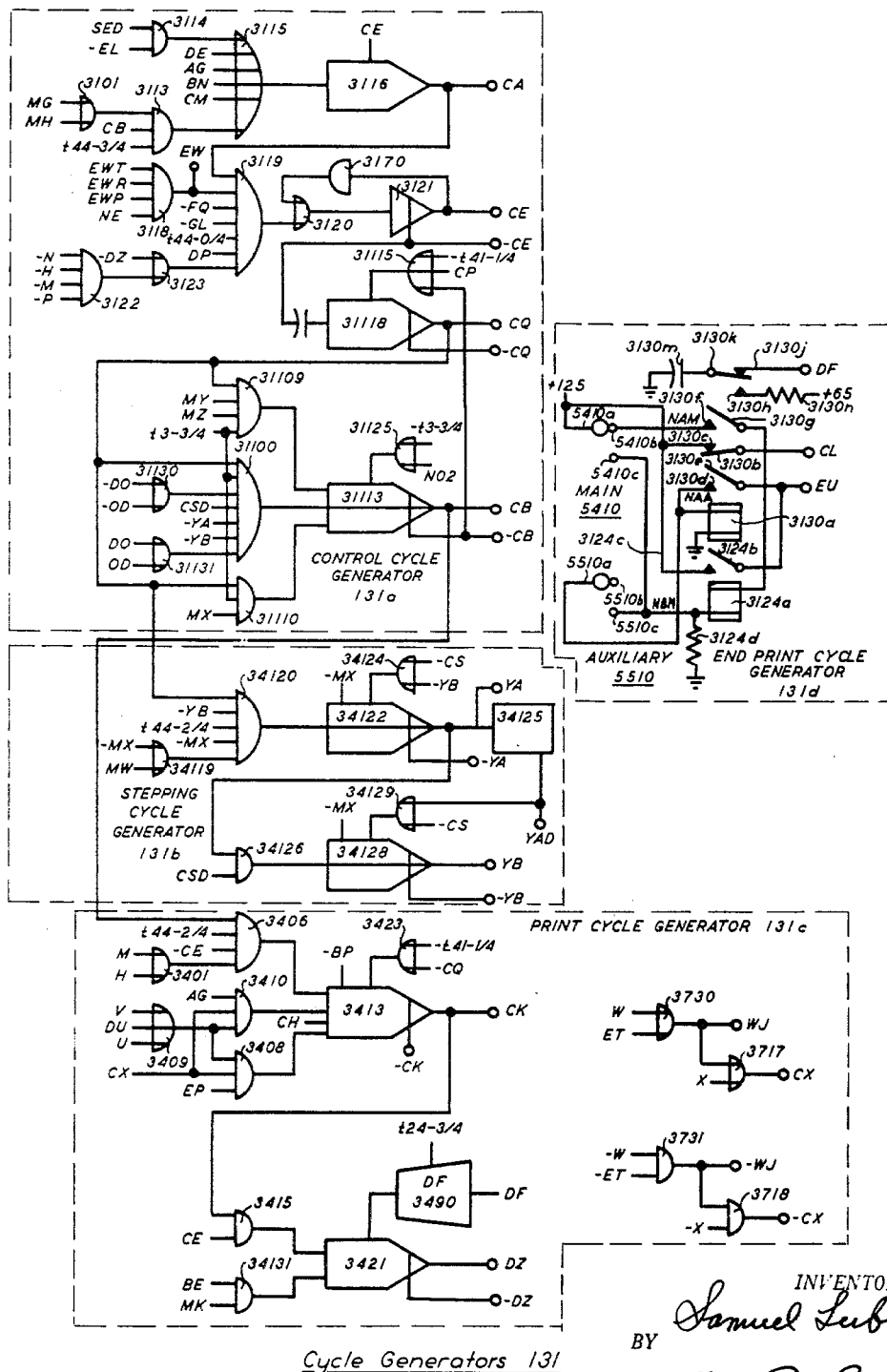
Figure 46:
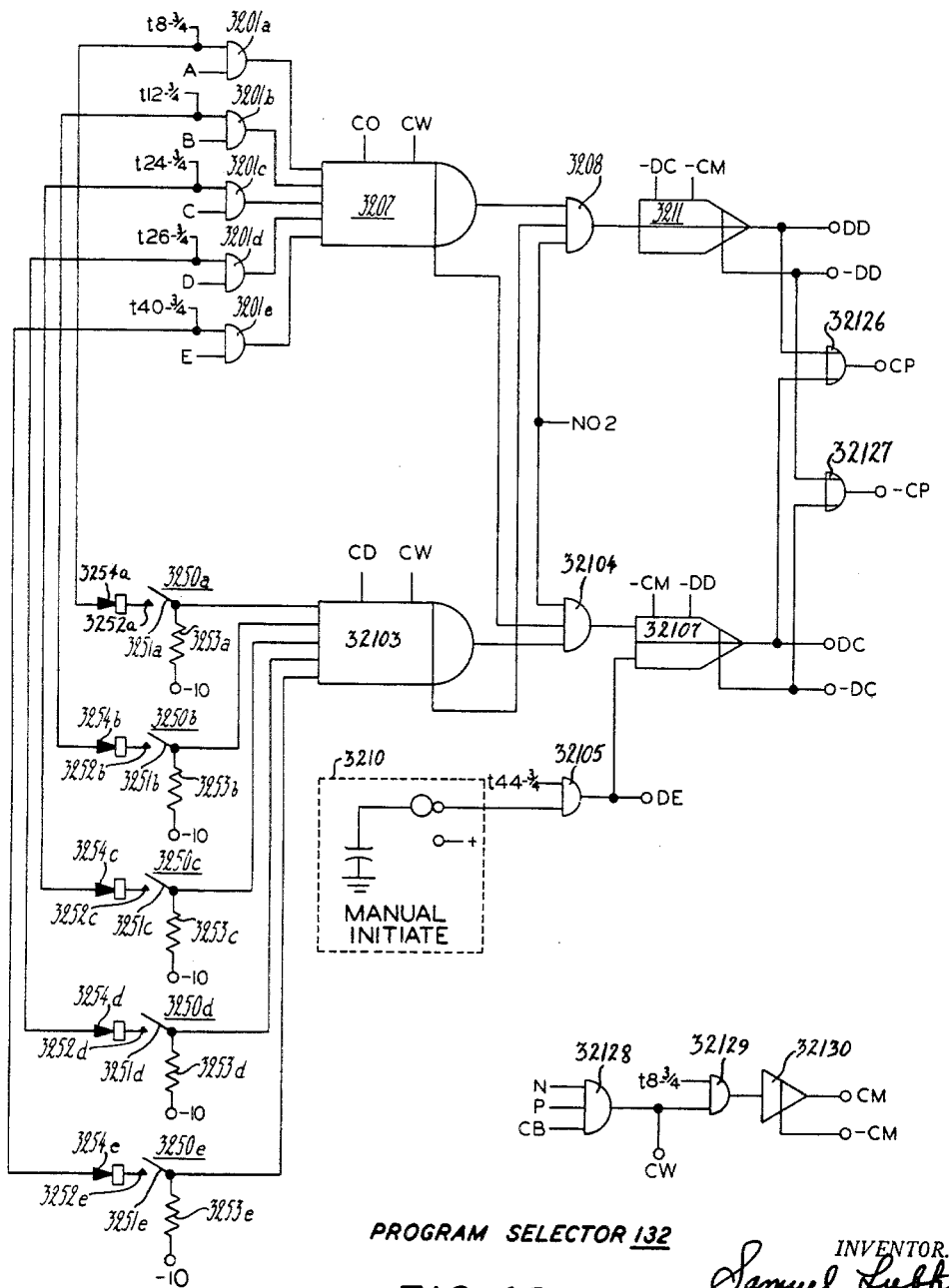
Figure 47:
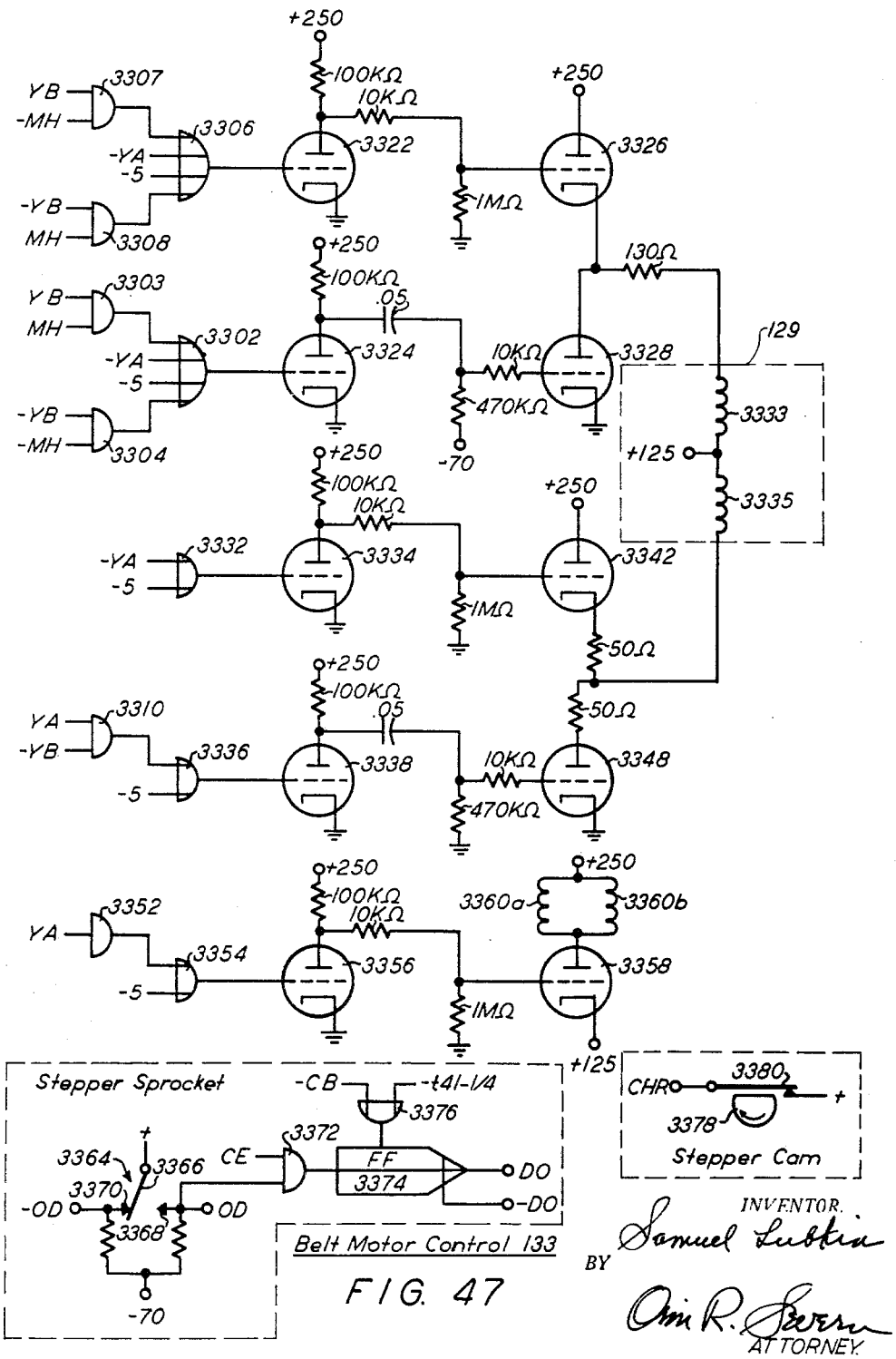

Fig. 25a illustrates the logical symbol for a gate.
Fig. 25b illustrates schematically the circuit of a gate.
Fig. 26a illustrates the logical symbol for a buffer.
Fig. 26b illustrates schematically the circuit of a buffer.
Fig. 27a illustrates the logical symbol for a delay line.
Fig. 27b illustrates schematically the circuit of a delay line.
Fig. 28a illustrates the logical symbol for a pulse amplifier.
Fig. 28b illustrates schematically the circuit of a pulse amplifier.
Fig. 29a illustrates the logical symbol for a disk or drum reading amplifier.
Fig. 29b illustrates schematically the circuit of a disk or drum reading amplifier.
Fig. 30a illustrates the logical symbol for a delay flop.
Fig. 30b illustrates diagrammatically the logical circuit of a delay flop.
Fig. 31a illustrates the logical symbol for a thyratron circuit.
Fig. 31b illustrates schematically the thyratron circuit.
Fig. 32a illustrates the logical symbol for a reshaper.
Fig. 32b illustrates schematically the circuit of a reshaper.
Fig. 33a illustrates the logical symbol for a D.-C. amplifier.
Fig. 33b illustrates schematically the circuit of a D.-C. amplifier.
Fig. 34a illustrates the logical symbol for a set dominant flip flop.
Fig. 34b illustrates diagrammatically the logical circuit of a set dominant flip flop.
Fig. 35a illustrates the logical symbol for a reset dominant flip flop.
Fig. 35b illustrates diagrammatically the logical circuit of a reset dominant flip flop.
Fig. 36 is a block diagram using logical symbols of the memory in-out control circuit.
Fig. 37 illustrates by logical symbols the circuit of the add-one register in-out control.
Fig. 38 illustrates by logical symbols the circuit of the accumulator register in-out control.
Fig. 39 illustrates by logical symbols the circuit of the left-shift register in-out control.
Fig. 40 illustrates by logical symbols the circuit of the arithmetic controls comprising multiplication controls, stepping pulse width control, and miscellaneous controls.
Fig. 41 illustrates by logical symbols the circuit of the operand funnel.
Fig. 42a illustrates by logical symbols the circuit of the adder-subtractor showing the binary adder-subtractor, the binary eight adder, the testing and pulse generator, the binary two adder-subtractor, and the control signal generator.
Fig. 42b illustrates, relative to pulse time, the signals that are present at various positions within the adder-subtractor during an addition procedure.
Fig. 43 illustrates by logical symbols the circuit of the scan control.
Fig. 44a is a plan view of the plastic tape.
Fig. 44b is a side view of one of the pin feeler mechanisms utilized to detect cutouts located in the plastic tape.
Fig. 45 illustrates by logical symbols the circuit of the cycle generators comprising the control cycle generator, the stepping cycle generator, the print cycle generator, and the end print cycle generator.
Fig. 46 illustrates by logical symbols the circuit of the program selector.
Fig. 47 is a block and schematic diagram of the belt motor control circuit including the stepper sprocket and the stepper cam.

Figure 48:
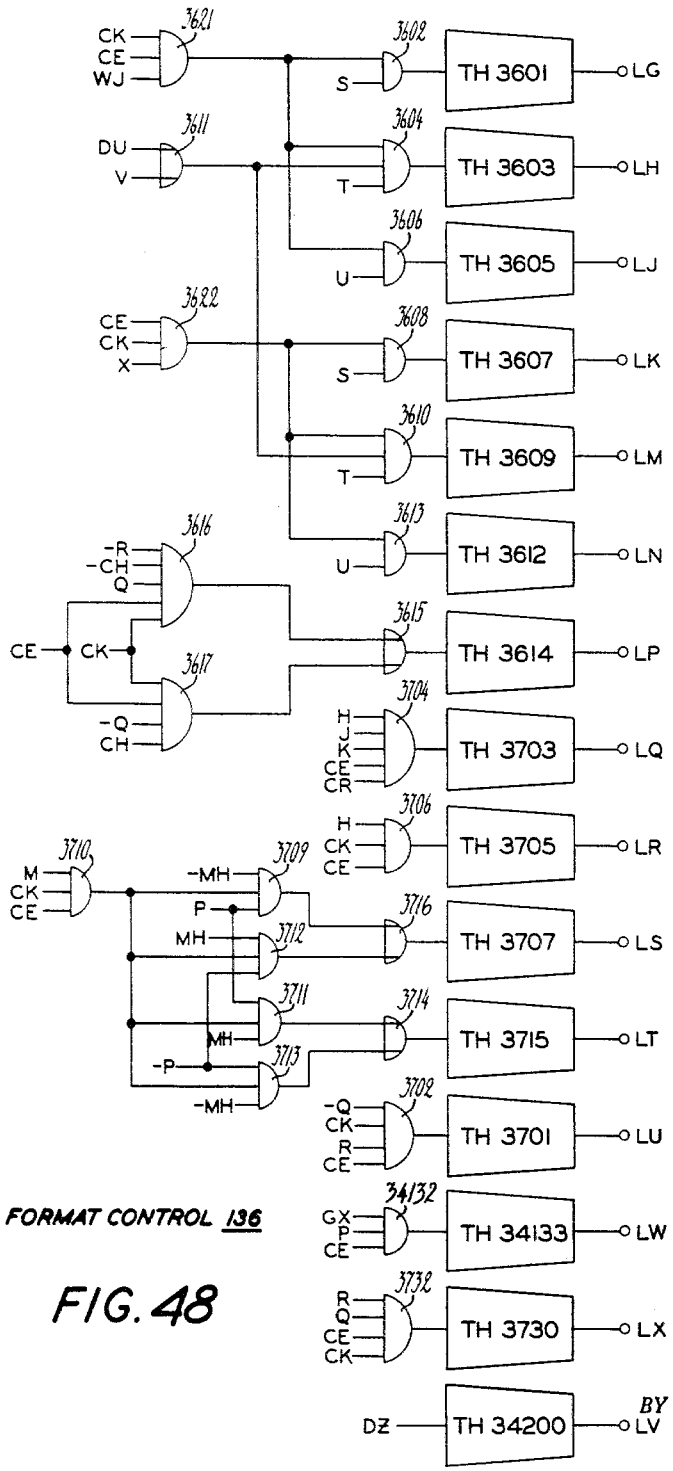
Figure 49:
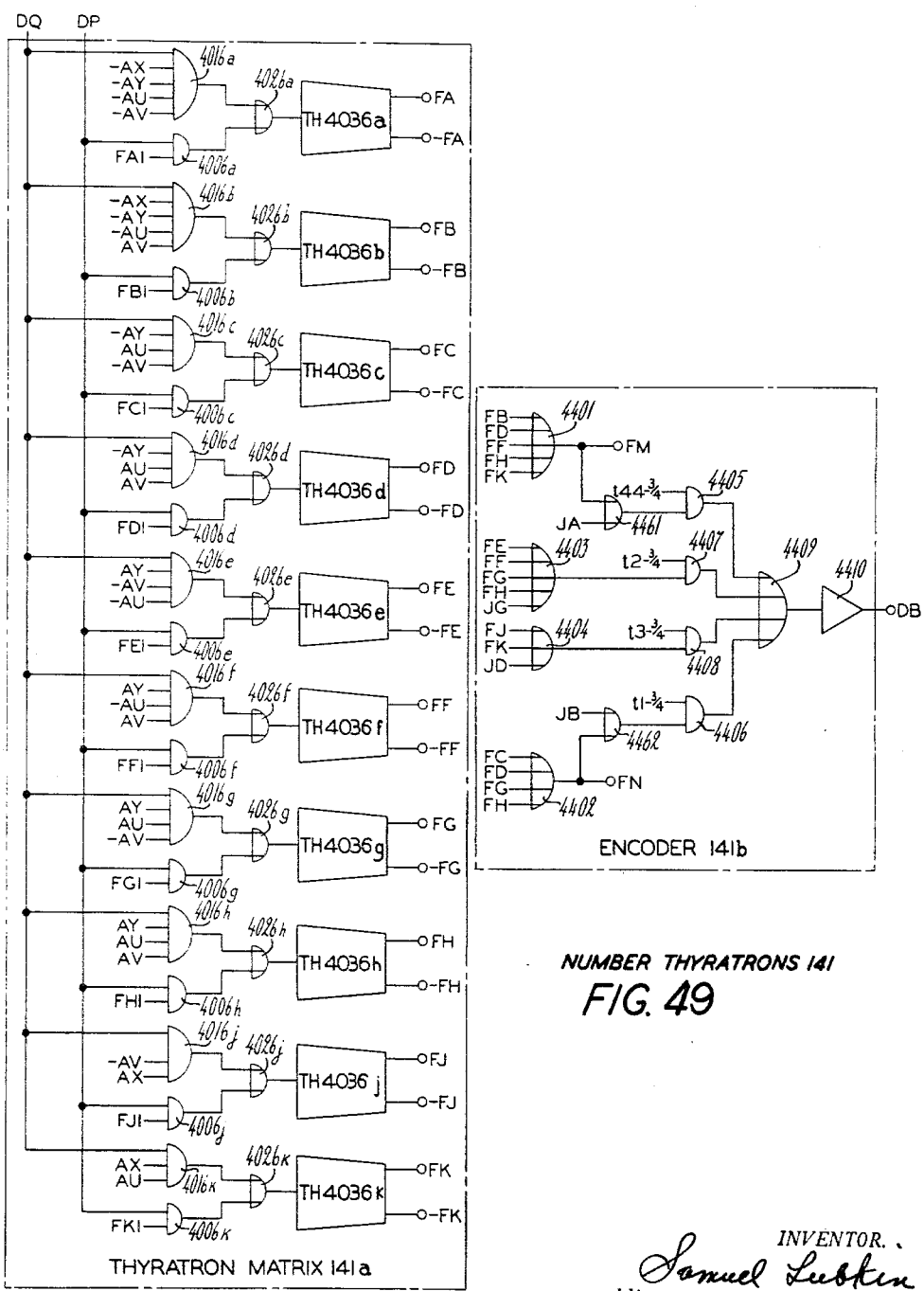
Figure 50:
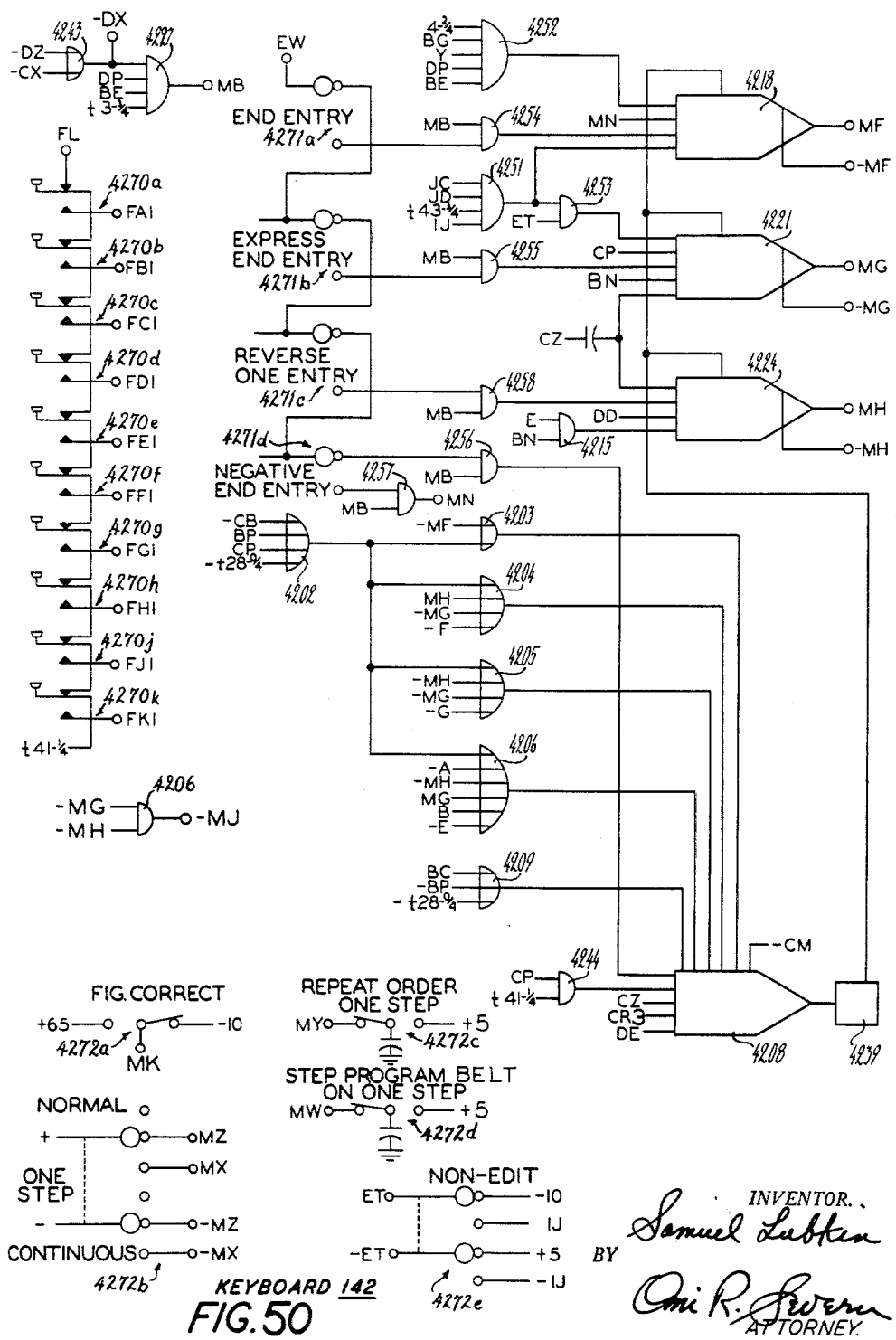
Figure 51:
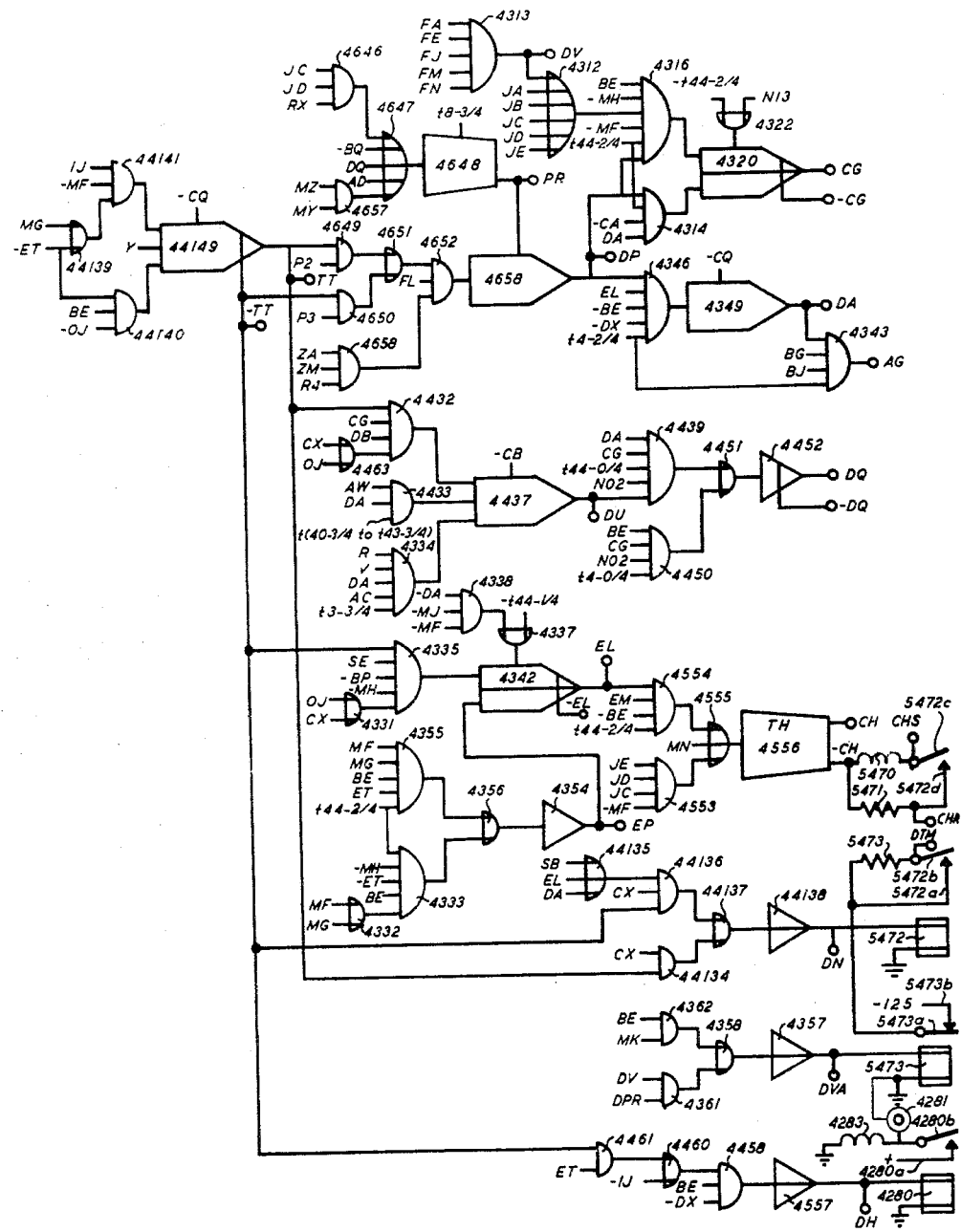
Figure 52:
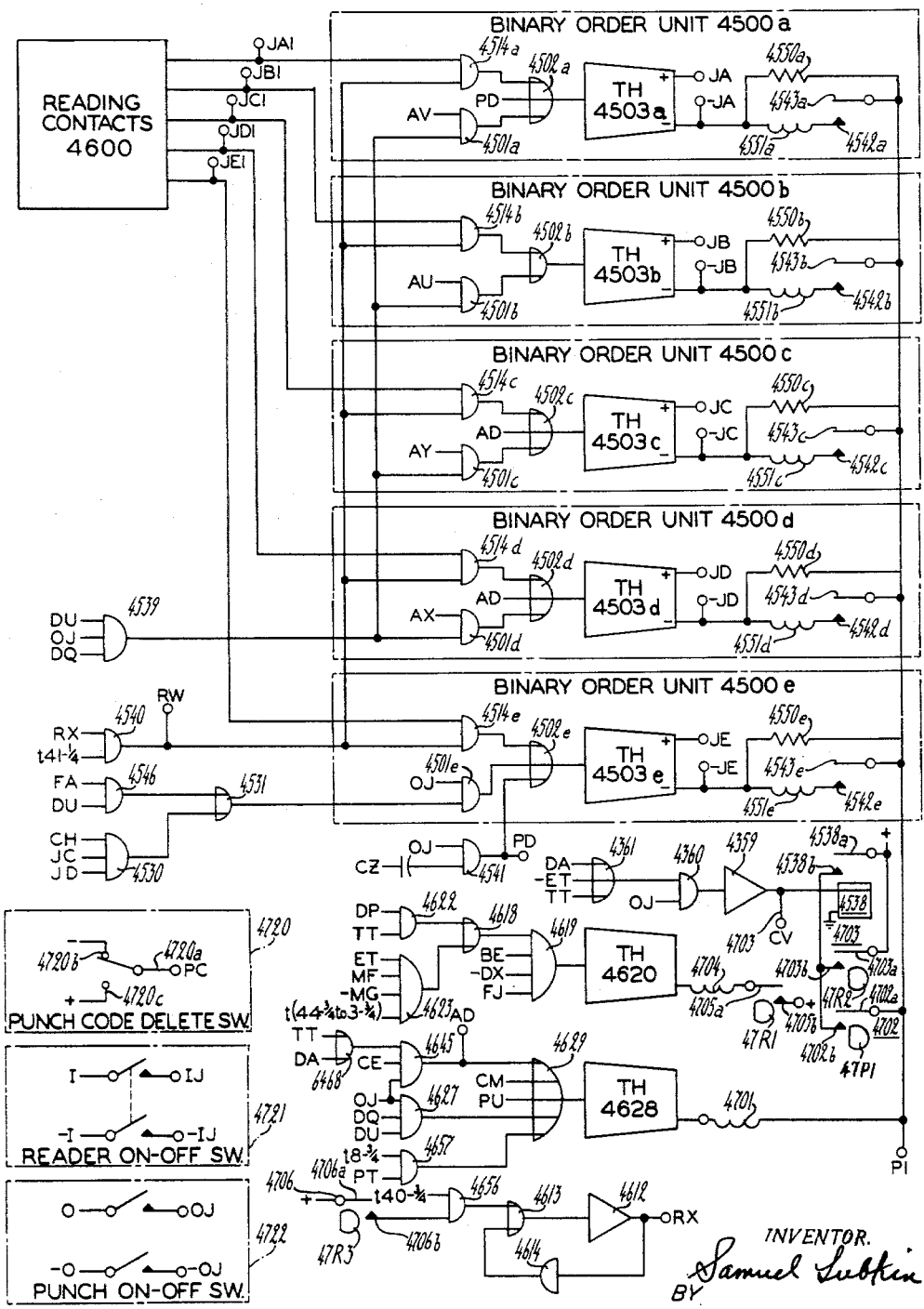
Figure 53:
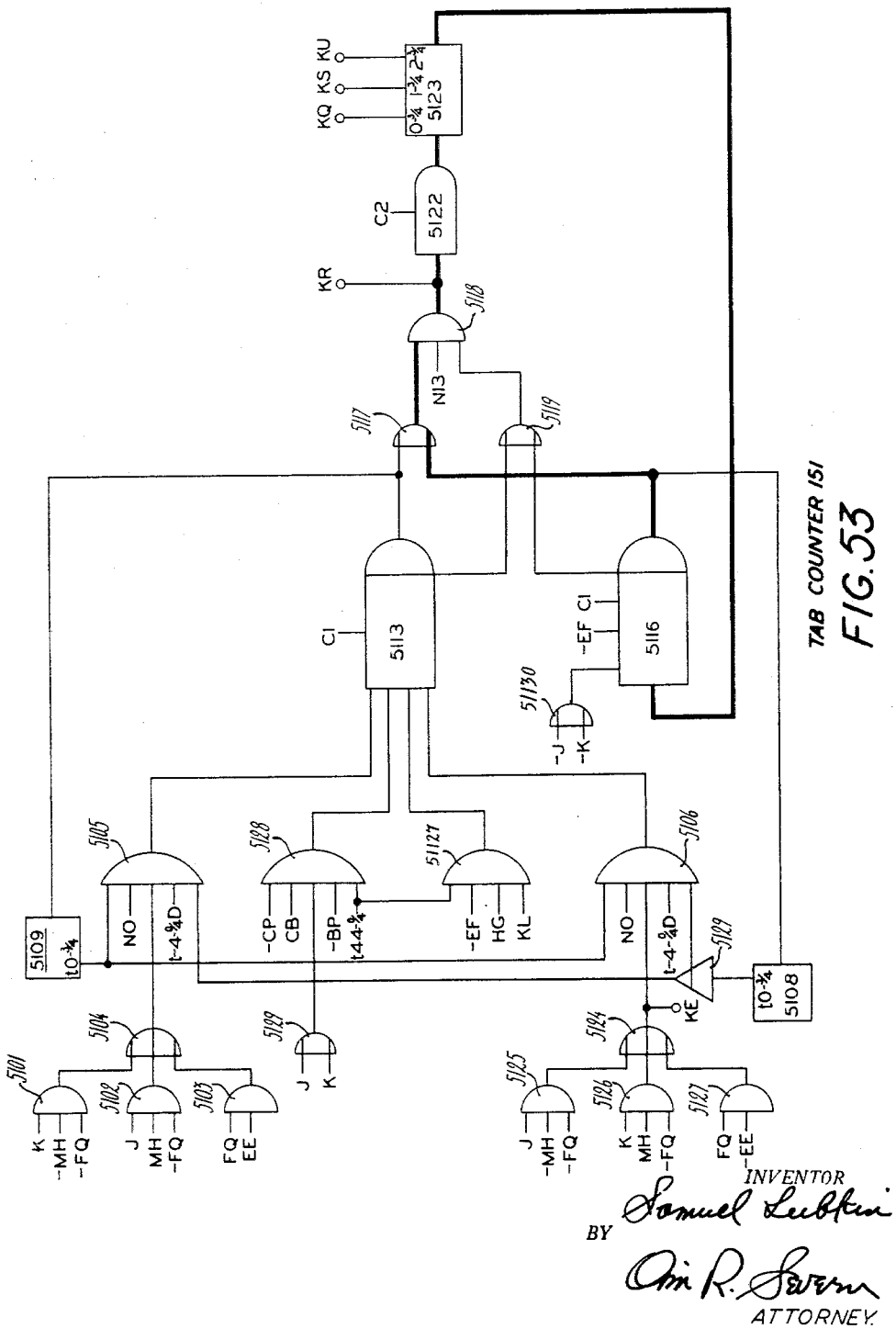
Figure 54:
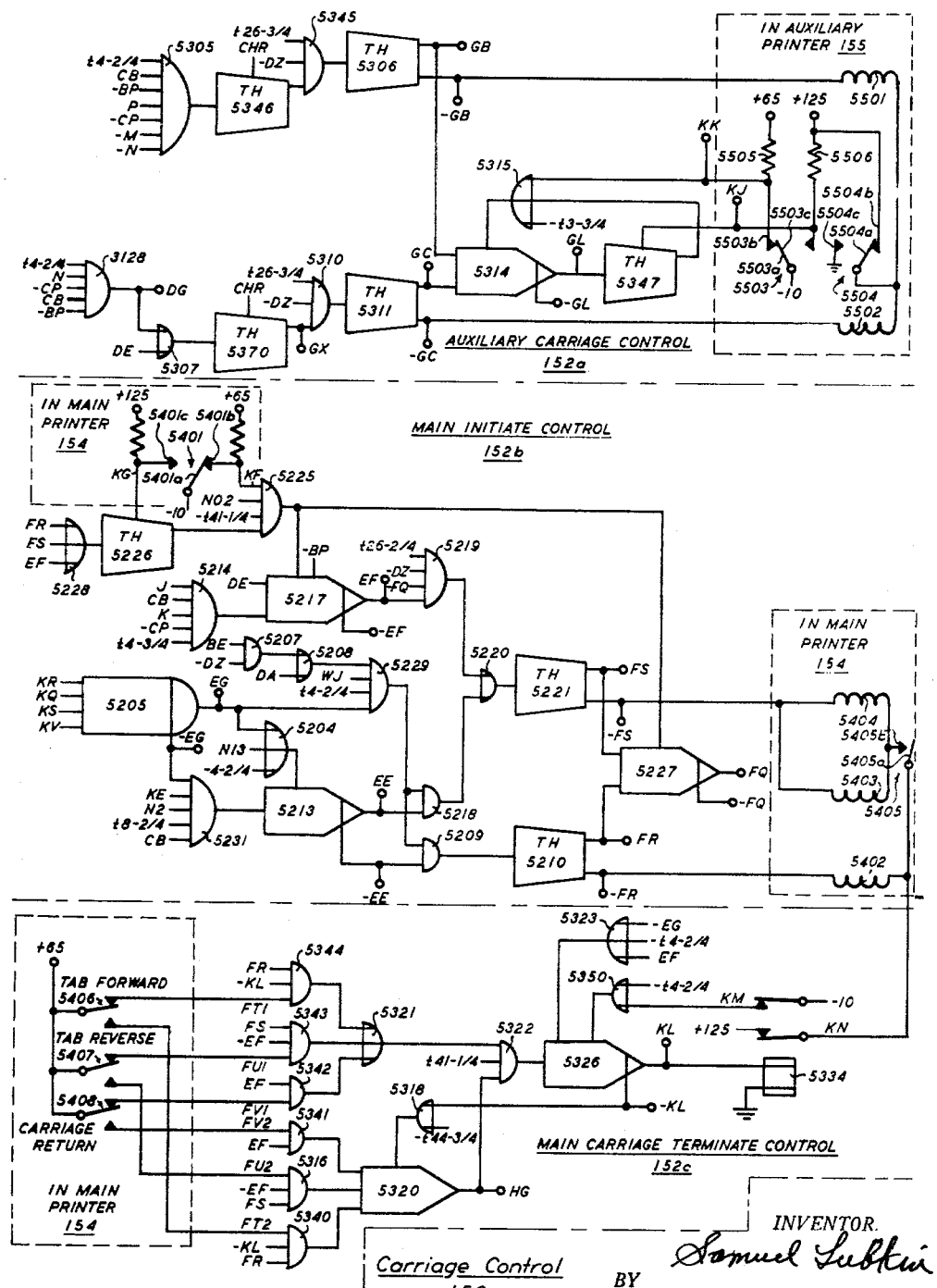
Figure 57:
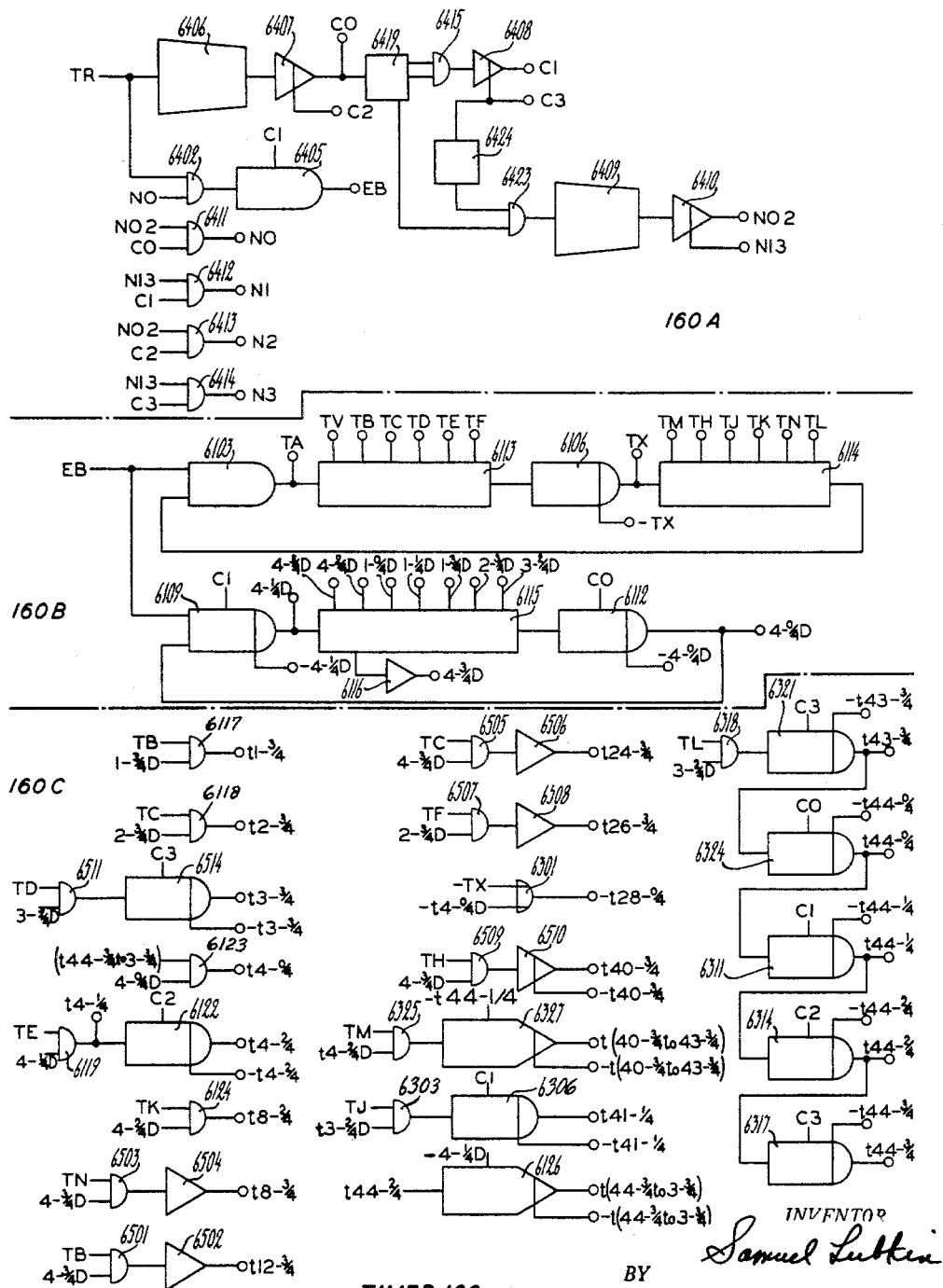
Figure 58:
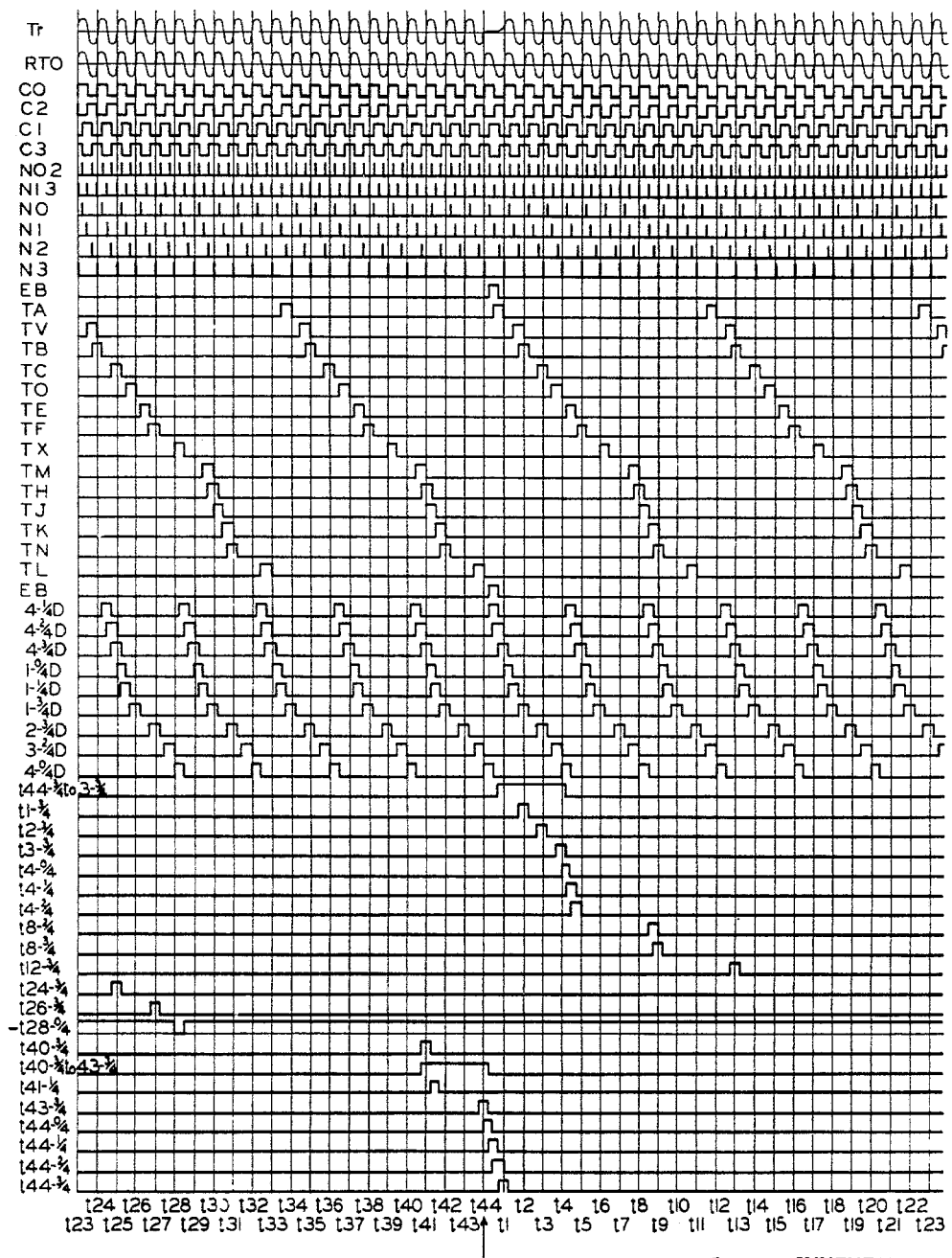
Figure 59A:
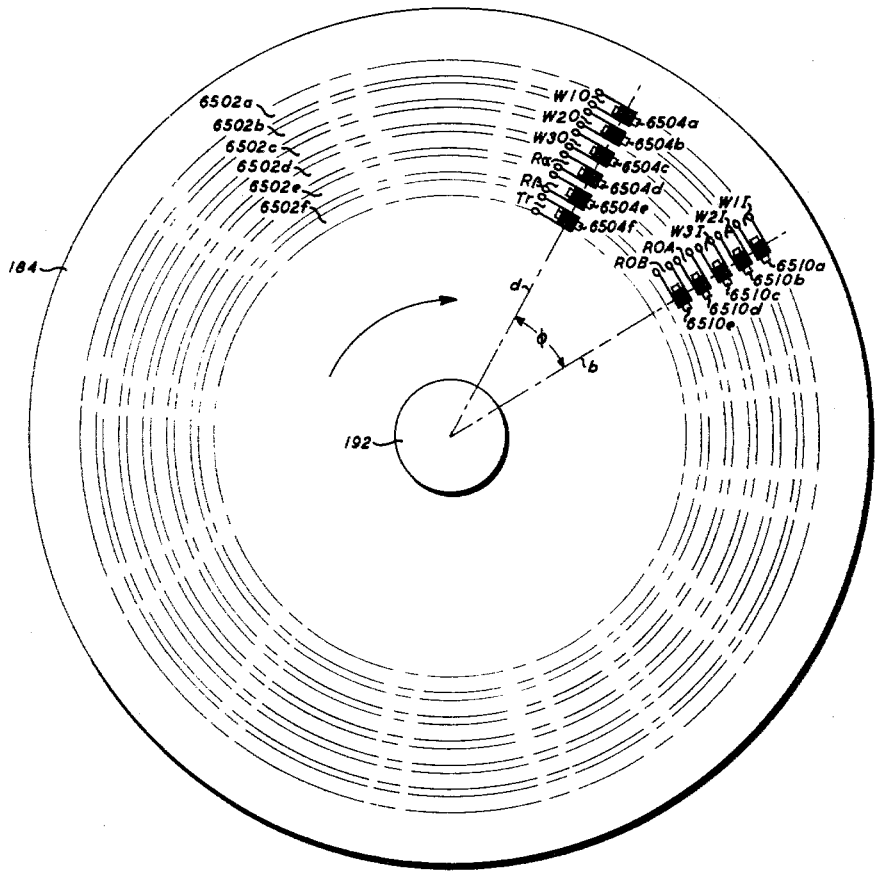
Figure 59B:
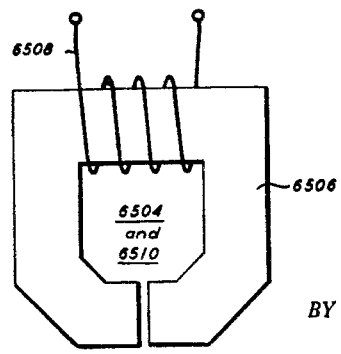

Fig. 48 illustrates by logical symbols the circuit of the format control.
Fig. 49 illustrates by logical symbols the number thyratrons comprising the thyratron matrix, and the encoder.
Fig. 50 illustrates schematically the circuit of the keyboard.
Fig. 51 illustrates by logical symbols the circuit of the enter and index control.
Fig. 52 illustrates by logical symbols the circuit of the paper tape input-output.
Fig. 53 illustrates by logical symbols the circuit of the tab counter.
Fig. 54 illustrates by logical symbols the carriage control comprising the auxiliary carriage control, the main initiate control, and the main carriage terminate control.
Fig. 55 is a perspective view of the mechanical elements of the main printer.
Fig. 56 is a side view of the switch in the main printer that indicates the mechanical end of a print cycle.
Fig. 57 illustrates by logical symbols the circuit of the timer.
Fig. 58 shows the timing waveforms that are generated by the timer when plotted against pulse time.
Fig. 59a illustrates the magnetic disk and the recording heads.
Fig. 59b illustrates in greater detail the recording and reproducing heads that record and read information on the magnetic disk.

A complete logical diagram of the computer system may readily be prepared by interconnecting the detailed logical diagrams in accordance with the connections shown in the various program instructions.

TABLE OF CONTENTS

Figure 1:
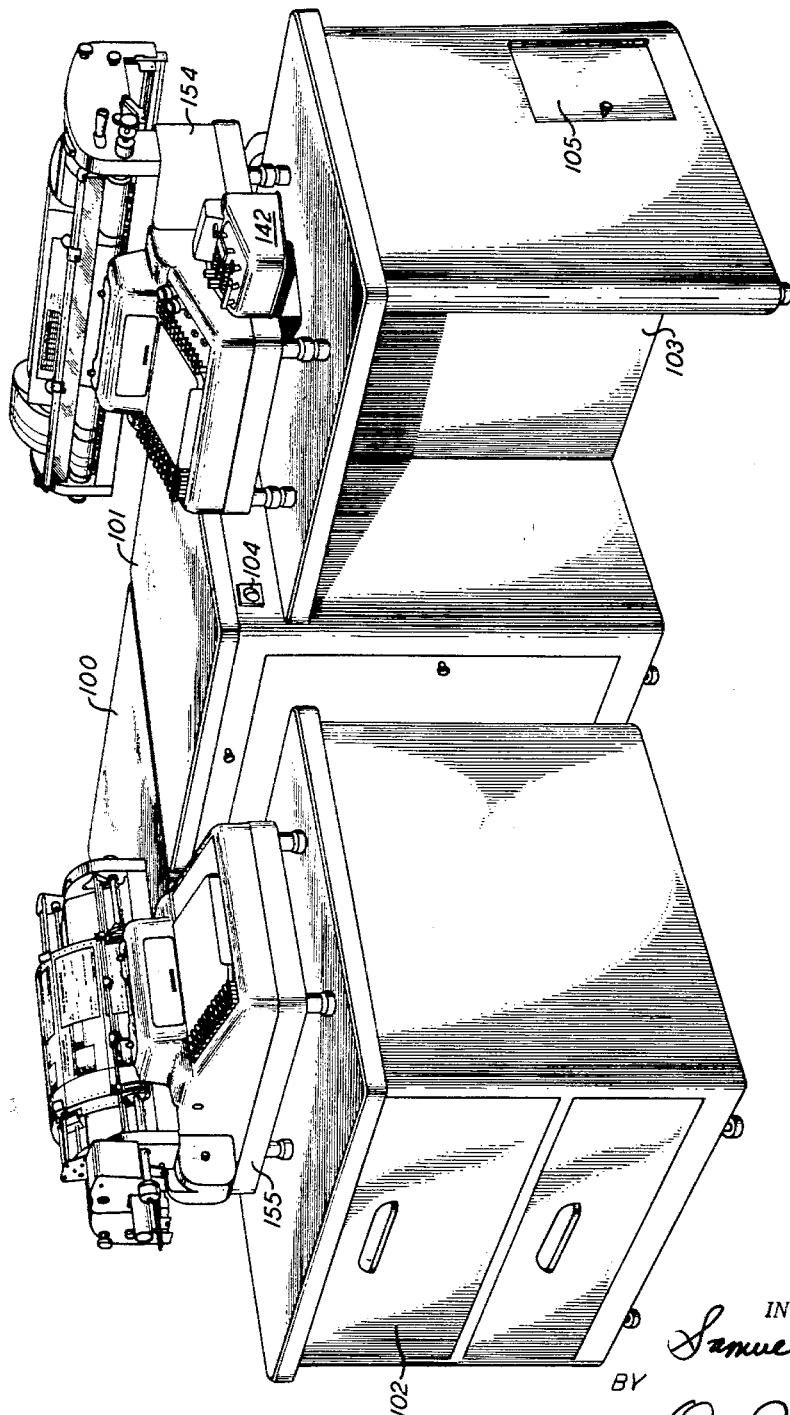
FIG. 1 is a pictorial view of the system illustrating the main and auxiliary printers and the arithmetic section, the central control section, the paper tape section and the power supply section.
Figure 7:
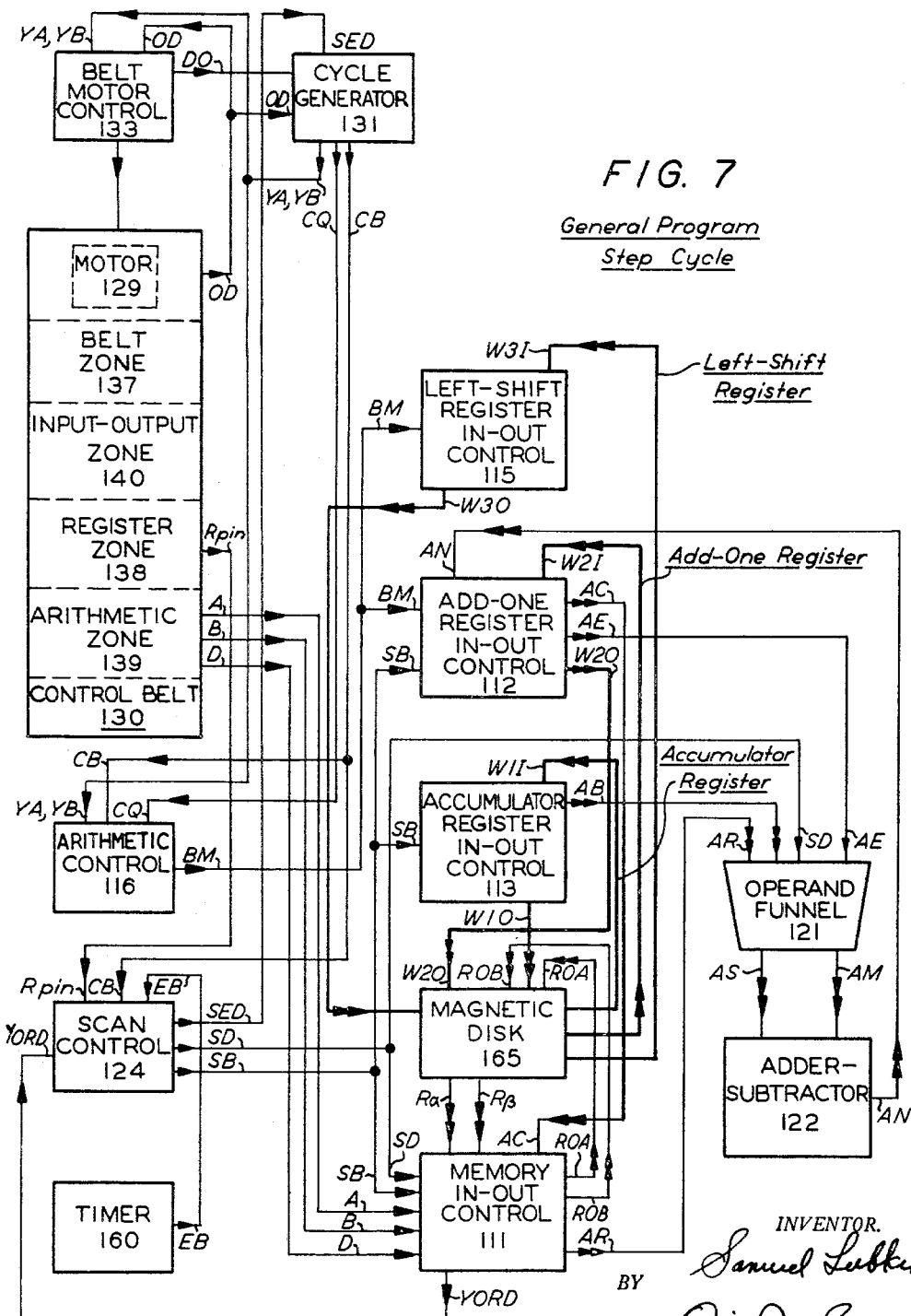
FIG. 7 is a block diagram that illustrates the flow of control and information signals during a general program step cycle.
Figure 8:
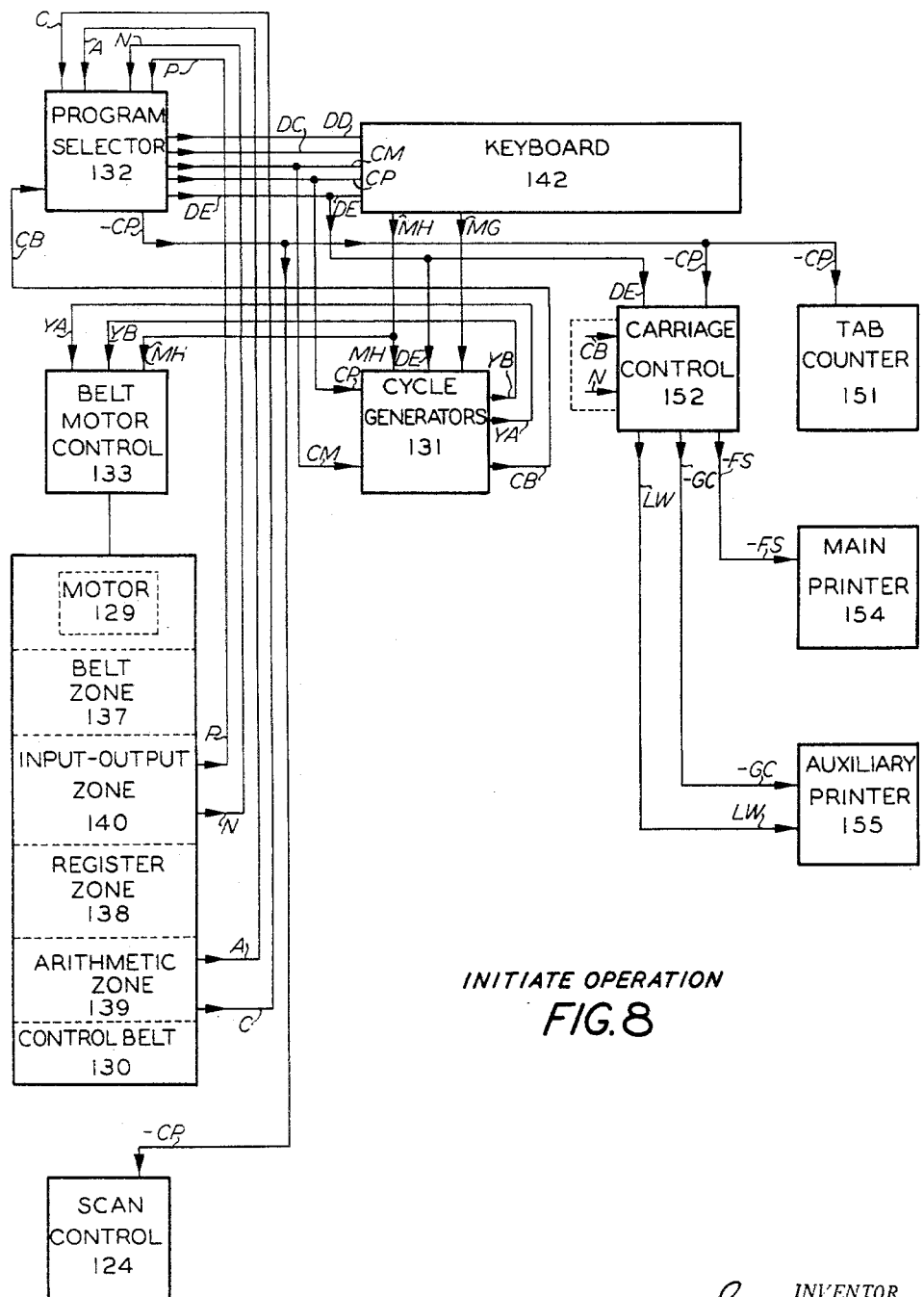
FIG. 8 is a block diagram that illustrates the flow of control signals during the "Initiate Operation" program instruction.
Figure 9:
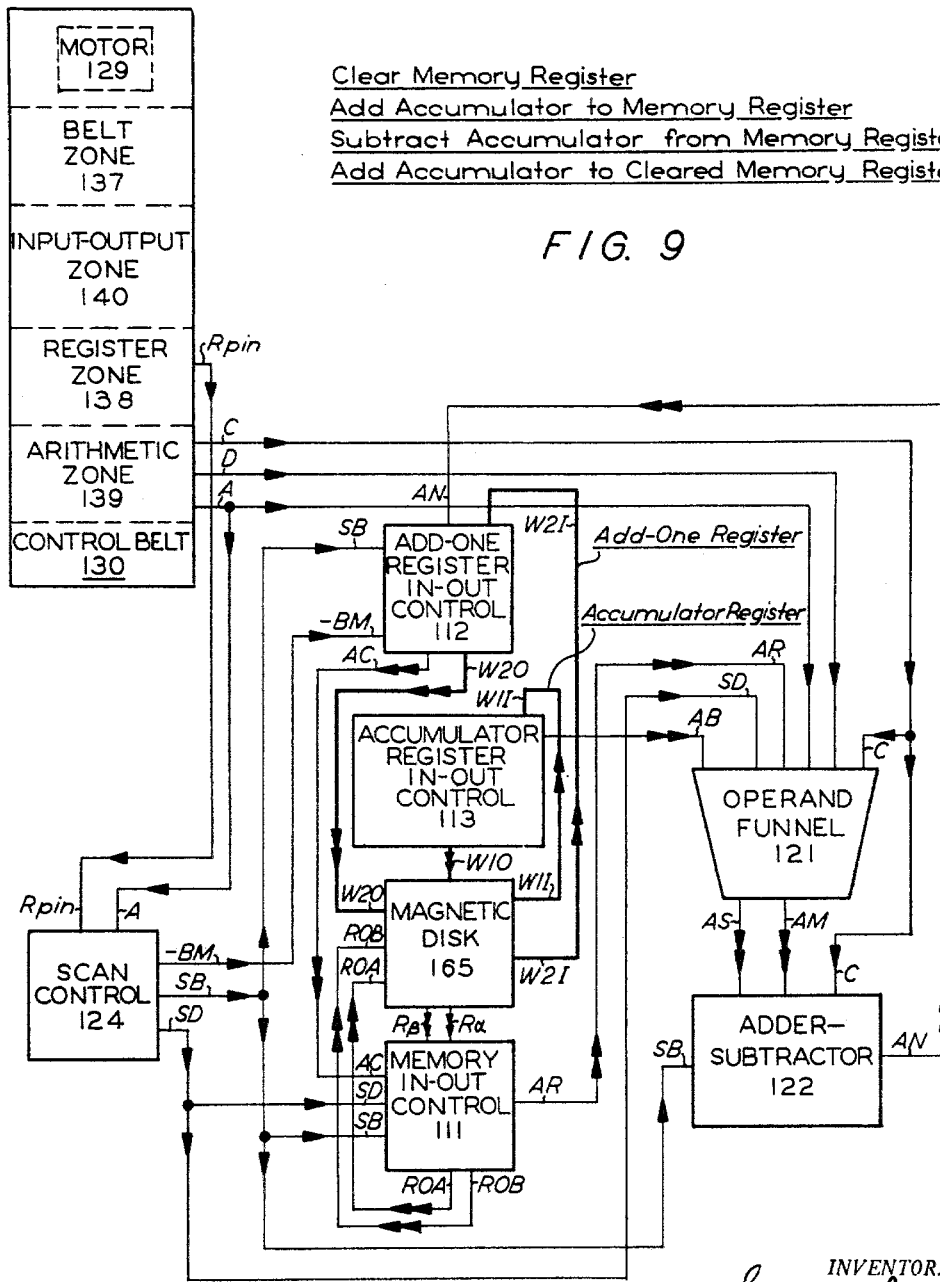
FIG. 9 is a block diagram that illustrates the flow of control and information signals during the "Clear Memory Register," the "Add Accumulator to Memory Register," the "Substract Accumulator from Memory Register," and the "Add Accumulator to Cleared Memory Register" program instructions.
Figure 10:
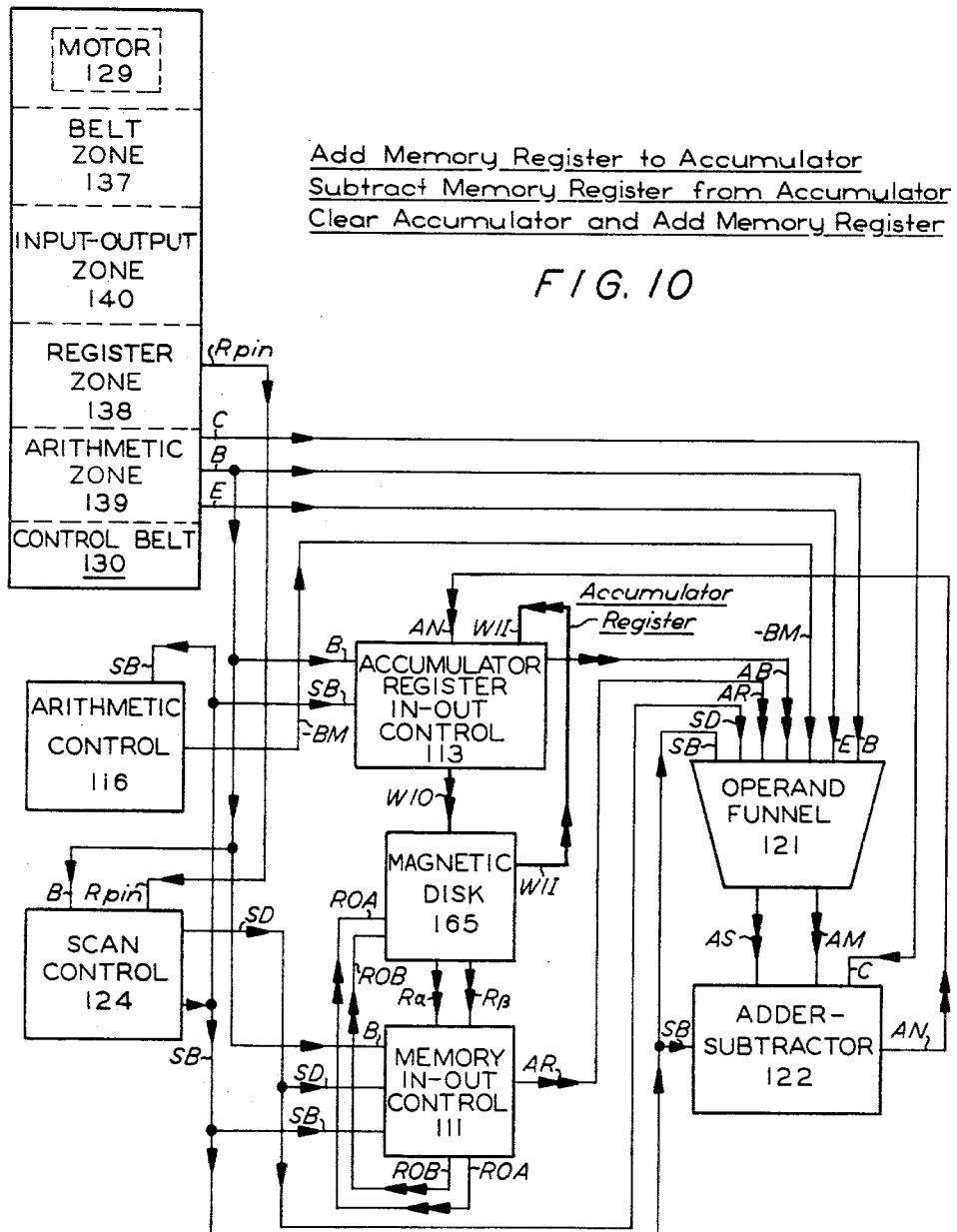
FIG. 10 is a block diagram that illustrates the flow of control and information signals during the "Add Memory Register to Accumulator," the "Subtract Memory Register from Accumulator," and the "Clear Accumulator and Add Memory Register" program instructions.
Figure 11:
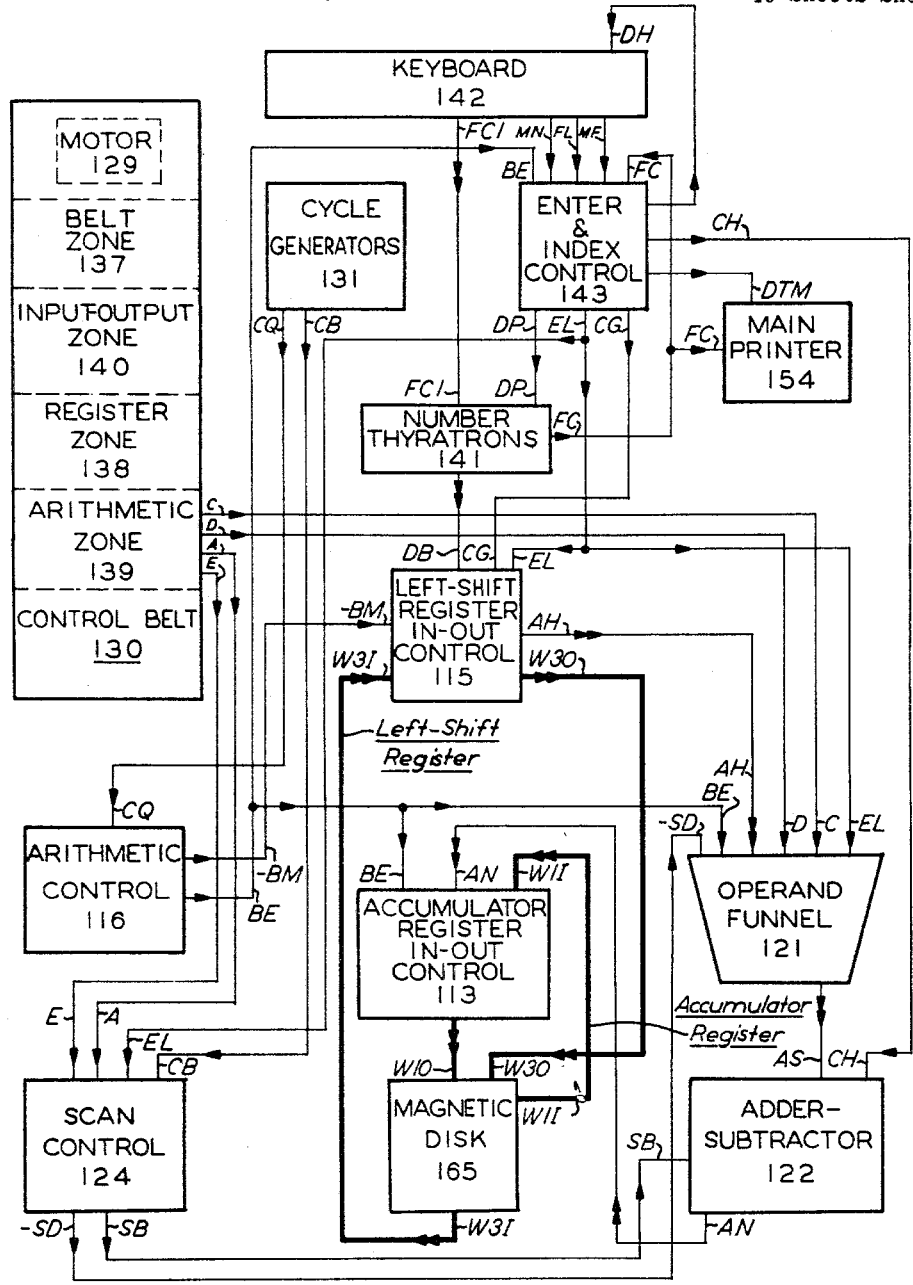
FIG. 11 is a block diagram that illustrates the flow of control and information signals during the "Enter Number via Keyboard into Memory Register," and the "Enter Number via Keyboard into Cleared Memory Register" program instructions.
Figure 12:
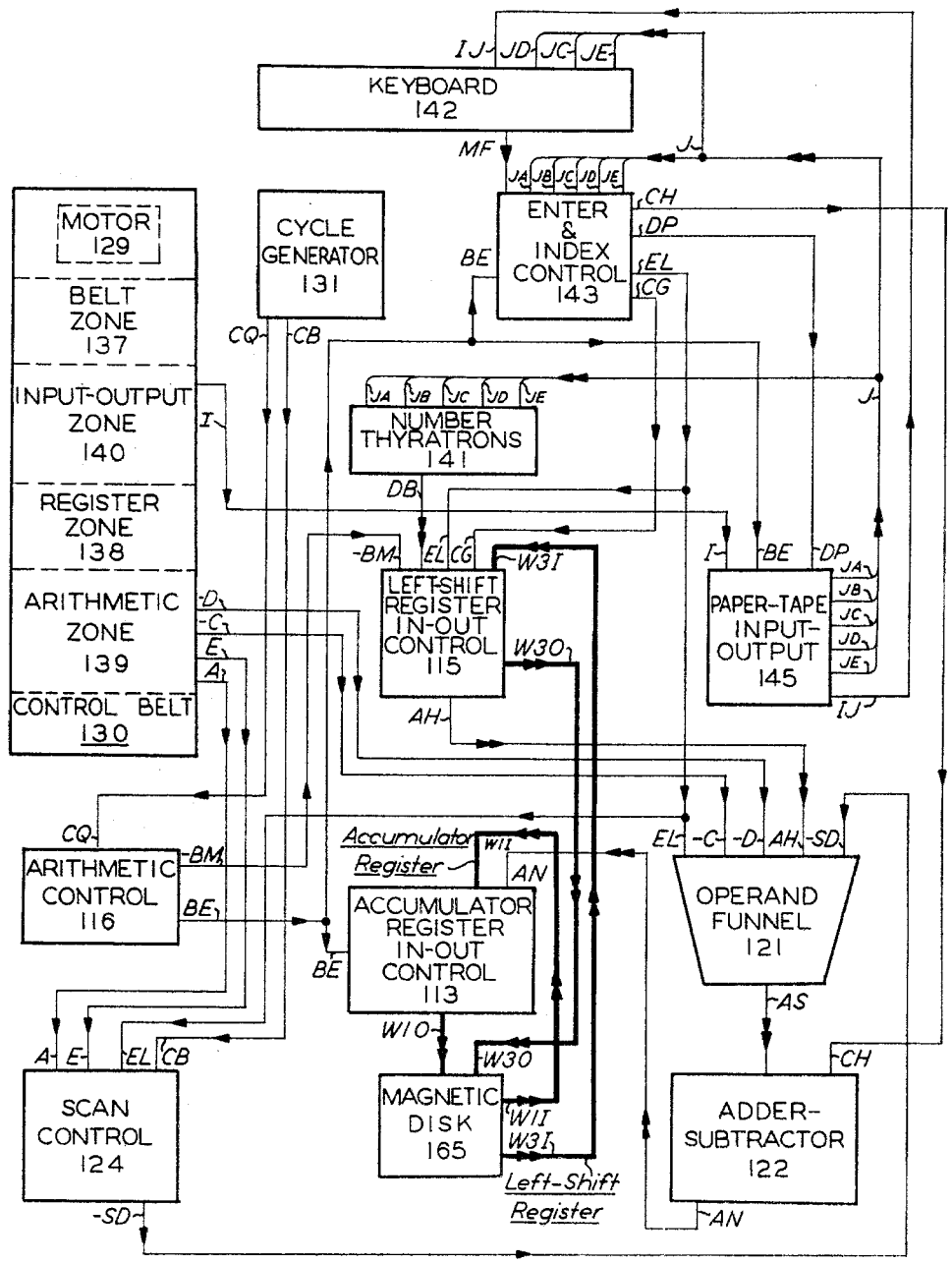
FIG. 12 is a block diagram that illustrates the flow of control and information signals during the "Enter Number via Paper Tape Unit into Memory Register," and the "Enter Number via Paper Tape Unit into Cleared Memory Register" program instructions.
Figure 13:
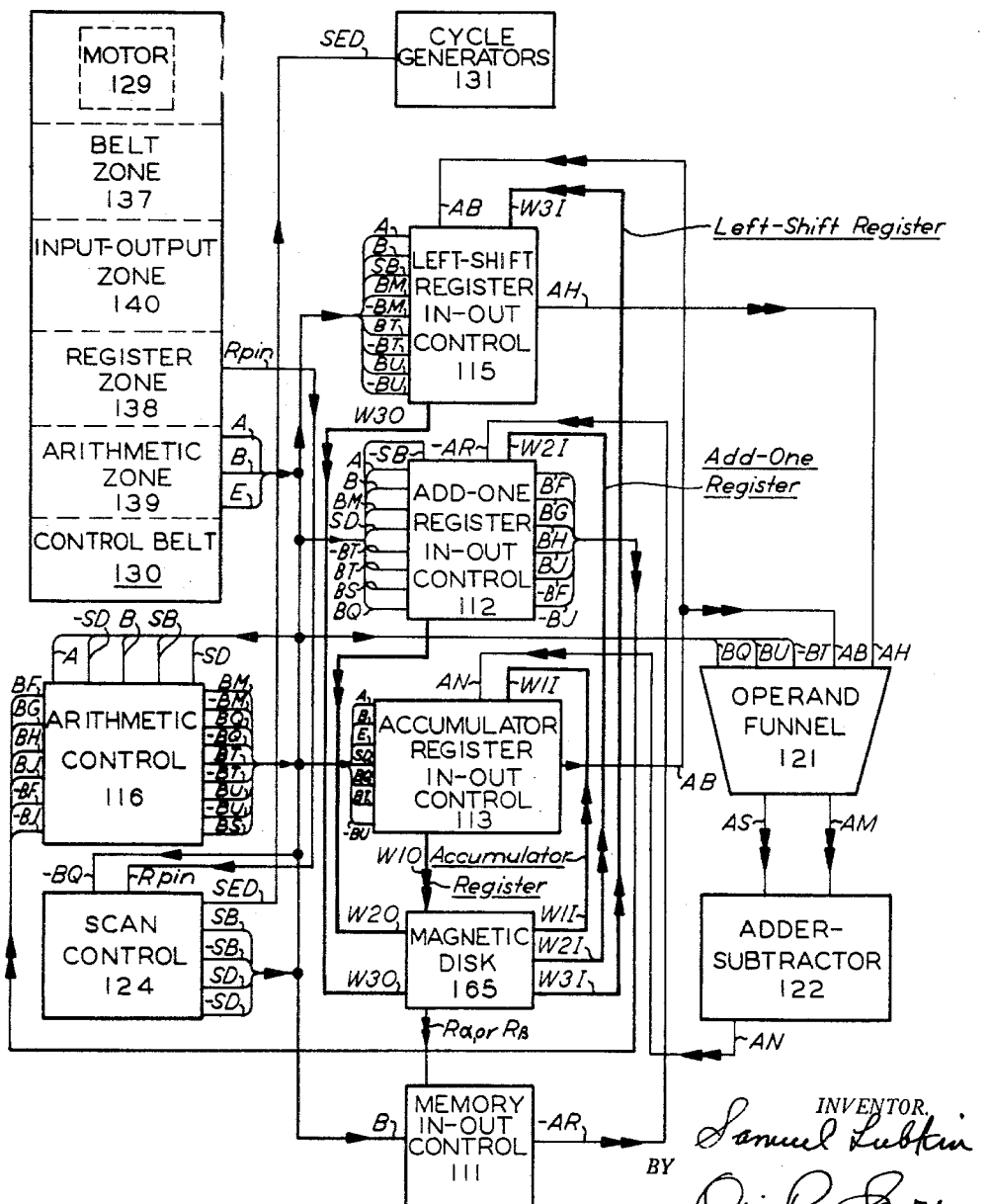
FIG. 13 is a block diagram that illustrates the flow of control and information signals during the "Multiplication" program instructions.
Figure 14:
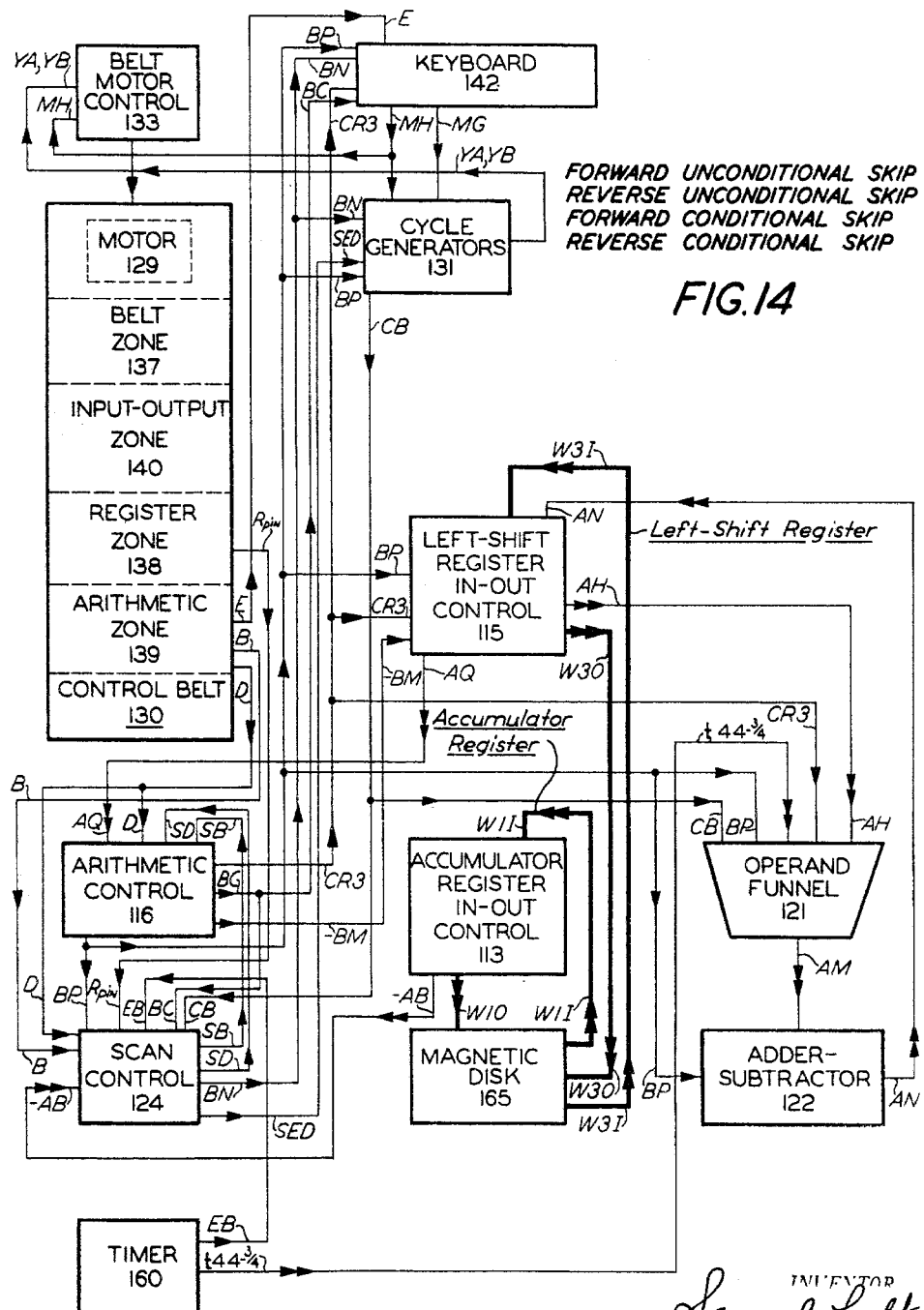
FIG. 14 is a block diagram that illustrates the flow of control and information signals during the "Forward Unconditional Skip," the "Reverse Unconditional Skip," the "Forward Conditional Skip," and the "Reverse Conditional Skip" program instructions.
Figure 15:
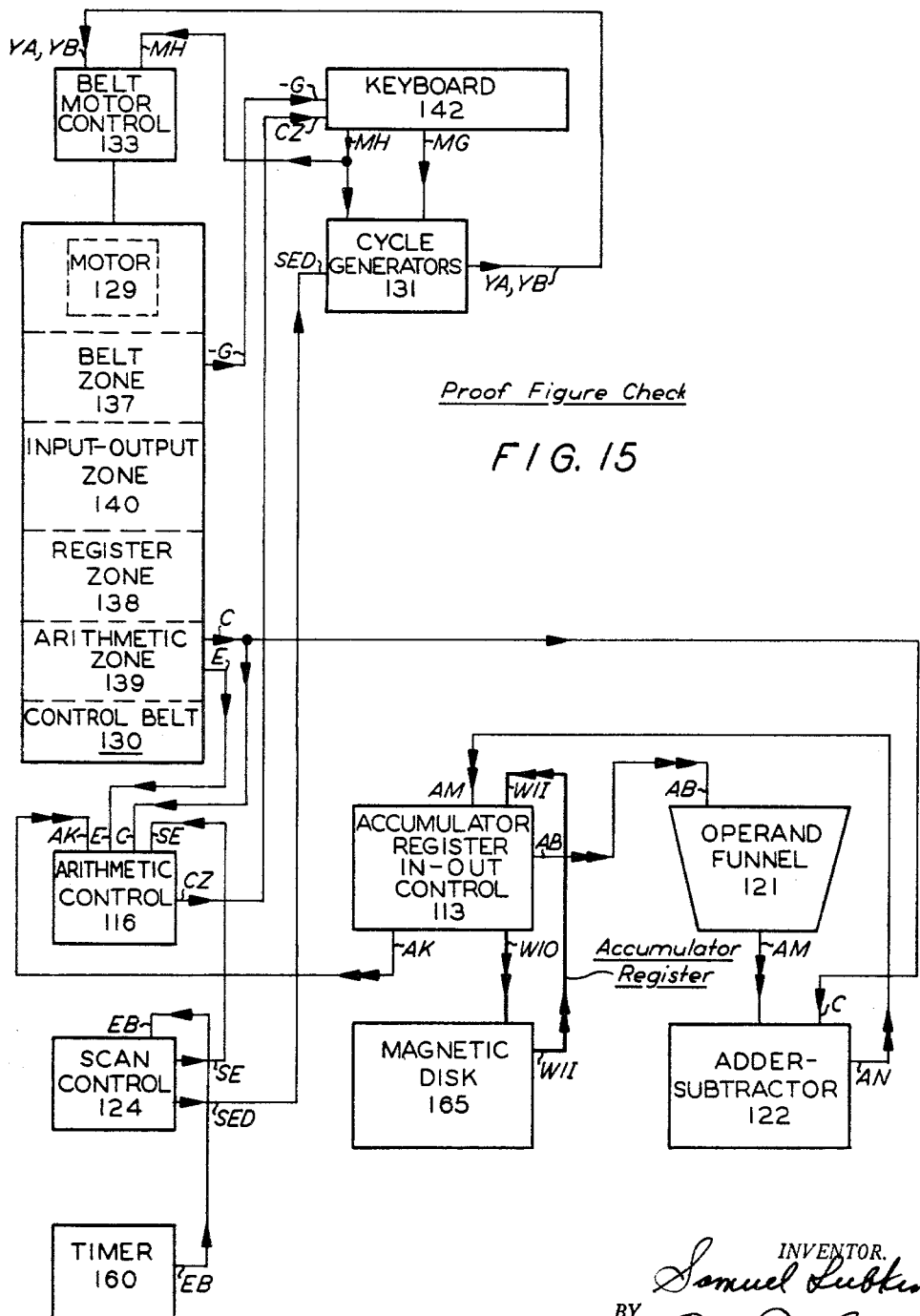
FIG. 15 is a block diagram that illustrates the flow of control and information signals during the "Proof Figure Check" program instructions.
Figure 16:
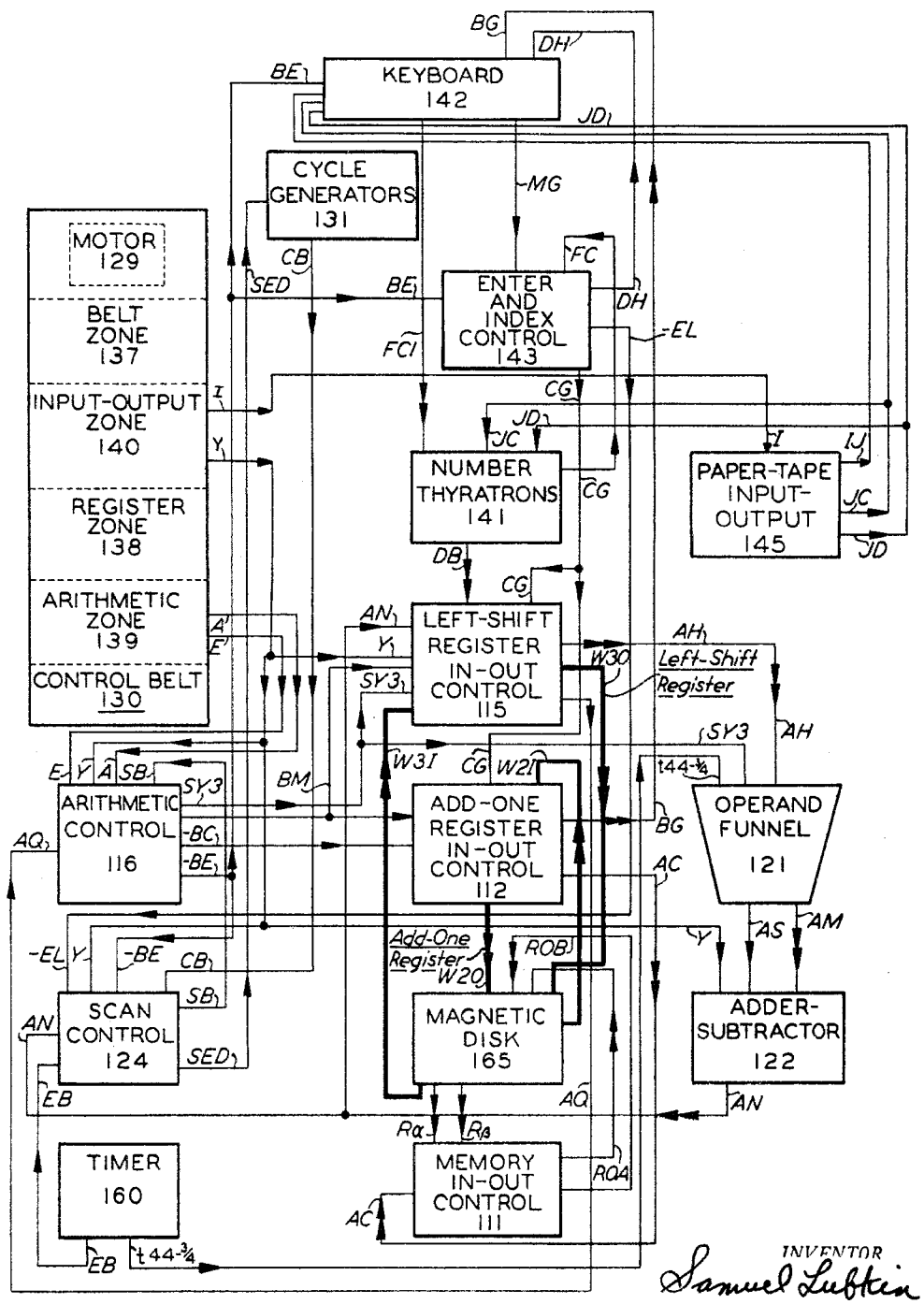
FIG. 16 is a block diagram that illustrates the flow of control and information signals during the "Memory Register Selection via Keyboard," and the "Memory Register Selection via Paper Tape" program instructions.
Figure 17:
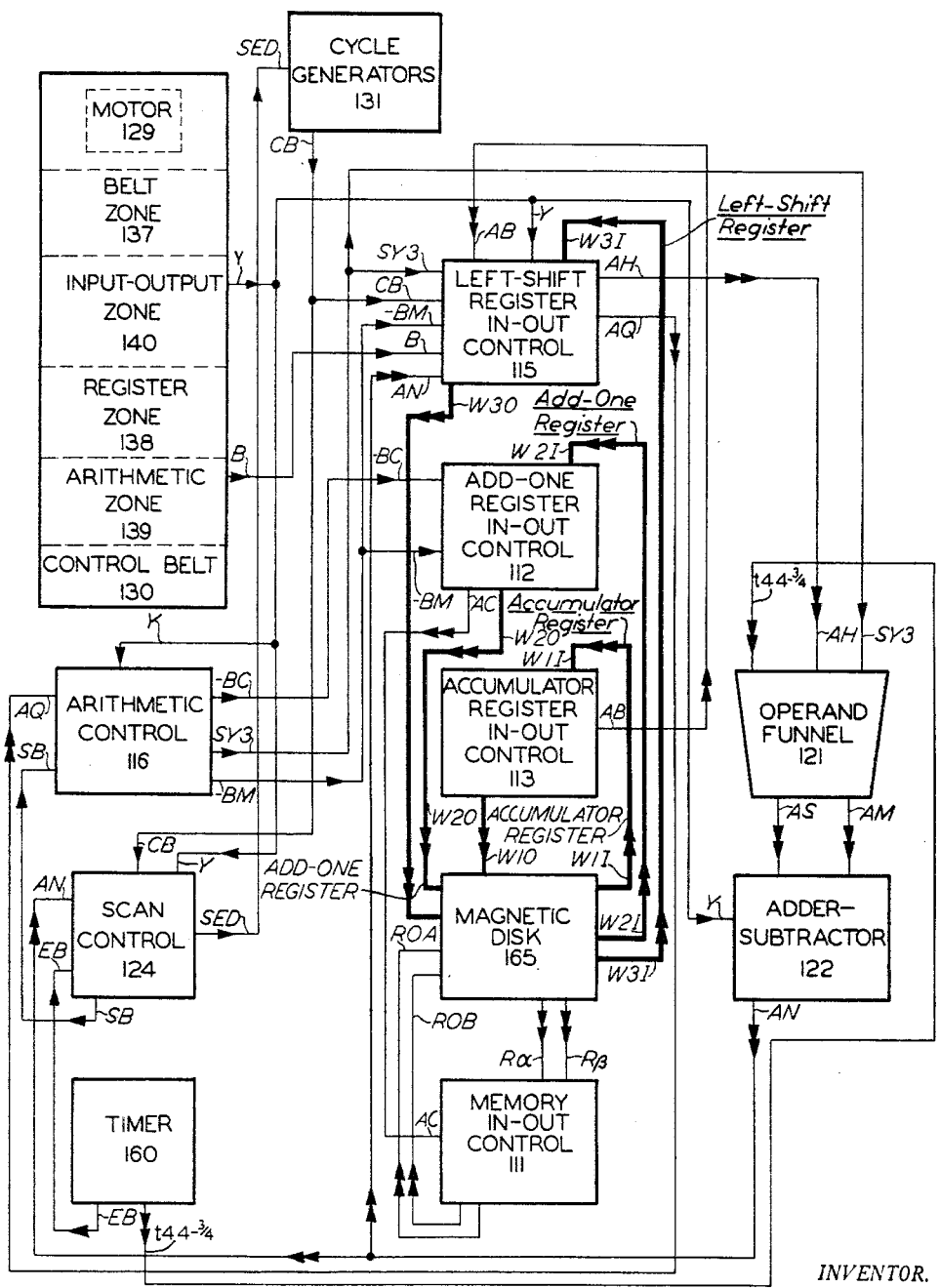
FIG. 17 is a block diagram that illustrates the flow of control and information signals during the "Memory Register Selection via Accumulator" program instructions.
Figure 18:
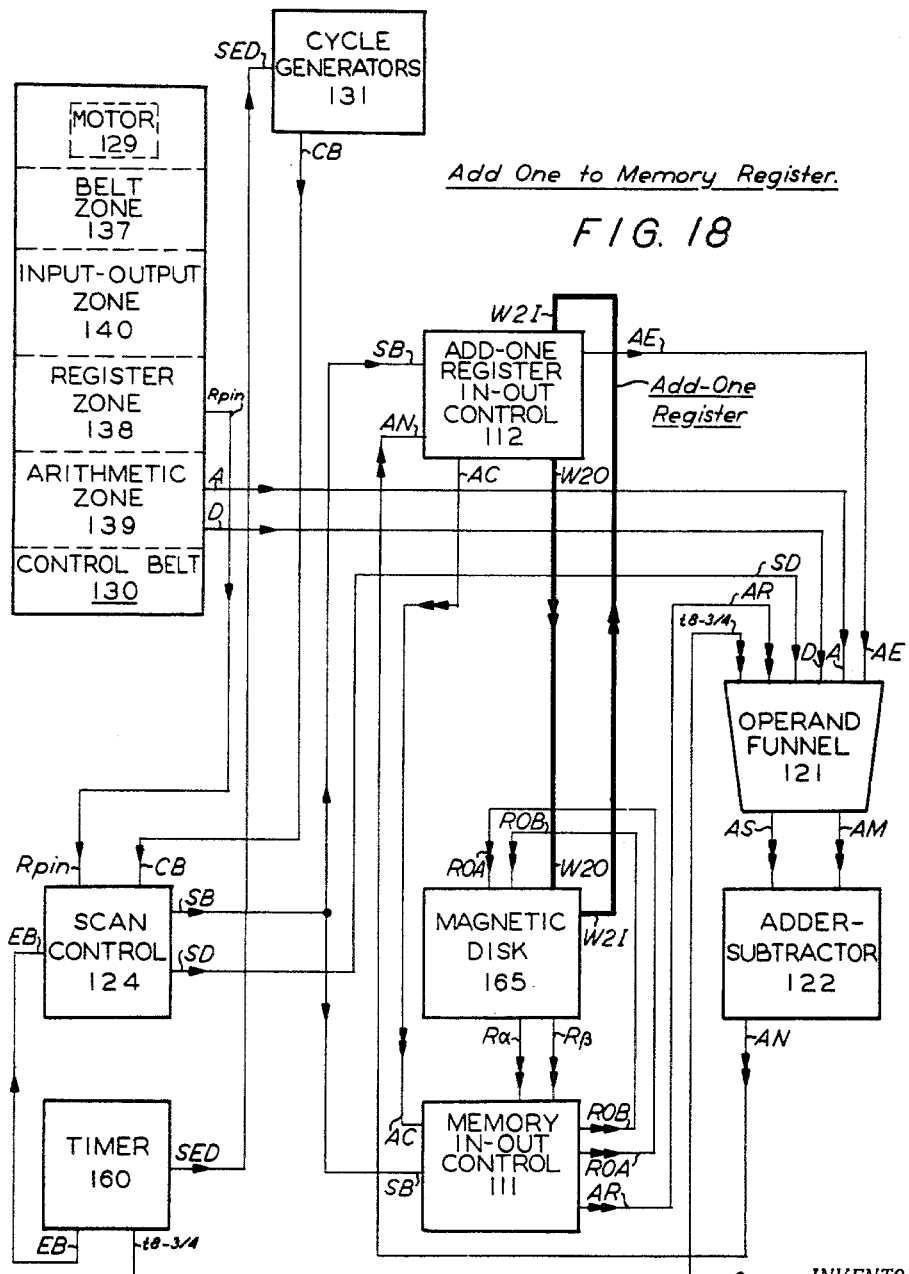
FIG. 18 is a block diagram that illustrates the flow of control and information signals during the "Add One to Memory Register" program instructions.
Figure 19:
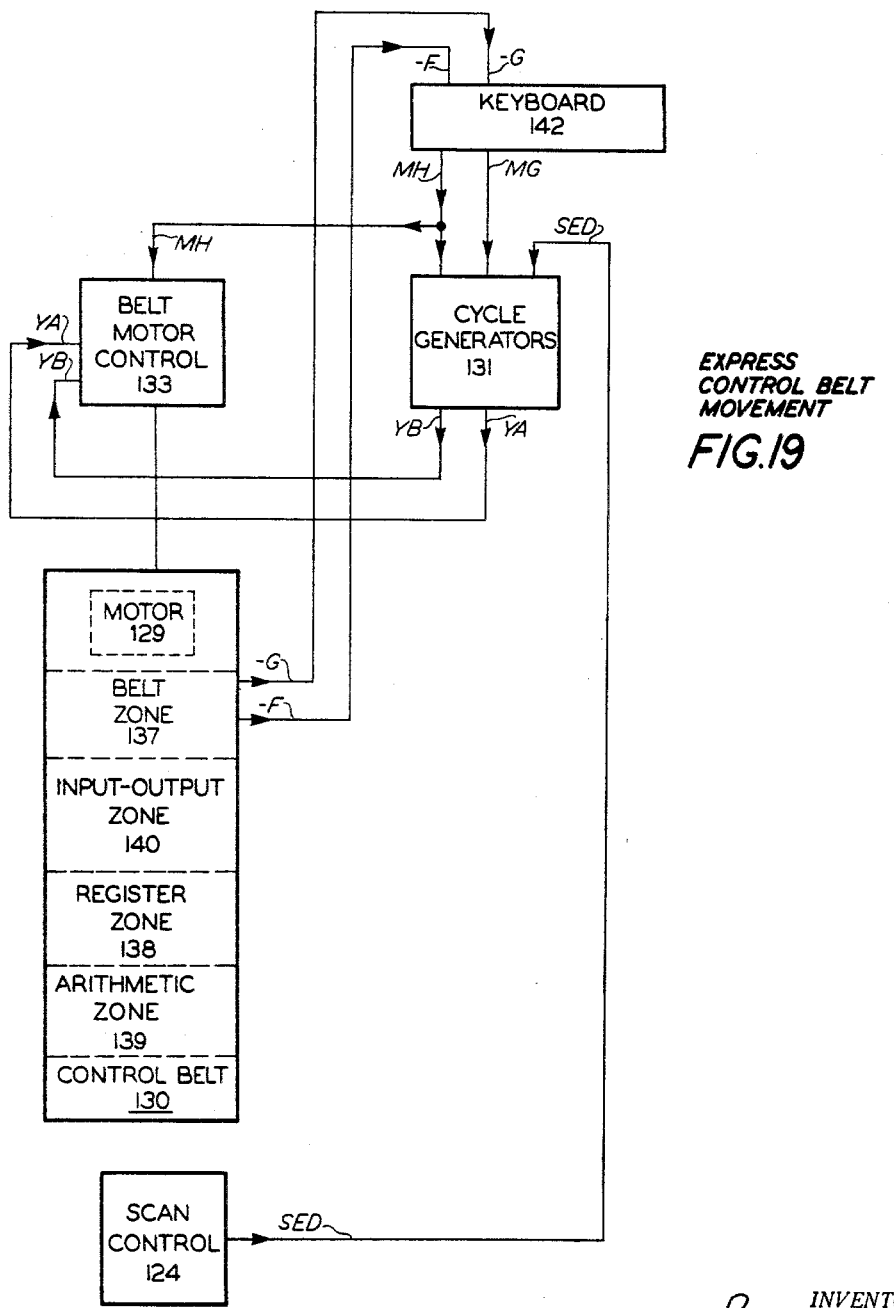
FIG. 19 is a block diagram that illustrates the flow of control signals during the express control belt movement procedures.
Figure 20:
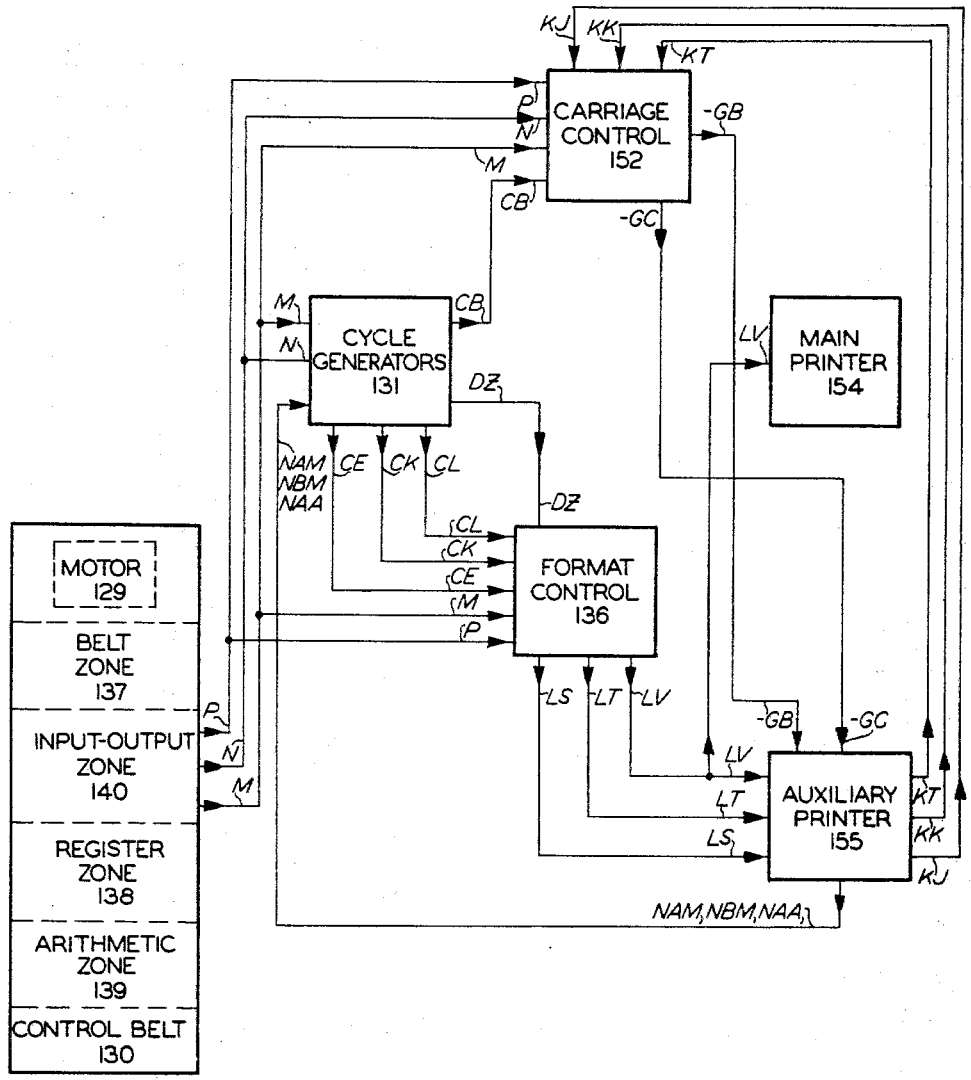
FIG. 20 is a block diagram that illustrates the flow of control signals during the "Auxiliary Printer Tab," the "Auxiliary Printer Carriage Return," the "Auxiliary Printer Forward Line Feed," and the "Auxiliary Printer Reverse Line Feed" program instructions.
Figure 21:
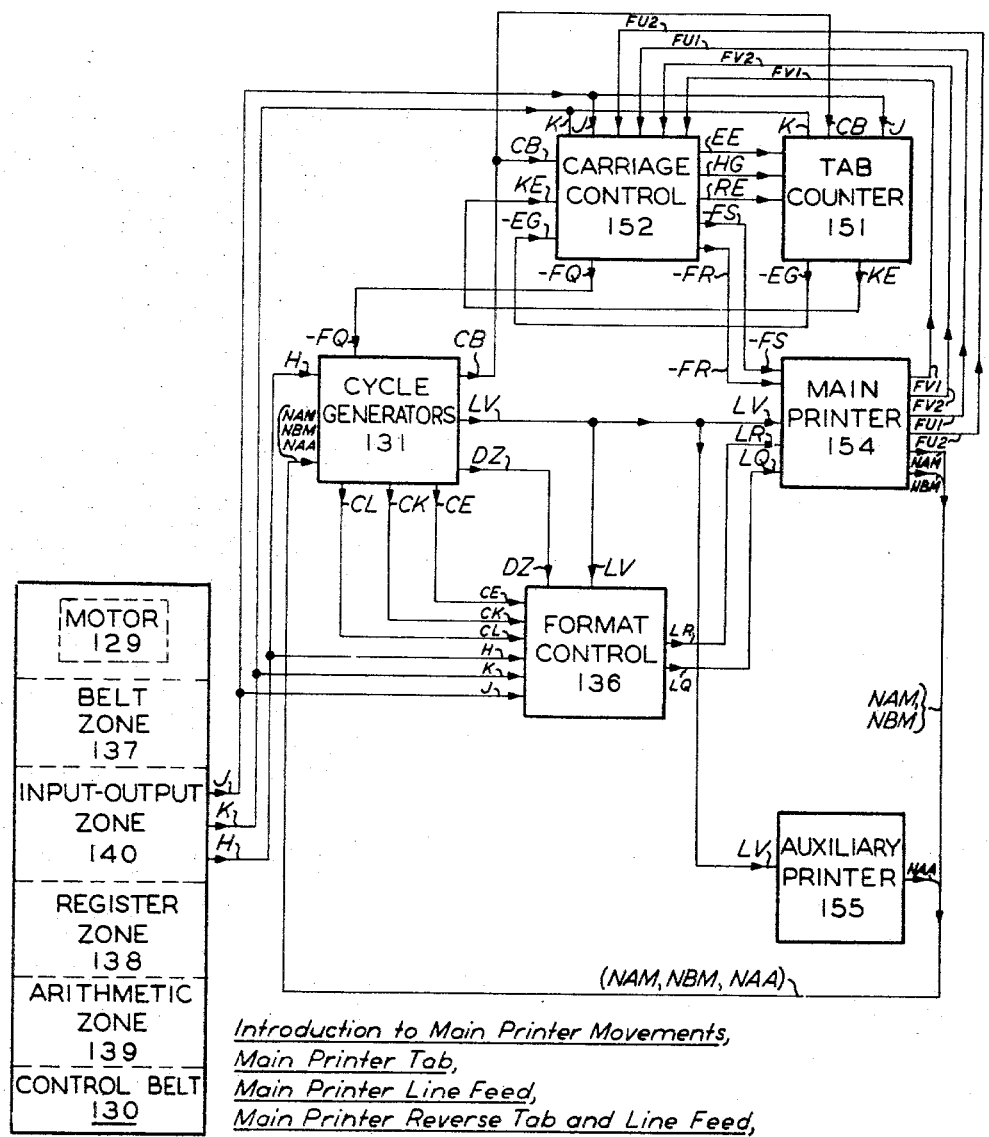
FIG. 21 is a block diagram that illustrates the flow of control signals during the "Main Printer Tab," the "Main Printer Line Feed," the "Main Printer Reverse Tab and Line Feed," the "Main Printer Carriage Return and Line Feed," and the "Main Printer Carriage Return, Line Feed and Bail Open" program instructions.

| Subject | Column |
|---|---|
| I. Introduction | 2 |
| II. Description of figures | 7 |
| III. General description of computer system (Fig. 1) | 11 |
| IV. Central control section (Figs. 2 and 44a) | 13 |
| V. Payroll program example (Figs. 3, 4, 5, and 44a) | 15 |
| (a) Program (Table II) | 18 |
| (b) Code used in program (Table III) | 19 |
| (c) List of registers (Table IV) | 19 |
| (d) Explanation of payroll program | 19 |
| VI. Brief description of units of computer system (Fig. 6) | 23 |
| VII. General signal flow (Fig. 6) | 25 |
| VIII. General program step cycle (Fig. 7) | 28 |
| IX. Initiate operation (Fig. 8) | 29 |
| X. Clear memory register (Fig. 9) | 31 |
| XI. Add accumulator to memory register (Fig. 9) | 31 |
| XII. Subtract accumulator from memory register (Fig. 9) | 32 |
| XIII. Add accumulator to cleared memory register (Fig. 9) | 32 |
| XIV. Add memory register to accumulator (Fig. 10) | 32 |
| XV. Subtract memory register from accumulator (Fig. 10) | 33 |
| XVI. Clear accumulator and add memory register (Fig. 10) | 33 |
| XVII. Introduction to enter instructions | 33 |
| XVIII. Enter number via keyboard into memory register (Fig. 11) | 34 |
| XIX. Enter number via keyboard into the cleared memory Register (Fig. 11) | 35 |
| XX. Enter number via paper tape unit into memory register (Fig. 12) | 36 |
| XXI. Enter number via paper tape unit into cleared memory register (Fig. 12) | 37 |
| XXII. Multiplication (Fig. 13) | 37 |
| XXIII. Multiplication with round off (Fig. 13) | 39 |
| XXIV. Introduction to control belt movement instructions (the forward and reverse control stops) | 40 |
| XXV. Forward unconditional skip (Fig. 14) | 40 |
| XXVI. Reverse unconditional skip (Fig. 14) | 41 |
| XXVII. Forward conditional skip (Fig. 14) | 41 |
| XXVIII. Reverse conditional skip (Fig. 14) | 42 |
| XXIX. Proof figure check (Fig. 15) | 42 |
| XXX. Introduction to memory register selection instruction | 43 |
| XXXI. Memory register selection via keyboard (Fig. 16) | 44 |
| XXXII. Memory register selection via paper tape (Fig. 16) | 45 |
| XXXIII. Memory register selection via accumulator (Fig. 17) | 45 |
| XXXIV. Add one to memory register (Fig. 18) | 45 |
| XXXV. Express control belt movement (Fig. 19) | 46 |
| XXXVI. Introduction to auxiliary printer movements | 47 |
| XXXVII. Auxiliary printer tab (Fig. 20) | 47 |
| XXXVIII. Auxiliary printer carriage return (Fig. 20) | 48 |
| XXXIX. Auxiliary printer forward line feed (Fig. 20) | 48 |
| XL. Auxiliary printer reverse line feed (Fig. 20) | 49 |
| XLI. Introduction to main printer movements | 49 |
| XLII. Main printer tab (Fig. 21) | 49 |
| XLIII. Main printer line feed (Fig. 21) | 51 |
| XLIV. Main printer reverse tab or forward tab and line feed (Fig. 21) | 51 |

Figure 22:
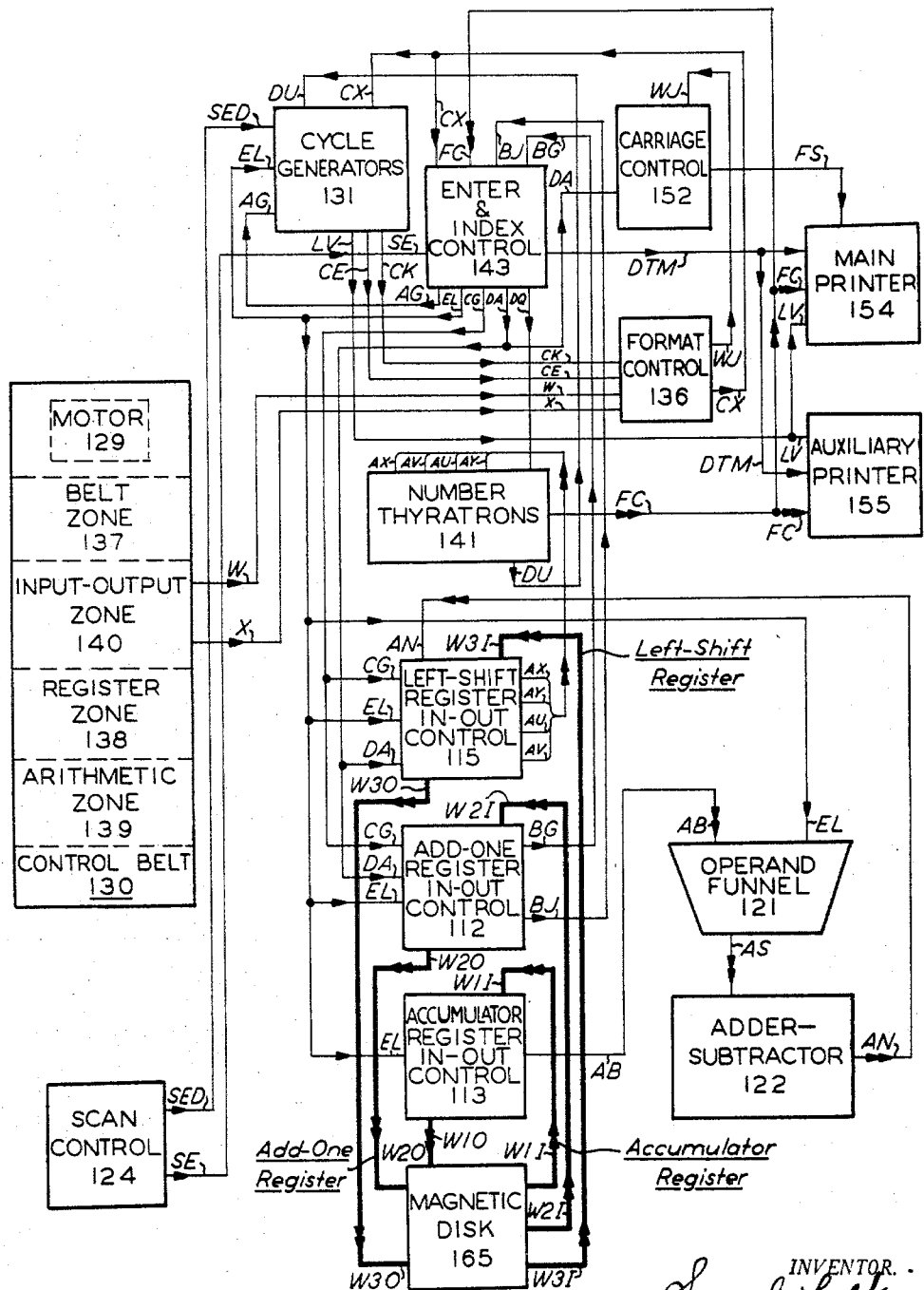
FIG. 22 is a block diagram that illustrates the flow of control and information signals during the "Main Printer Print Operations," and the "Auxiliary Printer Print Operations" program instructions.
Figure 23:
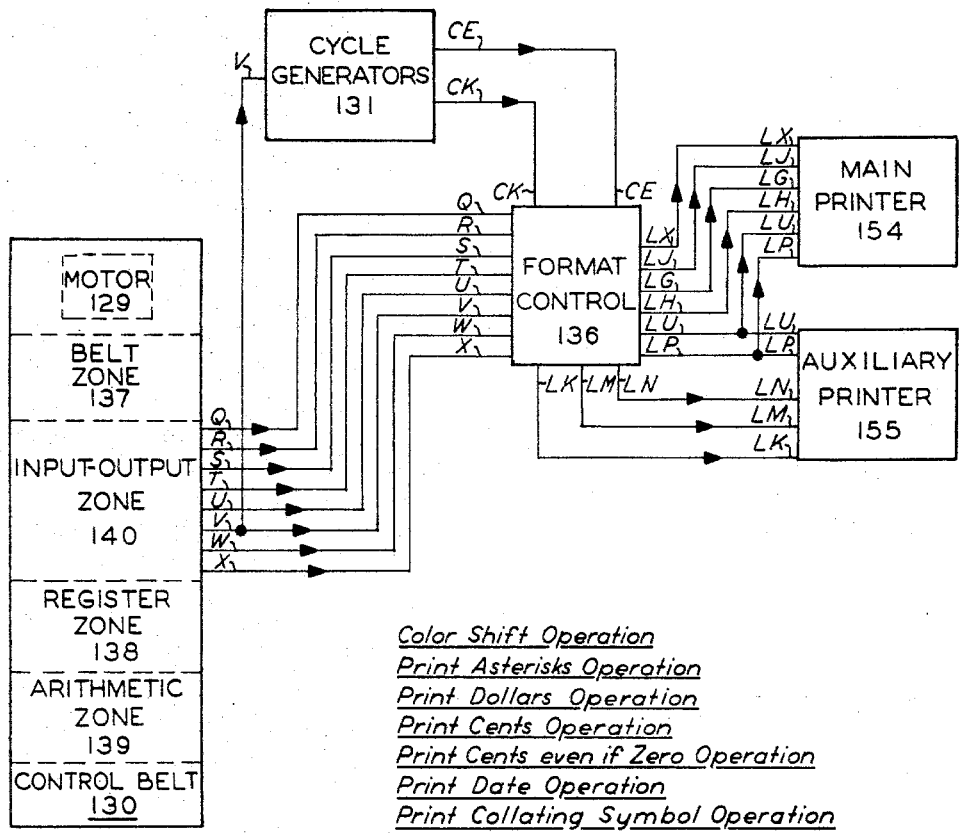
FIG. 23 is a block diagram that illustrates the flow of information signals during the "Format Controls" program instructions characterized by color shift operation, print asterisks operation, print dollars operation, print cents operation, print cents even if zero, print date operation, and print collating symbol operation.
Figure 24:
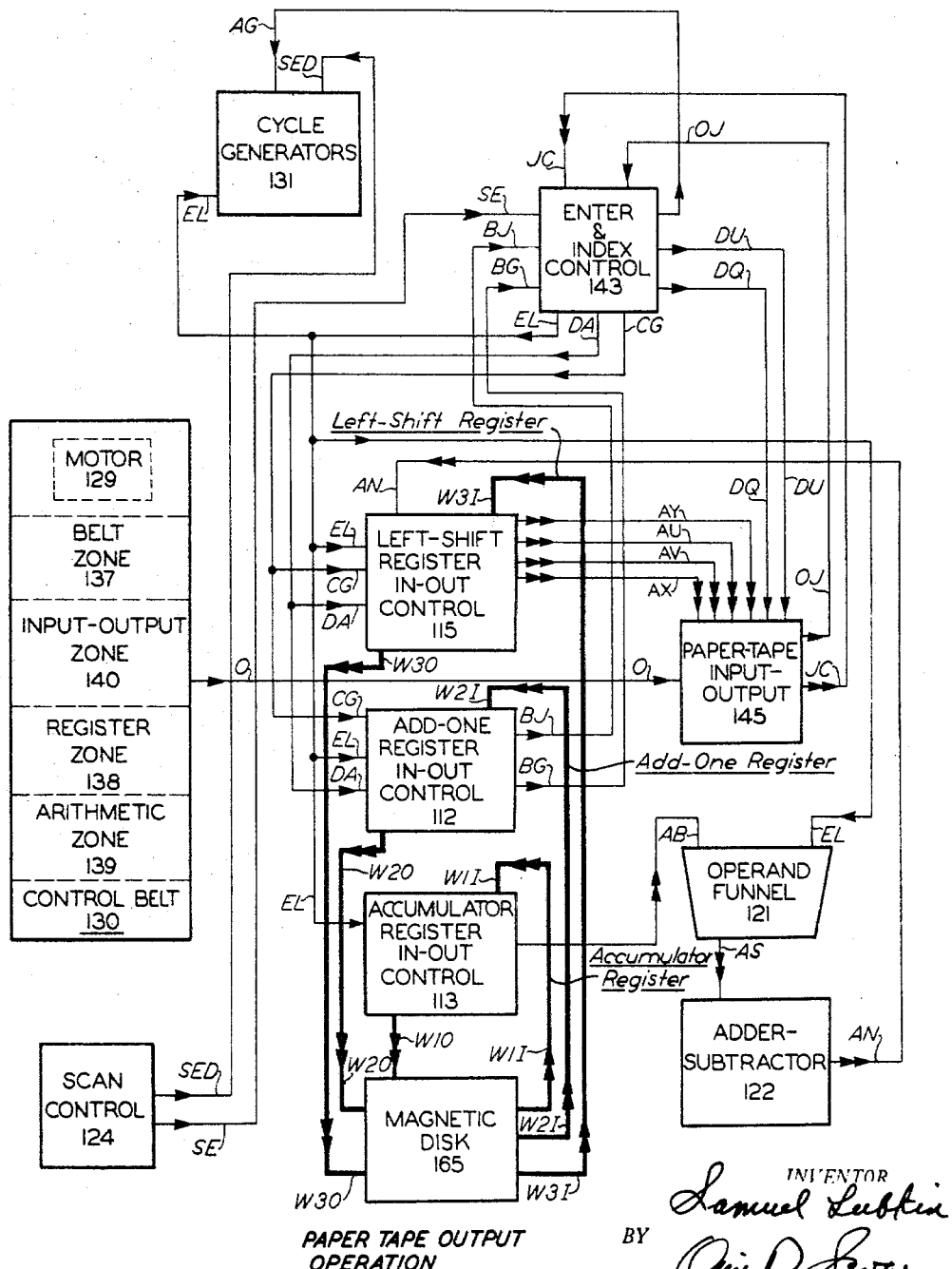
FIG. 24 is a block diagram that illustrates the flow of control and information signals during the "Paper Tape Output" operation.

| Subject | Column |
|---|---|
| XLV. Main printer carriage return and line feed (Fig. 21) | 51 |
| XLVI. Main printer carriage return, line feed and bail open (Fig. 21) | 52 |
| XLVII. Introduction to print operations | 52 |
| XLVIII. Main printer print operation (Fig. 22) | 53 |
| XLIX. Auxiliary printer print operation (Fig. 22) | 54 |
| L. Introduction to format operations | 54 |
| LI. Color shift operation (Fig. 23) | 54 |
| LII. Print asterisks operation (Fig. 23) | 55 |
| LIII. Print dollars operations (Fig. 23) | 55 |
| LIV. Print cents operations (Fig. 23) | 55 |
| LV. Print date operations (Fig. 23) | 55 |
| LVI. Print collating symbol operations (Fig. 23) | 55 |
| LVII. Print cents even if zero operation (Fig. 23) | 56 |
| LVIII. Paper tape output operation (Fig. 24) | 56 |
| LIX. Description of symbols | 56 |
| LX. Gate (Fig. 25) | 56 |
| LXI. Buffer (Fig. 26) | 58 |
| LXII. Delay line (Fig. 27) | 58 |
| LXIII. Pulse amplifier (Fig. 28) | 59 |
| LXIV. Reshaper (Fig. 32) | 60 |
| LXV. D.-C. amplifier (Fig. 33) | 61 |
| LXVI. Set dominant flip flop (Fig. 34) | 62 |
| LXVII. Reset Dominant flip flop (Fig. 35) | 63 |
| LXVIII. Drum-reading amplifier (Fig. 29) | 64 |
| LXIX. Delay flop (Fig. 30) | 65 |
| LXX. Thyratron circuit (Fig. 31) | 66 |
| LXXI. Introduction to description of block symbols | 67 |
| LXXII. Memory in-out control 111 (Fig. 36) | 68 |
| LXXIII. Add-one register in-out control 112 (Fig. 37) | 70 |
| LXXIV. Accumulator register in-out control 113 (Fig. 38) | 73 |
| LXXV. Left-shift register in-out control 115 (Fig. 39) | 74 |
| LXXVI. Arithmetic control 116 (Fig. 40) | 76 |
| LXXVII. The operand funnel 121 (Fig. 41) | 80 |
| LXXVIII. Adder-subtractor 122 (Figs. 42a and 42b) | 82 |
| LXXVIIIa. Detailed description | 83 |
| LXXIX. Scan control 124 (Fig. 43) | 92 |
| LXXX. Control belt 130 (Figs. 2 and 44a and 44b) | 95 |
| LXXXI. Cycle generators 131 (Fig. 45) | 96 |
| LXXXIa. Stepping cycle generator 131b (Fig. 45) | 98 |
| LXXXIb. Print cycle generator 131c (Fig. 45) | 99 |
| LXXXIc. End print cycle generator 131d (Fig. 45) | 100 |
| LXXXII. Program selector 132 (Fig. 46) | 101 |
| LXXXIII. Belt motor control 133 (Fig. 47) | 103 |
| LXXXIV. Format control 136 (Fig. 48) | 108 |
| LXXXV. Number thyratrons 141 (Fig. 49) | 111 |
| LXXXVI. The keyboard 142 (Fig. 50) | 112 |
| LXXXVII. Enter and index control 143 (Fig. 51) | 115 |
| LXXXVIII. Paper tape input-output 145 (Fig. 52) | 120 |
| LXXXIX. Tab counter 151 (Fig. 53) | 124 |
| XC. Carriage control 152 (Fig. 54) | 126 |
| XCI. Main printer 154 (Figs. 55 and 56) | 131 |
| XCII. The auxiliary printer 155 (Figs. 55 and 56) | 133 |
| XCIII. Timer 160 (Figs. 57 and 58) | 133 |
| XCIV. Magnetic disk 165 (Figs. 59a and 59b) | 139 |
| XCV. Conclusion | 141 |

III. GENERAL DESCRIPTION OF COMPUTER SYSTEM (FIG. 1)

The computer system provides a low cost means for applying the advantages of electronics to some of the data processing problems of small and medium sized business concerns. These problems now being performed by conventional accounting machines, punched card equipment, or manually, are handled much more economically by the relatively low cost electronic accounting machine provided in accordance with the invention. These problems include record keeping, accounting and statistical problems such as payroll, departmental expense analysis, sales audit including salesclerk commissions and cycle controls, accounts payable, and many other areas of front office accounting and statistical operations.

The computer system has the following outstanding advantages which make possible its economic application to the payroll, sales audit, accounts payable, cost analysis and other phases of accounting:

A. Eliminates separate calculating operations:

(1) The system can multiply instantaneously as well as add and subtract.

(2) Any keyboard entry or the contents of any register can be multiplied by the contents of any or all the registers and the product can then be added to or subtracted from the contents of from 1 to 100 registers.

Ex.: Calculation of gross earnings, withholding tax, FICA and State tax can be combined with preparation of the earnings statement, check, individual earnings record and journal.

B. Eliminates separate analysis operation:

(1) The system has 100 registers all of which can take positive or negative figures and produce positive or negative totals to provide extensive accumulations for both accounting and statistical purposes.

(2) Any keyboard entry or the contents of any register can be added to or subtracted from the contents of from 1 to 100 registers. This can be automatically repeated as many times as desired.

Ex.: As a by-product of processing the payroll, analysis of salary classifications can be made within each department such as buyers, selling, stock and clerical.

C. Reduces the number of decisions to be made by the operator:

(1) The system can automatically test the contents of any register for "00" or compare the contents of different registers and act accordingly.

Ex.: After picking up a series of balances and a proof figure total, the machine will test for "00" and if not "00," will automatically return to the beginning of the operation, wipe out the pickups and turn on an error light.

(2) It can automatically skip steps forward or backward depending upon the results of a test or comparison.

Ex.: When preparing a payroll the computer will check gross earnings year-to-date against the limit of $4,200.00. If the earnings are greater than $4,200.00 the computer will automatically skip the steps for calculating FICA, but if the earnings are less than $4,200.00 the computer will automatically make the calculation for FICA. If the current week's earnings are partly over the $4,200.00 then the tax will only be computed on that part which brings the year-to-date total to $4,200.00.

D. Reduces the time required to enter data:

(1) A punched paper tape reader automatically brings in all necessary fixed data at a rate of twenty digits a second.

Ex.: During a pay roll run, each employee's previous balances of earnings, Federal taxes, etc., must be entered. In addition, certain static information such as rate of pay, number of dependents, and regular deductions are also necessary to be recorded for each employee. Use of punched tape for entering all this data automatically eliminates chance for error and increases input speed tremendously.

(2) A second tape reader can be incorporated to bring in related data.

Ex.: When there is a large influx of new employees on a temporary basis, a tape can be prepared with all this new data and merged, at the time of payroll processing, with the existing permanent employee tape data.

E. Provides an external memory for further automatic processing:

(1) The system can punch a paper tape or margin punched cards.

Ex.: Each employee's new year-to-date balances and static data are punched on tape during payroll run as a by-product of printing on forms.

F. Increases the number of original forms, and reduces form handling time:

(1) The two printers permit flexible combinations of forms to be used, such as continuous rolls, tapes, unit ledgers, journals and pin-fed continuous forms.

Ex.: Payroll checks on pin-fed continuous forms can be handled on the auxiliary printer while the individual earnings record and payroll journal can be handled on the main printer. Both the check and the earnings record would be originals.

G. Combines related functions for each application:
 (1) Extensive programming facilities permit incorporating related operations into the major procedure thus easing operation work load.
 Ex.: Paper tape data for each employee can carry the savings bond denomination value to be purchased. As soon as his bond balance reaches this amount, the computer will automatically record the bond purchase and the employee number and amount on the journal.

The computer system (Fig. 1) comprises the arithmetic section 100, the central control section 101, the paper tape section 102, the power supply section 103, the main printer 154 and the auxiliary printer 155.

The arithmetic section 100 includes the major portion of the arithmetic and secondary control circuits. The central control section 101 contains the central control apparatus or programming unit which consists of a movable control belt and the associated electronic circuits that generate the primary control signals of the computer. The central control section 101 also includes a rotatable magnetic disk and associated electronic circuits which serve as the main storage device for the computer system and provides the one hundred memory registers. Included in the central control section 101 is a viewing port 104 through which, by means of an optical system, an operator may visually determine the position of the movable control belt.

The paper tape section 102 contains the paper tape input-output unit comprising a motorized paper tape reader and a motorized paper tape punch.

The main printer 154 is supported atop the power supply section 103. Affixed to the main printer 154 is the number key portion of the keyboard 142. The auxiliary printer 155 rests atop the paper tape section 102.

The motorized paper tape reader within the paper tape section 102 and the number key portion of the keyboard 142 are the two input devices of the computer. The information that is inserted via either one of these two input devices is fed to the arithmetic circuitry in the arithmetic section 100 for processing.

The main printer 154, the auxiliary printer 155, and the motorized paper tape punch in the paper tape section 102 are the output devices of the computer. During an output operation, information is fed from the arithmetic circuits in the arithmetic section 100 to any combination of these output devices. The main printer 154 handles ledger cards such as employee earning records and rolled record forms such as a check register. The auxiliary printer 155 handles continuous forms such as checks. The motorized paper tape punch handles a standard paper tape.

IV. CENTRAL CONTROL SECTION (FIGS. 2 AND 44a)

The central control section 101 includes the programming unit (the control belt 130 in Fig. 2) which generates the primary control signals which direct the computer through each step of a program. The central control section 101 also includes the main storage device (the magnetic disk 165) which contains one hundred memory registers.

The programming unit or control belt 130 of the central control section 101 includes the plastic belt 170 (Fig. 44a) having the holes 172; a drive mechanism (Fig. 2) for moving the plastic belt 170 having a pair of sprocket wheels 174a and 174b with sprocket pins 176a and 176b to engage sprocket holes in the plastic belt 170; a stepping motor 129 coupled to rotate the sprocket wheels 174 by means of a shaft 178 to provide a stepping movement of the plastic belt 170; pin feeler housings 180a and 180b containing pin feelers which cause the generation of control signals when a portion of the holes 172 are sensed; and a light source 182 for sensing other holes 172 by means of the rotatable apertured cylinder 194 and the photocell 196.

More particularly the plastic belt 170 (Fig. 44a) contains a plurality of transverse lines of holes 172 (only one line is shown). Each line of holes corresponds to a step or instruction in the program. The holes 172 generate various control signals which cause the computer system to perform the represented operations.

The holes 172a to 172e in the arithmetic zone 139 of the control belt 130 initiate the generation of control signals which control arithmetic operations; holes 172f and 172g in the belt zone 137 control movement of the control belt 130 itself; holes 172-1 to 172-50 in the register zone 138 provide for register selection; and the input-output zone 140 contains holes 172h to 172z which primarily control the operations of the main printer 154 and the auxiliary printer 155.

Each hole position is characterized by an alphabetic notation except in the register zone 138 where each hole position corresponds to a register number. In a line of holes the holes 172 which represent alphabetic notations are electro-mechanically sensed simultaneously by the pin feelers. The holes 172 which represent numerical notations corresponding to the register numbers are photo-electrically sensed sequentially.

The portion of the holes 172 sensed by the pin feelers (Fig. 2) cause the simultaneous generation of the primary control signals. The portion of the holes 172 sensed sequentially by the photo-electric apparatus are employed to designate particular memory registers in the magnetic disk 165.

The magnetic disk 165 of the central control section 101 comprises: a disk 184 coated with a magnetic material and enclosed in the disk housing 186; a plurality of magnetic heads enclosed in a head housing 188; a synchronous motor 190; and a shaft 192 coupling the disk 184 to the synchronous motor 190 to provide a means for rotating the disk 184. Each of two channels on a face of the disk 184 contains fifty memory registers.

The shaft 192 is also coupled to the apertured cylinder 194 which encloses the photocell 196. The apertured cylinder 194 includes a plurality of apertures 199 in a helical pattern on its surface. During the performing of a program by the computer system, the synchronous motor 190, turning at 1800 revolutions per minute, causes the synchronous rotation of the disk 184 and the apertured cylinder 194 by means of the common shaft 192.

The shaft 192 (and therefore the central axis of the apertured cylinder 194) is parallel to the plane of the plastic belt 170. The surface of the apertured cylinder 194 is opposite the plastic belt 170. Thus, the apertures 199 of the rotating apertured cylinder 194 sequentially scan holes 172-1 to 172-50 on the plastic belt 170. Therefore, storage positions on the disk 184 correspond to hole positions in a line of indicia on the plastic belt 170. Each one of fifty possible holes 172-1 to 172-50 opposite the aperture cylinder 194 is associated with a pair of memory registers, one from each channel of the disk 184. Thus it is possible to locate any memory register by first selecting one of the two channels and then detecting the corresponding hole 172.

The motor 129 is pulsed or energized periodically each pulse causing an angular displacement of the shaft 178 equal to a forty-eighth of a revolution. The angular displacement of the shaft 178 steps the plastic belt 170 a predetermined distance causing a new line of holes 172 to be opposite the pin feeler housings 180. When it is said that the control belt 130 is stepped what is meant is that the plastic belt 170 is moved by the associated apparatus in the control belt 130. When the new line is in position, the pin feelers sense the associated holes 172 simultaneously. Wherever a pin feeler senses the absence of the plastic material indicating that a hole 172 is present, a pair of control signals are generated; for example, the presence of the hole 172c causes the generation of the C and —C signals.

At the same time, the apertured cylinder 194 is sequentially scanning that portion of the line of holes 172 in the plastic belt 170 which is opposite the apertured cylinder 194. When an aperture 199 is opposite a hole such as hole 172–25 a ray of light is transmitted from the light source 182 to the photocell 196 to cause the generation of an R pin signal. Since there are fifty holes 172 which may be sensed in this manner and each hole position corresponds to a pair of memory registers, each R pin signal generated identifies one of the fifty pairs of memory registers.

An R pin signal fed to the computer initiates an information transfer between the designated memory register and the remainder of the computer system.

During a recording transfer, information is transmitted as signals from the remainder of the computer system via the ROA or ROB signal lines to an appropriate recording head for recording on the disk 184. The ROA signal line is associated with the first fifty memory registers and the ROB signal line is associated with the second fifty memory registers.

During a reproducing transfer the information, as signals, is transmitted via the R alpha or R beta signal line from an appropriate reproducing head to other parts of the computer system. The R alpha signal line is associated with the first fifty memory registers and the R beta signal line is associated with the second fifty memory registers. Therefore, in each rotation of the shaft 192 from one to fifty R pin signals may be generated, each R pin signal permitting the initiation of a recording or reproducing transfer of information. Thus access to either the first fifty or the second fifty memory registers is possible during one rotation of the shaft 192.

When the program step as determined by the computer is completed, the motor 129 is again pulsed and a new line of holes 172 is made available for sensing and a new program step commences. By providing two types of current waveforms to pulse the motor 129, the shaft 178 can be rotated clockwise or counterclockwise and therefore the plastic belt 170 can be stepped in a forward or reverse direction.

Under the control of the computer a series of current pulses can be fed to the motor 129, during which time the computer does not respond to signals generated as a result of the sensing of the holes 172. This permits stepping the plastic belt 170 a number of positions before a new program step is performed. The number of current pulses in the series is determined by a count number stored in a register. The count number stored in the register in turn is derived from one of the holes 172–1 to 172–50 which usually indicates memory register locations. However if plastic belt 170 is to be moved a number of steps the hole number gives an indication of the number of steps in the movement.

For a more complete disclosure of both the main storage device and the programming unit see the sections entitled "control Belt 130 (Fig. 44)" and "Magnetic Disk 165 (Fig. 59)."

V. PAYROLL PROGRAM EXAMPLE
(FIGS. 3, 4, 5 AND 44a)

The computer system may readily be programmed to perform a payroll operation. The following advantages are available to a typical department store which uses the computer system in this manner.

(1) Payroll department costs can be reduced fifty to seventy-five percent.

(2) Departmental time sheets can be analyzed by personnel classification (buying, sales, stock, clerical) although only one time sheet is necessary for each department.

(3) Greater accuracy results from electronic proof figure checking of entered data before computation.

(4) Control totals other than hours are eliminated.

(5) Automatic control of deductions is provided.

(6) Expedite preparation of Federal and State payroll reports as a result of the automatic printing of proper totals from the punched paper tape.

(7) Simplified budgeting techniques result from the more complete payroll reports.

(8) Sales person production reports are made available by computation of sales per hour and percentages.

(9) There is faster distribution of monthly department reports.

(10) Automatic denomination of a cash payroll is available.

(11) Reduced withholding taxes result from the accumulation of nontaxable earnings such as sick leave.

(12) The need for the employee earnings record card may be eliminated by using punched tape.

(13) Automatic elimination of FICA deduction on earnings over $4,200.00 is provided.

(14) Integration of personnel records with payroll and addressing equipment is possible by use of punched tape.

(15) Proration of department cost is a by-product of the payroll preparation.

(16) Automatic computation and recording of appropriate deductions for each pay period is readily available.

(17) Automatic computation and recording of bonds to be purchased can be a by-product of the payroll preparation.

(18) Improved control of annual vacation and sick leave is available.

(19) There is no need of payroll checking because of computer verified accuracy.

Any data processing problem such as a payroll problem can be broken down into a sequence of simple arithmetic and data handling steps. Each of these steps is specified by an instruction or step and the sequence of instructions is called the program. This program is recorded in the control belt 130 as lines of indicia on the plastic belt 170 (Fig. 44a).

In Table II a typical payroll program (utilizing manual entries of data rather than paper-tape entries of data for purpose of simplification) is indicated. This program results in the printing of a check with a check stub (Fig. 3), a check register (Fig. 4), and the employee's earnings record (Fig. 5).

The designations listed in Table II under the title "Plastic belt 170 of control belt 130" represent the actual indicia on the plastic belt 170. The columns entitled "Step" and "Number entered or printed" are included to explain the operation of the program.

Table III is an alphabetized code listing of all of the control signals and corresponding instructions initiated during the illustrated payroll program.

Table IV shows the contents of the various registers employed during the payroll progam. It should be noted that each one of the holes 172–1 to 172–50 (Fig. 44a) corresponds to two registers, one from each channel of the magnetic disk 165. The hole 172–1 corresponds to either the register "00" or "50," the hole 172–2 corresponds to either register "01" or "51," . . . , and the hole 172–50 corresponds to either the register "49" or "99." In the illustrated payroll program less than fifty memory registers are required. Therefore, only one channel of the magnetic disk 165 is used and the holes 172–1 to 172–50 correspond to the registers "00" to "49." The contents of registers 00 through 18 and 20 through 27 are entered in advance.

Following Table IV is an explanation of the operation of each step in the program in terms of producing the desired records.

3,250,367

Table II
(a) PROGRAM

| Step | Number Entered or Printed | Plastic Belt 170 of Control Belt 130 ||||||
|---|---|---|---|---|---|---|---|
| | | Arithmetic Zone 139 | Belt Zone 137 | Register Zone 138 | Input-Output Zone 140 |||
| | | | | | Tabs; Print $, ¢, Date, and Asterisks | Printer Selection, Color Shift, Print .00 | Initiate, Printer Line Feed |
| 1 | | B | | | | | NP |
| 2 | | | G | 00, 19, 30–49 | | | |
| 3 | 3368.75 | AE | | 19, 41 | | | |
| 4 | 439.81 | AE | | 19, 42 | | | |
| 5 | 33.72 | AE | | 19, 43 | | | |
| 6 | 3852.87 | AE | F | 44 | | | |
| 7 | 2.75 | AE | | 19, 45 | | | |
| 8 | | ABE | | 20 | | | |
| 9 | | A | | 40, 38 | | | |
| 10 | | A | | 40, 38 | | | |
| 11 | | A | | 38 | | | |
| 12 | .04 | AE | | 19, 46 | | | |
| 13 | | ABE | | 23 | | | |
| 14 | | A | | 39 | | | |
| 15 | 1.70 | AE | | 19, 47 | | | |
| 16 | 2.00 | AE | | 19, 48 | | | |
| 17 | 1.60 | AE | | 19, 49 | | | |
| 18 | 2.50 | AE | | 19, 00 | | | |
| 19 | | B | F | 41–43, 45–49 | | | |
| 20 | | BCE | | 44 | | | |
| 21 | 2.50 | BE | | 00 | S, T | Q, X | MP |
| 22 | | A | | 12 | | | |
| 23 | 1.60 | BE | | 49 | S, T | Q, X | MP |
| 24 | | A | | 11 | | | |
| 25 | 2.00 | BE | | 48 | S, T | Q, X | MP |
| 26 | | A | | 10 | | | |
| 27 | 1.70 | BE | | 47 | S, T | Q, X | MP |
| 28 | | A | | 9 | | | |
| 29 | 1.35 | AE | | 8 | S, T | Q, W, X | MP |
| 30 | | B | | 47–49 | | | |
| 31 | | A | | 00 | | | |
| 32 | | | | 44–49 | | | |
| 33 | 40.00 | AE | | 4 | K, S, T, U | V, W, X | MP |
| 34 | | ABE | | 40 | | | |
| 35 | | A | | 16, 19, 41, 49 | | | |
| 36 | 4.50 | AE | | 5 | K, S, T | V, W, X | |
| 37 | | ABE | | 38 | | | |
| 38 | | A | | 2, 7, 19, 41, 49 | | | |
| 39 | 128.56 | BE | | 49 | K, P, S, T | V, W, X | |
| 40 | | BC | | 39 | | | M |
| 41 | | BD | | 1 | | | |
| 42 | | ABE | | 24 | | | |
| 43 | | D | | 00 | | | |
| 44 | | BE | | | | | |
| 45 | 13.78 | A | | 13, 19, 42, 48, 00 | S, T | Q, X | M |
| 46 | | BE | | 21 | | | |
| 47 | | BC | | 41 | | | |
| 48 | | BD | | 1 | | | |
| 49 | | BE | | 49 | | | |
| 50 | | D | | 3 | | | |
| 51 | | B | | 49 | | | |
| 52 | | BD | | 00 | | | |
| 53 | | D | | 00 | | | |
| 54 | | BE | | | | | |
| 55 | | ABE | | 22 | | | |
| 56 | 2.57 | A | | 3, 14, 19, 42, 48, 00 | S, T | Q, X | M |
| 57 | 16.35 | BE | | 48 | K, S, T | Q, W | |
| 58 | | BE | | 49 | | | |
| 59 | | ABE | | 25 | | | |
| 60 | 1.29 | A | | 15, 19, 43, 00 | K, S, T | Q, W, X | M |
| 61 | | BE | | 49 | | | |
| 62 | | ABE | | 26 | | | |
| 63 | | BC | | 27 | | | |
| 64 | | BD | | 1 | | | |
| 65 | | BE | | 27 | | | |
| 66 | | D | | 00 | | | |
| 67 | | B | | 27 | | | |
| 68 | .30 | A | | 16, 00 | K, S, T | Q, W, X | M |
| 69 | | BE | | 49 | | | M |
| 70 | | BC | | 00 | | | |
| 71 | 101.47 | A | | 17, 47 | K, S, T | V, W, X | MP |
| 72 | 3497.31 | BE | | 41 | K, S, T | W | |
| 73 | 456.16 | BE | | 42 | K, S, T | Q, W | |
| 74 | 35.01 | BE | | 43 | K, S, T | Q, W | MP |
| 75 | 3999.07 | BE | | 19 | K, S, T | W | MP |
| 76 | | AD | | 18 | | | |
| 77 | 207 | BE | | 18 | K, P, S | W, X | |
| 78 | | D | | 1 | | | |
| 79 | | AE | G | | | | |
| 80 | | D | | 11 | | | |
| 81 | | BE | | 6, 7 | | | |
| 82 | | BCE | | 8–17 | | | |
| 83 | | BC | | 47 | | | |
| 84 | | BD | | 3 | | | |
| 85 | | BE | | | K, S, T | V, W | |
| 86 | | | | | P, R, S | V, X | |
| 87 | | | | | P, T, U | V, X | |
| 88 | | DE | | 9 | | | |
| 89 | 101.47 | BE | | 47 | K, S, T | W | |
| 90 | | | | | P, R, S | X | |
| 91 | | | | | P, T, U | X | |
| 92 | 101.47 | | | | P, R, S, T | X | |
| 93 | | AB | | | | | { HJK NP |

Table III

(b) CODE USED IN PROGRAM

| | |
|---|---|
| -- | Clear memory registers. |
| A | Add accumulator to memory register. |
| ABE | Multiplication with round off. |
| AD | Add one to memory register. |
| AE | Enter number via keyboard into memory register. |
| B | Add memory register to accumulator. |
| AEY | Select memory register via keyboard. |
| AEYI | Select memory register via paper tape. |
| BC | Subtract memory register from accumulator. |
| BCE | Proof figure check. |
| BD | Forward conditional skip. |
| BE | Clear accumulator and add memory register. |
| BY | Select memory register via accumulator. |
| D | Forward unconditional skip. |
| DE | Reverse unconditional skip. |
| F | Express control belt movement (forward). |
| G | Express control belt movement (reverse). |
| HJK | Main printer carriage return, line feed and bail open. |
| K | Main printer tab. |
| M | Auxiliary printer forward line feed. |
| MP | Auxiliary printer reverse line feed. |
| NP | Initiate operation. |
| P | Auxiliary printer tab. |
| Q | Color shift operation. |
| R | Print asterisk operation. |
| S | Print dollars operation. |
| T | Print cents operation. |
| U | Print date operation. |
| V | Print cents even if zero. |
| W | Main printer print operation. |
| X | Auxiliary printer print operation. |

Table IV

(c) LIST OF REGISTERS

| Register No. | Contents |
|---|---|
| 00 | 0; 2.50; 9.15; 22.93; 25.50; 26.79; 27.09 |
| 01 | Dept. Tot. Reg. Earnings 9,505.10; 9,615.10 |
| 02 | Dept. Tot. O.T. Earnings 1,721.45; 1,740.01 |
| 03 | Dept. Tot. FICA 198.24; 200.81 |
| 04 | Co. Tot. Reg. hrs. 4,755.65; 4,795.65. |
| 05 | Co. Tot. O.T. hrs. 825.20; 829.70. |
| 06 | Co. Tot. Reg. Earnings 17,461.10; 17,571.20. |
| 07 | Co. Tot. O.T. Earnings 3,325.00; 3,343.56. |
| 08 | Co. Tot. Misc. Ded. 95.72; 97.07. |
| 09 | Co. Tot. Hosp. Ded. 245.35; 247.05. |
| 10 | Co. Tot. Ret. Fd. 260.15; 262.15. |
| 11 | Co. Tot. Ins. Ded. 345.20; 346.80. |
| 12 | Co. Tot. Bond Ded. 575.75; 578.25 |
| 13 | Co. Tot. Fed. Inc. Tax 2,285.53; 2,298.31. |
| 14 | Co. Tot. FICA 370.86; 373.43. |
| 15 | Co. Tot. State Tax 219.21; 220.50. |
| 16 | Disabil. Ins. Co. Tot. 55.84; 56.14. |
| 17 | Co. Tot. Net Pay 16,332.59; 16,434.06. |
| 18 | Check No. 206.00; 207.00. |
| 19 | 0; 3368.75; 3808.56; 3842.28; 3845.03; 3845.07; 3846.77; 3848.77; 3850.37; 3852.87; 3962.87; 3981.43; 3995.21; 3997.78; 3999.07. |
| 20 | 5000.0000.00. |
| 21 | 0000.4200.00. |
| 22 | 0000.0200.00. |
| 23 | 1300.0000.00. |
| 24 | 0000.1800.00. |
| 25 | 0000.0100.00. |
| 26 | 0000.0050.00. |
| 27 | 0000.0000.30. |
| . | |
| . | |
| 38 | 0; 13750; 27500; 41250. |
| 39 | 0; 52.00. |
| 40 | 0; 13750; 27500. |
| 41 | 0; 3368.75; 3478.75; 3497.31. |
| 42 | 0; 439.81; 453.59; 456.16. |
| 43 | 0; 33.72; 35.01. |
| 44 | 0; 3852.87; 0. |
| 45 | 0; 2.75; 0. |
| 46 | 0; .04; 0. |
| 47 | 0; 1.70; 0; 101.47. |
| 48 | 0; 2.00; 0; 13.78; 16.35. |
| 49 | 0; 1.60; 0; 110.00; 128.56. |

(d) EXPLANATION OF PAYROLL PROGRAM

Before the performance of the payroll program certain constants are initially entered or loaded into the various registers (see registers 1 through 18 and 20 through 27 in Table IV).

For each employee the operator inserts the corresponding employee earnings and tax record (Fig. 5) into the main printer 154. The entries are listed on this record, for example, as fixed deductions and year-to-date balances. From the operator's point of view, she types in a number every time an "entry" light is actuated on her keyboard. The sequence of entries is indicated in advance. The control belt 130 contains a number of programs. It will be assumed that the payroll program is number 2.

Referring to Table II, Step 1 initiates the program which is automatically located by the computer system. The number of the desired program is controlled by pushbutton switches which are manually operated. Thus, with the pushbutton switches representing number 2, the appropriate program (indicated by the letter B) is located by the system. After the operation controlled by the indicia NP, the printers 154 and 155 are in position for the start of the program.

Step 2 results in the clearing to zero of the indicated registers (00, 19, 30–49). The indicia G provides for the return of the control belt 130 to Step 2 if an entry error occurs later in the program.

In Step 3 the operator enters the year-to-date earnings balance (3368.75) into registers 19 and 41. It should be noted that in each entry operation, the number entered also remains in the accumulator register, being changed by a subsequent operation.

In Steps 4–7 additional entries are made. For example, the year-to-date Federal tax balance (Step 4), the proof figure total (Step 6) and the hourly rate of pay (Step 7). As each entry is made (except the proof figure total), it is added to the balance in register 19 in order to provide for a proof figure check. (Step 6 also includes an F indicia. This indicia is present for the case when there are no intermediate entries. The operator by pressing an "express" button can move the control belt 130 directly to the "F" step.)

Steps 8–11 are required to properly scale the hourly rate for regular time and overtime (time and a half). This is necessary in order that the decimal point be properly positioned after the hourly rates are multiplied by the hours worked.

In Step 12 the number of dependents is entered (four).

In Steps 13 and 14 the amount of pay exempted for tax purposes is computed by multiplying the number of dependents (.04) by $1300 to give $52 (Step 13) which is stored in register 39 (Step 14).

In Steps 15–18 the remaining fixed deductions are entered such as retirement fund (Step 16) and bonds bonds (Step 18).

In Step 19 all of the previously entered pay factors (including the 2.50 which remained in the accumulator register) are added together to get a proof figure total.

In Step 20, the proof figure total (which remains in the accumulator register) is subtracted from the proof figure stored in register 44 (Step 6). If no entry error has occurred the difference is zero and the control belt 130 is stepped to Step 21. If an entry error has occurred (the difference is not zero), the control belt 130 is skipped back to Step 2 (designated by G), an error light is activated and the entries are then repeated by the operator. This is an example of a conditional skip. The next program step depends on the results of an operation being performed by this step.

Steps 21–28 result in the printing out on the check stub (in red because of Q) bonds, insurance, retirement fund, and hospitalization. (X causes the operation of the auxiliary printer 155.) These items are also added into company totals 12–9 during Steps 22, 24, 26 and 28. A reverse line feed (MP) occurs for each entry so that the items are printed from bottom up.

In Step 29 a miscellaneous (insurance) deduction is entered, printed on the earnings record and check stub, and entered into the appropriate company total (register 8).

In Steps 30 and 31 the fixed deductions are added to the miscellaneous deduction (which also remains in the accumulator register) and stored in register 00.

Step 32 results in the clearing to zero of the registers 44–49 for further use.

In Step 33 the regular hours are entered and printed on the earnings record (with the date) and check stub, and also added to the appropriate company total (register 4). The date which is printed on the check stub is no shown on the drawing.

In Step 34 the regular hours are multiplied by the scaled factor of the pay (register 40) to get the regular pay which remains in the accumulator register.

In Step 35 the regular pay is stored in the appropriate company totals and added to the old proof figure (register 19) to store the new proof figure. In addition the forming of the new year-to-date gross earnings (register 41) and gross pay (register 49) are begun.

In Step 36 the overtime hours are entered into the appropirate company total and printed on the earnings record and check stub.

In Step 37 the overtime hours left in the accumulator register are multiplied by the scaled time and a half rate of pay (register 38) to obtain overtime pay.

In Step 38 the overtime pay is stored in the departmental total (register 2), company total (register 7), and the new proof figure total (register 19), the total year-to-date earnings (register 41) and the total gross pay (register 49).

Steps 39–45 are concerned with the computation of the Federal income tax. In Step 39, the gross pay is printed on the check stub and earnings record. While the printing is being performed the control belt 130 proceeds to Step 40 and the processing continues simultaneously with the printing. In Step 40 the exempted pay (register 39) is subtracted from the gross pay. In Step 41 the remainder is tested to see if it is equal or greater than zero. If it is, then in Step 42 the remainder is multiplied by 1800 to determine the Federal income tax. If it is less than zero, the control belt 130 is skipped over two steps to Step 44. Step 43 instructs the control belt to skip over one step to Step 45. Step 44 results in the clearing of the accumulator register when there is no tax. In Step 45 the Federal tax is printed on the check stub and added into the appropriate totals.

The Steps 41–45 illustrate both the conditional and unconditional transfer.

In Step 41 there is a conditional transfer. If the contents of the accumulator are greater than or equal to zero indicating the gross pay is taxable then the tax must be calculated. The tax is calculated in Step 42. If the contents of the accumulator are less than zero no tax should be calculated (there is no taxable gross pay) and the tax calculation is bypassed. The bypassing occurs by skipping from Step 41 to Step 44. This is a conditional transfer.

Step 43 illustrates an unconditional transfer which results in skipping Step 44. In Step 44 the contents of the accumulator automatically are cleared to zero. If there were a tax calculation in Step 42 then the amount of the Federal tax is stored in the accumulator. Step 43 is an unconditional transfer to Step 45 which permits the bypassing of Step 44 since Step 44 would clear the accumulator and the amount of the Federal tax would be lost before it was printed in Step 45. Therefore at Step 45 the contents of the accumulator are either zero indicating no Federal tax deduction or a number indicating the amount of the Federal tax deduction which is printed out.

Steps 46–56 are concerned with computing and printing the FICA deduction. These operations are similar to the operations performed during the computation of the Federal income tax, except that there are three possibilities:

(1) If the year-to-date gross pay is equal or less than $4200 (Step 48) then the control belt 130 proceeds to Step 49 in the usual manner. Where the gross income is entered into the accumulator, Step 50 permits skipping to Step 55 where FICA calculation is performed.

(2) If the year-to-date gross pay is greater than $4200 the computer skips to Step 51 and determines:

A. Whether the $4200 was reached the last pay period (Step 52) or

B. The present pay period.

If A, tax is not computed and the control belt 130 skips to Step 54. If B, the control belt 130 skips from Step 53 to Step 55 and the FICA tax is computed.

In Step 56 the FICA deduction is printed on the check stub and recorded in the appropriate registers.

In Step 57 the total Federal tax stored in register 48 is printed on the earnings record.

In Steps 58 and 59 the State tax is computed.

In Step 60 the State tax is printed on the check stub and earnings record and stored in various registers. It should be noted that in Step 60 a tab is performed by the main printer 154 while the auxiliary printer 155 is performing a line feed. Thus, both printers are carrying out different carriage movements at the same time.

In Steps 61 to 67 disability insurance is computed up to a maximum of .30.

In Step 68 the disability insurance is printed on the check stub and earnings record.

In Steps 69 and 70 the net pay is computed by subtracting the sum of the deductions (register 00) from gross pay (register 49).

In Step 71 the net pay is printed on the check stub and earnings record.

In Steps 72–75 the computer prints the year-to-date earnings, Federal tax, State tax and new proof figure on the earnings record.

In Steps 76 and 77 a one is added to the previous check number (206) and the new check number (207) is printed.

Step 78 instructs the computer to skip to Step 81.

Steps 79 and 80 are for unusual conditions. In Step 79 the error and entry lights are activated so the operator may make note of either an error or a negative net pay.

Step 80 instructs the system to skip to Step 93 which prepares the machine for the next payroll operation after the operator has decided on how to handle the situation that caused stepping to Step 79.

Step 81 results in the company total gross earnings being stored in the accumulator register.

Step 82 is an error test. The company total net pay and deductions are subtracted from the company total gross earnings. The remainder should be zero if there is no error. In this case, the control belt 130 steps to Step 83. However, if there is an error the control belt steps back to Step 79 and indicates the error to the operator. The operator must then decide on how to cope with the error. This is a computer error which is usually handled by rerunning the program.

In Step 83 the negative net pay is transferred to the accumulator register.

In Step 84 the contents of the accumulator are tested to see if the actual net pay is not less than zero.

If the number in the accumulator is less than zero then the net pay is greater than zero and the control belt steps to Step 89. If the net pay is zero or less the number in the accumulator is zero or greater and the computer steps to Step 85.

In Steps 85 to 88 when the net pay is less than zero, .00 is printed on the check register. Step 85 clears the accumulator to zero and causes the printing of .00 on the check register. On Step 86 asterisks are printed on the check for zero dollars together with the date. Step 87 causes the printing of .00 on the cents portion of the check. This permits the actual printing of .00 when the number to be printed contains all zeros. The control belt 130 is stepped back to Step 79 by Step 88 to indicate to the operator that net pay is less than zero.

In Steps 89 to 92 when the net pay is equal to or greater than zero, the net amount is printed on the check register (Step 89). The dollar amount with asterisk check protection (Step 90) and the cents and date (Step 91) are printed on the check. The net amount is also printed on the check with the dollar protection (Step 92).

Step 93 produces a carriage return, a line feed and bail open on the main printer 155, and the control belt 130 is moved back to Step 1 which results in a long feed and carriage return of the auxiliary printer 155. The program is now ready for the payroll computation for the next employee.

VI. BRIEF DESCRIPTION OF UNITS OF COMPUTER SYSTEM (FIG. 6)

To facilitate the description the computer system has been divided into a plurality of operating units. Each unit may generally be defined as performing one of the following functions: input, output, program control, general control, arithmetic or memory. The operations of the computer system will be described in terms of the interaction of signals between these units. The input units are the keyboard 142, the number thyratrons 141, and a portion of the paper tape input-output 145.

The output units are the main printer 154, the auxiliary printer 155, the carriage control 152, the tab counter 151, the format control 136, and a portion of the paper input-output 145.

The program control units comprise the control belt 130, the program selector 132, and the belt motor control 133.

The general control units consist of the cycle generators 131, the enter and index control 143, the arithmetic control 116, the scan control 124 and the timer 160.

The arithmetic units comprise the left-shift register in-out control 115, the add-one register in-out control 112, the accumulator-register in-out control 113 which are associated with the left-shift add-one and accumulator registers respectively, the adder-subtractor 122 and the operand funnel 121.

The memory register units are the in-out control 111 and the magnetic disk 165.

The keyboard 142 is primarily an input device. It comprises ten number keys by means of which numbers may be manually entered, motor bar keys for terminating entries in several ways, and manual switches used both for modifying entry operations and for providing means for generating signals required in maintenance and test procedures.

The number thyratrons 141 serves as a decoder and an intermediate or buffer storage device between the main body of the computer and the main and auxiliary printers 154 and 155, and as an encoder between the keyboard 142 and the remaining part of the computer system.

The paper tape input-output 145 comprises both a motorized paper tape reader and motorized paper tape punch. It also contains suitable control equipment and intermediate or buffer storage apparatus for passing information to and from the main portion of the computer.

The main printer 154 is a modified Underwood Sundstrand Model C Accounting Machine with the calculating apparatus removed. It handles a ledger card such as an earnings record, and a second form which may be a check register.

The auxiliary printer 155 is also a modified Underwood Sundstrand Model C Accounting Machine with the calculating apparatus removed. It is provided with a pin feed to handle continuous forms such as checks. Both printers are provided with solenoids to activate normal mechanical movements by means of electrical signals from the computer.

The carriage control 152 regulates the lateral movements of the carriages of the main printer 154 and the auxiliary printer 155. It controls primarily carriage return movements and tabulations. Since each carriage can move independently of each other a separate set of control circuits is included for each of the printers 154 and 155.

The tab counter 151 is used to store the count of the number of tabs the carriage of the main printer 154 is to perform. Instead of performing single tabs upon command a number of tabs may be accumulated and stored to be performed in one operation prior to printing. Since the carriage of the main printer 154 can tabulate in either direction (forward or reverse) the tab counter 151 stores the accumulated count algebraically (as either a positive or negative number).

The format control 136 generates control signals which determine the format for the printed information. For example, it may instruct the printers to print only the dollars portion of a number or the cents portion of a number or a date, or change the vertical position of the form.

The control belt 130 is the central control of the computer. It includes a long belt capable of movement in a forward or reverse direction together with apparatus for sensing indicia on the belt. It also includes a drive coupled to a stepping motor 129 which permits a controlled stepwise movement of the belt. The actual belt has arrays of hole positions oriented in lines perpendicular to the direction of motion. Opposite most of the hole positions are mechanical feelers which senses for holes to cause the generation of pairs of control signals of opposite polarity. The hole positions are divided into four zones. The belt zone 137 generates control signals which regulate movement of the control belt 130. The input-output zone 140 generates control signals which determine the input-output operations. The register zone 138 is serially scanned photoelectrically to generate signals which indicate particular memory registers. This is the only zone not employing mechanical feelers. The arithmetic zone 139 generates control signals for determing which arithmetic operations are to be performed.

The program selector 132 comprises a plurality of manual switches for selecting a particular program in the control belt 130, and a comparator to compare a number set up by the manual switches with a number as represented by signals generated by hole combinations received from the control belt 130.

The belt motor control 133 is primarily a current waveform generator which feeds appropriate current pulses to the motor 129 for activating the drive to step the control belt 130 in the forward or reverse direction.

The cycle generators 131 sequences the computer through the steps of a program instruction and sequences the computer from program instruction to program instruction.

The enter and index control 143 sequences the computer through the input and the output operations.

The arithmetic control 116 is primarily a static control register which sets up control signals that route and sequence the flow of information through the computer during arithmetic operations.

The scan control 124 is primarily a memory register gating control which functions in conjunction with the register zone 138 to make the contents of memory registers available for processing.

The timer 160 generates repetitive signals from cycling units for synchronization, timing and waveform shaping throughout the computer.

There are three working registers associated with the arithmetic section of the computer; the left-shift register, the add-one register and the accumulator register.

The left-shift register comprises the left-shift register in-out control 115, the W3O signal line, a channel of the magnetic disk 165, and the W3I signal line. The left-shift register is used during input and output operations to permit digit by digit transfers to occur, and during multiplication to store the multiplicand.

The add-one register comprises the add-one register in-out control 112, the W2O signal line, a channel of the magnetic disk 165, and the W2I signal line. The add-one register is used as a counting register during input and output operations for counting the number of digits transferred, as a storage register for the multiplier during multiplication, and as a delay means during other arithmetic operations.

The accumulator register comprises the accumulator register in-out control 113, the W1O signal line, a channel of the magnetic disk 165 and the W1I signal line. The accumulator register in addition to serving its usual functions of storing operands during addition and subtraction operations, stores the partial products during multiplication operations.

The adder-subtractor 122 is an arithmetic unit capable of serially adding and subtracting binary-coded decimal digits. The adder-subtractor 122 is described in Berezin et al. Patent No. 2,943,790, dated July 5, 1960.

The operand funnel 121 selects from a plurality of sources the numbers to be fed to the adder-subtractor 122 as operands.

The memory register in-out control 111 acts as a gating control to shunt information between two channels of the magnetic disk 165 and other parts of the computer system.

The magnetic disk 165 has six channels each with appropriate magnetic recording and reproducing heads. Two channels are for storage, each storage channel can store up to fifty complete numbers. The storage space alloted to each number is called a memory register. Three channels are recirculation register channels, having their recording and reproducing heads arranged so that a delay in time of slightly less than one minor cycle (the time required for a complete number to pass a given point) occurs between reproducing and recording. Each of these recirculating registers is part of a working register. When the delay introduced by the external circuitry of the working register is added to the delay achieved by the magnetic head displacement a total delay of one minor cycle is obtained so that each working register can store one complete word.

The sixth channel carries a square wave recording used to generate clock pulses. The clock pulse signals are fed to the timer 160 to provide the synchronizing and timing signals for the computer. One pulse of the square wave is missing. Use is made of the absence of the pulse to synchronize the computer to the magnetic disk 165.

The schematic illustrations are usually arranged so that input lines enter at the left and top sides of each unit and output lines leave at the bottom and right sides of each unit.

The lines that connect the blocks which denote the basic units represent cables which may contain a plurality of wires through which electrical signals are transmitted. The flow of information signals is indicated by double arrowheads on the lines which represent the cables. The flow of control signals when shown is along lines designated by single arrowheads. The polarity of the various signals will not be indicated except where important.

The lines carrying the information and control signals have letter designations that are identical with the letter designations of the signal. For example, the DB signal line (from the number thyratron 141) carries the DB signal. In the sections following the terminology will be used interchangeably. If a signal is fed via the DB signal line it is the DB signal. Or if a unit receives the DB signal it receives the DB signal via the DB signal line. When a "number" is mentioned, what is usually meant is "the signal representing the number."

VII. GENERAL SIGNAL FLOW (FIG. 6)

Figure 6:
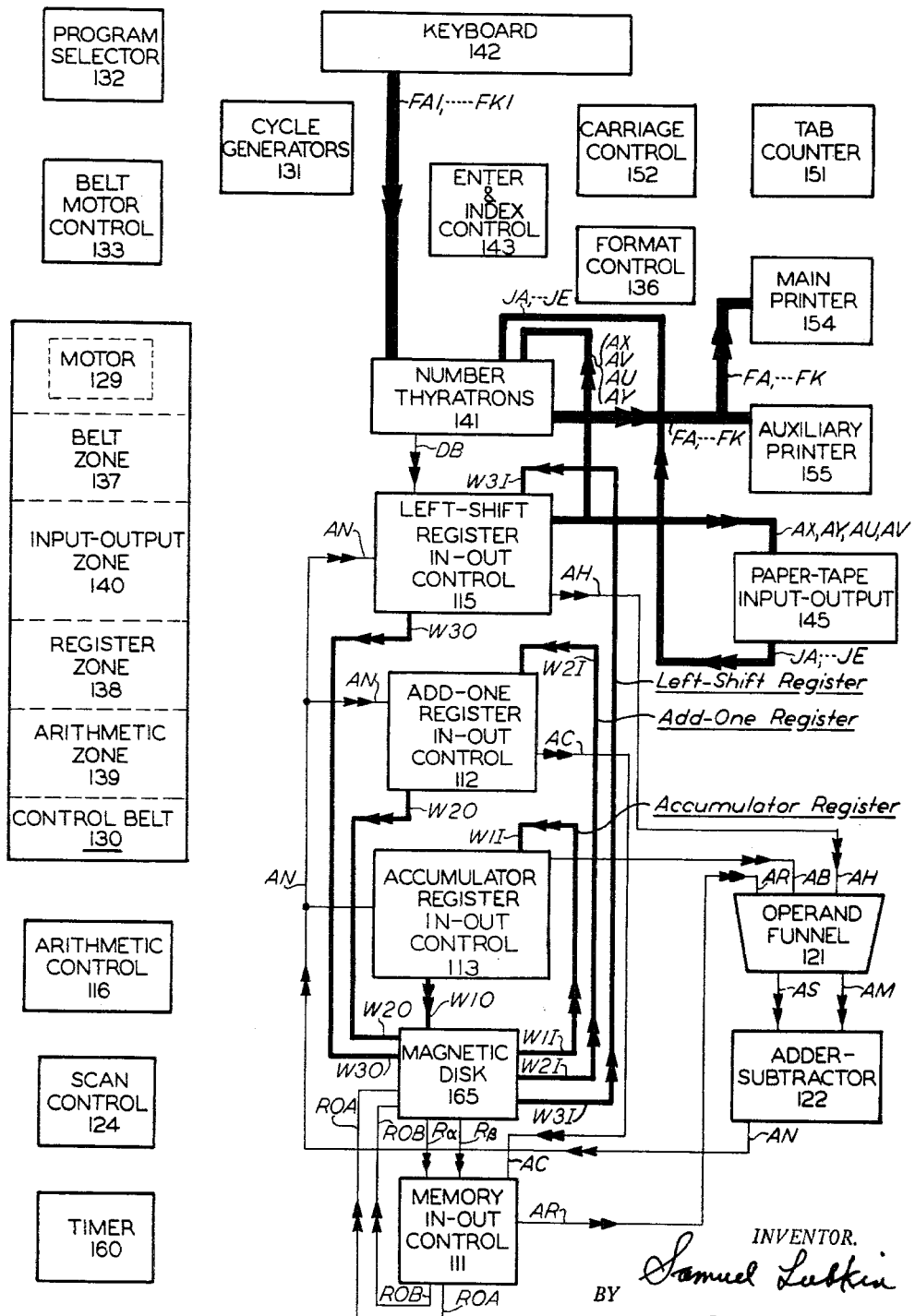
FIG. 6 is a block diagram that illustrates diagrammatically the flow of information signals during a general information signal flow.

The general flow of information signals through the computer is shown in Fig. 6. No control signals are shown but it should be noted that the flow of information is governed by many control signals. These control signals will be shown and described in subsequent sections.

Briefly, the digits of a number are entered via the keyboard 142. Each digit is stored in the left-shift register until a complete number (up to ten digits) is stored. The number is then transferred via the adder-subtractor 122 (for possible complementing if the number is negative) to the accumulator register. Then the number is transferred via the adder-subtractor 122 and the add-one register to the designated memory register of the magnetic disk 165.

If the number is to be stored as entered, the designated memory register is first cleared to zero. If the number is to be added to a number in the designated memory register, it is not cleared to zero. However, in either case, to enter the number stored in the accumulator register into the designated memory register, it is always added by the adder-subtractor 122 to the contents (which may be zero) of the designated memory register. The number (the sum) is then transferred from the adder-subtractor 122 to the designated memory register via the add-one register. The reason the number is transferred via the add-one register is to permit the contents of one channel (fifty memory registers) to be processed during one revolution of the magnetic disk 165, as will shortly be explained.

When a number stored in a memory register in the magnetic disk 165 is to be printed or punched out, it is first added to the contents of the accumulator register (zero if the number is not to be modified before printing out) by the adder-subtractor 122. The number is then transferred to the accumulator register. Thereafter, the number is transferred to the left-shift register via the adder-subtractor 122 (for possible recomplementing if the number is negative). The number is then fed from the left-shift register, digit by digit to the printers 154 and 155 via the number thyratrons 141, or directly to the paper tape input-output 145, or both.

In greater detail, information is inserted or entered via the keyboard 142 by manually striking number keys, or via the paper tape input-output 145 by an electro-mechanical sensing of holes in a punched paper tape.

When a number key is actuated, a signal corresponding to the number is fed to the number thyratrons 141. The number key zero generates the FA1 signal, the number key one the FB1 signal, the number key two the FC1 signal, . . . , the number key nine the FK1 signal. These signals are fed to the number thyratrons 141 for serial encoding.

If the entry is via the paper-tape input-output 145, a binary coded combination of JA, JB, JC, JD, and JE signals representing a digit is generated for each digit sensed by the paper-tape input-output 145 and these signals are fed to the number thyratrons 141 for serialization.

The numbers, usually comprising ten digits having a decimal point between the second and third least significant digits unless otherwise noted, are sequentially fed as serialized pulse signals via the DB signal line to the left-shift register in-out control 115. They circulate in the left-shift register (comprising the left-shift register in-out control 115, the W3O signal line, a channel of the magnetic disk 165 and the W3I signal line) until a complete number is assembled. The complete number is fed from the left-shift register in-out control 115 via the AH signal line through the operand funnel 121 to the adder-subtractor 122 as the AS signal.

The number passes through the adder-subtractor 122 for possible complementing. If a negative number had been entered a complement is formed and a negative sign is placed in the sign position of the number. (By complementing a number having $n$-digits, what is meant is subtracting that number from a number having $n+1$ digits, where all but the most significant digit are zero.)

The number, more precisely the pulse pattern representing the number is fed via the AN signal line to the accumulator register in-out control 113. The number circulates in the accumulator register (comprising the accumulator register in-out control 113, the W1O signal line, a channel of the magnetic disk 165 and the W1I signal line) until an arithmetic operation is to be performed.

At that time the number is fed from the accumulator register in-out control 113 via the AB signal line through the operand funnel 121, and to the adder-subtractor 122 by means of either the AS or AM information signal lines. The modified number is then fed via the AN signal line to either the accumulator register where it again recirculates, or is fed to the add-one register if it is to be stored. If the number is to be stored it enters the add-one register as the AN signal fed to the add-one register in-out control 112. It leaves the add-one register in-out control 112 on the W2O signal line and is recorded in a channel of the magnetic disk 165. After a fixed delay, the signals representing the number are fed via the W2I signal line back to the add-one register in-out control 112. The number leaves the add-one register in-out control 112 a second time along the AC signal line which is coupled to the memory in-out control 111. The number is then recorded in an appropriate memory register by feeding the number via either the ROA or ROB signal lines to an appropriate channel of the magnetic disk 165.

Thus a number that has been entered is now stored. The number may or may not have been modified.

If a number is to be printed or punched out, it leaves its position on a channel of the magnetic disk 165 via the R alpha or R beta signal lines to enter the memory in-out control 111. The number passes via the AR signal line through the operand funnel 121 and enters the adder-subtractor 122 via either the AS or AM lines for possible modification. The number then enters the accumulator register via the AN signal line connected from the adder-subtractor 122 to the accumulator register control 113. After circulating in the accumulator register the number leaves the accumulator register control 113 as the AB signal, passes through the operand funnel 121 and enters the adder-subtractor 122 along the AM signal line for possible recomplementing.

The number leaves the adder-subtractor 122 as the AN signal and enters the left-shift register via the left-shift register in-out control 115. The number now recirculates in the left-shift register.

The number is fed a digit at a time via the AX, AV, AU and AY signal lines to the number thyratrons 141 for decoding preparatory to printing out, and to the paper tape input-output 145 where it activates solenoids for punching a paper tape.

In the number thyratrons 141 each digit is decoded and fed to the main printer 154 and the auxiliary printer 155 for indexing (setting up appropriate print bars) and printing. The digit zero is fed to both printers by the FA signal line, the digit one by the FB signal line, . . . , the digit nine by the FK signal line. The number is then printed when all the print bars are set up.

Although a complete operation from entering to indexing and printing has been described, it should be noted that generally many arithmetic and control operations are interposed; for example, a number may be entered at the start of a program and another number printed at the end of the program.

During a data processing problem it may be desirable to permit an arithmetic operation to occur between a number stored in the accumulator register and any or all the numbers stored in fifty memory registers of a channel.

To accomplish this in a relatively short time (less than one revolution of the magnetic disk 165) the number recorded in a memory register is reproduced and fed to the adder-subtractor 122 to perform an arithmetic operation with the contents of the accumulator register. The modified number is then transferred via the add-one register and recorded in the original memory register. The same operation is repeated with numbers stored in subsequent memory registers in the channel. The reproducing head and recording head associated with the channel are spaced so that the time required for a memory register to move between the reproducing head and recording head is the same as the time required for the data to pass from the reproducing head through the adder-subtractor 122 and the add-one register and back to the recording head. In other words, a number is reproduced, modified and rerecorded in the original memory register during the time required for the memory register to move from the reproducing head to the recording head. The add-one register provides all but one digit of the transfer delay required. The adder-subtractor provides the remaining one digit of transfer delay.

Thus, it is possible to modify the contents of any or all of the memory registers within the time of one revolution of the magnetic disk 165.

VIII. GENERAL PROGRAM STEP CYCLE (FIG. 7)

A program step cycle starts with the control belt 130 in position to execute a program step or instruction. The computer proceeds to perform the operations called for by the instruction coded on control belt 130 and upon completion of these operations the control belt 130 is stepped to a new position and the program step cycle terminates. Thus, a program step cycle is usually composed of two parts. The first involves computer operations and the second the movement of the control belt 130 to its new position.

When the control belt 130 reaches its position an OD signal is fed to the cycle generators 131 and the belt motor control 133. In addition, a —DO signal dependent on the OD signal is fed from the belt motor control 133 to the cycle generators 131 if the control belt movement was properly executed. The simultaneous occurrence of the OD and —DO signals at the cycle generators 131 permits the generation of a CB signal. A second combination is possible, the occurrence of a —DO signal and a —OD signal in the cycle generators 131 also insures proper stepping. If neither of these signal combinations occurs, no stepping has been executed and a new stepping cycle is initiated.

The CB signal is fed from the cycle generator 131 to the scan control 124 to initiate a scan cycle. The coincidence of a signal derived from the CB signal and a synchronizing signal EB from the timer 160 initiates the generation of the SB signal. The EB signal synchronizes the computer to the cyclic rotation of the magnetic disk 165. The SB signal is fed to the memory in-out control 111, the add-one register in-out control 112 and the accumulator-register in-out control 113. The SB signal functions primarily as a gating control signal which makes the contents of the memory registers accessible to the arithmetic circuits of the computer.

The contents of each of the memory registers is read sequentially from the magnetic disk 165 and fed via the R alpha line or the R beta line to the memory in-out control 111. The contents of the memory registers hereinafter called information is transmitted as the AR signal to the operand funnel 121. The operand funnel 121 functions to select the particular information to be fed to the adder-subtractor 122. In a large class of program instructions, the SB signal generates the AE signal in the add-one register in-out control 112 which is fed to operand funnel 121 permitting the operand funnel 121 to accept the information from the memory in-out control 111. The information enters the adder-subtractor 122 as either the AS or the AM signal and leaves the adder-subtractor 122 as the AN signal processed or unprocessed depending on the type of operation being performed.

The AN signal is fed to the add-one register in-out control 112 and leaves this unit to be recorded on the magnetic disk 165 via the W2O line.

The information is read from the magnetic disk 165 and fed back to the add-one register in-out control 112 via the W2I line. After passing through the add-one register in-out control 112 the information is returned to the memory in-out control 111 as the A.C. signal. In some cases signals from the control belt 130 fed to the memory in-out control 111 will prevent or enable recording on the magnetic disk 165. These cases will be discussed as they arise. The information to be stored in appropriate memory registers is fed via the ROA line or the ROB line to the magnetic disk 165.

After one rotation of the magnetic disk 165 a second EB signal is generated by the timer 160 and the "scan cycle" is terminated.

It should be noted that, generally, a scan cycle lasts one disk revolution but for some operations the cycle may be longer or shorter. Whenever these special cases arise they will be noted. It should also be noted that the contents of all the memory registers on one channel of the magnetic disk 165 are available to the arithmetic circuits of the computer even though not all the memory registers are called upon to participate in a particular operation.

The register zone 138 of the control belt 130 synchronously transmits an R pin signal to the scan control 124 whenever a particular memory register is required in the program step. Upon receipt of this signal the scan control 124 generates an SD signal which is fed to the operand funnel 121 and the memory in-out control 111 to permit an operation be performed on the contents of the selected memory registers. The R pin signals are generated by sensing permanent marks or indicia on the control belt 130.

Since it is sometimes desirable to select memory registers not permanently programmed on the control belt 130, an "erasable" locator is provided. Such a locator is a pulse in the switching blank portion of a memory register. Whenever a pulse in this position of the contents of a memory register is detected, an SD signal is generated. The mark is later erased.

Since all the memory registers of one channel are serially available to the arithmetic circuits, it is possible to perform the same operation on any or all of the memory registers in one program step or in less than one cycle of the magnetic disk 165.

At the termination of the scan cycle, the scan control 124 generates an SED signal which is fed to the cycle generator 131 to initiate a cycle which is associated with the movement of the control belt 130 to the next program step. The cycle generators 131 feed the YA and the YB signals to the belt motor control 133 and the control belt steps to the next program step. Upon reaching the next program step a new program step cycle begins.

The following signals are also generated during this operation. These signals are employed in other operations of the computer as will hereinafter be explained in detail.

Just prior to the carrying out of the program instruction, a CB signal generates a BM signal in the arithmetic control 116. The negative counter parts of the BM signal fed to the left-shift register in-out control 115 and the add-one register in-out control 112 clears the associated registers to zero.

The information in the accumulator register is represented by the AB signal from the accumulator register in-out control 113. The accumulator register and its accompanying signal are included in this section for the sake of completeness.

IX. INITIATE OPERATION (FIG. 8)

Since there are as many as thirty-one possible programs permanently stored on the control belt 130, it is necessary to select the specific program to perform the desired operations. The first program instruction of each program is encoded with a combination of the A, B, C, D and E signals corresponding to 1, 2, 4, 8, and 16, or $2^0$ to $2^4$ respectively. In addition, the N and the P signals are present to characterize the program instruction as an initiate operation program instruction. The N and the P signals permit the combination of the A, B, C, D, and E signals to be interpreted as a number instead of as control signals. The combination is compared with a combination of switch positions selected by the operator prior to activating the computer.

When the switch positions are set in the program selector 132 indicating the number of the desired program, the operator depresses an initiate key in the program selector 132 generating a DE signal and also a DC signal characteristic of control belt 130 movement in the forward direction which in turn generates a CP signal.

The DE signal is fed to the carriage control 152 to initiate a carriage return on both the main printer 154 and the auxiliary printer 155.

At the end of these carriage movements, movement of the control belt 130 is initiated by a DE signal fed to cycle generators 131 and to the keyboard 142 to alert the motor bar circuitry. The DC signal is also fed to the keyboard 142 where cooperating with a signal derived from the DE signal causes the generation of the MG signal by the motor bar circuitry. The MG signal replaces the initial DE signal fed to the cycle generators 131 to provide a continuous source of stepping signals (YA and YB) to the belt motor control 133. The CP signal as a positive signal fed to the cycle generators 131 and the keyboard 142 locks the control belt 130 in the activated condition. The control belt 130 continues to step in a forward direction. As each program instruction is sensed the associated A, B, C, D and E signals from the arithmetic zone 139 are generated. To ensure that no spurious computer action is initiated, the CP signal as a negative signal is fed to the carriage control 152, the tab counter 151 and the scan control 124 to block any possible activation of these units by the signals from the arithmetic zone 139.

The control belt 130 continues stepping forward until an N and a P signal are present at the input-output zone 140. The N and the P signals cooperate in the program selector 132 with a CB signal from the cycle generators 131 causing the generation of a CM signal which terminates the DC signal and the CP signal.

The CM signal is also fed to the keyboard 142 and the cycle generator 131 to permit a single forward step movement of the control belt 130. At the same time, a comparison is performed between a combination of the signals from the arithmetic zone 139 and the signals from the switch positions in the program selector 132. It will be assumed as an example that the A and C signals (representing $2^0 + 2^2$) are present indicating the fifth program. Three possibilities arise:

(1) The switches in the program selector are set for a program designated by a number greater than five.
(2) The switches in the program selector are set for a program designated by a number less than five.
(3) The switches in the program selector are set for a program designated by a number equal to five.

For the first possibility the DC and the CP signals are geenrated. The operation continues in a similar manner with CP performing its usual functions.

For the second case a DD signal is generated which causes the generation of the CP signal. Everything is again identical but in addition the DD signal is fed to the keyboard 142 causing the generation of the MH signal. The MH signal fed to the belt motor control 133 causes the control belt 130 to step in the reverse direction.

For the third case, after the generation of the CM signal the DC or DD signal (whichever was present) is terminated and the program instruction terminates.

The search for the program continues until the third case arises at which time neither the DC nor the DD signals are generated and hence no CP signal is generated. The search terminates for the desired program has been located. The control belt 130 is automatically stepped to the first program instruction of the program and the computer proceeds to carry out the designated operations. Since the number designations of the programs are in ascending order in the forward direction, it is possible, by knowing the direction of the inequality, to logically search the control belt 130.

To automatically repeat the selected program, the first step of the next program generates the N and P signals and a program number which is greater than the number manually set in the program selector 132. Thus, the control belt 130 is stepped back to the beginning of the program. In this case, only the auxiliary printer 155 performs a carriage return and a multiple line feed. The main printer 154 is not affected for the DE signal is not generated. Instead the combination of an N and CB signal fed to the carriage control 152 activates the carriage of the auxiliary printer 155.

X. CLEAR MEMORY REGISTER (FIG. 9)

This program instruction clears any selected memory register or any combination of selected memory registers in one disk channel during one program step having a duration of approximately one magnetic disk revolution. This program instruction is extremely useful in problems where it is necessary for one or more memory registers to contain all zeros at a particular time. A mark corresponding to each memory register to be operated on is located in a predetermined position in the register zone 138 of the control belt 130.

The computer cycle for this program instruction is the same as the computer cycle previously described for a general arithmetic operation which includes the scan cycle characterized by the generation of the SB, the SD, and the —BM signals by the scan control 124.

The SD signal is a signal having a time duration equal to the time required to transmit one complete word of information. As each mark is located an R pin signal is transmitted from the register zone 138 of the control belt 130 to the scan control 124 to initiate an SD signal.

The contents (AR signal) of the memory registers including those containing the zeros enter the adder-subtractor 122 via the operand funnel 121 and are fed back to their particular locations on the magnetic disk 165 (via lines AN, W2O, W2I, and AC) as has been previously described.

Each SD signal fed to the memory in-out control 111 prevents the transmission of the AR signal to operand funnel 121. Since the R pin signals are synchronized with the memory registers stored on the magnetic disk 165, each R pin signal and its associated SD signal prevents the transfer of the contents of the designated memory registers into the operand funnel 121 thus effectively substituting zeros for the contents of these memory registers.

XI. ADD ACCUMULATOR TO MEMORY REGISTER (FIG. 9)

In this instruction it is possible to add the contents of the accumulator to one or more memory registers. The instruction is extremely useful wherever it is desired to add the same number to a plurality of numbers; for example, in an accounting problem it may be necessary to add a constant number to several distinct items.

The program instruction is similar to the previously described program instructions in that the usual scan cycle is characterized by the SB signal and the generation of the SD signals associated with the memory registers to be operated upon.

The information stored in the accumulator recirculates between the accumulator register in-out control 113 and a channel of the magnetic disk 165 via the lines W1O and W1I. The information in the memory registers circulates in the manner described in the previously disclosed section entitled "General Program Instruction Step Cycle."

The only additional signal required is the A signal generated by the arithmetic zone 139 of the control belt 130.

The A signal fed to the scan control 124 overrides the effect of the SD signal which is normally used for clearing designated memory registers as described in the "Clear Memory Register" program instruction. The A signal is also fed to the operand funnel 121 where, in conjunction with the SD signals it permits the gating of the contents of the accumulator as the AB signal to enter the adder-subtractor 122 as an addend (AS signal) whenever the contents of a designated memory register enters the operand funnel 121 as an AR signal. The contents of all the memory registers leave the operand funnel 121 as the AM signals and enters the adder-subtractor 122 as augends in synchronism with the addend or AS signal. As each of the sums is formed it is transmitted from the adder-subtractor 122 as the AN signal and returns to its appropriate memory register position in the usual manner.

Since the contents of the accumulator are only gated into the adder-subtractor 122 when a designated memory register is located, zeros are effectively added to the contents of the undesignated memory registers so they remain unchanged.

XII. SUBTRACT ACCUMULATOR FROM MEMORY REGISTER (FIG. 9)

This program instruction is exactly similar to the above described program instruction entitled "Add Accumulator to Memory Register," except that instead of performing an addition on each of the desired registers a subtraction is now performed.

The additional signal required is the C signal fed from the arithmetic zone 139 of control belt 130 to the adder-subtractor 122. The C signal converts the adder-subtractor 122 from an adder to a subtractor. The actual operation of the adder-subtractor 122 and the means by which it may be converted will hereinafter be more fully described.

XIII. ADD ACCUMULATOR TO CLEARED MEMORY REGISTER (FIG. 9)

This program instruction is a combination of the "Clear Memory Register" instruction and the "Add Accumulator to Memory Register" instruction. This program instruction permits the two cited program instructions to be performed in one program instruction step.

The only signals required in addition to the signals used in the "Add Accumulator to Memory Register" program instruction are the C and D signals. The A signal still permits the contents of the accumulator to enter the operand funnel 121 as the AB signal and leave the operand funnel as the addend or AS signal. The C and D signals (or more exactly the negative counterparts of the C and D signals) fed to the operand funnel 121 operate in conjunction with the negative counterpart of the SD signal to prevent the contents of the designated memory register from entering the operand funnel 121. Therefore each of the desired memory registers is cleared to zero and the augend input (the AM signal) fed to the adder-subtractor 122 is zero at these particular times. The sums formed by the adder-subtractor 122 are fed back to the appropriate memory registers in the usual manner.

Another way of visualizing the instruction is to say that all the memory registers still pass through the adder-subtractor 122 and the contents of the accumulator is substituted for the contents of the designated memory registers.

XIV. ADD MEMORY REGISTER TO ACCUMULATOR (FIG 10)

This program instruction permits the formation of a sum of the contents of one or more memory registers on the same track with the contents of the accumulator. It is possible to add the contents of a first memory register to the contents of the accumulator forming a first sum. To this first sum the contents of a second memory register is added to form a second sum and so on. This progressive build-up of sums permits the accumulation of totals from the contents of many memory registers. In accounting problems, such an operation is extremely useful where a figure indicative of the quantities stored in a plurality of memory registers is desired.

The program instruction steps are similar to those occurring in the "General Program Instruction Step Cycle" except that the accummulator is coupled to and recirculates through the adder-subtractor 122.

This program instruction is characterized by the B signal from the arithmetic zone 139 of the control belt 130. The B signal fed to the operand funnel 121 permits the contents of the accumulator identified as the AB signal from the accumulator register in-out control 113 to be transmitted from the operand funnel 121 to the adder-subtractor 122 as the AM signal. In addition, the B signal cooperating with the SB signal permits the output of the adder-subtractor 122 (the AN signal) to enter the accumulator via the accumulator register in-out control 113. In this manner, a recirculation path for the accumulator is established through the adder-subtractor 122.

Whenever the contents of a memory register is designated to be added to the contents of the accumulator, the usual R pin signal is fed from the register zone 138 to the scan control 124 and the associated SD signal is generated. The SD signal fed to the operand funnel 121 permits the contents of the designated memory register leaving the in-out control 111 to enter the operand funnel 121 as the AR signal and be transmitted from the operand funnel 121 to the adder-subtractor 122 as the AS signal. The formed sum is transmitted back to the accumulator as the AN signal via the accumulator register in-out control 113. The sum so formed becomes the new contents of the accumulator and recirculates awaiting the addition of the contents of the next designated memory register or until the completion of the instruction program step.

XV. SUBTRACT MEMORY REGISTER FROM ACCUMULATOR (FIG. 10)

This program instruction is identical to the "Add Memory Register to Accumulator" program instruction except that the adder-subtractor 122 is converted from an adder to a subtractor. The program instruction is characterized by both the B and the C signals from the arithmetic zone 139 of the control belt 130. The C signal is used to convert the adder-subtractor 122 to a subtractor.

XVI. CLEAR ACCUMULATOR AND ADD MEMORY REGISTER (FIG. 10)

This program instruction initially clears the contents of the accumulator so that a sum of the contents of designated memory registers can be accumulated. The program instruction is characterized by the generation of the B and the E signals by the arithmetic zone 139 of the control belt 130. The B signal performs the same functions as in the previous instruction. The E signal is fed to the operand funnel 121 where it cooperates with —BM (the negative counterpart of the BM signal) to block the entry of the contents of the accumulator into the operand funnel 121. The blocking action is timed to prevent accumulator recirculation for the period of time required to effectively clear the contents of the accumulator to zero. After the accumulator has been cleared to zero, the additions occur exactly the same as in the program instruction entitled "Add Memory Register to Accumulator."

XVII. INTRODUCTION TO ENTER INSTRUCTIONS

The following four program instructions are all concerned with enter or input operations. Each of the program instructions can be divided into two parts; the first part being the entering of a number via either a keyboard (manually) or via a punched paper tape. The information to be entered will consist of a number having a maximum of ten digits and a sign digit. The number is entered via either of the input devices and stored in the accumulator register. When the number is stored in the accumulator register the first part is complete.

The second part of the program instruction consists in using the stored number as an operand in an addition operation. The second part is similar to some of the previously-described program instructions, hence a detailed description of this second part will not be repeated and only an indication of the start of the second part will be discussed.

XVIII. ENTER NUMBER VIA KEYBOARD INTO MEMORY REGISTER (FIG. 11)

This program instruction begins with the clearing of the left-shift and accumulator registers, thereafter, the number is entered into the accumulator register and then added to the designated memory register.

After the left-shift and accumulator registers have been cleared, the keyboard 142 is prepared to receive the number being inserted. The digits are typed in sequentially and are encoded and fed in a serial manner to the left-shift register. As each digit is entered the contents of the left-shift register are raised one denominational order. After the last digit has been typed in, a motor bar is depressed indicating the end of the entry. The depression of the motor bar initiates a transfer of the contents of the left-shift register (the number that has been inserted) to the accumulator register via the adder-subtractor 122. The number now circulates in the accumulator register and a usual scan cycle begins. As each of the designated memory registers is located its contents are fed to the adder-subtractor 122 to be added to the contents of the accumulator register. As each sum is formed it is fed back to the designated memory registers and the contents of the accumulator register continue to recirculate awaiting the location of the next designated memory register. It should be noted that the second half of the operation beginning with the inserted number circulating in the accumulator register is identical to the program instruction entitled "Add Accumulator to Memory Register."

The program instruction will now be described in detail. At the beginning of the program instruction, a CB signal generated by the cycle generators 131 is fed to the arithmetic control 116 where the BM signals are generated. The negative BM signal lasting one minor cycle is fed to the left-shift register in-out control 115 where, by preventing the normal recirculation of the contents of the left-shift register, the register is effectively cleared to zero. Immediately following the generation of the BM signals by the CB signal a CE signal is fed from the cycle generators 131 to the arithmetic control 116 to generate the BE signals. A BE signal fed to the scan control 124 stalls the generation of the usual SB signal and the accompanying scan cycle. In this manner, the scan cycle then awaits the termination of the enter portion of the program instruction.

The BE signal is fed to the enter and index control 143 to generate a DH signal which unlocks the keyboard 142 and lights an indicator to notify the operator that the number may be inserted. Before any digits of the number is inserted an FL signal is fed from the keyboard 142 to the enter and index control 143 causing the generation of a DP signal.

For the purpose of simplifying the description the entry of a specific digit will be described. It will be assumed that the key for the digit two is depressed at the keyboard 142. An FC1 signal indicative of the digit two is fed to the number thyratrons 141. At the same time, the DP signal from the enter and index control 143 cooperates with the FC1 signal to set (fire) a thyratron causing the generation of the FC signal which is sent to the main printer 155 for possible indexing. The FC signal also enters a decoding matrix in the number thyratrons 141 where the binary equivalent of the digit two is formed in a serial pulse code. A signal derived from the FC signal but, for the sake of clarity still designated at FC, is fed to the enter and index control 143 to initiate a means for resetting the thyratrons in the number thyratron 141 and to initiate a left-shift cycle. This signal causes the generation of a CG signal lasting one minor cycle.

The CG signal fed to the left-shift register in-out control 115 permits the serialized binary digit to enter the left-shift register as the DB signal from the encoding matrix of the number thyratrons 141 and also causes a left shift in the left-shift register. The enter and index control 143 causes interruption of the DTM signal fed to the printer. The interruption of this signal which supplies power to all thyratrons resets the FC thyratron. Thus a number is built up a digit at a time by entering a digit and shifting the contents of the left shift register one denominational order.

After the last digit of the number has been entered, the operator depresses a motor bar at the keyboard 142 indicating the end of entering. The depression of the motor bar causes the generation of the MF signal which is fed to the enter and index control 143. The MF signal initiates a transfer minor cycle characterized by the EL signal. The EL signal from the enter and index control 143 is fed to the operand funnnel 121 permitting the contents of the left-shift register as the AH signal to enter the operand funnel 121. At the same time, the negative counterpart of the EL signal fed to the left-shift register in-out control 115 breaks the recirculation path thus clearing the left-shift register to zero.

The contents of the left-shift register leaves the operand funnel 121 as the AS signal, passes through the adder-subtractor 122 unchanged and is fed to the accumulator register in-out control 113 as the AN signal. The number then recirculates in the accumulator register.

Towards the end of the EL minor cycle, the EL signal fed to the scan control 124 terminates the BE signal. Following the termination of the BE signal an SB signal is generated at the next EB signal causing the initiation of the temporarily stalled scan cycle. With the initiation of the scan cycle and the recirculation of the number in the accumulator register, the program instruction begins its second part which is identical to the program instruction entitled "Add Accumulator to Memory Register" and the number is added to the designated memory register.

If the number being entered is a negative number the operator strikes the negative end of entry motor bar which generates an MF signal which generates ACH signal in the enter and index control 143. The CH signal is fed to the adder-subtractor 122 converting it to a subtractor during the minor cycle when the number is transferred from the left-shift register to the accumulator register via the operand funnnel 121 and the adder-subtractor 122 so that the number may be entered in complement form.

XIX. ENTER NUMBER VIA KEYBOARD INTO THE CLEARED MEMORY REGISTER (FIG. 11)

This program instruction is identical to the previously-described program instruction except that before the contents of the accumulator register are added to each of the designated memory registers each of the designated memory registers is initially cleared. To perform this clear operation the C and the D signals are generated in addition to the A and the E signals by the arithmetic zone 139 of the control belt 130. The negative counterparts of the C and D signals are fed to the operand funnel 121 where cooperating with a negative SD signal they clear each of the designated memory registers as it enters the operand funnel 121.

It should be noted that this program instruction after the entry portion is complete is identical to the program instruction entitled "Add Accumulator to Cleared Memory Register."

XX. ENTER NUMBER VIA PAPER TAPE UNIT INTO MEMORY REGISTER (FIG. 12)

This program instruction begins with the clearing of the left-shift register and the clearing of the accumulator register. After these two registers have been cleared the paper tape input-output 145 is prepared to receive the number being inserted. The digits are read from a pre-punched paper tape sequentially and are encoded and fed in a serial manner to the left-shift register. As each digit is entered, the contents of the left-shift register are raised one denominational order. After the last digit of the number has been read from the paper tape, a coded hole combination on the paper tape simulates a motor bar action indicating the end of the entry. The similated motor bar action initiates a transfer of the contents of the left-shift register (the number that has been inserted) to the accumulator register via the adder-subtractor 122. The number now circulates in the accumulator register and a scan cycle begins.

As each of the designated memory registers is located its contents are fed to the adder-subtractor 122 to be added to the contents of the accumulator register. As each sum is formed it is fed back to the designated memory registers and the contents of the accumulator register continue to recirculate awaiting the location of the next designated memory register. It should be noted that the second half of the operation beginning with the inserted number circulating in the accumulator register is identical to the program instruction entitled "Add Accumulator to Memory Register."

This program instruction will now be described in detail. At the beginning of the program instruction a CB signal generated by the cycle generators 131 is fed to the arithmetic control 116 where the BM signals are generated. The negative BM signal lasting one minor cycle is fed to the left-shift register in-out control 115 where, by preventing the normal recirculation of the contents of the left-shift register, effectively clears the register to zero.

The program instruction is characterized by the A, the E, and the I signals generated by the arithmetic zone 139 of the control belt 130. The A and the E signals, cooperating with the usual CG signal, generate the BE signal in the arithmetic control 116, and the BE signal functions exactly as in the "Enter Number Via Keyboard Into Memory Register" program instruction. Particularly, a BE signal within the scan control 124 stalls the generation of the usual SB signal and the accompanying scan cycle. In this manner, the scan cycle then awaits the termination of the entry portion of the program instruction.

In addition, the I signal is fed to the paper tape input-output 145 where it generates an IJ signal. The IJ signal, cooperating with the BE and the DP signals within the paper tape input-output 145, activates the reader clutch of the paper tape reader. The first hole combination on the paper tape indicating the first digit of the number is read by the paper tape reader and fed from paper tape input-output 145 as a combination of J signals (JA, JB, JC, JD, JE). The J signals are fed via the J signal cable to the number thyratrons 141 for serialization and synchronization.

At the same time, the J signals are fed to the enter and index control 143 to generate a CG signal which is fed to the left-shift register in-out control 115. The CG signal, having a time duration of one minor cycle, permits a shift left to occur in the left-shift register. The CG signal also permits the serialized pulse code of the digit to enter the left-shift register as the DB signal from the number thyratrons 141. The number is thus built up one digit at a time with a one digit left shift occurring as each digit enters the left-shift register. After all the digits of the number have been inserted, a hole combination indicating binary twelve is read by the paper tape reader and the corresponding JC and JD signals are fed to the keyboard 142 causing the generation of the MF signal indicating the end of entry. It should be noted that this simulates the motor bar action. The MF signal fed to the enter and index control 143 generates the EL signal which lasts one minor cycle, which is fed to the left-shift register in-out control 115 and the operand funnel 121 causing the number to be transferred from the left-shift register via the operand funnel 121 and the adder-subtractor 122 to the accumulator register. This transfer is similar to the transfer that occurs during the previously-described program instruction.

With the number circulating in the accumulator register, the entry portion of the operation may be considered ended.

Towards the end of the EL signal period the BE signal is terminated, permitting the initiation of the usual scan cycle. With the initiation of the scan cycle and the number now circulating in the accumulator register, the arithmetic portion of the operation is identical to the previously-described program instruction entitled "Add Accumulator to Memory Register."

If the number being entered is a negative number, the end entry signal will have a hole combination equivalent to binary twenty-eight and a JE signal will be generated in addition to the JC and JD signals. A combination of these three signals causes the generation of a CH signal in the enter and index control 143. The CH signal is fed to the adder-subtractor 122 and converts the unit to a subtractor during the EL signal period (the minor cycle when the number is transferred from the left-shift register to the accumulator register via the operand funnel 121 and the adder-subtractor 122) so that the number may be entered in complement form.

XXI. ENTER NUMBER VIA PAPER TAPE UNIT INTO CLEARED MEMORY REGISTER (FIG. 12)

This program instruction is identical to the previously-described program instruction except that before the contents of the accumulator register are added to each of the designated memory registers, each of the designated memory registers is initially cleared. To perform this clear operation the C and the D signals are generated in addition to the A and the E signals. The negative counterparts of the C and the D signals are fed to the operand funnel 121 and cooperate with a negative SD signal to clear each of the designated memory registers as it enters the operand funnel 121. It should be noted that this instruction, once the entry portion is complete, is identical to the program instruction entitled "Add Accumulator to Cleared Memory Register."

XXII. MULTIPLICATION (FIG. 13)

This program instruction multiplies the contents of the accumulator register (multiplicand) by the contents of a designated memory register (multiplier).

The contents of the designated memory register is a number assumed to be different than most numbers handled by the computer. Most numbers handled by the computer have a decimal point between the second and third least-significant digits, but the contents of the designated memory register acting as a multiplier assumes the decimal point between the sixth and seventh least-significant digits. This feature permits the handling of fractions of a cent which often occur in tax problems.

The multiplication operation is performed by accumulating and shifting partial products, except that the direction of the shifts change when a transition occurs from the cents portion of the multiplier to the dollars portion of the multiplier.

Briefly, the instruction can be broken into three parts, the first being the preparation of the three working registers and the adder-subtractor 122 for the multiplication; the second being the multiplication involving the cents portion of the multiplier; and the third being the multiplication by the dollars portion of the multiplier. The program instruction is characterized by the A and B signals generated by the arithmetic zone 139 of the control belt 130.

In order to clarify the drawing, many of the signal lines are shown as part of a cable and the registers are only partially illustrated.

During a usual scan cycle the minus BM signal fed from the arithmetic control 116 to the left-shift register in-out control 115 clears the left-shift register, and the minus BM signal fed to the add-one register in-out control 112 clears the add-one register. While the previous contents of the left-shift register are being cleared, a combination of the SB, BM, A and B signals fed to the left-shift register in-out control 115 gate the contents (multiplicand) of the accumulator register as the AB signal from the accumulator register in-out control 113 into the left-shift register. A combination of the B and SB signals fed to the accumulator register in-out control 113 then effectively clears the accumulator to zero.

Upon location of the designated memory register an R pin signal from the register zone 138 of the control belt 130 is fed to the scan control 124 to generate the SD and minus SD signals. The SD signal fed to the add-one register in-out control 112 permits the fifteen's complement of the multiplier to pass from the memory in-out control 111 as the minus AR signal to the add-one register. The fifteen's complement of each digit is used solely as a matter of convenience since it is easily obtained by a pure inversion of the pulse pattern representing the multiplier.

The SD signal fed to the arithmetic control 116 causes the generation of the plus and minus BQ signals which are characteristic of the multiplication operation. The BQ signals perform several important functions. A negative BQ signal fed to the scan control 124 prematurely terminates the SB signals. The BQ signal fed to the operand funnel 121 permits the contents of the left-shift register as the AH signal to enter the adder-subtractor 122 as the AM signal. The BQ signal permits the contents of the accumulator register (the AB signal) to enter the adder-subtractor 122 as the AS signal via the operand funnel 121. Also the BA signal fed to the accumulator-register in-out control 113 permits the sum formed by the adder-subtractor 122 (the AN signal) to enter the accumulator register. In addition the BQ signal fed to the add-one register in-out control 112 alerts the add-one circuitry.

Just prior to the first addition cycle of the multiplier operation the computer is in the following state: The complement of the multiplier is circulating in the add-one register with the add-one circuitry alerted; the multiplicand is circulating in the left-shift register with an output coupled via the operand funnel 121 to one of the operand inputs of the adder-subtractor 122; and the accumulator register is clear to zero but has an input connected to the output of the adder-subtractor 122 and an output connected to the second operand input of the adder-subtractor 122 via the operand funnel 121.

A series of addition cycles are now performed. Once a minor cycle the contents of the left-shift register (the multiplicand) are added to the contents of the accumulator to form partial products. During each addition cycle, one is added to the least significant digit of the contents of the add-one register (the multiplier). When binary fourteen is sensed by the presence of a BG signal, BH signal and BJ signals fed from the add-one register in-out control 112 to the arithmetic control 116 and a first shift cycle is alerted to occur after the next addition cycle. It should be noted that binary fourteen is the fifteen's complement of binary one. If the multiplier had been stored in uncomplemented form and each addition cycle subtracted one from the least significant digit of the multiplier then the occurrence of one if this digit would indicate that one more addition cycle is to occur before a shift. The complemented version of the multiplier and a unit adder are employed in the circuitry instead of an uncomplemented multiplier and a unit subtractor.

When the shift cycle occurs the BT, the —BT and the BS signals are generated by the arithmetic control 116. The BS signal fed to the add-one register in-out control 112 adds one to the sign position of the multiplier. This sign position is used to count the number of shifts. The —BT signal fed to the operand funnel 121 prevents the circulation of the contents of the accumulator register and the contents of the left-shift register through the adder-subtractor 122 during the shift cycle thus preventing an addition; instead a plus BT signal fed to the accumulator register in-out control 113 causes a one digit right shift of the contents of the accumulator register. At the same time plus and minus BT signals fed to the add-one register in-out control 112 cause a one digit right shift of the contents of the add-one register.

Provisions within the add-one register in-out control 112 cause the sign digit position to remain unshifted. The right shifting of the contents of the add-one register causes the second-least significant digit to become the least significant digit. The value of the new least significant digit then determines the number of addition cycles to be performed before another shift cycle occurs. It is seen that the magnitude of the digit in the least significant digit position in the add-one register determines the number of times the multiplicand is added to the partial products before a shift cycle occurs. After six groups of addition and shift cycles occur, a binary six is present in the sign position of the contents of the add-one register. This binary six indicated by a +BG and a +BH signal is fed to the arithmetic control 116 and causes the generation of +BU and —BU signals. The BU signal changes the type of shifting that occurs for the remainder of the multiplication. During each succeeding shift cycle the contents of the add-one register still shift right as has been previously described but the contents of the accumulator register (the partial products) are no longer shifted and the contents of the left-shift register (the multiplicand) are now shifted left.

During a shift cycle a BU signal fed to the left-shift register in-out control 115 cooperates with a BT signal to open a left-shift path in the left-shift register, and a —BU signal cooperating with a —BT signal closes the ordinary recirculation path in the left-shift register. A —BU signal fed to the accumulator register in-out control 113 overrides the effect of a BT signal so the right-shift path in the accumulator register is blocked. A BU signal fed to the operand funnel 121 also overrides the effect of a —BT signal which normally prevents circulation of the accumulator register through the adder-subtractor 122 during a shift cycle. In this manner during all shift cycles beyond the sixth the contents of the accumulator register circulate through the adder-subtractor 122 unchanged and the contents of the left-shift register are shifted one digit position to the left.

Just preceding the tenth shift cycle binary nine is stored in the sign digit position of the contents of the add-one register. This binary nine (characterized by a —BF and a —BJ signal from the add-one register in-out control 112) cooperates with the —BS signal in the arithmetic control 116 to terminate the BQ signal and effectively terminate the multiplication operation. The final product remains stored in the accumulator register. The disappearance of a —BQ signal fed to the scan control 124 permits the generation of an SED signal which is fed to the cycle generators 131 to step the control belt 130 to the next position in the usual manner.

XXIII. MULTIPLICATION WITH ROUND OFF
(FIG. 13)

This program instruction is identical to the program instruction entitled "Multiplication" except that the E signal is also generated by the arithmetic zone 139 of the control belt 130. The E signal is fed to the accumulator-register in-out control 113 where it cooperates with the A, the B and the SD signals to feed an appropriate timing pulse into the cleared register which effectively inserts the round off digit. Once the round off digit is inserted the operations are identical.

XXIV. INTRODUCTION TO CONTROL BELT MOVEMENT INSTRUCTIONS (THE FORWARD AND REVERSE CONTROL STOPS)

The following control belt movement program instructions are concerned primarily with moving the control belt in an unusual manner. Because of their similarity all the program instructions are disclosed in the same section. Normally the control belt moves one program step forward for each program instruction. The program instructions to be described will cause the control belt to move in a forward or a reverse manner a number of times specified by information recorded on the control belt.

These program instructions can be divided into the two classes; the first class are called forward or reverse unconditional skips wherein the control belt will move either forward or backward a number of steps specified by the program. The second class of program steps are called forward or reverse conditional skips wherein the control belt will move either to the next program step or will skip back a number of program steps specified by the program depending on the information recorded in the sign position of the contents of the accumulator register. It should be noted that these program instructions are similar to the well-known branch instructions of stored program computers.

XXV. FORWARD UNCONDITIONAL SKIP
(FIG. 14)

This program instruction is characterized by the D signal. The number of program steps to be skipped over is recorded in the register zone 138 of the control belt 130. Usually the marks recorded in the register zone portion of the control belt 130 indicate particular memory registers to be used during a program instruction. It will be recalled that these designated memory registers have a number associated with them. For example, the memory register 15 is actually the sixteenth memory register occurring after the EB signal recorded on the magnetic disk 165.

In this particular program instruction the mark is equivalent to the number of program steps to be skipped over. Hence if sixteen program steps are to be skipped over, it is possible, with an indication of the location of the 15 memory register, to represent the number sixteen.

The program instruction will be considered to start with the usual scan cycle generating the SB signal at the scan control 124. It should be noted that the SB signal is initiated by the cooperation of a CB signal from the cycle generators 131 and an EB signal from the timer 160. The SB signal fed to the arithmetic control 116 cooperating with the D signal from the arithmetic zone 139 generates a CR3 signal. The CR3 signal will be characteristic of building up a count in the left-shift register. The CR3 signal fed to the left-shift register in-out control 115 and the operand-funnel 121 couples the adder-subtractor 122 to the left-shift register. The left-shift register had been previously cleared to zero by a —BM signal from the arithmetic control 116 in the usual manner.

The following recirculation path is thus built up: The contents of the left-shift register leave the left-shift register in-out control 115 as the AH signal. The AH signal leaves the operand-funnel 121 as the AM signal and enters the adder-subtractor 122. The output of the adder-subtractor 122 is the AN signal. The AN signal is fed back to an input of the left-shift register in-out control 115. In addition, the CR3 signal fed to the operand-funnel 121 permits a unit addition to occur every minor cycle of the scan cycle. These unit additions continue until the desired memory register is located and an R pin signal fed to the scan control 124 from the register zone 138 causes the generation of an SD signal. The SD signal fed from the scan control 124 to the arithmetic control 116 causes the generation of a BP signal.

The BP signal will be characteristic of a counting down operation. The negative counterpart of the BP signal fed to the scan control 124 terminates the SB signal and thus prematurely terminates the scan cycle. The disappearance of the SB signal causes the termination of the CR3 signal but the BP signal assumes the role of the CR3 signal in maintaining the previously-described recirculation path. In addition, the BP signal fed to the adder-subtractor 122 converts the unit to a subtractor.

The situation in the computer is now as follows: The count that had been built up during the CR3 portion of the program instruction is recirculating through the left-shift register, the operand-funnel 121 and the adder-subtractor 122 (which has now been converted to a subtractor). The original set signal for BP (a BN signal) is fed to the cycle generators 131 and the keyboard 142. The BN signal fed to the cycle generator 131 initiates the first control belt step. The BN signal fed to the keyboard 142 generates an MG signal which replaces the function of the BN signal on each succeeding control belt step.

The control belt steps in the usual manner with the generation of a CB signal in the cycle generators 131. The CB signal fed to the operand-funnel 121 cooperates with a BP signal to cause a unit subtraction in the built up count. Each control belt step generates a CB signal which causes another unit subtraction. When the count finally reaches zero an AQ signal representing the count number is fed from the left-shift register in-out control 115 to the arithmetic control 116 where zero is indicated by the generation of a —BC signal. Effectively, the —BC signal fed to the keyboard 142 causes the termination of the MG signal, and the —BC signal fed to the scan control 124 causes the generation of an SED signal which terminates the program instruction in the usual manner.

XXVI. REVERSE UNCONDITIONAL SKIP (FIG. 14)

This program instruction is identical to the previously-described program instruction except that in addition to the D signal the E signal is generated by the arithmetic zone 139 of the control belt 130. The E signal fed to the keyboard 142 generates an MH signal which is fed to the belt motor control 133 causing the control belt 130 to step in a reverse direction whenever a step is called for.

XXVII. FORWARD CONDITIONAL SKIP (FIG. 14)

This program instruction is characterized by the B and D signals. The sign of the number circulating in the accumulator register is tested to determine whether a skip is to be performed or not. If a positive sign is present in the sign position of the contents of the accumulator register the control belt 130 steps to the next program instruction. If the sign is negative the program instruction skips over the designated number of program instructions.

The program instruction is identical to the previously-described program instruction Forward Unconditional Skip except that one additional step occurs at the onset of the operation, namely, a signal (—AB) representing the sign of the accumulator register is fed to the scan control 124 where cooperating with the B and D signals a test is made on the sign digit position. If the sign is positive the SE and SED signals are generated in the scan control 124. The SED signal fed to the cycles generators 131 terminates the operation in the usual manner. If the sign is negative, the —AB signal corresponding to the sign is present to inhibit the generation of the SE and the SED signals, and the program instruction is not prematurely terminated. The D signal then takes over and the remainder of the program instruction is identical to the previously described program instruction entitled Forward Unconditional Skip.

XXVIII. REVERSE CONDITIONAL SKIP (FIG. 14)

This program instruction is exactly identical to the Forward Conditional Skip instruction except that the E signal is also generated by the arithmetic zone 139 of the control belt 130.

The E signal is fed to the keyboard 142 which generates the MH signal which is fed to the belt motor control 133 to cause a skip in the reverse direction.

XXIX. PROOF FIGURE CHECK (FIG. 15)

This program instruction is extremely useful for performing proof figure checks. For example, a series of numbers may be entered during the course of a problem. If these numbers are stored in designated memory registers, a proof total of the sum may be entered by the operator at the end of the sequence of entries. Equality of the proof total and the sum of the individual entries is an indication that the quantities were entered correctly. It should be noted that the program instruction is primarily a check for the possibility of the operator's transporting of digits in a number or inserting of incorrect digits.

The program instruction may be summarized as follows:

(1) Subtract the contents of designated memory registers from the contents of the accumulator register, (2) Test the remainder resulting from the subtraction for zero, (3) If the remainder is zero, proceed to the next program instruction, (4) If the remainder is not equal to zero, return to an earlier program instruction and generate a particular signal to indicate an error to the operator.

The program instruction may be considered to comprise two parts; the purely arithmetic operation of subtracting the numbers being the first part, and the testing of the result and the control belt movement being the second part.

The B, C and E signals from the arithmetic zone 139 of the control belt 130 characterize this program instruction. The B and C signals are the signals characteristic of the previously-described program instruction entitled "Subtract Memory Register from Accumulator" and perform the same functions in this program instruction. Since the two program instructions are identical to the point where the results of the subtraction are circulating in the accumulator register, that portion will not be described.

The results of the subtraction are assumed to be recirculating in the accumulator register as follows: from the accumulator register in-out control 113 as the AB signal to the operand funnel 121, from the operand funnel 121 to the adder-subtractor 122 as the AM signal, from the adder-subtractor to the accumulator register in-out control 113 as the AN signal, the accumulator register in-out control 113 as the W10 signal to the accumulator channel of the magnetic disk 165, and from this channel as the W11 signal back to the accumulator register in-out control 113. (The control signals maintaining the circulation path are not shown.)

At the end of the scan cycle the usual EB signal from the timer 160 is fed to the scan control 124 to generate the SE and the SED signals. The SED signal fed to the cycle generators 131 terminates the scan cycle.

The control belt 130 will step to the next program instruction provided the contents of the accumulator are zero. The contents of the accumulator are fed as the AK signal to the arithmetic control 116. If the circulating number is not zero, at least one pulse is present in the contents of the accumulator register. The presence of this pulse cooperating with the SE signal fed to the arithmetic control 116 causes the generation of the CZ signal to indicate an error. The CZ signal activates an error indicator in the arithmetic control unit 116 which causes a light to flash to signal the operator. The CZ signal is also fed to the keyboard 142 to activate the MG and the MH signals. The MG signal fed to the cycle generators 131 overrides the mechanism for a usual one step advance of the control belt. Instead the MG activates the mechanism for generating a plurality of YA and YB signals fed to the belt motor control 133. Each pair of YA and YB signals initiates a control belt movement of one step. The MH signal fed to the belt motor control 133 from the keyboard 142 causes each control belt step to be in the reverse direction. The control belt 130 retraces the program steps until a program instruction is reached having a G signal in the belt zone 137. The negative counterpart of the G signal is fed to the keyboard 142 to terminate the MH and MG signals. The control belt 130 stops stepping and the program instruction is ended. Thereafter, the operator may reenter the figures.

XXX. INTRODUCTION TO MEMORY REGISTER SELECTION INSTRUCTION

In most cases the memory registers to be used in a program instruction are designated by fixed marks on the control belt. Therefore, once a control belt is prepared the choice of memory registers is fixed. However, it is sometimes very convenient to have access to a memory register not designated by the control belt. Variable selection of memory registers can often decrease the number of program instructions required to process a quantity of information.

To provide added flexibility for the computer, three program instructions are incorporated to give a means for selecting a memory register for participation in a succeeding program step without permanently indicating the memory register on the control belt.

The first program instruction entitled "Memory Register Selection via Keyboard" permits the operator to choose a desired memory register by typing in the number indicating the memory register. The second program instruction entitled "Memory Register Selection via Paper Tape" performs the same function except the paper tape input-output 145 enters the number indicating the memory register. The third program instruction entitled "Memory Register Selection via Accumulator" performs the same function except the number indicating the memory register is obtained from the accumulator register.

In each of these three program instructions a number representing the desired memory register is stored in the left-shift register. The program instructions differ in the means for placing the number in the left-shift register.

After the number is stored in the left-shift register a counting down operation occurs during a scan cycle. The left-shift register is coupled to the adder-subtractor 122 and a unit subtraction on the number is performed each minor cycle. The counting down operation during the scan cycle starts at the beginning of the scan cycle and terminates when the number reaches the zero value.

Since the scan cycle is initiated by the EB signal (from timer 160) which indicates the availability of the 00 memory register and since each succeeding memory register becomes available a minor cycle later, the memory register associated with the originally inserted number is available when the count reaches zero.

At this time, a mark is inserted in the switching blank portion of the contents of the memory register preceding the desired one. A final unit subtraction is performed which changes the zero to a minus one. The detection of the negative sign activates the usual terminating operations and the program instruction ends.

During the succeeding program instructions, the switching blank portions of each of the memory registers is tested and whenever a mark is detected a signal is generated which performs the same functions as a memory register designation mark permanently fixed on the control belt 130.

After the recorded mark is detected and used it is erased. Hence the mark can only be used once and if further need for the memory register is required a new program step consisting of one of the three program instructions is required.

XXXI. MEMORY REGISTER SELECTION VIA KEYBOARD (FIG. 16)

This program instruction is characterized by the A, the E and the Y signals from the arithmetic zone 139 and input-output zone 140 of the control belt 130. The A and E signals fed to the arithmetic control 116 cooperate with the usual CB signal at the start of the program instruction to cause the generation of the BE signals. It should be remembered that the BE signals are characteristic of all entry operations. At the same time the normal —BM signal generated in the arithmetic control 116 clears the left-shift register and the add-one register.

The BE signal fed to the enter and index control 143 causes the generation of a DH signal which, fed to the keyboard 142, unlocks the keyboard. The BE signal is also fed directly to the keyboard 142 to alert the motor bars in the usual manner. Finally, a negative BE signal is fed to the scan control 124 to temporarily prevent the generation of an SB signal and thus stall the initiation of a usual scan cycle.

The two digits indicating the selected memory register are then sequentially entered via the keyboard 142 by the operator. Each digit (FC1 signal) is fed from the keyboard 142 for encoding by the number thyratrons 141 and transferred as the DB signals to the left-shift register via the left-shift register in-out control 115. As each digit is inserted, the usual CG signal is generated by the enter and index control 143 causing a normal one-digit left shift in the left-shift register. The CG signal in addition is fed to the add-one register in-out control 112 for activating a unit addition so that a count of the number of digits being inserted may be kept. After the insertion of the second digit, the add-one register stores a count of two. The count of two as represented by the BG signal is fed to the keyboard 142 where it simulates a normal end of entry motor bar action by causing the generation of the MF signal. The MF signal fed to the enter and index control 143 causes the generation of the EL signal. The EL signal during normal entry operations causes the transfer of the contents of the left-shift register to the accumulator register via the adder-subtractor 122. However, in this program instruction the number is retained in the left-shift register because the Y signal fed from the input-output zone 140 to the left-shift register in-out control 115 overrides the memory transfer effects of the EL signal.

The remaining functions of the EL signal are no different than during an enter operation. In particular, a —EL signal fed to the scan control 124 terminates the BE signal and the entry portion of the program instruction is completed.

With the disappearance of the BE signal the next EB signal from the timer 160 permits the generation of an SB signal and the initiation of the scan cycle. The SB signal in addition to performing all of its usual functions is fed to the arithmetic control 116 causing the generation of the SY3 signals. The SY3 signals are characteristic of the counting down operation that is to be performed. The SY3 signal fed to the operand funnel 121 couples an output of the left-shift register as the AH signal to the adder-subtractor 122 as the AM signal. Also, the SY3 signal fed to the left-shift register in-out control 115 blocks normal recirculation of the contents of the left-shift register and couples the output of the adder-subtractor 122 as the AN signal to an input of the left-shift register. Thus, the contents of the left-shift register circulate through the adder-subtractor 122 instead of the normal recirculation path. In addition, the SY3 signal permits a t44¾ signal from the timer 160 to enter via the operand funnel 121 the adder-subtractor 122 as an AS signal every minor cycle. A Y signal fed to the adder-subtractor 122 from the arithmetic zone 139 converts it to a subtractor and each minor cycle one is subtracted from the circulating number.

Constant sampling of the contents of the left-shift register is performed by an AQ signal fed from the left-shift register in-out control 115 to the arithmetic control 116. As long as the contents of the left-shift register are not zero, a —BC signal is generated by the arithmetic control 116. When the contents of the left-shift register become zero, the —BC signal is no longer generated in the arithmetic control 116. The absence of the —BC signal permits a single pulse to be generated in the add-one register in-out control 112. The single pulse is so timed as to be in the switching blank portion of the contents of the add-one register. The contents of the add-one register as the AC signal is fed to the memory in-out control 111 and the single pulse is then recorded in the switching blank preceding the memory register indicated by the original number that had been entered in the left-shift register.

A final unit subtraction is performed on the contents of the left-shift register, thus creating a negative number. The sign bit position of the contents of the left-shift register is fed via the adder-subtractor 122 as the AN signal to the scan control 124 causing the generation of an SED signal. The SED signal fed to the cycle generators 131 terminates the program instruction in the usual manner.

XXXII. MEMORY REGISTER SELECTION VIA PAPER TAPE (FIG. 16)

This program instruction is characterized by the A, the E, the Y and the I signals from the arithmetic zone 139 and input-output zone 140 of the control belt 130. The program instruction is identical to the previously described program instruction except that the number is entered from the paper tape instead of manually.

The I signals fed to the paper tape input-output 145 cause the generation of the —IJ signal. A —IJ signal fed to the keyboard 142 prevents the unlocking of the keyboard. The two digits are then read in as in the previously described paper tape entry operation. After the reading in of the second digit, an end entry digit is read in which is decoded as the JC and the JD signals. The JC and the JD signals fed to the keyboard 142 substitute for the usual motor bar action and cause the generation of the MF signal. From this point on the program, instruction is identical to the program instruction entitled "Memory Register Selection Via Keyboard."

XXXIII. MEMORY REGISTER SELECTION VIA ACCUMULATOR (FIG. 17)

This program instruction is characterized by the B and Y signals. Since the A and E signals are not present, there is no entry portion to this instruction. Instead, the B signal, an SY3 signal derived from the Y signal and the normal BM signal at the beginning of the program instruction transfer the contents of the accumulator register as the AB signal from the accumulator-register in-out control 113 to the left-shift register in-out control 115. After this transfer, the instruction is identical to the two previously described memory register selection instructions.

XXXIV. ADD ONE TO MEMORY REGISTER (FIG. 18)

This program instruction permits the performance of a unit addition to one or many designated memory registers. Such unit additions are extremely useful where counting operations are required. It should be noted that with suitable programming tally operations similar to those performed by stored program computers may be performed.

The A and D signals generated by the arithmetic zone 139 of the control belt 130 are characteristic of this program instruction.

The program instruction, like the other arithmetic program instructions, starts with the transmission of a CB signal from the cycle generators 131 to the scan control 124 causing the generation of an SB signal and the accompanying scan cycle.

The SB signal fed to the add-one register in-out control 112 permits the output of the adder-subtractor 122 as the AN signal to be coupled to the add-one register. The AE signal derived from the SB signal in the add-one register in-out control 112 permits an output of the memory in-out control 111 as the AR signal to be coupled to the operand funnel 121. Also, the SB signal fed to the memory in-out control 111 permits an output of the add-one register as the AC signal to be coupled to the memory in-out control 111.

The contents of all the memory registers then circulate as follows: from the memory register in-out control 111 as the AR signal to the operand funnel 121 as the AM signal to the adder-subtractor 122, from the adder-subtractor 122 as the AN signal to the add-one register; after circulating in the add-one register the information is fed as the AC signal from the add-one register in-out control 112 to the memory in-out control 111 for storage in the appropriate memory register on the magnetic disc 165.

Whenever a unit addition is to be performed on a designated memory register an R pin signal associated with the designated memory register is fed from the register zone 138 of the control belt 130 to the scan control 124 causing the generation of an SD signal.

The SD signal fed to the operand funnel 121 cooperates with the A and the D signals from the arithmetic zone 139 to permit a t8¾ pulse from the timer 160 to enter the adder-subtractor 122 as an AS signal. The entry of this t8¾ pulse is equivalent to adding one to the third least significant digit position of the contents of the memory register then circulating through the adder-subtractor 122.

If the contents of more than one memory register are to be increased, an R pin signal is generated for each of the desired memory registers.

When all the memory registers on one track are scanned, an EB signal from the timer 160 fed to the scan control 124 causes the generation of an SED signal. The SED signal fed to the cycle generators 131 terminates the program instruction in the usual manner.

XXXV. EXPRESS CONTROL BELT MOVEMENT (FIG. 19)

During the course of a program, the control belt 130 usually steps from program instruction to program instruction automatically. However, the need for moving the control belt 130 many steps between program instructions often arises. The program instructions concerning skips and proof figure checking are examples of program instructions which may demand "express" operations of the control belt 130. In the skip program instructions the control belt 130 moves a number of program steps specified by the skip program instruction, but in the "Proof Figure Check" program instruction the control belt 130 is stepped backward until a particular hole in the belt zone 137 is located in a different program instruction. This hole causes the generation of a stop signal.

A third situation may also arise during an enter program instruction where the operator has the option of striking the end of entry motor bar key to cause the control belt 130 to step to the next program instruction or of striking the end of entry express motor bar to cause the control belt 130 to step several program instructions. The control belt 130 in this case moves until a stop signal is located in a different program instruction.

To advance the control belt 130 to the next step the

SED signal generated by the scan control 124 is fed to the cycle generators 131 to generate the YA and YB signals which are fed to the belt motor control 133. The SED signal is a pulse signal which essentially triggers the belt motor control 133 by means of the YA and YB signals to advance the control belt 130 one step.

In any of the cases which employs a stop signal to stop the movement of the control belt 130, a signal is generated which replaces the SED signal in its function of setting up cycle generator 131. The signal, either an MG or both an MG and an MH signal (depending on which direction the control belt 130 is to be moved) from the keyboard 142 is continuously fed to the cycle generators 131 causing a continuous series of trigger pulses. These trigger pulses cause the generation of a series of YA and YB signals fed to the belt motor control 133 to step the control belt 130. The trigger pulses continue until the MG or the MH signal is terminated. The termination is accomplished by detecting a particular hole which causes the generation of either a —F or a —G signal depending on the position of the hole in the belt zone 137 of the control belt 130. The particular position sensed depends on which direction the control belt 130 is moving. If a forward express control belt movement is called for the MG signal is generated and the control belt 130 steps forward until a —F signal is detected in the belt zone 137 of the control belt 130. The —F signal is fed from the belt zone 137 to the keyboard 142 terminating the MG signal and therefore the generation of the trigger pulses in the cycle generator 131.

If a reverse express control belt movement had been initiated, for example, during the "Proof Figure Check" program instruction, both an MH and an MG signal are generated at the keyboard 142. The control belt 130 continues stepping backward until a —G signal is detected in the belt zone 137 of the control belt 130. The —G signal is fed from the belt zone 137 to the keyboard 142 terminating both the MG and MH signals and the control belt 130 halts on that particular step. The computer then proceeds to perform the program instruction incorporated in the following zones of the control belt 130.

XXXVI. INTRODUCTION TO AUXILIARY PRINTER MOVEMENTS

The carriage of the auxiliary printer 155 can perform the following movements: forward tab, which is similar to tabulation in a typewriter; carriage return; forward line feed, which is the same as a single line spacing in a typewriter; reverse line feed which is a single line spacing in the opposite direction; and combined carriage return and multiple forward line feed.

The combined carriage return and multiple forward line feed only occurs during an "Initiate Operation" program instruction so that a new blank check from a pin feed roll of blank checks may be located in a fixed reference position preparatory to printing. This movement has previously been described in the "Initiate Operation" program instruction.

The remaining movements of the carriage of the auxiliary printer 155 may occur in combination with other program instructions. For example, auxiliary carriage movements may be performed during arithmetic or control belt operations. Also, auxiliary carriage movement may occur during carriage movement of the main printer 154. The only restriction imposed is that when an actual print cycle occurs all carriage motion is stalled until completion of the print cycle.

XXXVII. AUXILIARY PRINTER TAB (FIG. 20)

In the auxiliary carriage tab the carriage of the auxiliary printer 155 is horizontally moved a number of spaces as determined by mechanical stops on the carriage of the auxiliary printer 155. As each tab is called for by a program instruction, the carriage travels to the next mechanical stop. It should be noted that arithmetic operations and indexing can be progressing during these carriage movements.

The portion of the program instruction producing a tab is a P signal from the input-output zone 140 of the control belt 130. The P signal is fed to the carriage control 152 where cooperating with a CB signal that is generated in the cycle generators 131 at the start of every program instruction causes the generation of a —GB signal. The —GB signal fed to the auxiliary printer 155 activates a solenoid which initiates the carriage motion. As the carriage moves through and past the mechanical tab stop the signals on the KK, KJ and KT lines of the auxiliary printer 155 change polarity. The sequencing of the changing voltages is accomplished by a mechanical switch to provide a positive indication of carriage movement. The sequence is hereinafter more fully described. When the potential on the KT line is no longer positive the —GB signal disappears thus terminating the activation of carriage motion.

XXXVIII. AUXILIARY PRINTER CARRIAGE RETURN (FIG. 20)

This program instruction is characterized by the N signal. The N signal is fed from the input-output zone 140 of the control belt 130 to the carriage control 152. The N signal cooperates in the carriage control 152 with a CB signal from the cycle generators 131 to cause the generation of a —GC signal. The —GC is fed to the auxiliary printer 155 to activate the carriage return mechanism.

XXXIX. AUXILIARY PRINTER FORWARD LINE FEED (FIG. 20)

The forward line feed of the carriage of the auxiliary printer 155 is produced by an M signal from the input-output zone 140 of the control belt 130.

The M signal is fed to the cycle generators 131 and to the format control 136. The M signal (cooperating with the usual CB signal generated in the cycle generators 131) causes the generation of the CK signal. The CK signal is fed to the format control 136.

The arithmetic portions of the program instruction are performed in the usual manner, terminated, and just prior to the stepping of the control belt 130 to the next program instruction a CE signal instrumental in initiating movement of the control belt 130 is generated by the cycle generators 131. The CE signal is fed to the format control 136. The CE signal cooperates with the CK and M signals to cause the generation of the LT signal in the format control 136. The LT signal is fed to the auxiliary printer 155 to activate the forward line feed solenoid to produce a single forward line feed.

At the same time CE and CK signals cause the generation of the DZ signal within the cycle generators 131. The DZ signal is fed to the format control 136 to cause the generation of the LV signal. The LV signal fed to the auxiliary printer 155 permits the mechanical accomplishment of the line feed.

The end of the print cycle of the auxiliary printer 155 is indicated by a sequencing of the voltages present on the NAM, NBM and NAA lines which is accomplished by mechanical switches. This sequencing after a suitable time delay terminates the DZ signal which indicates to the computer that the print cycle is completed. Also, the sequencing terminates the LV and LT signals by interrupting the CL signal fed to the format control 136.

It should be noted that all the vertical carriage movements are taking place while the control belt 130 is stepping to the next program instruction. If the control belt 130 arrives at the next program instruction before the termination of the print cycle as is the usual case two possibilities arise:

(1) The next program instruction involves either the main printer 154 or the auxiliary printer 155, or both; or (2) The next program instruction involves neither.

For the first possibility a temporary stall is imposed on performing the new program instruction since the DZ signal has not been terminated. Thus, the DZ signal within the cycle generators 131 act as an interlock to prevent the initiation of the next instruction when it involves either the main printer 154 or the auxiliary printer 155.

For the second possibility no stall is imposed and the operations are carried out in parallel with carriage movement.

XL. AUXILIARY PRINTER REVERSE LINE FEED (FIG. 20)

This program instruction is the same as "Auxiliary Printer Forward Line Feed" except the P signal is also generated in addition to the M signal by the input-output zone 140. The P signal is also fed to the format control 136 and cooperates with the M signal to cause the generation of the LS signal instead of the LT signal. The LS signal fed to the auxiliary printer 155 activates the reverse line feed solenoid.

XLI. INTRODUCTION TO MAIN PRINTER MOVEMENTS

The carriage of the main printer 154 can perform the following movements: Forward tab which is similar to tabulation in a typewriter; reverse tab; forward line feed; carriage return; and bail open which permits the insertion of ledger cards.

The forward and reverse tabs are not necessarily immediately performed by the carriage of the main printer 154, but as each tab is called for the direction of the tab is temporarily stored in the tab counter 151. In this way, it is possible to accumulate algebraically a plurality of tabs before they are actually carried out. The accumulated total of tabs whether forward or reverse are performed just before an actual printing operation.

The line feed is a single forward line feed which may be carried out immediately and in parallel with other computer operations. The only restriction on the performing of the line feed is that it wait until near the termination of a print cycle.

The main carriage also performs several combined operations such as a combination of a reverse tab and line feed which causes the accumulation of a single reverse tab in the tab counter 151 and at the same time causes the main carriage to feed forward one line. The program instruction is restricted to the same provisions as an ordinary line feed.

A second combined operation very similar to typewriter carriage movement is the combination of a carriage return and a line feed. This program instruction may occur in parallel with other computer operations subject to the sole restriction that it occur near the termination of a print cycle.

The last combined main carriage movement operation comprises a combination of carriage return, a line feed and the bail open. This combined operation is subject to the same restrictions as the combined carriage return and line feed operation.

XLII. MAIN PRINTER TAB (FIG. 21)

This section discusses both the forward tab as characterized by the K signal and the reverse tab as characterized by the J signal. Since both program instructions are so intimately tied together they are disclosed in one section.

As has been previously stated it is possible to accumulate a number of tabs before actually carrying out a tab operation. As each tab is called for, a unit change occurs in the count of the number of tabs to be performed as stored in the tab counter 151. If a forward tab is called for, one is added to the count stored in the tab counter 151. If a reverse tab is to be performed, one is subtracted from the count in the tab counter 151. In this way, it is possible to add and subtract the number of tabs that are finally performed.

For example, during the course of a program three of the program instructions besides calling for arithmetic operations may also call for forward tabs and two of the program instructions in addition to calling for arithmetic operations may also call for reverse tabs. Finally, a print out operation is called for and at this time the main carriage will perform one forward tab. (The difference between three forward tabs and two reverse tabs.)

The accumulating of the number of tabs in the tab counter will be described in detail. The actual performance of the carriage movements of the main printer 154 although it is dependent upon a print program instruction will also be described by assuming that suitable control signals are present.

The forward tab is characterized by the K signal from the input-output zone 140 of the control belt 130. The K signal is fed to the tab counter 151 where it cooperates with the CB signal generated by the cycle generators 131 at the start of every program instruction. The combination of the K and CB signals permits the addition of one to the count stored in the tab counter 151.

The reverse tab is characterized by the J signal fed from the input-output zone 140 to the tab counter 151. The combination of a J signal and a CB signal from the cycle generators 131 causes a unit subtraction in the count stored in the tab counter 151.

Eventually a print program instruction is called for (the control signals for which are not shown) and the tabs are carried out. It will first be assumed that a number of forward tabs are to be performed.

The presence of a non-zero number in the tab counter 151 during a forward tab causes the generation of a −FR signal which is fed to the main printer 154 initiating a forward carriage motion. As the carriage moves past a mechanical tab stop a sequence of the FV1 and the FV2 signals are fed from the main printer 154 to the carriage control 152 causing the generation of an HG signal. The HG signal fed to the tab counter 151 causes a unit subtraction to occur. The carriage continues moving past succeeding mechanical tab stops and when the count in the tab counter reaches a value of zero the −EG signal normally fed from the tab counter 151 to the carriage control 152 is interrupted. The absence of the −EG signal causes the activation of a relay in the carriage control 152. Upon activation of the relay, the −FR signal which causes the carriage movement ceases and the desired number of forward tabs have been performed.

If at any time during the course of the accumulation of the tabs the number of reverse tabs exceeds the number of forward tabs a negative number would be effectively stored in the tab counter 151. The appearance of the negative number is partially manifested by a KE signal fed from the tab counter 151 to the carriage control 152 to the generation of an EE signal. The EE signal then cooperates with control signals occurring during the print operation (not shown) to cause the generation of a −FS signal. The −FS signal fed to the main printer 154 initiates a reverse carriage motion. As the carriage moves in the reverse direction, a series of FU1 and FU2 signals from the main carriage 154 cause the generation of a series of HG signals in the carriage control 152. Each HG signal cooperating with the EE signal also fed from the carriage control 152 causes unit additions to occur in the tab counter 151. When the count in the tab counter 151 returns to zero from its original negative value the −EG signal is no longer fed from the tab counter 151 to the carriage control 152 and the operation terminates the same as with a forward tab.

XLIII. MAIN PRINTER LINE FEED (FIG. 21)

This program instruction is characterized by the H signal from the input-output zone 140 of the control belt 130. The H signal is fed to the cycle generators 131 and the format control 136. In the cycle generators 131 the CB signal that is generated at the start of each program instruction cooperates with the H signal to initiate the generation of the CK signal. The CK signal is fed to the format control 136. Concurrently, arithmetic portions of the program instruction are carried out. When the program instruction is complete, movement of the control belt 130 is initiated. During the initiation of movement a CE signal is generated by the cycle generators 131. The CE signal is fed to the format control 136. The presence of the CE, the CK and the H signals in the format control causes the generation of the LR signal which is fed to the main printer 154. At the same time the CE signal within the cycle generators 131 initiates a print cycle by feeding an LV signal to the main printer 154 and the auxiliary printer 155.

As the control belt 130 steps to the next program step, the print cycle occurs and the line feed is accomplished. At the end of the print cycle a sequencing of the NAM, NBM and NAA signals fed from the main printer 154 and auxiliary printer 155 to cycle generators 131 terminates the LV signal and by feeding a negative signal on the CL line to the format control 136 terminates the LR signal.

XLIV. MAIN PRINTER REVERSE TAB OR FORWARD TAB AND LINE FEED (FIG. 21)

This program instruction is characterized by the H and the J or K signals. The H signal performs the same functions as in the program instruction entitled "Main Printer Line Feed" and the program instruction is identical in this respect. In addition, the J signal is fed to the tab counter 151 to permit the storage of a single reverse tab, just as the J signal functions during the program instruction entitled "Main Printer Tab" or the K signal is fed to the tab counter 151 to permit storage of a single forward tab. Actually this program instruction is a combination of these two previously-described program instructions permitting them to be performed at the same time.

XLV. MAIN PRINTER CARRIAGE RETURN AND LINE FEED (FIG. 21)

The program instruction is characterized by the J and K signals from the input-output zone 140 of the control belt 130.

The J and the K signals are fed to the carriage control 152 and the format control 136. The J and K signals cooperate with a usual BC signal fed from the cycle generators 131 to the carriage control 152 to initiate an EF signal, a —FQ signal and a —FS signal. The —FS signal is fed to the main printer 154 initiating a carriage return.

The —FQ signal is fed to the cycle generators 131 to stall the initiation of movement of control belt 130 until the end of the carriage return.

When the carriage reaches the returned position, a sequence of FV1 and FV2 signals are fed from the main printer 154 to the carriage control 152 terminating the EF, the —FQ and the —FS signals. With the disappearance of the —FQ signal fed to the cycle generators 131, initiation of control belt movement 130 is allowed. This initiation causes the generation of the CE and DZ signals in the cycle generators 131. The DZ signal is fed to the format control 136 to generate an LJ signal. The LJ signal is fed to the main printer 154 and the auxiliary printer 155 to initiate a print cycle. The CE signal cooperating with the CK signal and the J and K signals fed to the format control 136 cause the generation of the LR signal which is fed to the main printer 154. During the print cycle the main printer 154 performs a line feed. The termination of the operation is similar to the program instruction entitled "Main Printer Line Feed."

XLVI. MAIN PRINTER CARRIAGE RETURN, LINE FEED AND BAIL OPEN (FIG. 21)

This program instruction is characterized by the H, the J and the K signals from the input-output zone 140 of the control belt 130. This program instruction is identical to the previously-described program instruction with one additional step. The H signal is also fed to the format control 136 with the J and the K signals so that when the CE and CK signals are fed from the cycle generators 131 an LQ signal is also generated. The LQ signal fed to the main printer 154 activates a bail open during the print cycle.

XLVII. INTRODUCTION TO PRINT OPERATIONS

The computer is capable of printing the contents of the accumulator register by either the main printer 154 or the auxiliary printer 155 or both at the same time. In addition to printing the actual number stored in the accumulator register as a number, several additional format operations are possible.

A color shift may be called for whereby the color of the printed characters can be changed from red to black for example.

To provide for check protection asterisks can be printed in all the digit positions more significant than the first non-zero digit position, for example the number 729.82 would be printed out as \*\*\*\*\*\*729.82 when the main printer 154 and the auxiliary printer 155 are preconditioned to provide check protection.

The dollar and cents portions of a number may be printed out separately if so desired. If only the dollars portion is set up the number 729.82 would be printed as 729 and if only the cents portion is set up the printed figure would be .82.

The main printer 154 and the auxiliary printer 155 can also print out a date upon command. The date is set up in the main printer 154 and the auxiliary printer 155 prior to computer operations. During the course of any of the printing operations it is then possible to print the set-up date in addition to the usual numeric information.

During a printing operation the zeros which may occur in digit positions more significant than the first non-zero digit position are not printed; thus, if the contents of the accumulator register is 00000000.00 and a print out is called for nothing will be printed. In some instances it is desirable to have a printed record of the zero number, therefore, the printers upon a command will print .00 when a zero number is encountered during a print out operation.

A collating operation is provided for during a print out operation. When partially overlapping forms are simultaneously present in the main printer 154 some of the printed information may be present on each of the forms. If at a later time the forms are again brought together there may arise the problem of horizontally aligning the two forms. To facilitate the horizontal alignment of the two forms a collating operation can be ordered. While the numeric information is being printed a plurality of asterisks is also printed in a horizontal line such that each form receives some of the asterisks. Thus when horizontal alignment is required it is only necessary to position the forms such that the asterisks are colinear.

During a print operation program instruction, the contents of the accumulator register (the number to be printed out) is transferred from the accumulator register to the left-shift register. A digit by digit activation of the indexing pins in the main printer 154 and the auxiliary printer 155 occurs followed by the preconditioning of the selected format controls. After the preconditioning and indexing operations the print cycle is generated and the actual printing is accomplished.

It should be noted that during the print operation program instruction step the computer performs programmed arithmetic operations. The arithmetic operations will be performed first, then the printing operations followed by the stepping of the control belt 130 to the next program instruction. As long as succeeding program instructions do not require further print cycles these operations will be carried out in parallel with the print cycle.

XLVIII. MAIN PRINTER PRINT OPERATION (FIG. 22)

This program instruction is usually not performed as a separate operation but in conjunction with an arithmetic operation. The arithmetic operation is performed first and is immediately followed by the print operation.

The program instruction is characterized by the W signal from the input-output zone 140 of the control belt 130. The W signal is fed to the format control 136 to initiate generation of the CX and WJ signals. The CX signal is characteristic of all print operations and the WJ signal is characteristic of print operations associated with the main printer 154.

The WJ signal internal to the format control 136 alerts preconditioning apparatus and is also fed to the carriage control 152 for activating a possible tab operation in the main printer 154.

The CX signal is fed to the cycle generators 131 to alert the print cycle circuits and to the enter and index control 143 primarily to generate an EL signal and a DA signal derived from the EL signal.

The EL signal is initiated by an SE signal from the scan control 124 indicating the end of the arithmetic portions of the program step. It should be noted that an SED signal is also generated by the scan control 124 immediately after the SE signal. The SED signal is fed to the cycle generators 131 to attempt to step the control belt 130, but the presence of an EL in the cycle generators 131 prevents the stepping. Instead the EL and DA signals are fed to the left-shift register in-out control 115 to couple the output of the adder-subtractor 122 as the AN signal to the left-shift register in-out control 115. The —EL signal is also fed to the add-one register in-out control 112 to clear the register to zero. In addition, the EL signal is also fed to the operand-funnel 121 to permit the contents of the accumulator register as the AB signal to pass through the operand-funnel 121 and enter the adder-subtractor 122 as the AS signal. Thus the contents of the accumulator register are transferred to the left-shift register via the adder-subtractor 122 while the add-one register is cleared to zero. At the end of the transfer operation the EL signal automatically terminates.

A first one-digit left-shift cycle is initiated. The left-shift cycle is characterized by the generation of the CG signal by the enter and index control 143. The first left-shift is automatically initiated. Succeeding left shifts are dependent on signals from the number thyratrons 141. In either case, the CG signal is fed to the left-shift register in-out control 115 to perform the left shift and to the add-one register in-out control 112 to record a one indicating that the first shift is to occur.

The most significant digit of the contents of the left-shift register is sampled. The AV, AU, AY and AX signals representing the four binary bits comprising the most significant digit are fed to the number thyratrons 141 for decoding. A DQ signal derived from the CG signal is fed from the enter and index control 143 to the number thyratrons 141 to perform a synchronous sampling operation. For the purposes of illustration, it will be assumed that the most significant digit is a two (0010) thus only an AU signal is received by the number thyratrons 141. The coincidence of the AU signal and the DQ signal cause the generation of an FC signal. The FC signal representing the number two is fed to both the main printer 154 and the auxiliary printer 155 activating the appropriate indexing pins.

The FC signal is also fed to the enter and index control 143 where it initiates the resetting of the number thyratron 141. More particularly, the FC signal causes the interruption of the voltage on the DTM line fed to both the main printer 154 and the auxiliary printer 155 and thereby effectively terminates itself by interrupting the plate power to the thyratron generating the FC signal.

At the same time the FC initiates the generation of another CG signal in the enter and index control 143 and another left-shift cycle followed by a sampling cycle occurs. The shifting and sampling of the contents of the left-shift register occurs ten times so that all of the appropriate indexing pins are activated. A record of the number of shifts is maintained in the add-one register and when the number stored is binary ten a BJ and a BG signal are simultaneously fed from the add-one register in-out control 112 to the enter and index control 143 causing the generating of the AG signal indicating the indexing operation is complete. Thereafter, the format control 136 controls the format of the subject matter to be printed. To speed up the operation only those digits including and following the most significant non-zero digit are actually indexed. The first non-zero digit sensed causes the generation of a DU signal fed from the enter and index control 143 to the cycle generators 131. The DU signal then permits generation of the DQ signals which actually set the thyratrons.

The AG signal is fed to the cycle generators 131 to activate the control belt 130 movement apparatus (it performs the role usually performed by the SED signal) and cooperates with a CX signal and the DU signal to cause the generation of a CK signal. The CK signal is fed to the format control 136 to alert preconditioning signal generators which control the format. The CE signal is then generated by the cycle generators 131 and is also fed to the format control 136 to activate the preconditioning signal generators. The preconditioning signals are discussed in detail in the format operation sections. Briefly, they function to control the format of the subject matter printed when a print cycle is initiated.

A print cycle is initiated by the cycle generators 131 by feeding the LV signal to the main printer 154 and the auxiliary printer 155. The number is then printed by the main printer 154 in accordance with the format as determined by the set-up preconditioning signals.

XLIX. AUXILIARY PRINTER PRINT OPERATION (FIG. 22)

This program instruction is characterized by the X signal from the input-output zone 139 of the control belt 130. The X signal is fed to format control 136 and generates the CX signal but not the WJ signal. With this exception the program instruction is identical to Main Print Operation and only the auxiliary printer 155 is activated.

L. INTRODUCTION TO FORMAT OPERATIONS

This group of program instructions are a portion of the print program instructions which occur during the print operation. This group comprises the following operations: Color shift, print asterisks, print dollars, print cents, print date, and print collating symbol. They are all activated by the CK and the CE signals generated by the cycle generators 131 during a print operation which cause the generation of the appropriate preconditioning signals.

LI. COLOR SHIFT OPERATION (FIG. 23)

This program instruction (actually a preconditioning portion of the print program instruction) is characterized by the Q signal. The Q signal is fed to the format control 136 and cooperates with the CK and CE signals occurring during a print operation program instruction to generate the LP preconditioning signal. The LP preconditioning signal is fed to both the main printer 154 and the auxiliary printer 155 and will cause a color shift when the actual printing occurs.

LII. PRINT ASTERISKS OPERATION (FIG. 23)

This program instruction is characterized by the R signal. The R signal from the control belt 130 is fed to the format control 136 and cooperates with the CK and CE signals from the cycle generators 131 to generate the LU preconditioning signal. The LU preconditioning signal is fed to both printers and will print asterisks for check protection when the actual printing occurs.

LIII. PRINT DOLLARS OPERATION (FIG. 23)

This program instruction is characterized by the S signal. The S signal from the control belt 130 is fed to the format control 136 and cooperates with the CK and CE signals from the cycle generators 131 and either the X, the W, or both the X and W signals to precondition the dollars sectors of the selected printers. If only printing on the main printer 154 the W signal and the CK, CE and S signals cause generation of the LG signal. The LG preconditioning signal is fed from the format control 136 to the main printer 154 permitting printing of only the dollars portion of the number.

If only printing on the auxiliary printer 155 the X signal and the S signal from the control belt 130 cooperate with the CK signal and the CE signal from the cycle generators 131 in the format control 136 to generate the LK preconditioning signal. The LK preconditioning signal is fed from the format control 136 to the auxiliary printer 155 to permit the printing of the dollars portion of the number on the auxiliary printer 155.

LIV. PRINT CENTS OPERATION (FIG. 23)

The format controls for this instruction are identical to the format controls for setting up dollars except that the T signal instead of the S signal is fed from the control belt 130 to the format control 136. When printing on the main printer 154 the T signal cooperates with the other usually generated signals in the format control 136 to cause the generation of the LH signal. The LH signal is fed to the main printer 154 permitting printing of the cents portion of the numbers.

When printing on the auxiliary printer 155 the T signal cooperates with the other usually generated signals and the X signal in the format control 136, to cause generation of the LM preconditioning signal. The LM preconditioning signal is fed to the auxiliary printer 155 permitting printing of the cents portion of the numbers.

LV. PRINT DATE OPERATION (FIG. 23)

The date to be printed is initially manually preset on both the main printer 154 and the auxiliary printer 155. When commanded to do so either the main printer 154 or the auxiliary printer 155 or both will then print whatever date has been set up. The actual command signal is the U signal fed from the input-output zone 138 of the control belt 130 to the format control 136. The U signal will during a print operation program instruction cause the generation of either or both the LJ and LN preconditioning signals. The LJ preconditioning signal fed to the main printer 154 permits printing of the preset date by the main printer 154. The LN preconditioning signal fed to the auxiliary printer 155 permits printing of the preset date by the auxiliary printer 155.

LVI. PRINT COLLATING SYMBOL OPERATION (FIG. 23)

The collating symbol is a plurality of asterisks in a horizontal array printed by the main printer 154. The preconditioning operation is characterized by the R and Q signals fed from the input-output zone 138 of the control belt 130 to the format control 136. The R and Q signals cooperate with the CK and CE signals fed from the cycle generators 131 to the format control 136 during a print operation to generate an LX preconditioning signal. The LX preconditioning signal is fed to the main printer 154 to permit the printing of a collating symbol during a print operation.

LVII. PRINT CENTS EVEN IF ZERO OPERATION (FIG. 23)

This permits printing even if the number indexed is zero. The program instruction is characterized by the V signal from the input-output zone 140 of the control belt 130. The V signal is fed to the format control 136 to activate the cents preconditioning signal generator which feeds an LM preconditioning signal to the auxiliary printer 155. The V signal is also fed to the cycle generator 131 to assume the role of the DU signal by cooperating with the AG signal to cause the generation of the CK signal and activation of the print cycle.

LVIII. PAPER TAPE OUTPUT OPERATION (FIG. 24)

This program instruction permits the digit by digit punching on the paper tape of the paper tape of the paper-tape input-output 145 the contents of the accumulator register. The program instruction is similar in operation to the "Main Printer Operation" print instruction except that the paper-tape input-output 145 having its own punch thyratrons is employed instead of the main printer 154 and the number thyratrons 141. Therefore, only the differences will be discussed.

The program instruction is characterized by the O signal from the input-output zone 140 of the control belt 130. The O signal is fed to the paper-tape input-output 145 where it generates the OJ signal and activates the punch mechanism. The OJ signal is fed to the enter and index control 143 to generate the EL and DA signals characteristic of output operations. The operation proceeds as in a print operation program instruction except that AY, AU, AV, and AX signals representing a digit of the number are fed to the paper-tape input-output 145 to fire the appropriate thyratrons which energize particular punches and generate the JC signal, for example. In this unit the JC signal performs the same function as the FC signal did during a print operation. The JC signal is also fed to the enter and index control 143 to permit the punching of the next digit by generating the usual CG, DQ and DU signals.

Since the control signals for creating the left shifts and for maintaining a count of the number of digits punched out are identical to those employed in the print operation program instructions, they are only mentioned but not shown in the figure.

The thyratrons are automatically reset by cams associated with the punch portion of the paper-tape input-output 145 which interrupt the plate voltages of the thyratrons. The operation is terminated with the punching of an "end of word" character by activating the thyratrons associated with the JC and JD signals. These thyratrons are activated by a CE signal fed from the cycle generators 131 after the last character is punched.

LIX. DESCRIPTION OF SYMBOLS

The schematic equivalents of the symbols which are hereinafter employed to simplify the detailed description of the units of the frequency dividing system which have been illustrated in block form are shown in Figs. 25 through 35. For convenient reference, all positive and negative supply buses will generally be identified with a number corresponding with their voltage. The circuitry terminals corresponding to the same symbol terminals are identified by the same character reference numbers.

LX. GATE (FIG. 25)

The gates utilized are of the "coincidence" type, each comprising a crystal diode network which receives input signals from a plurality of input terminals and passes the most negative signal.

The symbol of a representative gate 2306, having two input terminals 400 and 402, is shown in Fig. 25a. Since the signal potential levels are plus five volts (positive signals) and minus ten volts (negative signals), the potentials of the signals which may exist at the input terminals 400 and 402 are thereby limited.

If a potential of minus ten volts is present at one or both of the input terminals 400 and 402, a potential of minus ten volts exists at the output terminal 404. Therefore, if one of the input signals to the input terminals 400 and 402 is positive and the other signal is negative, the negative signal is passed and the positive signal is "blocked."

When there is a coincidence of positive signals at the two input terminals 400 and 402, a positive signal is transmitted from the output terminal 404. In such case, it may be stated that a positive signal is "gated" or "passed" by the gate 2306.

The schematic details of the gate 2306 are shown in Fig. 25b. Gate 2306 includes the crystal diodes 406 and 408. Each of the input terminals 400 and 402 is coupled to one of the crystal diodes 406 and 408. Crystal diode 406 comprises the cathode 410 and the anode 412. Crystal diode 408 comprises the anode 416 and the cathode 414. More particularly, the input terminals 400 and 402 are respectively coupled to the cathode 410 of the crystal diode 406 and the cathode 414 of the crystal diode 408. The anode 412 of the crystal diode 406 and the anode 416 of the crystal diode 408 are interconnected at the junction 418. The anodes 412 and 416 are coupled via the resistor 420 and the terminal 422 to the positive voltage bus 65.

If negative potentials are simultaneously present at the input terminals 400 and 402, both of the crystal diodes 406 and 408 conduct, since the positive supply bus 65 tends to make the anodes 412 and 416 more positive. The voltage at the junction 418 will then be minus ten volts since, while conducting, the anodes 412 and 416 of the crystal diodes 406 and 408 assume the potential of the associated cathodes 410 and 414.

When a positive signal is fed only to the input terminal 400, the cathode 410 is raised to a positive five volts potential and is made more positive than the anode 412, so that crystal diode 406 stops conducting. As a result, the potential at the junction 418 remains at the negative ten volts level. In a similar manner, when a positive signal is only present at the input terminal 402, the voltage at the junction 418 will not be changed.

When the signals present at both input terminals 400 and 402 are positive, the anodes 412 and 416 are raised to approximately the same potential as their associated cathodes 410 and 414 and the potential at the junction 418 rises to a positive potential of five volts.

The potential which exists at the junction 418 is transmitted from the gate 2306 via the connected output terminal 404.

In the above described manner, the gate 2306 is frequently used as a switch to govern the passage of one signal by the presence of one or more signals which control the operation of the gate 2306.

It should be understood that the potentials of plus five volts and minus ten volts used for purpose of illustration are approximate, and the exact potentials will be affected in two ways. First, they will be affected by the value of the resistance 420 and its relation to the impedances of the input circuits connected to the input terminals 400 and 402. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 404 to prevent the terminal from becoming more negative than a predetermined voltage level to protect the diodes 406 and 408 against excessive back voltages and to provide the proper voltage levels for succeeding circuits.

LXI. BUFFER

The buffers utilized are also known as "or" gates. Each buffer comprises a crystal diode network which functions to receive input signals via a plurality of input terminals and to pass the most positive signal.

The symbol for a representative buffer 2209, having two input terminals 430 and 432, is shown in Fig. 26a. Since the signal potential levels in the system are minus ten volts and plus five volts, either one of these potentials may exist at the input terminals 430 and 432.

If a positive potential of five volts exists at one or both of the input terminals 430 or 432, a positive potential of five volts exists at the output terminal 434. If a negative potential of ten volts is present at both of the input terminals 430 and 432, a negative potential of ten volts will be present at the output terminal 434.

The schematic details of the buffer 209 are shown in Fig. 26b. The buffer 209 includes the two crystal diodes 436 and 438. The crystal diode 436 comprises the anode 440 and the cathode 442. Crystal diode 438 comprises the anode 444 and the cathode 446. The anode 440 of the crystal diode 436 is coupled to the input terminal 430. The anode 444 of the crystal diode 438 is coupled to the input terminal 432. The cathodes 442 and 446 of the crystal diodes 436 and 438, respectively, are joined at the junction 448 which is coupled to the output terminal 434, and via the resistor 450 to the negative supply bus 70. The negative supply bus 70 tends to make the cathodes 442 and 446 more negative than the anodes 440 and 444, respectively, causing both crystal diodes 436 and 438 to conduct.

When negative ten volt signals are simultaneously present at input terminals 430 and 432, the crystal diodes 436 and 438 are conductive, and the potential at the cathodes 442 and 446 approaches the magnitude of the potential at the anodes 440 and 444. As a result, a negative potential of ten volts appears at the output terminal 434.

If the potential at one of the input terminals 430 or 432 increases to plus five volts, the potential at the junction 448 approaches the positive five volts level as this voltage is passed through the conducting crystal diode 436 or 438 to which the voltage is applied. The other crystal diode 436 or 438 stops conducting since its anode 440 or 444 becomes more negative than the junction 448. As a result, a positive potential of five volts appears at the output terminal 434.

If positive five volt signals are fed simultaneously to both input terminals 430 and 432, a positive potential of five volts appears at the output terminal 434, since both crystal diodes 436 and 438 will remain conducting. Thus the buffer 2209 functions to pass the most positive signal received via the input terminals 430 and 432.

LXII. DELAY LINE (FIG. 27)

The symbol for a representative electrical delay line 2230 which is a lumped parameter type delay line and which functions to delay received pulses for discrete periods of time, is shown in Fig. 27a.

The delay line 2230 comprises the input terminal 500, the output terminal 502, and a plurality of taps 504, 506 and 508. A pulse which is fed via the input terminal 500 to the delay line 2230 will be delayed for an increasing number of pulse times before successively appearing at the taps 504, 506 and 508. When the pulse reaches the output terminal 502, the total delay provided by the delay line 2230 has been applied. In the text which follows, the specific number of pulse-times delay which is encountered before a pulse travels from the input terminal to a tap of the delay line will be stated.

The delay line 2230 shown in Fig. 27b comprises a plurality of inductors 510 connected in series, with associated capacitors 512 which couple a point 514 on each inductor 510 to ground. A signal is fed into the delay line 2230 at the input terminal 500 and the maximum delay occurs at the output terminal 502. The taps 504, 506 and 508 are each connected to one of the points 514 and provide varied delays. The delay line 2230 is terminated by a resistor 516 in order to prevent reflections. Although in the delay line of Fig. 27b a tap is shown connected to each of the points 514, it should be understood that in actual practice there are ordinarily several untapped points 514 between successive taps.

LXIII. PULSE AMPLIFIER (FIG. 28)

The symbol for a representative pulse amplifier is shown in Fig. 28a. When a positive pulse is fed to the pulse amplifier 2322 via the input terminal 460, the pulse amplifier 2322 functions to transmit a positive pulse which swings from minus ten to plus five volts from its positive output terminal 462, and a negative pulse which swings from plus five to minus ten volts from its negative output terminal 464. At all other times, the pulse amplifier 2322 has a negative potential of ten volts at its positive output terminal 462 and a positive potential of five volts at its negative output terminal 464.

The detailed circuitry of the pulse amplifier 2322 is shown in Fig. 28b. The pulse amplifier 2322 includes the vacuum tube 466, the pulse transformer 468 and associated circuitry. The vacuum tube 466 comprises the cathode 470, the grid 472 and the anode 474. The pulse transformer comprises the primary winding 476 and the secondary windings 478 and 480.

The crystal diode 482 couples the grid 472 of the vacuum tube 466 to the input terminal 460, the anode 484 of the crystal diode 482 being coupled to the input terminal 460, and the cathode 486 being coupled to the grid 472. The negative supply bus 70 is coupled to the grid 472 via the resistor 488 and tends to make the crystal diode 482 conductive. The grid 472 and the cathode 486 of the crystal diode 482 are also coupled to the cathode 490 of the crystal diode 492, whose anode 494 is coupled to the negative supply bus 5. The crystal diode 492 clamps the grid 472 at a potential of minus five volts thus preventing the voltage applied to the grid 472 from becoming more negative than minus five volts.

When a voltage more positive than minus five volts is transmitted to the input terminal 460, the crystal diode 482 conducts and the voltage is applied to the grid 472. Since the crystal diode 492 clamps the grid 472 and the cathode 486 of the crystal diode 482 at minus five volts, any voltage more negative than minus five volts will cause the crystal diode 482 to become nonconductive, and that input voltage will be blocked at the crystal diode 482. Thus the clamping action of the crystal diode 492 will not affect the circuitry which supplies the input voltage.

The cathode 470 of the vacuum tube 466 is connected to ground potential. The anode 474 of the vacuum tube 466 is coupled by the primary winding 476 of the pulse transformer 468 to the positive supply bus 250. The outer ends of the secondary windings 478 and 480 of the pulse transformer 468 are coupled respectively to the positive output terminal 462 and the negative output terminal 464. The inner ends of the secondary windings 478 and 480 are coupled respectively to the negative supply bus 10 and the positive supply bus 5.

A positive pulse which is fed to the grid 472 of the vacuum tube 466 will be inverted at the primary winding 476 of the pulse transformer 468 which is wound to produce a positive pulse in the secondary winding 478 and a negative pulse in the secondary winding 480. These pulses respectively drive the positive output terminal 462 up to a positive five volts potential and the negative output terminal 464 down to a negative ten volts potential because of the circuit parameters.

When the vacuum tube 466 is nonconducting, the negative ten volts potential is fed through the secondary winding 478 and appears at the positive output terminal 462. At the same time, the positive five volts potential is fed through the secondary winding 480 to the negative output terminal 464. These latter conditions are the normally existing conditions at the output terminals 462 and 464.

XLIV. RESHAPER (FIG. 32)

The reshaper 2207 is illustrative of the type used and is an electronic circuit which functions to reshape and retime positive pulses which have become poorly shaped and attenuated.

The symbol for a representative reshaper 2207 is illustrated in Fig. 32a and comprises one or more input terminals of which the input terminals 520 and 522 are shown, timing terminal 524 which receives reshaping and retiming pulses (also designated clocking or C pulses), positive output terminal 526 and negative output terminal 528.

Except when positive pulses are fed to the input terminals 520 and 522 of the reshaper 2207, a negative potential of ten volts is present at the positive output terminal 526 and a positive potential of five volts exists at the negative output terminal 528.

When a pulse is fed to the reshaper 2207 via one or both of the input terminals 520 and 522, the pulse is reshaped by a clock pulse (received via the terminal 524), which is timed to delay the reshaped pulse for one-quarter of a pulse time, and is then transmitted from the reshaper 2207 via the positive output terminal 526. While the positive pulse is being transmitted from the positive output terminal 526, a negative pulse is transmitted from the negative output terminal 528.

The detailed circuitry of the reshaper 2207 is illustrated in Fig. 32b in which use is made of logical symbols previously described.

The reshaper 2207 comprises the buffer 2209, the gate 2306 and the pulse amplifier 2322 connected in series. A positive pulse which is fed via one or both of the input terminals 520 and 522 of the buffer 2209 is passed to the gate 2306.

A series of identical clock pulses which are generated in the clock pulse generator, as will later be described in detail, are transmitted to the gate 2306 via the clock terminal 524. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 2306. Since in many cases the pulse to be reshaped is originally produced by a previous reshaper and thus has approximately the same width as a clock pulse, its center point will be one-quarter pulse time later than the leading edge of the clock pulse which previouly reshaped it. Hence its leading edge after passing through the new reshaper will be one-quarter pulse time later than before, and on this basis it may be said that a reshaper introduces a one-quarter pulse time delay in the signals passing through it.

When the attenuated positive pulse reaches its full magnitude at the gate 2306, the coinciding clock pulse is gated through to the amplifier 2322 and is amplified and causes a positive pulse to be transmitted from the positive output terminal 526, and a negative pulse to be transmitted from the negative output terminal 528 at the same time.

The positive output terminal 526 is also coupled to one input of the buffer 2209 so that a positive signal which appears at the positive output terminal 526 is regenerative and will continue to exist until the clock pulse terminates at the gate 2306. This effectively permits the entire clock pulse to be gated through the gate 2306, even though the original pulse has decayed before the end of the clock pulse.

Stated more generally, a clock pulse is passed through the gate 2306 from the earliest coincidence of that clock pulse with the full magnitude of the attenuated pulse until the termination of that clock pulse. As a result, a clock pulse is substituted for the attenuated pulse in the system after a delay of one-quarter of a pulse time.

LXV. D.-C. AMPLIFIER (FIG. 33)

The symbol for a representative D.-C. amplifier 2321 is shown in Fig. 33a. When a positive signal is present at the input terminal 540, a positive signal of five volts appears at the positive output terminal 542 and a negative signal of ten volts is present at the negative output terminal 544. If a negative potential is present at the input terminal 540, the potentials at the output terminals 542 and 544 are reversed.

As shown in Fig. 33b, the D.-C. amplifier 2321 includes the gate 2306, the buffer 2209, the vacuum tube 546, the transformer 548, the full-wave rectifiers 550 and 552, and the filters 554 and 556.

The input terminal 540 is connected to one input terminal of the gate 2306. The other input of the gate 2306 is fed a one megacycle carrier signal from the signal generator 558 which is a signal generator of known type. The megacycle carrier signal swings from minus ten to plus five volts.

One input of the buffer 2209 is connected to the output of the gate 2306. The other input of the buffer 2209 is connected to the negative supply bus 5. The buffer 2209 couples the output of the gate 2306 to the control grid 560 of the vacuum tube 546.

The vacuum tube 546 is a five element tube having a grounded cylindrical shield 562, and includes the anode 564 connected via the primary winding 566 of the transformer 548 to a positive supply bus 250. The junction of the positive supply bus 250 and the primary winding 566 is coupled via the capacitor 568 to ground. The vacuum tube 546 also includes the suppressor grid 570 which is connected to ground, the screen grid 572 which is connected to the positive supply bus 125 and via the capacitor 574 to ground, and the cathode 576 which is grounded.

The anode 564 of the vacuum tube 546 is also connected via the coupling capacitor 578 to the neon tube 580 which is grounded. The capacitor 582 is connected in parallel with the primary winding 566 of the transformer 548 to form the parallel tank circuit 584 which is tuned to the frequency of the carrier signal.

The full-wave rectifier 550 is connected to the secondary winding 586 having its center tap 588 connected to the negative supply bus 10. The full-wave rectifier 550 includes the pair of crystal diodes 590 and 592. The anodes 594 and 596 of the crystal diodes 590 and 592 are respectively coupled to opposite ends of the secondary winding 586 of the transformer 548, and the cathodes 598 and 600 of the crystal diodes 590 and 592 are interconnected.

The full-wave rectifier 552 is connected to the secondary winding 602 having its center tap 604 connected to the positive supply bus 5.

The full-wave rectifier 552 includes the pair of crystal diodes 606 and 608. The cathodes 610 and 612 of the crystal diodes 606 and 608 are coupled to opposite ends of the secondary winding 602, and the anodes 614 and 616 of the crystal diodes 606 and 608 are connected together.

The filter 554 which couples the cathodes 598 and 600 of the crystal diodes 590 and 592 to the positive output terminal 542 is a parallel tank circuit which includes the capacitor 618 and the inductor 620. The capacitor 622 connects the positive output terminal 542 to the negative supply bus 10. The positive output terminal 542 is also coupled via the resistor 624 to the negative supply bus 70.

The filter 556, which couples the anodes 614 and 616 of the crystal diodes 606 and 608 to the negative output terminal 544, is a parallel tank circuit which includes the capacitor 626 and the inductor 628. The capacitor 630 connects the negative output terminal 544 to the positive supply bus 5. The negative output terminal 544 is also coupled by the resistor 632 to the positive supply bus 65.

Initially, the crystal diodes 590 and 592 are in a conductive state such that the potential at the positive output terminal 542 is approximately minus ten volts. Similarly, the crystal diodes 606 and 608 are initially in a conductive state such that the potential at the negative output terminal 544 is approximately plus five volts.

When a signal is fed to the input terminal 540 it is combined with the one megacycle carrier and fed to the buffer 2209. As previously noted, one input terminal of the buffer 2209 is connected to a negative five volts supply bus so that all signals at the output of gate 2306 which are equal to or more positive than minus five volts will be passed by the buffer 2209. A signal passed by the buffer 2209 is applied to the control grid 560 of the vacuum tube 546. The signal is amplified by vacuum tube 546 and appears across the parallel tank circuit 584. The parallel tank circuit 584 is tuned to the frequency of the incoming signal so that the maximum signal will be passed by the parallel tank circuit 584 to the full-wave rectifiers 550 and 552.

The full-wave rectifier 550 delivers a positive signal which is then filtered by the filter 554 to appear as a positive direct-current potential of approximately five volts at the positive output terminal 542. The full-wave rectifier 552 delivers a negative signal which is then filtered by the filter 556 to appear as a negative direct-current potential of approximately ten volts at the negative output terminal 544.

Thus, if a positive signal is present at the input terminal 540, the voltage at the positive output terminal 542 is plus five volts, and the potential at the negative output terminal 544 is minus ten volts. However, if no signal is present at the input terminal 540, the voltage at the positive output terminal 542 will be minus ten volts, and the potential at the negative output terminal 544 will be plus five volts.

Generally, it should be noted that this D.-C. amplifier is a carrier type D.-C. amplifier with positive and negative output signals comprising only one vacuum tube and producing output signals equal in magitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

In the description which follows, the D.-C. amplifier may at times be referred to simply as an amplifier, and the fact that the amplifier is a D.-C. amplifier will be apparent from the use of the symbol shown in Fig. 33a.

LXVI. SET DOMINANT FLIP FLOP (FIG. 34)

A set dominant flip flop of the type utilized is a bistable electronic circuit with two output terminals, one of which is maintained at one potential level and the other of which is maintained at a second potential level to indicate one stable state. An input signal of suitable magnitude interchanges the potential levels of the two output terminals to indicate a second stable state.

The symbol for a representative set dominant flip flop 3211 is illustrated in Fig. 34a. The set dominant flip flop 3211 comprises the input terminal 640, the reset terminals 642, the positive output terminal 644, and negative output terminal 646.

One stable state of the set dominant flip flop 3211 is the normal condition which is designated "reset" and exists when a negative potential of ten volts appears at the positive output terminal 644 and a positive potential of five volts appears at the negative output terminal 646. The second stable state is designated "set" and exists when a positive potential of five volts appears at the positive output terminal 644 and a negative potential of ten volts appears at the negative output terminal 646.

The set dominant flip flop 3211 is set when a positive potential input signal is received via its input terminal 640, and this is true irrespective of the presence of a reset signal at the reset terminal 642 of the set dominant flip flop 3211.

Once set, the set dominant flip flop remains set as long as positive potential signals are received at the reset terminal 642 regardless of the termination of the "setting" pulse or signal. When the signal at the reset terminal 642 becomes negative, the set dominant flip flop 3211 is reset unless a positive pulse or signal is simultaneously fed to the input terminal 640.

Stated more generally, the set dominant flip flop 3211 is set by the receipt of a positive potential input signal via the input terminal 640 and is reset by a coincidence of a negative potential input signal and a reset signal. After being reset, the set dominant flip flop 3211 remains reset until the above recited set conditions are fulfilled.

The detailed circuitry of the set dominant flip flop 3211 is illustrated in Fig. 34b employing some of the logical symbols previously described.

The set dominant flip flop 3211 comprises the buffer 2209, the D.-C. amplifier 2321 and the gate 2306.

The input terminal 640 is the input terminal of the buffer 2209. A positive signal which is transmitted to the input terminal 640 is passed through the buffer 2209 to the D.-C. amplifier 2321, and causes the D.-C. amplifier 2321 to generate a positive potential of five volts at its positive output terminal 644 and a negative potential of ten volts at its negative output terminal 646.

The gate 2306 couples the positive output terminal 644 of the D.-C. amplifier 2321 to the buffer 2209. When a positive signal is present at the reset terminal 642, the gate 2306 passes the positive signal to the buffer 2209. Thus a feedback path is provided which enables the positive potential of five volts to be maintained at the positive output terminal 644 and which is blocked only when a negative signal causes the gate 2306 to be blocked.

It should be noted that a reset signal which causes the gate 2306 to be blocked will not prevent a set signal at the buffer 2209 from causing the D.-C. amplifier 2321 to generate a positive potential of five volts at its positive output terminal 644 during the existence of the set signal.

In the text which follows, the set dominant flip flop may be referred to simply as a flip flop and the quality of being set dominant will be apparent from the use of the symbol shown in Fig. 34a.

LXVII. RESET DOMINANT FLIP FLOP (FIG. 35)

A reset dominant flip flop of the type used in the frequency dividing system is a bi-stable electronic circuit with two output terminals, one of which is maintained at one potential level and the other of which is maintained at a second potential level to indicate one stable state. Upon the receipt of at least two signals of suitable magnitude the potential levels of the two output terminals are exchanged to indicate a second stable state.

The symbol for a representative reset dominant flip flop 3412 is illustrated in Fig. 35a. The reset dominant flip flop 3412 comprises one or more input terminals of which the input terminal 650 is illustrated; one or more reset terminals of which the reset terminal 652 is illustrated; the positive output terminal 654; and the negative output terminal 656.

One stable state of the reset dominant flip flop 3412 is the normal condition which is designated "reset" and exists when a negative potential of ten volts appears at the positive output terminal 654 and a positive potential of five volts appears at the negative output terminal 656. The other stable state is designated "set" and exists when a positive potential of five volts appears at the positive output terminal 654 and a negative potential of ten volts appears at the negative output terminal 656.

The reset dominant flip flop 3412 is set when a positive signal is received via its input terminal 650, and a positive signal is present at its reset terminal 652. Therefore, the reset dominant flip flop 3412 will not be set if a reset (negative) signal is present at the reset terminal 652.

Once set, the reset dominant flip flop 3412 remains set as long as a positive signal is received via the reset terminal 652 even though the "setting" signal has terminated, but when the signal at the reset terminal 652 is negative, the reset dominant flip flop 3412 is then reset.

After being reset, the reset dominant flip flop 3412 remains reset until the above recited set conditions are fulfilled.

The detailed circuitry of the reset dominant flip flop 3412 is illustrated in Fig. 35b in which use is made of logical symbols previously described.

The reset dominant flip flop 3412 comprises the buffer 2209, the gate 2306 and the D.-C. amplifier 2321 connected in series. The input terminal 650 is the input terminal of the buffer 2209.

The buffer 2209 is coupled to the gate 2306. The reset terminal 652 is also coupled to the gate 2306. When the gate 2306 receives positive signals coincidentally from the buffer 2209 and the reset terminal 652, the gate 2306 passes a positive signal to the D.C. amplifier 2321, and causes the D.C. amplifier 2321 to generate a positive potential of five volts at its positive output terminal 654 and a negative potential of ten volts at its negative output terminal 656.

The positive output terminal 654 is coupled directly to the buffer 2209 so that when a positive signal is generated at the positive output terminal 654, it is regenerative. The positive signal will be maintained at the positive output terminal 654 until the gate 2306 is blocked by a negative signal received via the reset terminal 652.

It should be noted that a negative signal at the reset terminal 652 will prevent the setting of the reset dominant flip flop 3412 by a positive pulse or signal at the input terminal 650.

In the text which follows, the reset dominant flip flop may be referred to simply as a flip flop and the quality of being reset dominant will be apparent from the use of the symbol shown in Fig. 35a.

LXVIII. DRUM-READING AMPLIFIER (FIG. 29)

The symbol for a representative drum-reading amplifier 1000 is shown in Fig. 29a. The drum-reading amplifier 1000 functions to amplify signals which are generated when a pulse on a magnetic drum moves past a magnetic head which is coupled to the input terminal 660. The amplified signals appear at the output terminal 662.

As shown in Fig. 29b, the drum-reading amplifier 1000 includes the transformer 664 and the vacuum tubes 666 and 668. The transformer 664 comprises the primary winding 670 connected to the input terminals 660, the secondary winding 672 interposed between the control grid 674 of the vacuum tube 666 and ground, and a core provided with an electrostatic shield 676 which is connected to ground to prevent noise from being fed to the control grid 674. The resistor 678 is in parallel with the secondary winding 672. The vacuum tube 666 also includes the anode 680 which is connected through the resistor 682 to the positive supply bus 250, and the cathode 684 connected through the resistor 688 to ground.

The vacuum tube 668 comprises the anode 688 connected through the resistor 690 to the positive supply bus 250, the control grid 692 connected through the resistor 694 to the negative supply bus 1, and the cathode 696 is connected to ground. The anode 689 of the vacuum tube 666 is coupled via the capacitor 698 to the control grid 692 of the vacuum tube 668. The anode 688 of the vacuum tube 668 is connected via the capacitor 700 to the output terminal 662.

When a signal is read from the magnetic drum by the magnetic head it is applied to the primary winding 670 of the transformer 664. The secondary winding 672 of the transformer 664 applies an amplified signal to the control grid 674 of the vacuum tube 666. The signal is amplified by the vacuum tubes 666 and 668 to produce an amplified signal at the output terminal 662.

In the text which follows, the drum-reading amplifier 1000 may at times be referred to as an amplifier and the fact that the amplifier is a drum-reading amplifier will be apparent from the use of the symbol shown in Fig. 29a.

LXIX. DELAY FLOP (FIG. 30)

A delay flop of the type used in the computer system is a mono-stable electronic circuit with two output terminals, one of which is maintained at one potential level and the other of which is maintained at a second potential level to represent the stable state. Upon receipt of a signal of suitable magnitude, the potential levels of the two output terminals are exchanged for a predetermined period of time, after which the circuit automatically returns to its stable state.

The symbol for a representative delay flop 3490 is illustrated in Fig. 30a. The delay flop 3490 comprises one or more input terminals of which the input terminal 800 is illustrated, one positive output terminal 802, and one negative output terminal 804. The delay flop 3490 can also include one or more reset terminals such as 806.

One stable state of the delay flop 3490 is the normal condition which is designated "reset" and exists when a negative potential of ten volts appears at the positive output terminal 802 and a positive potential of five volts appears at the negative output terminal 804. The other state is designated "set" and exists when a positive potential of five volts appears at the positive output terminal 802 and a negative potential of ten volts appears at the negative output terminal 804.

The delay flop 3490 is set when positive signals are received simultaneously at the input terminal 800 and all of the reset terminals such as 806 (if reset terminals are included in the delay flop 3490). Once set, the delay flop 3490 remains set for a predetermined period of time or for as long as a positive signal is received at all of the reset terminals such as 806. The time duration of the set condition is dependent upon which has the shorter period of time.

The detailed circuitry of the delay flop 3490 is illustrated in Fig. 30b in which use is made of logical symbols previously prescribed.

The delay flop 3490 comprises the buffer 2209, the gate 2306, the D.C. amplifier 2321, and the delay line 2230. The input terminal 800 is the input terminal of the buffer 2209.

The output terminal of the buffer 2209 and the reset terminal 806, as well as any additional reset terminals, are coupled to the gate 2306 which feeds the D.C. amplifier 2321. The delay line 2230 couples the negative output terminal 804 of the D.C. amplifier 2321 to the gate 2306 so that normally the delay line 2230 transmits a positive signal to the gate 2306.

When the gate 2306 receives positive signals coincidentally from the buffer 2209, from all of the reset terminals such as 806, and from the delay line 2230, the D.C. amplifier 2321 generates a positive potential of five volts at its positive output terminal 802 and a negative potential of ten volts at its negative output terminal 804. The D.C. amplifier 2321 transmits a negative potential of ten volts from its positive output terminal 802 and a positive potential of five volts from its negative output terminal 804 when a positive signal is not present at its input.

The positive output terminal 802 is coupled directly to the buffer 2209 so that when a positive signal is generated at the positive output terminal 802, it is regenerative. The positive signal will be maintained at the positive output terminal 802 until the gate 2306 is blocked by a negative signal received via one of the reset terminals such as 806, or by the negative signal which is fed from the negative output terminal 804 through the delay line 2230.

Generally, the negative signal fed through the delay line 2230 resets the delay flop 3490 and, therefore, the delay in the delay line 2230 controls the period of time for which the delay flop 3490 may be set.

LXX. THYRATRON CIRCUIT (FIG 31)

The symbol for a representative thyratron is shown in Fig. 31a. The thyratron circuit 5210 comprises a clipper 730, a transformer 732, a thyratron tube 734 with its associated circuitry, a solenoid device 736, and a resetting device 738.

The schematic details of the thyratron circuit 5210 are shown in Fig. 31b. The clipper 730 passes a desired signal and discriminates against undesired noise signals; the transformer 732 increases the amplitude of the desired signal to facilitate operation of the thyratron tube 734; the solenoid device initiates a mechanical movement in the associated mechanical output device at the instant of conduction by the thyratron tube 734; and the resetting device 738 deactivates the thyratron tube 734 by interrupting the anode supply voltage.

When the thyratron tube 734 is in the conducting state, a positive output signal appears at the output terminal 780. This signal indicates that the thyratron tube 734 is operating; and is fed back to the input of the thyratron tube 734 to provide positive feedback. The feedback increases the reliability of operation and the speed of response of the thyratron tube 734.

The clipper 730 consists of the diodes 740 and 742 and the resistor 744. The cathodes 746 and 748 of the diodes 740 and 742 respectively are connected together and to one end of the resistor 744. The other end of the resistor 744 is connected to a negative supply voltage source 70. The anode 750 of the diode 742 is connected to receive the desired signal. The anode 752 of the diode 740 is connected to a negative supply voltage source 5. Clipper 730 is responsive and passes the most positive pulse present at the anodes 750 and 752. Since the diode 740 is connected to a negative supply voltage source of minus five volts, the output voltage of the clipper 730 will never be less than minus five volts. Thus, any undesired signals present at the input to the clipper 730 having a magnitude of less than minus five volts will not be passed.

Therefore, when an input pulse signal is present at the input terminal 754 of the clipper 730, a pulse which swings from minus five volts is passed to the transformer 732.

The transformer 732 comprises a primary winding 756 and a secondary winding 758. One end of the primary winding 756 is connected to the output terminal of the clipper 730. The other end of the primary winding 756 is coupled to the negative supply voltage source 5. The transformer 732 is a step-up transformer which produces a signal having more convenient voltage levels and a larger amplitude at the secondary winding 758 than the signal present at the primary winding 756. The larger amplitude signal is fed to the thyratron tube 734.

The thyratron 734 comprises the cathode 760, the control grid 762, the screen grid 764 and the anode 766. One end of the secondary winding 758 of the transformer 732 is connected through the resistor 768 to the control grid 762. The other end of the secondary winding 758 is connected by means of the resistor 770 to the cathode 760. The same end of the secondary winding 758 is connected to a negative supply voltage source 70 through the resistor 772. The cathode 760 is coupled to a negative supply voltage source 10 by means of the resistor 774. The output terminal 776 is coupled to the cathode 760.

A diode 778 is provided having its anode 780 connected to the cathode 760 and its cathode 782 coupled to a positive supply voltage source 5. The purpose of the diode 778 is to prevent the cathode voltage from rising above plus five volts, since the diode 778 will conduct when its anode reaches plus five volts or more.

Each of the diodes in the apparatus may be any unilateral conducting device, however, crystal diodes are preferable.

The solenoid device 736 consists of the winding 784 and the bar 786. The resetting device consists of the relay 788 having the normally closed contacts 790. The winding 784 of the solenoid device 736 connects the positive supply voltage source 125 from the normally closed contacts 790 of the relay 788 to the anode 86. When the thyratron tube 734 conducts, current flows through the coil winding 110 to actuate the bar 112 which in turn initiates a mechanical operation in the associated mechanical output device. This mechanical operation may be a print operation, a line feed, or a carriage return. Once the thyratron tube 734 is operated it remains conducting until a reset signal is received at the reset terminals 792 to actuate the relay 788 and briefly open the contacts 790. This interrupts the current flowing from the anode 766 to the cathode 760 of the thyratron tube 734 causing the thyratron tube 734 to become non-conductive and the solenoid device 738 to assume its unactuated state.

This circuit is subject to many modifications and variations utilizing the principles set forth. For example, the transformer 732, and the resistors 768, 770 and 772 can be eliminated; the output signal of the clipper 730 then being fed directly to the control grid 762. A flip-flop circuit can be substituted for the relay of the resetting device 738; and a relay may be substituted for the solenoid device 736, or the solenoid device can be eliminated entirely where a mechanical movement is not desired.

In the text which follows, the thyratron circuit may at times be referred to as a thyratron and the fact that the thyratron is a thyratron circuit will be apparent from the use of the symbol shown in Fig. 31a.

LXXI. INTRODUCTION TO DESCRIPTION OF BLOCK SIGNALS

In the following sections, the details of the sub-units which have been shown in block symbol form and referred to in the program instruction sections are illustrated in Figs. 36 to 59. The sub-units will be described in terms of the logical symbols.

Generally, the input and output lines to and from the various sub-units have been previously referred to in the procedures sections. However, for convenience, certain inhibitory signals were not included in the description of the procedures. These inhibitory signals are included in the detailed description so that the number of input and output lines associated with a particular sub-unit may exceed the total number of input and output lines associated with the same sub-unit in all of the flow diagrams, but their inclusion in the computer system will be obvious to those skilled in the art.

Further, whereas polarity of signals was not generally indicated in the program instructions, polarity is included in the description which follows. Therefore, a line which was referred to in the program instruction may be represented as two lines carrying signals of opposite polarity. These two lines (designated as a positive line and a negative line) are coupled, respectively, to the positive and negative output terminals of the logical component which generates the signals which are to be transmitted. The two lines are differentiated by the use of a negative sign or absence of a sign preceding the alphabetic character reference of the line. For example, the AM signal line becomes both the AM signal line and the —AM signal line in the following detailed description. The AM line is coupled to the positive output terminal of the logical component which generates AM, and the —AM line is coupled to the corresponding negative output terminal. It should be noted that the alphabetic character designation of the line is the same as the name of the signal. In many cases the terms line and signal are used interchangeably, but the signals on the lines are always to be understood. For example, the AM signal line carries the AM signal and no other signal.

The positive and negative output terminals of various logical components (flip flops, reshapers, etc.) may transmit either a positive or a negative signal at a given time. For example, the AM signal line may conduct either a positive or negative signal as will be specifically indicated; likewise, the —AM signal line may transmit positive or negative signals as will be specifically indicated. The signals on the two lines, however, will, at a given time, always be opposite in polarity with respect to each other. Generally, where a positive line conducts a signal from a sub-unit, the associated negative line is also illustrated. However, for purposes of convenience, the associated negative line may be omitted.

Repetitious phrases such as "input terminals" and "output terminals" have been excluded where their absence does not create ambiguity. For example, when it is stated that a gate is coupled to a buffer, what is meant is that the output terminal of the gate is coupled to one of the input terminals of the buffer unless the text clearly indicates otherwise.

In the detailed description only one logical component is shown as generating a given signal. Where, however, this signal is transmitted to a plurality of components and the load exceeds the capacity of the transmitting component, it is to be assumed that sufficient parallel transmitting sources are available to sustain the load.

LXXII. MEMORY IN-OUT CONTROL 111 (FIG. 36)

This figure shows the memory in-out control 111 which functions primarily as the input-output device for the memory registers. The contents of the memory registers that are recorded on the magnetic disk 165 are sensed by standard magnetic reproducing heads. This information is fed to the memory in-out control 111 via the R alpha and R beta lines.

The signals present on the R alpha line represent the contents of the first fifty memory registers and the signals present on the R beta line represent the contents of the second fifty memory registers. Both signal trains are continuously received and amplified by their respective pulse amplifiers 1142 and 1136 and then suitably delayed by their respective delay lines 1131 and 1137. The delay lines 1131 and 1137 permit minor timing adjustments of the signals with respect to the main computer. The adjustment is primarily in phase relationship.

The output terminal of the delay line 1131 is coupled to an input terminal of the gate 1127 having a second input terminal which receives a —RA signal while the output terminal of the delay line 1137 is coupled to an input terminal of the gate 1138 having a second input terminal which receives an RA signal. The RA signals determine which half of the one hundred memory registers are to be available.

When the RA flip flop in the arithmetic unit 116 is set, the RA signal is at a positive potential permitting the signals from the R beta line to pass through the gate 1138 and the —RA signal is at a negative potential preventing the signals on the R alpha line from passing through the gate 1127. When the RA flip flop is not set, the RA signal is at a negative potential preventing the signals from the R beta line from passing through the gate 1138 and the —RA signal is at a positive potential permitting the signals from the R alpha line to pass through the gate 1138. The N2 timing signals are fed to an input terminal of each gate to provide properly timed sampling pulses for passing particular bits of information.

The signals passed by either of the gates 1127 or 1138 are fed through the buffer 1139 to the pulse amplifier 1140. The signal appearing at the output terminal of the pulse amplifier 1140 is known as the YORD signal. The YORD signal is fed to the scan control 124 for sensing pulses in the switching blank portions of the memory registers.

The YORD signal is also fed to the input terminal of the reshaper 1130 and appears at positive and negative output terminals respectively as the AR and —AR signals. The AR and —AR signals are the information outputs of the memory in-out control 111.

The reshaper 1130 receives several blocking signals which determine the time when the information is transmitted as the AR and —AR signals. The SB signal permits the transmission of signals during a scan cycle. The output signal of the buffer 1134 is fed to the reshaper 1130 and permits clearing of particular memory registers by means of the presence of a —SD signal and the absence of the A and B signals during the "Clear Memory Registers" program instruction, and the output of the buffer 1141 permits the clearing of the switching blank portion of the contents of each memory register before the contents are transmitted as the AR signals. The —t40¾ to 43¾ and t40¾ pulses are fed to the input terminals of the buffer 1141.

The remaining portion of the memory in-out control 111 comprises the input and recording portion of the unit. The information to be recorded in the memory registers enters the unit as the AC and —AC signals from the add-one register in-out control 112 and is recorded in the memory registers as either a signal on the ROA or on the ROB lines. It should be noted that the ROA signal line is used for magnetically recording in the first fifty memory registers and the ROB signal line is used for magnetically recording in the second fifty memory registers.

The information signals to be recorded enter as the AC signals, are delayed one quarter of a pulse time by the delay line 1102 and are fed to the reshaper 1105 where the signal is delayed another quarter of a pulse time. The combination of the gate 1114, fed by the —Y, C3, and —AC signals; the buffer 1115, fed by the signal appearing at the positive output terminal of the reshaper 1105 and the output signal from the gate 1114; the gate 1110, fed by the signal appearing at the negative output terminal of the reshaper 1105 and the —Y and C1 signal; and the buffer 1111, fed by the output signal of the gate 1110 and the AC signal; produce an equal duty cycle waveform suitable for a non-return-to-zero recording through a transformer. It should be noted that other standard types of recording waveforms such as the return-to-zero technique also be used without affecting the operation of the apparatus.

The —Y signals fed to the gates 110 and 1114 prevent the recording of zeros during the program instructions associated with the selection of a memory register from the paper tape, keyboard, or accumulator. If a straight return-to-zero recording system were employed, the —Y signal would not be required.

The waveform to be recorded is fed to the gates 1112, 116, 1106, and 1108. The output signal from the gate 1111 and the AF and RA signals are fed to the gate 1112. The output signal from the gate 1115 and the AF and RA signals are fed to the gate 1116. The output signal from the gate 1111 and the AF and —RA signals are fed to the gate 1106. The output signal from the gate 1115 and the AF and —RA signals are fed to the gate 1108. When recording, the record enables signal AF from the scan control 124 alerts the four gates 1112, 1116, 1106 and 1108. The actual pair of gates to pass the information depends on the state of the RA flip flop. When the RA flip flop is set, the RA signal is positive. Thus the gates 1106 and 1108 pass the information and the gates 112 and 116 do not pass the information. When the RA flip flop is reset the conditions are reversed.

With the —RA signal at a positive potential the information passes through the gates 1106 and 1108 to the amplifiers 1107 and 1109. These amplifiers are arranged in a modified push-pull arrangement to transmit the signal for recording in one of the lower memory registers via the ROA signal line.

When the RA signal is at a positive potential the information passes through the gates 1112 and 1116 to the amplifiers 1113 and 1117. These amplifiers are also arranged in a modified push-pull arrangement to transmit the signal for recording in one of the upper memory registers via the ROB signal line.

The method of recording is more fully disclosed in the copending application, titled "Magnetic Recording System," by Daniel Golden and Irvin I. Korn, Serial No. 496,857, filed March 25, 1955, now Patent No. 2,917,726, granted January 15, 1959.

LXXIII. ADD-ONE REGISTER IN-OUT CONTROL 112 (FIG. 37)

The add-one register serves primarily as a counting register and as a delay means. The information in the form of signals from a magnetic reproducing head is fed from the W2I signal line to the pulse amplifier 1270 for amplification. The signals are delayed a fraction of a pulse time by the delay line 1218 and sampled at the gate 1201 by an N2 pulse signal. The output terminal of the gate 1201 is coupled to the input terminal of the AC reshaper 1215 that receives the timing pulse C3. The output of the AC reshaper 1215 is the AC signal which may be considered to be the information output of the add-one register. The positive output terminal of the AC reshaper 1215 is connected to an input terminal of the gate 1204. This connection permits unshifted circulation through the add-one register. The positive output terminal of the AC reshaper 1215 is also connected to an input terminal of the gate 1319 to provide a right shift path.

The remaining signals, that t(44¾ to 3¾) pulse and the —CS signal through the buffer 1203, and the —BM, —SB, and —EL signals are fed to input terminals of the gate 1204 to determine when the normal (unshift) recirculation is to occur. The —EL signal is used to clear the left shift register at the end of an input or an output operation. The —SB signal prevents any recirculation during the scan cycles associated with most arithmetic operations. The —BM signal will clear the add-one register at the beginning of any program instruction. The —CG signal and the t(44¾ to 3¾) signal blocks normal recirculation of all but the least significant digit during the shift cycles of the input and output operations.

The reshaper 1208 has four input terminals connected respectively to the output terminals of the gates 1204, 1205, 1237, and 1221. During normal recirculation the gate 1204 feeds the reshaper 1208. The gate 1205 receives, as inputs, the —t(40¾ to 3¾) pulse and the SD, B, —AR, N3, and A signals and permits the output of the memory registers, the —AR signal, to enter the add-one register as the multiplier during multiplication. Multiplication is indicated by the presence of the A, and the B signals. The SD signal indicates the location of the multiplier. The —t(40¾ to 43¾) signal prevents the sign digit of the multiplier from entering the add-one register.

The gate 1237 receives, as inputs, the 40¾, and 43¾ pulse through the buffer 1238, and the CQ and BM signals. This gate permits the insertion of the binary coded representation of the digit nine at the start of counting operation associated with the movement of the control belt 130 as characterized by the presence of the CQ and the BM signals. The number nine was chosen for convenience. In this particular case, the add-one register is used to count a predetermined number of minor cycles to indicate predetermined time delays. The gate 1223 receives, as inputs, the EL and the Y signals. The buffer 1222 receives, as inputs, the output signal of the gate 1223 and the SY3 signal. The gate 1221 receives, as inputs, the output signal of the buffer 1222, the $t43\frac{3}{4}$ pulse, and the —BC signal. The gate 1221 is used to insert the marker pulse for the switching blank positions during the "Memory Register Selection" program instructions. The marker pulse is a $t43\frac{3}{4}$ pulse signal. The marker pulse is written when the contents of the accumulator register have reached the value of zero as indicated by the —BC signal. The buffer 1222 which feeds the gate 1221 permits this to occur during the "Memory Register Selection" program instruction only, as characterized by the SY3 signal. The gate 1223 feeding the buffer 1222 and provides for the special case when the memory register selected was the 00 memory register.

The BL reshaper 1208, the three quarter pulse delay line 1224, the BJ reshaper 1209, the three quarter pulse delay line 1227, the BH reshaper 1230, the three quarter pulse delay line 1231, the BG reshaper 1220, the three quarter pulse delay line 1234, and the BF reshaper 1212 are connected in series and constitute a distributor which permits the simultaneous sampling of binary digits having a maximum of five positions or denominational orders. The augend reshaper 1340, the unit addend reshaper 1307, the three quarter pulse delay line 1323, the three quarter pulse delay line 1321, the gate 1308, the buffers 1312 and 1313 and the gate 1314 constitute a standard binary unit adder for serial operation.

The input terminal of the augend reshaper 1340 is coupled to the positive output terminal of the BF reshaper 1212. The unit addend reshaper 1307 has three input terminals. The first input terminal is coupled to the output terminal of the gate 1303 to provide unit additions during two different program instructions. The gate 1303 receives, as inputs, the output signal of the buffer 1304, the $t4\frac{2}{4}$ pulse, and the —BT signal. The buffer 1304 receives, as inputs, the BQ and CG signals. During the input (enter) and output (print or punch) operations the number of left shifts that occur is counted by means of the CG signal fed through the buffer 1304 to the gate 1303 permitting a $t4\frac{2}{4}$ pulse to act as a unit addend. During the "Multiplication" program instructions the number of add cycles that occur between the shift cycles is counted by feeding the BQ signal through the gate 1304 thus permitting the $t4\frac{2}{4}$ to act as a unit addend. The —BT signal prevents this type of unit addition from occurring during the shift cycles associated with the multiplication operations.

The second input terminal of the unit addend reshaper 1307 is coupled to the output terminal of the gate 1302. The gate 1302 has two input terminals one of which is coupled to the output terminal of the buffer 1341, and the other is coupled to receive the $t44\frac{2}{4}$ pulses. The buffer 1341 receives, as inputs, the BS, YA and YB signals. The $t44\frac{2}{4}$ pulses function as unit addends during specific operations and are controlled by the signals fed to the input terminals of the buffer 1341. The BS signal fed to the buffer 1341 permits unit additions to occur in the sign position of the contents of the add one register. These unit additions effectively count the number of shift cycles occurring during the multiplication operation.

It should be noted that during multiplication two types of unit additions are performed on the contents of the add-one register. The first is unit additions to the least significant digit of the multiplier. This is accomplished by the gate 1303 which effectively counts the number of addition cycles that are to be performed by the shift cycles. The second type of unit additions is addition into the sign position of the contents of the add-one register which counts the number of shift cycles. Since these unit additions occur on different parts of the contents of the add-one register different timing signals are used as separate unit addends. In this way it is possible to obtain more efficient use of the add-one register for the add-one register is thus able to store two separate and distinct counts.

The YA and YB signals provide unit additions during the counting operation needed to determine the width of the stepping pulse waveforms associated with moving the control belt 130.

The third input terminal of the unit addend reshaper 1307 is the gate 1308 that functions as a carry gate. One input terminal of the gate 1308 is coupled to the output terminal of the three quarter pulse delay line 1321 and the second input terminal is coupled to the output terminal of the three quarter pulse time delay line 1323. The input terminals of the delay lines 1323 and 1321 are coupled respectively to the positive output terminals of the augend reshaper 1340 and the unit addend reshaper 1307. Thus when pulses (binary 1's) are present at both output terminals, a carry is then generated which is suitably delayed and then fed to an input terminal of the unit addend reshaper 1307 through the gate 1308.

The input terminals of the buffer are coupled to the positive output terminal of the reshaper 1340 and 1307. The input terminals of the buffer 1313 are coupled to the negative output terminal of the reshaper 1340 and 1307. The input terminals of the buffer 1315 are coupled to receive the $t(44\frac{3}{4}$ to $3\frac{3}{4})$ pulses and the —BT signal. The gate 1314 receives, as inputs, the N13 pulse and the output signals of the buffers 1312, 1313 and 1315.

The gate 1319 receives, as inputs, the $—t(44\frac{3}{4}$ to $3\frac{3}{4})$ pulse, the N13 pulse, the BT, and the AC signals. The gate 1318 receives, as inputs, the output signal AE of the gate 1317 and the AN signal. The gate 1317 receives, as inputs, the —Y, —CR3, N13, SB, and —B signals.

The reshaper 1311 which generates the AZ signal has three input terminals. The first input terminal is coupled to the output terminal of the gate 1314 which is the sum output of the unit adder. The second input terminal is coupled to the output terminal of the gate 1319 and the third input terminal is coupled to the output terminal of the gate 1318. The gate 1319 is part of the right shift path in the add-one register. The information in the add-one register is shifted right by bypassing the distributor and the unit adder. This occurs in the shift cycles during multiplication as characterized by the BT signal fed to a second input of the gate 1319. The $—t(44\frac{3}{4}$ to $3\frac{3}{4})$ timing signal deletes the least significant digit from the shifted contents of the add-one register.

The gate 1318 permits the output of the adder-subtractor 122 to enter the add one register as the AN signal during many operations in which the add-one register is used as a delay means to permit multi-register arithmetic operations. The gate 1317 feeds the gate 1318 to generate the AE signal which determines when the output of the adder-subtractor 122 is coupled to the add-one register. The SB signal permits this coupling during all scan cycles except those associated with the "Memory Register Selection" program instructions, indicated by the presence of the —Y signals; the "Skip" program instructions indicated by the presence of the —CR3 signals; and those program instructions in which the contents of the memory registers should remain unchanged as for example, the program instruction entitled "Add Memory Register Accumulator."

The positive output terminal of the reshaper 1311 is coupled to the input terminal of the reshaper 1327 through the delay line 1324. The signal appearing at the negative output terminal of the reshaper 1327, and the C2 signal are fed to the input terminals of the gate 1328. The gate 1330 is coupled to receive the signal appearing at the negative output terminal of the reshaper 1311, and the C0 signal. The buffer 1329 is coupled to receive the AZ signal and the signal appearing at the output terminal of the gate 1328. The buffer 1331 receives, at its inputs terminals, the AZD signal and the signal appearing at the output terminal of the gate 1330. The input terminals of the gate 1332 are coupled to receive the N02 pulse and the output signal from the buffer 1324; and the input terminals of the gate 1333 are coupled to receive the N02 pulse and the output signal from the buffer 1331. The output signals of the gates 1332 and 1343 are fed, respectively, to the pulse amplifiers 1342 and 1343.

The three quarter pulse delay line 1324, the reshaper 1327, the gates 1328 and 1330, the buffers 1329 and 1331, the gates 1332 and 1333 and the pulse amplifiers 1342 and 1343 comprise a recording waveform generator similar to that described in the memory register in-out control 111. The information is then recorded on the magnetic disk 165 via the W2O signal line.

LXXIV. ACCUMULATOR REGISTER IN-OUT CONTROL 113 (FIG. 38)

The in-out control of the accumulator register controls the transfer of information to and from the accumulator register. The information is represented as signals from a magnetic reproducing head and is fed from the W1I signal line to the amplifier 0370 for amplification. The signals are delayed by the delay line 0322 a fraction of a pulse time and sampled at the gate 0325 by an N2 pulse signal. The output of the gate 0325 is fed to the AB reshaper 0304. The AB and —AB output signals of the reshaper 0304 are considered the information output signals of the accumulator register.

The signal appearing at the positive output terminal of the AB reshaper 0304 is fed to the delay line 0320 and to the gate 0308. Normal (unshifted) recirculation through the accumulator register is via the four pulse time delay line 0320 and the gate 0305. Circulation including a one digit right shift path is via the gate 0308. The gate 0308 also receives, as inputs, the $-t(44\frac{3}{4}$ to $3\frac{3}{4})$ pulse and the BT, —BU, and N13 pulse signals. The BT and —BU signals permit right shifting during selected portions of the "multiplication" program instruction. The timing pulses insure deletion of unrequired digits.

The gate 0309 receives, as inputs, the $t24\frac{3}{4}$ and the $t26\frac{3}{4}$ pulses through the buffer 0310, and the A, B, E, and SD signals. This gate is used only during rounded multiplication as characterized by the A, B, and E signals to inject the coded representation of the round off digit (the $t24\frac{3}{4}$ and $t26\frac{3}{4}$ pulse signals) into the accumulator register.

The fourth gate feeding the reshaper 0302 is the gate 0306. One input terminal of this gate receives the output of the adder-subtractor 122 (the AN signals) while the second input terminal is coupled to the positive output terminal of the set dominant flip flop 0318. It should be noted that the N3 pulse and the signal at the negative output terminal of the flip flop 0318 is coupled to the input terminal of the gate 0305, therefore, the state of the set dominant flip flop 0318 determines which of gates 0305 or 0306 feeds signals to the reshaper 0302. When the flip flop is set, the gate 0306 is activated and the gate 0305 is blocked. When the flip flop is reset, the gate 0305 is activated and the gate 0306 is blocked.

The set terminal of the set dominant flip flop 0318 is coupled to the output terminal of the gate 0315. The gate 0315 receives, as input signals, the output signal of the buffer 0314, the $t4\frac{3}{4}$ pulse, and the —Y signal. The —Y signal prevents the setting of the set dominant flip flop 0318 during the "Memory Register Selection" program instructions. The buffer 0314 receives, as input signals, the output signal of the gate 0311, the BQ, and the BE signals. The gate 0311 receives, as inputs, the B, —D, and SB signals. The BE signal, the BQ signal, and the output signal of the gate 0311 permit setting, respectively, during the "Enter," the "Multiplication" and the "Add (Subtract) Memory Registers to (from) Accumulator" program instructions.

The reshaper 0302 generates the AK and —AK signals. The AK signal can be considered to be the modified output of the accumulator register. The AK signal is fed to the arithmetic control 116 to indicate whether the contents of the accumulator register are zero or not during the "Proof Figure Check" program instructions.

The reshaper 0329 is coupled to the positive output terminal of the reshaper 0302 through the three quarter pulse time delay line 0326. The signal at the negative output terminal of the reshaper 0329, and the C2 pulse are fed to the input terminals of the gate 0205. The signals appearing at the positive output terminal of the reshaper 0302, and at the output terminal of the gate 0205 are fed to an input terminal of the gate 0207 through the buffer 0206. The signal appearing at the negative output terminal of the reshaper 0302, and the C0 pulse are fed to the input terminals of the gate 0208. The signals appearing at the positive output terminal of the reshaper 0329, and at the output terminal of the gate 0208 are fed through the buffer 0209 to an input terminal of the gate 0210. The N02 pulse is fed to a second input terminal of each of the gates 0207 and 0210. The output terminals of the gates 0207 and 0210 are coupled, respectively, to the input terminals of the pulse amplifiers 0235 and 0236.

The components illustrated, from the reshaper 0302 through the pulse amplifier 0235 and 0236, comprise a recording waveform generator similar to the generator described in the section entitled "Memory Register In-Out Control." The waveform representing the information to be recorded is fed via the W1O signal line to the magnetic disk 165.

The only other output signal from this unit is the EM signal from a tap on the delay line 0320. The EM signal is fed to the Enter and Index Control 143 to indicate the presence of a non-zero digit during the print out operations.

LXXV. LEFT-SHIFT REGISTER IN-OUT CONTROL 115 (FIG. 39)

The in-out control of the left-shift register controls the transfer of signals between the left-shift register and the remainder of the computer. The information, as represented by signals from a magnetic reproducing head, is fed from the W3I signal line to the amplifier 0770 for amplification.

The signals from the amplifier are fed to and delayed a fraction of a pulse time by the delay line 0735 and then fed to and sampled at the gate 0701 by an N2 pulse signal. The output terminal of the gate 0701 is coupled to one input terminal of the AH reshaper 0704. The second input terminal of the reshaper 0704 is coupled to the output terminal of the gate 0702 to receive the contents of the accumulator register as the AB signal during the "Memory Register Selection Via Accumulator" program instruction as characterized by the presence of the B and SY3 signals. The gate 0702 receives, as inputs, the AB, B, SY3, and BM signals.

The AH signal from the output terminal of the AH reshaper 0704 is considered the output of the left shift register. The AH signal is also fed to an input terminal of the delay line 0728 and to an input terminal of the gate 0707. Signals passing through the gate 0707 are considered to be circulating normally (unshifted), while signals passing through the four pulse time delay line 0728 and the pulse amplifier 0737 are considered to be shifted left one digit.

The AX reshaper 0714 has five input terminals coupled respectively to the output terminals of the gates 0708, 0709, 0710, 0711, and 0707. The gate 0707 is the gate for normal (unshifted) circulation of the information. The gate 0707 has a plurality of input terminals which control the flow of information. The following table lists the signals fed to the input terminals and their function.

*Table 115a*

| Signal | Role |
| --- | --- |
| −CR3 | blocks ordinary recirculation during the "skip" program instructions when the left-shift register is coupled to the adder-subtractor 122. |
| −BP | same as indicated for the −CR3 signal. |
| −BM | initial clear of register at start of each program instruction. |
| −CG | blocks ordinary recirculation when left shifting on input-output operations. |
| −SY3 | blocks ordinary recirculation during the "Memory Register Selection" program instructions when left-shift register is coupled to adder-subtractor 122. |
| −BT and −BU from buffer | blocks ordinary recirculation during the right shifting portion of the multiplication program instruction. |
| −EL and Y signals from buffer 0736. | clears left shift register when information being transferred between accumulator register and left shift register during input-output operations. |

The −BT and −BU signals are fed to an input terminal of the gate 0707 through the buffer 0706. The −EL and Y signals are fed to an input terminal of the gate 0707 through the buffer 0736.

The gate 0711 feeds the left-shifted information represented by the AW signal from the pulse amplifier 0737 and the four pulse delay lines 0728 to the AX reshaper 0714 during the left shifting portion of the multiplication as characterized by the BT and BU signals. The gate 0711 also receives, as inputs, the −t(40¾ to 43¾) and N3 pulses.

The gate 0710 feeds the left shifted information represented by the AW signal from the pulse amplifier 0737 to the AX reshaper 0714 during the left shifting portions of the input-output operations indicated by the CG signal.

The gate 0709 feeds the contents of the accumulator register, as the AB signal, to the AX reshaper 0714 during the multiplication operation (characterized by the A and B signals) when the multiplicand originally stored in the accumulator register is transferred to the left-shift register under the control of the BM signal. The gate 0709 also receives, as inputs, the A, B, and SB signals.

The gate 0708 permits feeding the encoded digit from the number thyratrons 141, as the DB signal, to the AX reshaper 0714 for insertion into the left-shift register during the left-shifting portions (the CG signal) of the "entry" program instructions (the BE signal). The gate 0708 also receives as inputs, the BE and CG signals.

The AX reshaper 0714, the three-quarter pulse time delay line 0729, the AY reshaper 0717, the three-quarter pulse time line 0730, the AU reshaper 0720, the three-quarter pulse time line 0731, the AV reshaper 0723 and the three-quarter pulse time delay line 0732 connected in a series manner, in the order mentioned, form a distributor which permits simultaneous access to the four binary bit positioins which comprise a digit. The AX, AY, AU and AV signals are fed to the number thyratrons 141 or the paper tape input-output 145 during output operations for decoding or punching out.

The output terminal of the three-quarter pulse time delay line 0732 is coupled to an input terminal of the AQ reshaper 0234. The second input terminal of the AQ reshaper 0234 is coupled to the output terminal of the gate 0226. The AN output signal of the adder-subtractor 122 is fed to one input terminal of the gate 0226 to enter the left shift register, and the output terminal of the buffer 0225 is coupled to another input terminal. The signals EL and DA, through the gate 0224, and SY3, CR3, and BP that are fed to the input terminals of the buffer 0225 dictate when the transfer is to occur.

The CR3 and BP signals permit such insertions during the "skip" program instructions. The SY3 signal permits the insertion during the "memory register selection" program instructions. The coincidence of the EL and DA signals at the gate 0224 permit the insertion during the output operations.

The AQ signal from the positive output terminal of the AQ reshaper 0234 is considered to be the modified output terminal of the left-shift register.

The three-quarter pulse time delay line 0201, the reshaper 0204, the gates 0211 and 0214, the buffers 0212 and 0215, the gates 0213 and 0216 and the pulse amplifiers 0237 and 0238 comprise a recording current waveform generator similar to the one described in the section entitled "Memory-Register In-Out Control 111" and in the section entitled "Accumulator Register In-Out 113."

LXXVI. ARITHMETIC CONTROL 116 (Fig. 40)

The arithmetic control 116 is primarily a static control register which generates control signals that are characteristic of many of the program instructions. The unit has been divided into three parts as follows: The multiplication controls 116(*a*) that generate the control signals associated with multiplication; the stepping pulse width control 116(*b*) that controls the width of the stepping pulses YA and YB that are generated in the cycle generators 131; and the miscellaneous controls 116(*c*) that generates control signals associated with several of the program instructions.

The presence of the A and B signals from the control belt 130 indicates the order of a Multiplication program instruction. The presence of the SD signal from the scan control 124 indicates that a particular multiplier has been located. The t41¼ pulse and the A, B, and SD signals are fed into the gate 150. The locating of a particular multiplier, during multiplication, allows the t41¼ pulse signal to pass through the gate 1501 to the set terminal of the flip flop 1505. The buffer 1502 receives as inputs and passes the −t44¾ pulse and the −BF, −BJ, and −BS signals to the reset terminal of the reshaper 1505. When set the flip flop 1505 generates the BQ signal at its positive output terminal, and the −BQ signal at its negative output terminal. The flip flop remains set for the entire multiplication operation.

The BQ signals are fed through the buffer 1521 to an input terminal of the gate 1506. The gate 1506 also receives, as inputs, the BG, BH, and BJ signals. During multiplication the coincidence of the BG, BH, and BJ signals from the add-one register indicates that the appropriate number of additions have been performed and a signal is then fed through the gate 1506 to an input terminal of each of the gates 1508 and 1509. The signal fed to the gate 1509 permits the passage of a t4¾ pulse which sets the flip flop 1511. The flip flop 1511 generates the BS and −BS signals which can be considered as the "intend to shift" signal. The BS signal is fed to the gate 1513 to pass the next t44¾ pulse that appears at the input terminal of the gate 1513 to an input terminal of the flip flop 1515. This timing pulse sets the flip flop 1515 and causes the generation of the BT and −BT signals. The BT and −BT signals are the actual shift signals. The BT and −BT signals will be present for one minor cycle (a −t44¼ pulse resets the flip flop 1515), a period of time that is long enough to encompass a complete number. The BT signal is fed to an input terminal of the gate 1508 and the −BT signal is fed to an input terminal of the gate 1509.

It is also possible to set the flip flop 1511 and initiate a shift cycle under other conditions. For example, the second set terminal of the flip flop 1511 is coupled to the output terminal of the gate 1508. A t8¾ pulse will pass through this gate when the next least significant digit of the multiplier indicates a shift. Thus, as directed by the contents of the multiplier a second shift cycle will occur immediately after a first shift cycle.

At the beginning of the multiplication operation when the least significant digit of the multiplier calls for no addition cycles, it is desirable to have an immediate shift cycle. The gate 1509 in addition to its usual function will also handle this case. It should be noted that the buffer 1507 which feeds an input terminal of the gate 1509 receives as input the —SD and BF signals. The —SD signal is only present when the multiplier is transferred from its memory register to the add-one register. Thus, the gate 1509 will only be dependent on the buffer 1507 during this initial transfer. If during this initial transfer a BF signal is fed from the add one register to an input terminal of the buffer 1507, and the BG, BH and BJ signals are also fed to the gate 1506 indicating that the least significant digit of the multiplier is zero, a shift cycle is initiated by feeding a $t4\frac{2}{4}$ pulse through the gate 1509 to an input terminal of the flip flop 1511.

The gate 1517 receives the $-t44\frac{2}{4}$ pulse and the BH, BG, and BQ signals as inputs. After six shift cycles, as counted in the add-one register, the BG and the BH signals are sensed at the gate 1517 to permit a $t44\frac{2}{4}$ pulse to set the flip flop 1520. The flip flop 1520 causes the generation of the BU and the —BU signals which indicate that the first half of the multiplication operation is terminated and the second half is to start. The —SED signal is fed to and resets the flip flop 1520. It should be noted that during the first half of the multiplication operation the partial products in the accumulator are shifted right and during the second half of the multiplication operation the partial products in the accumulator are not shifted but instead the multiplicand is shifted left. The BU and —BU signals fed to the appropriate registers change the type of shifting that is performed.

The miscellaneous controls 1160 are used to generate control signals associated with various program instructions. During the "Memory Register Selection" program instructions the Y signal from the control belt 130, the SB signal from the scan control 124, and the C3 pulses are fed to the input terminals of the gate 1631. At coincidence of the SP and Y signals a plurality of C3 pulses are fed to generate the SY3 and the —SY3 signals that primarily control the computer during the "Memory Register Selection" program instructions. The gate 24112 is fed by the $t41\frac{1}{4}$ pulse and the —N, —P, —MJ, and CB signals.

At the start of each program instruction except the "Initiate Operation" program instruction wherein the —N signal and the —P signal are present, or program instructions having forward or reverse express movements of the control belt 130 indicated by the —MJ signal, the CB signal permits the passage of a $t41\frac{1}{4}$ pulse through the gate 24112 to generate the BA signal. The BA signal is fed to the computer and to the set terminal of the reset dominant flip flop 2444. The reset dominant flip flop 2444 generates the SA and —SA signals. The SA signal is fed to the scan control 124 to cause the generation of an SB signal at the start of a scan cycle. The flip flop 2444 is reset by a —SED signal from the scan control 124 at the end of a scan cycle. A —CP signal fed from the program selector 133 prevents spurious setting of the flip flop 2444 during the "Initiate Operation" program instruction.

The —D and C signals are fed to the input terminals of the buffer 1641. The output signal of the buffer 1641 and the BA, A, —B and E signals are fed to the input terminals of the gate 1614. The gate 1614 will pass the BA signal to the set terminal of the reset dominant flip flop 2418 only during the "Enter" program instructions. The particular combination of signals from the control belt 130 that are fed to the gate 1614 and to the input terminals of the buffer 1641 restrict the passage of this pulse to the entry program instructions.

The reset dominant flip flop 2418 will remain set and will generate the BE and —BE signals until it is reset at the end of a scan cycle by the presence of the —SED signal at one of its reset terminals. It is also possible to reset the set dominant flip flop 2418 by means of the —EL or —$t41\frac{1}{4}$ pulse signals that are fed through the buffer 2412 to a second reset terminal. This particular reset terminal is used when the number that has been entered into the left shift register is being transferred to the accumulator register, indicated by the presence of an —EL signal. The —CP signal is fed to a blocking terminal of the reset dominant flip flop 2418 to prevent any spurious setting of the flip flop 2418 during the "Initiate Operation" program instruction.

The reset dominant flip flop 1623 generates the BM and —BM signals. These signals have a duration of one minor cycle. They clear the left-shift and add-one registers between program instructions. The reset dominant flip flop 1623 has four set terminals. The first set terminal is coupled to the output terminal of the gate 1648. The second set terminal is coupled to the output terminal of the gate 1619. The third set terminal is coupled via a differentiating circuit to the SB signal and the fourth set terminal is coupled to receive the CB signal. The differentiating circuit may be a well-known R-C network.

At the start of each scan cycle the leading edge of the SB signal from the scan control 124 sets the reset dominant flip flop 1623. If during an "Enter" program instruction the operator realizes that the wrong information has been inserted, a figure correct switch on the keyboard 142 is depressed and the MK signal is generated. The MK and BE signals are fed to the gate 1648 and, at coincidence, sets the reset dominant flip flop 1623 to clear the registers of the erroneous information.

The coincidence of the CQ, the —YA, and the —YB signals from the cycle generators 131, at the input terminals of the gate 1619, permit a $t44\frac{1}{4}$ pulse to pass through the gate 1119 to a set terminal of the flip flop 1623. This signal clears the add-one register just prior to the counting operation associated with determining the width of the pulses which cause stepping of the control belt 130. The reset terminal of the flip flop 1623 is fed by the —$t44\frac{1}{4}$ pulse and the No. 2 signal through the buffer 1634.

The pulse amplifier 1633 generates the CR3 and —CR3 signals characteristic of the "Skip" program instructions. The input terminal of the pulse amplifier 1633 is coupled to the output terminal of the gate 1632. The D, —A, C3, and SB signals are fed to the input terminals of the gate 1632. The presence of the D signal and the absence of the —A signal from the control belt 130 permit the passage of the C3 pulse signals through the gate 1632 during a scan cycle (i.e., the SB signal from the scan control 124). The reset dominant flip flop 1604 causes the generation of the BP and —BP signals characteristic of the counting down portion of the skip program instructions. The gate 1624 is coupled to receive the signal appearing at the positive output terminal of the pulse amplifier 1633, the $t44\frac{3}{4}$ pulse, and the SD signal. The output terminal of the gate 1624 is coupled to the set terminal of the reset dominant flip flop 1604. When the desired count during the buildup portion of a "Skip" program instruction is attained as indicated by an SD signal from the scan control 124, a $t40\frac{3}{4}$ pulse passes through the gate 1624. A signal at the output terminal of the gate 1624 sets the reset dominant flip flop 1602 and the BN signal is generated. The flip flop 1602 remains set until a —SED signal is received at its reset terminal at the end of the operation.

The set dominant flip flop 1608 generates the BC and —BC signals. The reset dominant flip flop 1608 is primarily a zero sensing flip flop. The first set terminal of the flip flop 1608 is coupled to the left-shift register via the AQ signal line. If during a "Skip" program instruction the contents of the left-shift register are not zero, at least one pulse will be present to set the flip flop during each minor cycle. At the end of the minor cycle, the −t44¾ signal will be fed to the reset terminal to reset the flip flop. When the contents of the left-shift register are zero the flip flop is not set. By testing the flip flop for the set or reset condition, at a particular time, it is possible to determine whether the contents of the left-shift register is zero. If the contents are zero, then the counting down portion of the skip operation is terminated.

The second set terminal of the reset dominant flip flop 1608 is coupled to the output terminal of the gate 1605. The −BP, AK, C, and E signals are fed to the input terminals of the gate 1605. The gate 1605 operates only during the "Proof Figure Check" program instruction, when the contents of the accumulator register as indicated by the AK signal, are fed to an input terminal of the gate 1605 to be checked for zero.

The error thyratron 1612 when set, generates a CZ signal which activates circuitry that prevents the program from proceeding until certain manual operations are performed. The set terminal of the thyratron 1612 is coupled to the output terminal of the gate 1607. The three input terminals of the gate 1607 are coupled respectively to output terminals of the gate 1607, 1646 and 1647. The gate 1609 receives as inputs, the BC, C, E, SE, and −D signals and operates during the "Proof Figure Check" program instruction. If the contents of the accumulator are not zero, a BC signal passes through the gate 1609 to set the thyratron 1612. The gate 1646 receives the JE and the JA signals from the paper tape input output 145. Both of these signals are present when a code delete character is read from the paper tape by the paper tape in-out control 145. The PC signal from the paper tape input output 145 passes a t41¼ pulse through the gate 1647 to set the thyratron 1612 when the code delete switch of the motorized paper tape punch is depressed during "Enter Via Paper Tape" program instruction. When the thyratron 1612 is set, a neon indicator 1628 is activated to indicate the occurrence of an error. The DT signal from the enter and index control 143 is used to reset the thyratron 1612 after the error has been indicated and corrected.

The stepping pulse width control 116B comprises the gates 1530, 1531 and 1532, the buffer 1529, the gate 1528, the reshaper 1525, the three-quarter pulse delay line 1524, the buffer 1523, the pulse amplifier 1522 and the gate 1560. The gate 1530 is fed by the YA, −YB, BH, and BJ input signals. The gate 1531 is fed by the −YA, YB, BH, and BJ input signals, and the gate 1532 is fed by the YA, YB, BH, −BJ and BF input signals. The output terminals of the gates 1530, 1531 and 1532 are coupled to input terminals of the buffer 1529. The output terminal of the buffer 1529 is coupled to a first input terminal of the gate 1528. The second input terminal of the gate 1528 is coupled to the TV signal line from the timer 160 which is used for sampling. The output terminal of the gate 1528 is coupled to the input terminal of the reshaper 1525. The reshaper 1525 generates the CS and −CS signals in time with the C3 signal. The CS signal is fed to an input terminal of the three-quarter pulse delay line 1524, whose output terminal is coupled to an input terminal of the buffer 1523. The second input terminal of the buffer 1523 is coupled to the output terminal of the isolation gate 1560. The output terminal of the buffer 1523 is coupled to the input terminal of the pulse amplifier 1522. The output terminal of the pulse amplifier 1522 generates the CSD signal which is fed to the input terminal of the isolation gate 1560. The isolation gate 1560 has no logical function, it serves solely to isolate unidirectionally an input terminal of the buffer 1523 from the CSD signal line to prevent possible inappropriate feedback. The stepping pulse width control 116(b) acts in conjunction with the add-one register and the cycle generators 131 to determine the width of the YA and YB signals. It should be noted that the YA and YB signals are fed from the cycle generators 131 to the belt motor control 133 to step the control belt 130. At the start of the stepping operation the YA signal is generated and fed to an input terminal of the gate 1530. At the same time, a binary nine is inserted in the add-one register. Each succeeding minor cycle one is added to the count in the add one register. When the count reaches twenty-four (fifteen minor cycles later) a pulse is fed through the gate 1530, the buffer 1529 and the gate 1528 to the reshaper 1525 causing the generation of the CS, the −CS and the CSD signals. These signals are fed to the cycle generators 131 to generate the YB signal. The YB signal, in addition to the YA signal, is fed to the gate 1532. The unit additions continue and when the count reaches forty-two (sixteen minor cycles later) as indicated by the BH, the −BJ and the BF signals at the input terminals of the gate 1532, a pulse passes through the gate 1532, the buffer 1529 and the gate 1528 to the reshaper 1525 causing the generation of the CS, the −CS and the −CSD signals. These signals are again fed to the cycle generators 131 where they cause the termination of the YA and the −YA signals, but not the YB and the −YB signals. The count continues until the number stored is equal to fifty-six (fourteen minor cycles later). At this time, the gate 1531 is operating and the BH and BJ signals used to determine this count number permit a pulse to pass through the gate 1531, the buffer 1529 and the gate 1528 to the reshaper 1525 to generate the CS, −CS, and CSD signal. These signals are again fed to the cycle generators 131 where they terminate the YB and −YB signals.

Although for the sake of description it has been assumed that pulses pass through, for example, the gate 1531 to the buffer 1529 and through the buffer 1529 to the gate 1528 whenever the designated number is attained, it should be realized that signals are continuously fed along this path and only when the particular number is attained do these signals actually pass through the gate 1528 as determined by the TV pulse from the timer 160 which operates to permit proper sampling of the pulses representing the number.

LXXVII. THE OPERAND FUNNEL 121 (FIG. 41)

The operand funnel 121 selects and feeds particular numbers to the adder-subtractor 122. The operand funnel 121 selects the augend or minuend (AM and −AM) signals and the addend or substrahend (AS and −AS) signals from a plurality of input sources and feeds these signals to the adder-subtractor 122.

The augend-minuend reshaper 2108 can receive signals from the gates 2123, 2103, 2104 and 2105. The gate 2123 permits the number circulating in the left-shift register (the AH signal) to become the minuend during the counting down portion of the "Memory Register Selections" program instructions as indicated by the SY3 signal.

The gate 2103 receives the output of the buffer 2102 and the AH and −BT signals. This gate permits the number circulating in the left-shift register (the AH signal) to become the augend or minuend during the "Skip" program instructions (indicated by feeding the CR3 and BP signals into the buffer 2102) or during the nonshifting portions of the "Multiplication" program instructions (indicated by feeding the BQ signal into the buffer 2102 and the −BT signal into the gate 2103).

The gate 2104 receives the output signal of the buffer 2125 and the AE and AR signals. This gate permits the contents of the memory registers (indicated by the AR signal) to become the augend or minuend during the "Clear Memory Registers," "Add Accumulator to Memory Register," "Subtract Accumulator from Memory Register," or "Add Accumulator to Cleared Memory Register" program instructions, all of which are characterized by the presence of the AE signal. The simultaneous occurrence of the −SD, −C and −D signals at the buffer 2125 blocks the passage of the contents of a designated memory register through the gate 2104 thus effectively clearing the memory register to zero.

The gate 2105 receives the output signal of the buffer 2109 and the AB, B, SB, —D, and —Y signals. This gate permits the contents of the accumulator register (indicated by the AB signal) to become the addend or minuend during the scan cycle of the "Add Memory Register to Accumulator," "Subtract Memory Register from Accumulator" or "Clear Accumulator and Add Memory Register" program instruction. These program instructions are all indicated by the B signal, and the scan cycle is indicated by the presence of the SB signal. The —BM signal that is fed to the buffer 2109 permits the clearing of the accumulator during the "Clear Accumulator and Add Memory Register" program instruction. The —E and —A signals that are fed to the gate 2124, the output of which is coupled to an input terminal of the buffer 2109, and the C signal that is fed to the buffer 2109 prevent the signals in the accumulator register from passing through the gates 2105 during other program instructions which are also partially characterized by a B signal. For example, the —D signal blocks the gate 2105 during a "Conditional Skip" program instruction which is indicated by the presence of both a B and a D signal.

The addend-subtrahend reshaper 2121 can receive signals from the gates 2111, 2112, 2113, 2114, 2115, 2116, 2117, 2118, and 2122.

The BU and —BT signals are fed to the gate 2126. The output signal of the gate 2126, and the BQ and AB signals are fed to the output terminals of the gate 2111. The gate 2111 passes to the addend-subtrahend reshaper 2121 the partial product that is circulating in the accumulator register to become the addend during multiplication except when a right shift is indicated by the presence of the BU and —BT signals at the input terminal of the buffer 2110. The partial product is indicated by the AB signal, and multiplication is indicated by the BQ signal.

The —D and C signals are fed to the gate 2126. The output signal of the gate 2126, and the AB, A, B, and SD signals are fed to the input terminals of the gate 2112. The gate 2112 permits the contents of the accumulator register represented by the AB signal to become the addend or subtrahend during the "Add Accumulator to Memory Register," "Subtract Accumulator from Memory Register" or "Add Accumulator to Cleared Memory Register" program instructions.

The gate 2113 receives the —C, A, D, SD, and $t8\tfrac{3}{4}$ pulse input signals. This gate permits a single pulse (i.e. the $t8\tfrac{3}{4}$ pulse signal) to be an addend during the "Add One to Memory Register" program instruction when ordered by the presence of the A and the D signals. The —C signal prevents this addition during the "Add Contents of the Accumulator to Cleared Memory Register" program instruction and the SD signal permits the addition to occur only when a particular memory register is available.

The gate 2114 receives the AR, —A, B, —D, and SD input signals. This gate permits the contents of the particular memory registers to become the addend during the "Add Memory Register to Accumulator" or "Clear Accumulator and Add Memory Register"; and the minuend during the "Subtract Memory Register from Accumulator" program instructions. The particular memory register is indicated by the SD signal, and the contents of the particular register is indicated by the AR signal. The —A signal prevents the passage of information through the gate 2114 during multiplication and the —D signal blocks information passage during the "Forward" or "Reverse Conditional Skip" program instruction. Multiplication is indicated by the presence of the A, B and E signals, and "Conditional Skip" is indcated by the B and the D signals.

The gate 2115 receives the $t44\tfrac{3}{4}$ pulse and the BD and CB signals as inputs. This gate permits the $t44\tfrac{3}{4}$ pulse to become a unit subtrahend for each step of the control belt 130 (indicated by the CB signal) in the counting down operation during the four "Skip" program instructions. The presence of the BP signal indicates the count down operation during the four "Skip" program instructions.

The gate 2116 receives the $t44\tfrac{3}{4}$ pulse and the CR3 signal as inputs. This gate permits the $t44\tfrac{3}{4}$ pulse to become a unit addend once each minor cycle during the four "Skip" program instructions. The presence of the CR3 signal indicates the count up operation during the four "Skip" program instructions.

The gate 2117 receives the signal BE, AH, and EL as inputs. This gate permits the contents of the left-shift register as represented by the AH signal to pass through the adder-subtractor 122 via the operand funnel 121 during the "Enter Numbers via Keyboard into Memory Register" program instructions as indicated by the presence of the BE signal. The EL signal fixes the time of the transfer.

The gate 2118 receives the signals EL, —BE, and AB as inputs. This gate permits the contents of the accumulator register (indicated by the AB signal) to pass through the adder-subtractor 122 via the operand funnel 121 during the "Main Printer Print Operation," the "Auxiliary Printer Print Operation" or the "Paper Tape Output Operation" program instructions. The EL signal indicates the time of the transfer operation and the —BE signal prevents the occurrence of the transfer operation during an entry operation.

The gate 2122 receives the $t44\tfrac{3}{4}$ pulse, the SY3, and and —RS signals as inputs. This gate permits the $t44\tfrac{3}{4}$ pulse to become a unit subtrahend of each minor cycle during the "Memory Register Selection" program instructions. The presence of the SY3 signal indicates this instruction. The —RS signal deletes one of the subtractions during a disk revolution.

LXXVIII. ADDER-SUBTRACTOR 122
(FIGS. 42a AND 42b)

In performing arithmetic computations with computing machines, it is possible to use combinations of binary digits to represent binary coded decimal digits provided that the rules of binary arithmetic are followed. The apparatus performing the operations must test the binary coded representations for the particular combinations which require exceptions to the normal binary arithmetic operations so that the arithmetic operations can be modified.

Since the presence of a signal can represent a one and the absence of a signal can represent a zero, only two states of the signal need to be considered. A common method of representing the digits of a number is by the discrete time spacing of a plurality of electrical pulses derived from a series of constant frequency square waves. The period of a pulse will hereinafter be called a pulse time. The presence of a pulse at a particular pulse time represents a one and the absence of a pulse during a particular pulse time represents a zero.

In the computer and the adder-subtractor the operations proceeded from right to left; from the least significant binary digit to the most significant binary digit. Therefore, the pulse patterns representing the numbers will always progress, relative to time, from the least significant digit to the most significant digit of a number.

Unless otherwise indicated, when the term digit is hereinafter used in connection with the operations of the apparatus, the term will be understood to mean signals representing the specified digit.

This device comprises two basic functional parts that cooperate with each other to form a binary coded decimal adder-subtractor. The first, a binary adder-subtractor 90, and the second, a decimal corrector 91. The first part forms a binary sum or difference; the second part produces the required decimal correction.

The decimal corrector 91 comprises a testing and pulse generator 92, a binary eight adder 94, and a binary two adder-subtractor 96.

The testing and pulse generator 92 receives the arithmetic results of the binary adder-subtractor 90, and tests for and generates an interdigit carry or borrow pulse for digits of the resultant that are greater than nine. The binary eight adder 94 is fed by the binary adder-subtractor 90 and controlled by the generated pulse from the testing and pulse generator 92 to modify all digits greater than nine by the addition of binary eight. The binary two adder-subtractor 96 is coupled to receive all generated interdigit carry or borrow pulses and all modified arithmetic results to add binary two (on subtraction) or to subtract binary two (on addition) to or from all modified digits.

To simplify design, to reduce the number of components, and to expedite the operations of this invention, all required interdigit carries are generated and all interdigit carries produced by the addition of the correction are blocked. Thus, each sum or difference is scanned, and if it fulfills certain specific conditions, an interdigit carry is artificially generated and the correction factor is then added. However, all interdigit carries resulting from the addition of the correction factor are blocked. The correction factor of binary six on addition and binary ten on subtraction is effectively added in a single arithmetic unit.

LXXVIIIa. DETAILED DESCRIPTION

In the addition of two binary-coded decimal numbers the augend is inserted or fed into the adder-subtractor 90 through the input terminals AM and —AM, and the addend is fed into the adder-subtractor 90 through the input terminals AS and —AS. If, on the addition or subtraction of two binary-coded decimal numbers, the sum or difference is less than nine, no further corrections are required and the digit appears at the output terminal AN in a correct form. If, however, the resultant sum or difference is greater than nine, a decimal correction must be made to produce an answer in the correct form at the output terminal AN. In addition, the two bits that are to be added together are fed into the information input terminals AS, —AS, AM and —AM of the adder-subtractor 90. If the sum of the two bits is greater than nine, a carry bit is generated. The carry bit is then delayed one pulse time and fed into input terminals AT and —AT of the binary adder-subtractor 90 in time to be added in the sum of the next most significant two bits. In subtraction the process is essentially the same; however, a difference bit and a borrow bit are produced, the latter delayed and sent back as an input to the terminals AT and —AT.

This arithmetic device forms the sum or difference, and carry or borrow, in accordance with the following table:

| Augend or Minuend AM | Addend or Subtrahend AS | Delayed Carry or Borrow AT | Sum or Difference | Carry on —EX | Borrow on EX |
|---|---|---|---|---|---|
| 0 | 0 | 0 | 0 | 0 | 0 |
| 0 | 0 | 1 | 1 | 0 | 1 |
| 0 | 1 | 0 | 1 | 0 | 1 |
| 0 | 1 | 1 | 0 | 1 | 1 |
| 1 | 0 | 0 | 1 | 0 | 0 |
| 1 | 0 | 1 | 0 | 1 | 0 |
| 1 | 1 | 0 | 0 | 1 | 0 |
| 1 | 1 | 1 | 1 | 1 | 1 |

At each instant that a "1" (a positive potential pulse), appears on the AM, AS, or AT input terminals, a negative potential pulse appears on the —AM, —AS, or —AT input terminals respectively. The polarities are reversed for the representation of a "0."

The sum or difference of two binary-coded decimal numbers appearing at the AM and AS input terminals of the adder-subtractor 90 is formed by the three-input buffers 201, 202, 203 and 204. If any one of the three signals AM, AS and AT (Augend or Minuend, Addend or Subtrahend, and Carry or Borrow) is present, a pulse will pass through the gate 205. If all three input signals are present a pulse will also pass through the gate 205. Thus, if only two of the inputs are present at any particular instant, a pulse will not pass through the gate 205.

The binary carry or borrow is produced by the buffers 209, 210 and 211 which feed the associated gate 212.

When this device is utilized for addition, a signal having a positive polarity is fed from the —EX terminal of the control signal generator 246 to the buffer 210 and the gate 305, and a signal having a negative polarity is fed from the EX terminal of the control signal generator 246 to the buffer 211 and the gate 304.

The gate 212 produces a carry if there is a signal present on the input terminal AM and either of the terminals AS or AT. The presence of pulses on the input terminals AS and AT only produces a carry pulse through the gate 221. Therefore, on addition a carry pulse is produced if there is a pulse appearing on the input terminals AS and AT or the input terminals AM and AS or AT.

In the subtraction of two binary-coded decimal numbers, the polarities on the terminals EX and —EX of the control signal generator 246 are reversed from those potentials present during addition. Thus, during subtraction, the potential appearing at terminal EX is positive and the potential appearing at the terminal —EX is negative. Again, if pulses are present at the input terminals AS and AT; or AS, or AT but not at AM, a borrow pulse is generated.

The gate 212 operates to pass a borrow pulse only when no signal is present at the input terminal AM and a signal is present at either of the input terminals AS and AT. The presence of a signal (a positive potential pulse) at the input terminals AS and AT will produce a borrow (or carry) pulse through the gate 221.

The sum or difference signal is shaped in the reshaper 207 and the carry or borrow pulse is shaped in the reshaper 214. The carry pulse is delayed a signal pulse time and appears at the terminal AT in time to be added to the next most significant bits of the input binary-coded decimal numbers.

A decimal correction is required with both addition and subtraction whenever an output digit of the binary adder-subtractor 90 is greater than nine or has an associated carry into the next decimal digit. Furthermore, an interdigit carry must be produced whenever an output digit is greater than nine. Thus the presence of the carry bit is adequate indication of the requirement of a correction.

The test for a number greater than nine is made at the output of the binary added-subtractor 90 by the testing and pulse generator 92. By means of a timing pulse 4¾D that occurs in time with the most significant bit of each sum or difference digit, a test is made for a pulse in the most significant bit and either or both of the two previous or less significant bits. The two other bits are fed to the gate 216 from the one-half and one and one-half pulse time delay taps of the two and three-quarter pulse time delay line 230 through the buffer 228. When a digit is greater than nine a pulse goes through the gate 216 and is reshaped by the carry or borrow reshaper 214. The correction factor depends upon a pulse out of the carry or borrow reshaper 214 and is produced in the following manner: On addition, the correction factor that must be added is binary six, and on subtraction the correction factor that must be added is binary ten. All interdigit carries that result from the addition of binary six or binary ten must be blocked.

Therefore, on addition, binary six (0110) must be added to all binary sums that are greater than nine or have an associated carry into the next most significant digit; and on subtraction, binary ten (1010) must be added to all binary differences that are greater than nine or have an associated carry into the next most significant digit. However, since 6=8−2 and 10=8+2, it can readily be seen that binary eight (1000) can be added to all sums or differences that require corrections, and then binary two (0010) added on subtraction operations or binary two (0010) subtracted on addition operations.

The addition of binary eight (1000) is accomplished by inverting the most significant bit of the digit that requires correction. This addition of binary eight is performed by the buffer 222 and the gate 224 of the binary eight added 94. If there is a pulse out of the carry or borrow reshaper 214 at the pulse time $t4\frac{1}{4}$, the positive potential pulse appearing on the positive output terminal of the sum or difference reshaper 207 is blocked and negative potential pulse appearing on the negative output terminal is effectively passed through the gate 224. This method effectively adds binary eight (by inverting the most significant pulse of digits greater than nine) to the sum or difference, without generating carries. Thus it can be seen that binary eight can be added to any binary number (and blocking all carries) by simply inverting the most significant pulse of each digit. If the most significant pulse is a one, it is changed to a zero, and if the most significant pulse is a zero, it is changed to a one.

The addition or subtraction of binary two (0010) is performed after the inversion of the most significant pulse (adding binary eight) in order to complete the correction. The information that is to be corrected is delayed by means of a delay line 230. This delay is necessary to test for binary coded decimal digits that are greater than nine. The information is then fed to a binary two adder-subtractor 96 where the addition or subtraction of binary two (0010) is then performed. The addition or subtraction of binary two is performed at a reshaper 303 and three associated gates 304, 305 and 306. If the information that appears at the output of the reshaper 303 was initially less than ten it is fed directly to an output terminal AN without modification. If, however, the information that appears at the output of the reshaper 303 is partially corrected information of a binary digit that was initially greater than nine, a further correction must be made. A signal (carry or borrow) that appears at the output of the carry or borrow reshaper 214 at the pulse time $t4\frac{1}{4}$, is passed through the gate 224 by means of a timing pulse $4\frac{1}{4}$D and is then shaped and delayed in the reshaper 227 and the delay line 230 to provide a correction pulse for the addition or subtraction of binary two. The negative and positive output signals from the reshapers 303 and 309 are fed to two buffers 310 and 311. The output signal of the buffer 310 is not positive if there is a positive potential pulse present on the positive output terminals of the two reshapers 303 and 309. The outputs of the buffers 310 and 311 are fed to the input terminals of the gate 312. The gate 312 produces an output pulse only when there is a positive signal from one but not from both of the reshapers 303 and 309. It should be noted that during binary additions and subtractions the sum and difference bits are alike but the carry and borrow bits are different. A generated carry or borrow pulse that is gated by the timing pulse $4\frac{0}{4}$D passes through the reshaper 214 and is delayed a single pulse time by the combination of the reshapers 214 and 220, and the delay line 233 to produce the correct carry or borrow for addition to the next pulses. This generated carry or borrow pulse from the delay lint 233 is also fed into the gate 306 where it is gated by a $1\frac{1}{4}$D timing pulse to indicate the addition or subtraction of binary two.

On subtraction binary two is added. In this case there must be a carry into the next bit only when there is a correction pulse and an information pulse. On subtraction the signal appearing on the EX terminal of the control signal generator 246 has a positive potential and the signal appearing at the −EX terminal has a negative potential. The delayed correction pulse from the reshaper 214 is therefore gated through the gate 304 by the positive signal appearing on the terminal EX and the delayed information pulse to produce an add one into the next most significant bit. In subtraction it is possible to produce a carry out of the most significant pulse of the digit. However this is blocked by the timing pulse −$4\frac{1}{4}$D as applied to the gate 304.

During addition, the signals appearing on the EX and −EX terminals respectively have a negative and positive polarity. In addition binary two must be subtracted. There must be a borrow when there is a subtraction pulse and no information pulse. Therefore, the positive signal appearing on the −EX terminal gates the delayed negative output of the information reshaper with the delayed correction pulse. It is not possible to gate a carry out of the most significant bit of a digit on addition. This corrected information is then reshaped.

Referring to Fig. 42a, the output terminals of three buffers 209, 210, and 211 are connected, respectively, to three input terminals of a gate 212. One input terminal of a three input terminal reshaper 214 that passes a pulse C1 is connected to the output terminal of the gate 212; a second input terminal is connected to the output terminal of a gate 221; and a third input terminal is connected to the output terminal of a gate 216. Each of the buffers 209, 210 and 211, and the gate 221 has respectively a first and a second input terminal.

The output terminals of four buffers 201, 202, 203 and 204 are connected respectively to four input terminals of a gate 205. A fifth input terminal of the gate 205 is connected to receive a timing pulse N02. Each of the buffers 201, 202, 203 and 204 has respectively first, second and third input terminals.

The input terminal of a pulse amplifier 217 is coupled to the output terminal of the gate 205. The output of the pulse amplifier 217 is fed to the input terminal of a reshaper 207 that passes a pulse C1 and to one of three input terminals of a gate 216 that has three input terminals. A second input terminal of the gate 216 is connected to the output terminal of a buffer 228 and a third input terminal is connected to receive a timing pulse $4\frac{0}{4}$D. As stated previously, the output of the gate 216 is fed to one of the input terminals of the reshaper 214. A gate 223 that has three input terminals is coupled to receive as inputs, the potential appearing on the positive output terminal of the reshaper 207, a timing pulse N13, and the output of a buffer 222. The potential appearing on the negative output terminal of the reshaper 214, and a timing pulse −$4\frac{1}{4}$D are fed to the two input terminals of the buffer 222. The potential pulses appearing on the negative output terminal of the reshaper 207, the potential appearing on the positive output terminal of the reshaper 214, and two timing pulses $4\frac{1}{4}$D and N13 are fed into four inputs of a four input terminal gate 224. First and second input terminals of a reshaper 227 are connected to the output terminal of the gate 223 and the gate 224. The reshaper 227 passes the pulse C2. The output terminal of the reshaper 227 is connected to the input terminal of a 2¾ pulse delay line 230 that has sampling taps at one-half and one and one-half pulse delay positions.

A first and a second input of the buffer 228 are connected respectively to the one-half and one and one-half pulse delay taps. The positive output terminal of the reshaper 214 is connected to the input terminal of a one pulse delay line 233 having a tap at the one-half pulse delay position. The input terminal of a reshaper 220 that passes a pulse C0 is connected to the one-half pulse delay tap of the delay line 233. The output of the reshaper 220 is the time-delayed carry or borrow. The positive output terminal AT of the reshaper 220 is fed to one input terminal of the gate 221, and to one input terminal of the buffers 209, 202 and 201 respectively.

The negative output terminal —AT of the reshaper 220 is fed to one input terminal of the buffers 203 and 204 respectively.

The two and three-quarters pulse delay output terminal of the delay line 230 is connected to the input of an information reshaper 303 that represents the input information with a C2 timing pulse. The potential appearing on the positive output terminal of the reshaper 303 is fed to one input terminal of a two input terminal buffer 311, and is also fed to the input terminal of a three-quarter pulse delay line 326. The potential appearing on the negative output terminal of the reshaper 303 is connected to one of two input terminals of a buffer 310. The output terminal of the delay line 326 is connected to the input terminal of a pulse amplifier 322. The potential appearing on the positive output terminal of the pulse amplifier 322 is fed to one of five input terminals of a gate 304, and the potential appearing on the negative output terminal of the pulse amplifier 322 is fed to one of four input terminals of a gate 305. Second and third input terminals of the gate 304 are fed respectively by the timing pulses N1 and —4¼D; the fourth input terminal is connected to the EX terminal of the control signal generator 246; and the last input terminal is connected to the output terminal of a three-quarter pulse delay line 325. One input terminal of the gate 305 is connected to the —EX terminal of the control signal generator 246; another input terminal is fed by the timing pulse N1; and the last input terminal is connected to the output terminal of the three-quarter pulse delay line 325. One input terminal of a two input gate 306 is connected to the one pulse delay output terminal of the delay line 233; the other input terminal is connected to receive the timing pulse 1¼D. A reshaper 309 has three input terminals which are connected respectively to the output terminals of the gates 304, 305 and 306, and passes the timing pulse C2. The potential appearing on the positive output terminal of the reshaper 309 is fed to one of the input terminals of the buffer 311 and to the input terminal of the three-quarter pulse delay line 325. The output terminal of the delay line 325 is coupled to an input terminal of the gates 304 and 305. The potential appearing on the negative output terminal of the reshaper 309 is fed to an input terminal of the buffer 310. The output terminals of the buffers 310 and 311 are connected to two of the three input terminals of a gate 312. The timing pulse N02 is fed into the third input terminal of the gate 312. The input terminal of a reshaper 316 is connected to the output terminal of the gate 312 and passes the timing pulse C3 to the output terminal AN.

To more fully describe the operation of the apparatus, a problem in addition as performed by the adder-subtractor 122 will be described in detail wherein the number 195 will be added to the number 289. The augend (289) is fed into the AM input terminals and the addend (195) is fed into the AS input terminals in the form of binary coded decimal numbers. The least significant bit of the least significant digit of each of the binary coded decimal numbers appears first in time. Thus, it can be said that the binary coded decimal numbers are fed into the arithmetic device "backwards" and, reading left to right, appear to the apparatus as follows:

```
1001   0001   0100
1010   1001   1000
``` where the top row of pulses are fed into the input terminals AM and —AM in the order shown from left to right. At each instant that a "1" appears in the upper row, a positive potential appears at the AM terminals and a negative potential appears at the —AM terminals. The polarities are reversed in the representation of a "0." The conditions are similar for the second row relative to the AS and —AS terminals.

The carry pulse appears at the output terminals AT and —AT of the reshaper 220. The pulse appearing on the positive output terminal AT of the reshaper 220 is fed into the input buffers 201, 202 and 209 and the gate 221 and appears as a positive potential when a carry or borrow bit is present. The pulse appearing on the negative output terminal —AT of the reshaper 220 is fed into the buffers 203 and 204 and appears as a negative potential when a carry or borrow pulse is present. The carry or borrow bits appear in synchronism with the next most significant pulse.

When performing the arithmetic operation of addition, the control signal generator 246 generates a positive potential on the terminal —EX, and a negative potential on the terminal EX. During subtraction the potential polarities on these terminals are reversed. Therefore, on the addition of the number 195 to the number 289, the terminal EX will be impressed with a negative potential and the terminal —EX will be impressed with a positive potential. Thus, the buffer 210 continuously passes a positive potential or signal. Since, on addition, the potential on the EX terminal is negative, the presence of a positive signal at the output terminal of the buffer 211 is dependent upon the polarity of the signal fed to the AM input terminal.

In the addition of the number 195 to the number 289, the numbers are fed into their respective inputs in binary coded decimal form, the least significant pulse of the least significant digit appearing first in time.

Referring to Fig. 42b, a graph of the timing pulses C0, C1, C2, C3, 1¼D, 4⅔D, 4¼D, N1, N02, and N13 are included for convenience with the signal waveforms. The pulse time $t1$ indicates the commencement of the time period allotted to the first bit or pulse and $t2$ indicates the commencement of the time period allotted to the second bit or pulse. Thus, $t9$ indicates the commencement of the time period allotted to the ninth bit or pulse.

The order of the input signals with respect to pulse time is indicated by the waveforms AM and AS.

"A" indicates the waveforms appearing at the output of the gate 205.

"B" indicates the waveforms appearing at the output of the gate 212.

"C" indicates the waveforms appearing at the output of the positive output terminal of the reshaper 214.

"D" indicates the waveforms appearing at the positive output terminal of the reshaper 227.

"E" indicates the positive potential pulses appearing at the output of the buffer 228.

"F" indicates the positive potential pulses appearing at the positive terminal of the reshaper 220.

"G" indicates the positive potential pulses appearing at the input to the reshaper 303.

"H" indicates the positive potential pulses appearing at the one pulse delay output of the delay line 233.

"I" indicates the positive potential pulses appearing at the output of the gate 306.

"J" indicates the positive potential pulses appearing at the negative output of the pulse amplifier 322.

"K" indicates the positive potential pulses appearing at the positive output terminal of the reshaper 309.

"L" indicates the positive potential pulses appearing at the positive output terminal of the reshaper 303.

"M" indicates the positive potential pulses appearing at the output of the buffer 311.

"N" indicates the positive potential pulses appearing at the negative output terminal of the reshaper 303.

"O" indicates the positive potential pulses appearing at the output of the buffer 310.

"P" indicates the positive potential pulses appearing at the negative output terminal of the reshaper 309.

AN indicates the binary coded decimal sum of the two inputs as it appears at the terminal AN.

At pulse time $t1$, as indicated by the graphs AM and AS, a pulse is applied to the AM input terminal and to the AS input terminal. The presence of pulses on the AM and AS input terminals; and the absence of a carry pulse from the reshaper 220 makes the buffer 202 inoperative. Thus the gate 205 is inoperative as all of the input terminals are not simultaneously at a positive potential. This is indicated by curve A at time $t1$. However, a pulse is passed by the gate 212 as indicated by the curve B. The gate 221 also operates to pass a pulse. The output pulse from the gates 212 and 221 arrive simultaneously at the input of the reshaper 214 and appear at the positive output terminal as a single positive potential pulse that is delayed one quarter of a pulse time, and indicated by curve C. This one quarter delayed carry pulse is fed to the gate 224 where it is blocked by the absence of the timing pulse 4¼D. It is also fed to the delay line 233, where it is delayed one half of a pulse time, and then fed to the reshaper 220 where it is shaped and delayed another one quarter of a pulse time to arrive at the positive output terminal AT of the reshaper 220 at time $t2$, the time of the arrival of the second pulse.

At pulse time $t2$, there is a positive potential pulse at the −AM, −AS and AT input terminals. Therefore gate 205 passes a pulse at time $t2$, and the gate 212 is inoperative. The output of gate 205 is fed through the pulse amplifier 217 to the gate 216 where it is blocked by the absence of a pulse on each of the other two inputs, and it is also fed to the gate 223 after being shaped and delayed one quarter of a pulse time by the reshaper 207. Since there is a positive potential on the negative output terminal of the reshaper 214, and a timing pulse N13 is present, a pulse passes through the gate 223 to the reshaper 227 where it is shaped and delayed. The pulse appears at the output terminal of the reshaper 227 one half of a pulse time after time $t2$ as indicated by curve D and is then fed into the delay line 230. From the one half and one and one half pulse delay taps of the delay line 230, this pulse is fed to the input terminals of the gate 216 through the buffer 228 at pulse time $t3$ and $t4$. This pulse is also fed to the input terminal of the reshaper 303 at pulse time $t5¼$ as indicated by curve G.

At pulse time $t3$ there are positive potentials on the AS, −AM and −AT input terminals. The gate 205 operates, and passes a positive pulse as indicated by the curve A. The gate 212 is inoperative. The output of gate 205 is fed through the pulse amplifier 217 to the gate 216 where it is inhibited by the absence of a positive timing pulse 4%D. The output of gate 205 is also fed through the pulse amplifier 217 to the reshaper 207; through the reshaper 207 to the gate 223; and through the gate 223 to the reshaper 227 from which it emerges one-half of a pulse time after being fed into the reshaper 207 as indicated by curve D. This pulse is fed to the delay line 230 and is then fed through the one half and one and one half pulse delay taps of the delay line 230, and the buffer 228 to one of the inputs of the gate 216 at the pulse times $t4$ and $t5$. This pulse is also fed from the two and three quarter pulse delay output terminal of the delay line 230 to the input terminal of the reshaper 303 at pulse time $t6½$ as indicated by curve D.

At pulse time $t4$ there are positive potentials on the input terminals AM, −AS, and −AT. The gate 205 operates to pass a positive potential pulse as indicated by curve A. The gates 212 and 221 are inoperative. The pulse from the gate 205 is fed through the pulse amplifier 217 to the input terminal of the reshaper 207, and an input terminal of the gate 216. As shown by the curves 4%D and E, at time $t4$ there is a positive potential pulse on each of the three inputs of the gate 216 and a pulse is allowed to pass through the gate 216 to the reshaper 214. Thus at time $t4$ the pulse from the gate 216 is fed to the reshaper 214 where it is shaped and delayed one quarter of a pulse time as indicated by curve C. The output of gate 205 was also fed to the reshaper 207 where it was shaped and appeared at the positive output terminal one quarter of a pulse time later. At time $t4¼$, timing pulse −4¼D is negative and there is a negative potential on the negative output terminal of the reshaper 214. Therefore, the buffer 222 is inoperative and the gate 223 is inoperative thus inhibiting the positive potential pulse appearing on the positive output terminal of the reshaper 207. Also, at time $t4¼$, the negative output terminal of the reshaper 207 has a negative potential. Thus the gate 224 is inoperative and inhibits the passage of the positive potential pulse from the reshaper 214.

The output of the reshaper 214 is fed to the input terminal of the delay line 233 and then to the reshaper 220 where the pulse appears as a positive potential on the positive output terminal AT as indicated by the curve AT. Thus, it has been shown how, at pulse time $t4$, the gate 216 tested the number for the presence of a pulse in the most significant position and in either or both of the next two least significant positions. The satisfaction of this condition indicates the presence of a number greater than nine and, having found that the number was greater than nine, a carry was generated. The addition of binary eight, the inversion of the pulse occupying the most significant position of the digit is also required for numbers that are greater than nine. This addition is performed by the buffer 222 and the gate 224.

The operation of addition continues with the remaining pulses in an orderly manner similar to that described above and as illustrated by the curves of Fig. 42b.

The positive potential output pulses of the delay line 230, for the twelve pulses of input information are illustrated by the curve G. The intradigit carry pulses and the interdigit carry pulses are shown by the curve H.

The subtraction of binary two will now be illustrated. The pulses appearing on the two and three quarter pulse delay output terminal of the delay line 230 are fed to the input terminal of the reshaper 303 where they are shaped and delayed one quarter of a pulse time. The positive potential pulses appearing on the positive output terminal of the reshaper 303 are illustrated by the curve L. Positive potential pulses appearing on the negative output terminal of the reshaper 303 occur when the potential at the positive output terminal is not positive and is illustrated by the curve N.

The positive potential pulses appearing on the positive output terminal of the reshaper 303 are fed to one of the inputs of the two input buffers 311. The positive potential pulses are also fed to the input terminal of a delay line 326 where the pulses are delayed three quarters of a pulse time and then fed to the input terminal of a pulse amplifier 322.

On addition the potential appearing on the EX terminal of the control unit 246 is negative, thus the gate 304 is not operative. The potentials appearing on the negative output terminal of the pulse amplifier 322 are of opposite polarity and delayed three quarters of a pulse time relative the pulses appearing on the positive output terminal of the reshaper 303. This condition is illustrated by the curve J.

At the pulse time $t1¼$, the timing pulse 1¼D is positive, but the potential appearing on the output terminal of the delay line 233 is not positive (as shown by curve H), thus the gate 306 is inoperative.

At the time $t5¼$, the timing pulse 1¼D is again positive, and the output of the delay line 233 is also positive, thus a positive pulse passes through the gate 306 as illustrated by curve I. The positive output pulse of the gate 306 is fed to the reshaper 309 where it is delayed one quarter of a pulse and reshaped.

The potential appearing on the positive output terminal of the reshaper 309 is represented by the curve K. This positive pulse is first fed to the reshaper 309 where it is shaped and delayed one quarter of a pulse time, and then fed to one of the inputs of the buffer 311. The positive pulse from the reshaper 309 is also fed to the input terminal of the delay line 325 where it is delayed three quarters of a pulse time. The output of the delay line 325 is fed to an input terminal of the gate 305 at pulse time t6¼. At pulse time t6¼, the output potential on the negative output terminal of the pulse amplifier 322 is not positive and the gate 305 is inoperative.

At time t9¼, the timing pulse 1¼D is positive, and the output of the delay line 233 is positive. Thus the gate 306 becomes operative and a positive potential pulse is fed from the gate 306 to the reshaper 309 where it is shaped and delayed one quarter of a pulse time. The positive potential pulse present at the output terminal of the gate 306 at pulse time t9¼ is indicated by curve I; and the positive potential pulse present at the positive potential output terminal of the reshaper 309 at pulse time t9½ as illustrated by curve K.

The positive potential appearing on the positive output terminal of the reshaper 309 at pulse time t9½ is fed through the delay line 325 to one of the input terminals of the gate 305 at pulse time t10¼. At pulse time t10¼, the potential appearing on the negative output terminal of the pulse reshaper 322 is negative, thus the gate 305 is inoperative.

At pulse time t10¼ the potential appearing on the output terminal of the delay line 233 is positive, however, the gate 306 is inoperative.

The potential appearing on the negative output terminal of the reshaper 309 is opposite in polarity of the potential appearing on the positive output terminal, and is indicated by the curve P.

At each instant that a positive potential pulse appears on one of the input terminals of the buffer 311, a positive potential pulse appears at the output terminal of the buffer. Therefore, by combining the positive potential pulses from the positive output terminal of the reshaper 303, and from the positive output terminal of the reshaper 309, a plurality of positive potential pulses appear at the output terminal of the buffer 311 at pulse times t5½, t6½, t9½, t11½, and t14½ and is illustrated by curve M.

The positive potential pulses appearing at the output terminal of the buffer 310 is a combination of the positive potential pulses appearing on the negative output terminal of the reshaper 303 and on the negative output terminal of the reshaper 309. Thus, there is a positive potential on the output terminal of the gate 310 at all times except at time t5½ and t9½. The plot of the positive potential appearing on the output terminal of the buffer 310 is illustrated by curve O.

A positive potential pulse will pass through the gate 312 at each instant that a positive potential pulse appears simultaneously on the input terminals of the buffer 312 as fed from the output terminal of the buffer 310, the output terminal of the buffer 311, and by the timing pulse N02.

Therefore, at pulse times t6½, t11½, and t14½ a positive potential pulse appears at the output terminal of the buffer 312. The positive potential output pulses of the buffer 312 are fed to the input terminal reshaper 316 where they are shaped and delayed one quarter of a pulse time and appear at the output terminal AN at the pulse times t4¾ through t16¾.

Thus, the pulses appearing on the output terminal AN appear as follows:

0010  0001  0010=484 wherein the presence of a positive pulse is indicated by a "1."

It should be noted that the first bit of information appears at the output terminal AN 3¾ pulse times after the insertion of the first bit into the arithmetic device.

The addition of negative numbers to positive numbers or to each other may be performed in the same manner as the addition of positive numbers. The digits of negative numbers, however, are complemented before any arithmetic operation is started and a negative sign (a pulse in the sign position) follows the most significant pulse position.

The EX signal generator 246 comprises the D.C. amplifier 321, the buffers 317 and 330 and the gates 328 and 329. The positive output terminal of the D.C. amplifier 321 generates the EX signal and the negative output terminal of the D.C. amplifier 321 generates the —EX signal when a positive signal is received at its input terminal. The input terminal of the D.C. amplifier 321 is coupled to the output terminal of the buffer 317.

The buffer 317 has three input terminals. The first input terminal is coupled to the output terminal of the gate 329. The second input terminal is coupled to the BP signal line from the arithmetic control 116. The third input terminal is coupled to the output terminal of the gate 328.

The gate 329 operates during input and output operations. A positive signal will be fed from this gate whenever the number being handled is negative. The CH signal feeding one input terminal of the gate 329 is received from the enter and index control 143 to indicate that the number being handled is negative.

The —SB signal from the scan control 124 is coupled to the second input terminal of the gate 329. A positive signal will be fed through the gate 329 only when the possible arithmetic portion of an input-output operation is not in progress.

The BP signal feeding the second input terminal of the buffer 317 causes the setting of the D.C. amplifier 321 during the counting down portion of the "Skip" program instructions. The gate 328 operates during arithmetic program instructions that actually call for a subtraction. For example, "the subtract the contents of a memory register from the accumulator" program instruction. The SB signal feeding one of the input terminals of the gate 328 restricts the activation of the gate to the purely arithmetic portion of a program instruction. The C signal from the control belt 130 which feeds an input terminal of the buffer 330 is characteristic of all the program instructions calling for subtraction.

The Y signal from the control belt 130 feeding a second input terminal of the buffer 330 permits subtractions to occur during the counting down portion of the memory register selection program instructions.

LXXIX. SCAN CONTROL 124 (FIG. 43)

The scan control 124 controls the availability of the memory registers. The signals fed from the scan control 124 are: the RA and —RA signals; the SB, —SB, and SBD signals; the AF signal; the SD and —SD signals; and the SE, SED, and —SED signals.

The RA and —RA signals select one of the pair of fifty memory registers. The SB, —SB, and SBD signals make the fifty memory registers selected by the RA and —RA signals available to the arithmetic circuits of the computer. The AF signal is dependent on the SB signal and controls the flow of information into the memory registers. The SD and —SD signals indicate when a particular memory register within a group of fifty memory registers is available. The SE, SED and —SED signals terminate the availability period of the memory registers and indicates generally the arithmetic operations as completed.

The RA and —RA signals fed to the memory in-out control 111 are generated by the set dominant flip flop 2437 which, when set, permits access to the second fifty memory registers and, when not set, permits access to the first fifty memory registers.

The set dominant flip flop 2437 is usually set via the input terminal coupled to the gate 2434. The CB signal which is generated by the cycle generators 131 at the start of every program instruction cooperates with a Z signal from the control belt 130 to pass a set signal through the gate 2434. The Z signal indicates that the memory registers to be used in the program instruction are among the second fifty memory registers.

During the "Memory Register Selection" program instructions (characterized by the presence of the Y signal) a memory register from the second group of fifty memory register may be selected. Since the Z signal will not be fed from the control belt 130, an alternate means of setting the flip flop must be available. This is accomplished by the gate 2435 when the EB signal (a signal occurring once during each magnetic disk revolution) is fed from the timer 160 to cooperate with the Y and SBD signals to set the set dominant flip flop 2437 for the next program instruction. This permits access to a memory register from the second fifty memory registers.

The set dominant flip flop 2437 is reset at the end of a program instruction by a —SED signal fed via the buffer 2439 to the reset terminal. However, at the end of a "Memory Selection" program instruction it is necessary for the state of the set dominant flip flop 2437 to remain unchanged. Therefore, the Y signal is also fed to the buffer 2439 to override the effect of the —SED signal during this program instruction.

The SB and —SB signals are generated by the reset dominant flip flop 2420. The set terminal of the flip flop 2420 is coupled to the output terminal of the gate 2417. The cooperation of the SA signal generated by the arithmetic control 116, and the EB signal from the timer 160 (occurring once each magnetic disk revolution to indicate the first position of the first memory register) cause the setting of the flip flop. The setting is synchronized to occur when the first memory register is available. During the enter program instructions the generation of the SB signal is delayed by the presence of the —BE signal at an input terminal of the gate 2417. The —BP signal fed to the gate 2417 prevents possible setting of the flip flop during the counting down portion of the "Skip" program instructions. Thus, the gate 2417 receives, as inputs, the N13 pulse, and the SA, —BE, BE, and —BP signals.

The reset dominant flip flop 2420 has a normal reset terminal coupled to the negative output terminal of the pulse amplifier 2411. During multiplication a reset is required immediately after the location of the memory register containing the multiplier and is accomplished when the —BQ signal is fed to a second reset terminal immediately after location of the multiplier.

The buffer 2470 receives, as inputs, the —BP and —t41¼ signals. The output terminal of the buffer 2470 is coupled to feed a signal to a third reset terminal of the reset dominant flip flop 2470 at the start of the counting down portion of the "Skip" program instructions.

The SBD signal is produced by delaying the SB signal three quarters of a pulse time in the delay line 2432. This signal is used when a slightly different timing is required.

The AF signal generated by the gate 1134 is known at the write enable signal. The AF signal is fed to the memory in-out control 111 to permit recording in the memory registers. One input terminal of the gate 1134 is coupled to receive the SBD signal to restrict access to the memory registers for recording to the scan cycles. The second input terminal of the gate 1134 is coupled to the output terminal of the buffer 1140. The presence of the timing signals t41¼ and t43¾ at two of the input terminals of the buffer 1140 provide access to the memory registers for erasing any marks recorded in the switching blank portions of the memory registers. The marks are recorded during the "Memory Register Selection" program instruction. The third input terminal of the buffer 1140 is coupled to the output terminal of the gate 1131. The gate 1131 receives, as inputs, the A and —D signals through the buffer 1130 and the —B signal. These signals restrict entry access to the memory registers during certain of the arithmetic program instructions.

The SD and —SD signals are generated by the set dominant flip flop 2424 whose set terminals is coupled to the output terminal of the gate 2421. During program instructions other than the "Memory Selection" program instructions (indicated by the absence of the —Y signal) the flip flop 2424 is set during a scan cycle (SB signal) by a positive signal from the pulse amplifier 2445. The t44¾ signal fed to the gate 2421 ensures the setting of the set dominant flip flop 2424 at a precise time. The —t44¼ signal fed to the reset terminal of the flip flop 2424 ensures that the reset is performed at a precise time. The duration of the set time of the flip flop is one minor cycle or the period of time required to gate the contents of a complete memory register past a point in the computer. Thus, the gate 2421 receives, as inputs, the SB, t44¾, —Y, and RS signals. The RS signal appears at the positive output terminal of the pulse amplifier 2445.

The buffer 2444 which feeds the pulse amplifier 2445 has two input sources, the output signals from the gates 2443 and 2446. The gate 2443 receives, as inputs, the t44¾ and R pin signals. The R pin signal is transmitted from the register zone 139 of the control belt 130. It should be noted that the R pin signals indicate which of the memory registers is to be used during a program instruction. The gate 2446 receives, as inputs, the t43¾, —Y and the YORD signals. The YORD signals are transmitted from the memory in-out control 111 and are the marks in the switching blank portions of the contents of the memory register. The —Y signal prevents sampling during the "Memory Register Selection" program instructions.

The pulse amplifier 2411 generates the SE and —SE signals. The SE signal is delayed three quarters of a pulse time by the delay line 2426 and is fed to the pulse amplifier 2416 which generates the SED and —SED signals. These four signals generally terminate a program instruction. In particular, the SED signal is fed to the cycle generators 131 to initiate the movement of the control belt 130 to the next program instruction.

The pulse amplifier 2411 is fed by the buffer 2410 which has six input terminals coupled respectively to the output terminals of the gates 2401, 2404, 2406, 2407, 2408 and 2435.

The gate 2401 receives, as inputs, the —AB signal, delayed 0⅜ and 0⅝ of a pulse time by the delay line 2425, and the BA, B, and D signals. The gate 2404 receives, as inputs, the BE, MH, and t4¼ signals. The gate 2406 receives, as inputs, the BP, —BC, and t44¼ signals. The gate 2407 receives, as inputs, the —Y, EB, and SBD signals. The gate 2408 receives, as inputs, the —BQ, BU, and t41¼ signals. The gate 2435 receives, as inputs, the AN, Y, and t44¾ signals.

For most program instructions the gate 2407 passes an EB pulse from the timer 160 to terminate the operations. The —Y signal at an input terminal of the gate 2407 prevents this termination during the "Memory Register Selection" program instructions, however, at this instant the gate 2435 operates. The AN signal from the adder-subtractor 122 permits passage of a t44¾ pulse when the unit subtractions are completed.

The gate 2401 operates during the "Conditional Skip" program instructions. The —AB signal from the accumulator register in-out control 113 indicates whether the contents of the accumulator register are zero or not. If they are not zero, then the —AB signal is positive and a pulse is fed to the pulse amplifier 2411 to end the scan cycle immediately.

The gate 2404 passes a t4¼ pulse signal that bypasses the computation portion of an "Entry" program instruction (i.e., the BE signal) when the negative end entry motor bar (MH) is depressed by the operator.

The gate 2406 provides a t44¼ pulse signal when the count during the counting down operation reaches zero (indicated by the absences of —BC signal from the arithmetic control 116) during the counting down portion of the "Skip" program instructions (indicated by the BP signal from the arithmetic control 116).

The gate 2408 passes a *t*44¼ pulse signal at the end of "Multiplication" program instructions as indicated by the absences of the —BQ signal and the presences of the BU signal from the arithmetic control 116.

The reset dominant flip flop 2418 generates the BE and —BE signals, respectively, at its positive and negative output terminals. The —*t*41¼ and —EL signals through the buffer 2417, and the —CP and —SED signals are fed to reset terminals of the flip flop 2418. The set terminal of this flip flop is coupled to the output terminal of the gate 2414. The gate 2414 receives, as inputs, the C and —D signals through the buffer 2441, and the A, —B, E, and BA signals. The BA signal appears at the output terminal of the gate 24112.

The gate 24112 receives, as inputs, the —N, —P, —MJ, CB, and *t*41¼ signals. The output terminal of the gate 24112 is coupled to the set terminal of the reset dominant flip flop 2444. The —CP and —SED signals are fed to reset terminals of the flip flop 2444. The SA and —SA signals appear respectively at the positive and negative output terminals of the reset dominant flip flop 2444.

LXXX. CONTROL BELT 130 (FIGS. 2 AND 44)

The control belt 130 is shown in the figures in a modified symbolic form. Fig. 44*a* shows the portion of the plastic belt 170 that is stepped by the sprocket pins 176 cooperating with the sprocket holes 3004. The sprocket pins 176 can be the teeth of a sprocket wheel that is coupled to the motor 129 through the shaft 178.

The plastic belt 170 has a plurality of apertures or holes arranged in rows. One such row of holes 172 is shown. Each row of holes is divided into four zones. Each row of holes is divided into four zones. The first five holes 172*a*–172*e* are in the arithmetic zone 139 and are detected by pin feelers. The next two holes 172*f* and 172*g* are associated with the belt zone 137 and are detected by pin feelers. The next fifty holes 172–1 to 172–50 in an opaque portion of the plastic belt 170 are in the register zone 138 and are sensed optically. The remaining holes 172*h* to 172*z* are associated with the input-output zone 140 and are detected by pin feelers.

The arithmetic zone 139 generates signals that control arithmetic operations in the computer.

The belt zone 137 generates signals that control express movements of the control belt 130.

The register zone 138 generates signals indicating the location of memory registers.

The input-ouput zone 140 generates signals that control the input and output operations of the computer.

In any particular row various combinations of the pin feeler holes and the optically scanned holes will be present as determined by the type of program instructions called for. The holes sensed by the pin feelers generate the control signals and those that are optically scanned indicate the memory register selection.

Fig. 44*b* illustrates a pin feeler sensing mechanism. There is one such mechanism associated with each pin sensed hole. Each mechanism is identical and all mechanisms operate simultaneously. The pin feeler mechanism associated with the hole 172*c* is shown comprising the cam follower 3008*c*, the pin feeler 3010*c*, the feeler guide 3011*c*, the shorting bar 3012*c*, the contacts 3016*c* and 3018*c*, the resistor 3020*c*, the sorting bar 3014*c*, the contacts 3022*c* and 3024*c* and the resistor 3026*c*.

The shorting bars 3012*c* and 3014*c* are electrically insulated from the pin feeler 3010*c* and from each other. When the hole 172*c* is not being sensed, the shorting bars 3012*c* and 3014*c* are in a withdrawn position and do not short the contacts. When the presence of the hole 172*c* is to be sensed, the cam follower 3008*c* permits the pin feeler 3010*c* to move down. If the actual hole is present, the pin feeler 3010*c* drops into a hole 172*c* causing the shorting bar 3012*c* to close a circuit between the contact 3016*c* and the contact 3018*c* and a positive potential is fed to the C signal line. At the same time the shorting bar 3014*c* closes a circuit between the contacts 3022*c* and 3024*c* and a negative voltage is present on the —C line.

If the hole 172*c* is not present then the pin feeler 3010*c* does not move. No connection is made between the contact 3016*c* and the contact 3018*c* by the shorting bar 3012*c* and a negative potential is present on the C signal line. Similarly the shorting bar 3014*c* does not close the circuit between the contacts 3022*c* and 3024*c* and a positive potential is present on the —C signal line. When the sensing operation is terminated, the cam 3050*c* forces the cam follower 3008*c* up. Thus the pin feeler 3010*c* is withdrawn from a hole of the plastic belt 170 and the belt can be stepped to a new position. The presence or absence of the hole 172*c* determines the magnitude and polarities of the potentials on the C and —C signal lines.

The holes 172–1 to 172–50 associated with the register zone 138 are sensed in a serial manner by photoelectric techniques. Fig. 2 shows symbolically the method of scanning. The plastic belt 170 is interposed between a light source 182 and the apertured cylinder 194. A plurality of holes 199 is described by a helix on the surface of the apertured cylinder 194. A photoelectric cell 196 is positioned within the apertured cylinder 194. The cylinder is secured rigidly to the shaft 192 which is coupled to and rotates in synchronism with the disk 184.

When a hole 199 of the apertured cylinder 194 is opposite a hole such as 172–25 located in the plastic belt 170, energy from the light source 182 will pass through a hole of the apertured cylinder 194 and will be detected by the photoelectric cell 196. The photoelectric cell 196 will generate a signal which will be fed via the R pin signal line to the scan control 124 to indicate the location of a memory register. Since each line of the belt can accommodate fifty optically sensed holes in the register zones 138 it is possible to select one of the fifty memory registers associated with a channel of the magnetic disk 165 in one rotation of the disk 184.

LXXXI. CYCLE GENERATORS 131 (FIG. 45)

The cycle generators 131 are a plurality of control circuits which initiate, sequence and terminal the overall cycles of the computer. The cycle generators 131 comprise the control cycle generator 131*a*, the stepping cycle generator 131*b*, the print cycle generator 131*c*, and the end print cycle generator 131*d*. The end print cycle generator 131*d* includes two switches which are actually part of the main printer 154 and the auxiliary printer 155; however, they are included with the cycle generators 131 to simplify this disclosure.

The control cycle generator 131*a* steps the computer through a complete program instruction cycle. The gate 3114 receives, as inputs, the —EL and SED signals. The SED signal from the scan control 124 generates a CA signal by setting the reset dominant flip flop 3116. The —EL signal prevents an SED signal from generating a CA signal during the transfer portions of both the input (entry) and output (printer punch) operations indicated by the presence of the —EL signal. The CA signal is also generated when the DE signal from the program selector 133 is fed through the buffer 3115. This condition occurs during a manual initiate. The buffer 3115 receives, as inputs, the output signals from the gate 3114 and 3113 and the DE, AG, BN and CM signals. At the end of an indexing portion of a print-out instruction, the AG signal from the enter and index control 143 is present. During the skip program instructions the BN signal from the arithmetic control 116 is present. The gate 3113 receives, as inputs, the MG and MH signals through the buffer 3101, the *t*44¾ pulse, and the CB signal. When express movements of the control belt 130 are being performed as characterized by the presence of either the MG or the MH signals and the CB signals, the *t*44¾ pulses pass through the gate 3113 to the buffer 3115 to generate the CA signal.

The gate 3119 receives, as inputs, the output signal from the buffer 3123, the t44⅔ pulse, and the CA, EW, —FQ, —GL, and DP signals. The CA signal gates a t44⅔ pulse through the gate 3119 provided certain interlocking conditions are satisfied by the signals that are fed to the remaining input terminals of the gate 3119. One of the input terminals of the gate 3119 is coupled to the output terminal of the gate 3118. The gate 3118 receives, as inputs, the EWT, EWR, EWP, and NE signals. When the paper tape is threaded properly, the EWT, EWR, and DWP signals from the paper tape input-output 145 are present. When the auxiliary printer's long feed interlock switch is in a closed position, the NE signal is also present. The simultaneous presence of each of the four input signals permits a positive signal (DW) to be fed from the gate 3118. The —FQ signal from the carriage control 152 prevents any operations while the carriage of the main printer 154 is moving. The DP signal from the enter and index control 143 permits the gating to occur when the entry and index interlocks are in their rest position. The —GL signal from the carriage control 152 prevents gating during movement of the carriage of the auxiliary printer 155. The input terminal of the gate 3119 that is connected to the output terminal of the buffer 3123 prevents gating during a print cycle (characterized by the —DZ signal) when the new program instruction involves any auxiliary carriage movement or any line feed operations of the carriage of the main printer 154 or the auxiliary printer 155. The —N, —H, —M, and the —P signals are feed to the input terminals of the gate 3122 from the control belt 130 to determine these conditions. The output signal from the gate 3122, and the —DZ signals are fed to the input terminals of the buffer 3123. The buffer 3120, the pulse amplifier 3121, and the single input gate 3170 comprise a pulse extender which permits the generation of a wide pulse (about three times the normal width) when a pulse is fed to its input terminal. The output terminal of the gate 3119 is fed to an input terminal of the buffer 3120. The pulse amplifier 3121 generates the CE and —CE signals. The trailing edge of the CE signal is fed into the resets the reset dominant flip flop 3116 while the trailing edge of the —CE signal that is fed to the set terminal of the flip flop 31118 generates the CQ and —CQ signals. The —t41¼ pulse and the CP and —CB signals are fed through the buffer 31115 to the reset terminal of the flip flop 31118. The CQ signal is fed to the stepping cycle generator 131b to cause the generation of the stepping signal waveforms which step the control belt 130.

The gate 31100 receives, as inputs, the —DO and —OD signals through the buffer 31130, the DO and OD signals through the buffer 31131, the t3¾ pulse, and the CQ, CSD, —YA, and —YB signals. When the control belt 130 has been properly stepped as determined by the state of the signals fed to the buffers 31130 and 31131, the coincidence of a CSD signal from the arithmetic control 116, and the absence of a —YA and —YB signal from the stepping cycle generator 131b, a t3¾ pulse passes through the gate 31100 to a set terminal of the set dominant flip flop 3113. A second set terminal of the flip flop 31113 is coupled to the output terminal of the gate 31109 to provide manual setting of the flip flop 31113 for test operations. The gate 31109 receives, as inputs, the t3¾ pulse and the CQ, MZ, and MY signals. The MY and MZ signals are received from the manual switches on the keyboard 142. The third input terminal of the flip flop 3113 is coupled to an output terminal of the gate 31110 to provide manual setting of the flip flop 31113 during a second type of test operation. The gate 31110 receives, as inputs, the t3¾ pulse and the CQ and MX signals. The set dominant flip flop 3113 generates the CB and —CB signals. The generation of the CB signal is usually considered the start of a program instruction. The reset terminal of the flip flop 31113 is coupled to receive the —t3¾ and the N02 pulses through the buffer 31125.

The —CB signal resets the flip flop 31118 and terminates the CQ signal unless an "Initiate Operation" program instruction is in progress as characterized by the CP signal from the program selector 133 which overrides the effect of the —CB signal.

It should be noted that the CQ signal is fed to the stepping cycle generator 131b to initiate the stepping signal waveforms. Once started, these waveforms will be generated continuously as long as the CQ signal is present. The CQ signal will remain set until the —CB signal resets the flip flop 31118. Therefore, it may be said that the generation of the CB signal terminates the generation of the stepping cycle waveforms. If the control belt 130 has been stepped properly, the output terminal of the buffers 31130 and 31131 will be at positive potentials to permit the setting of the flip flop 31113. If the control belt 130 has not stepped, the output of either one of these buffers will be at a negative potential, the flip flop 31113 will not be set, and the —CB signal will not be generated. Therefore, the CQ signal will not terminate and a new series of stepping pulse waveforms will be generated.

The DO and the —DO signals are fed from the motor control 133. The OD and —OD signals are fed from a switch attached to the mechanical stepping mechanism of the control belt 130.

LXXXIa. STEPPING CYCLE GENERATOR 131b (FIG. 45)

The stepping cycle generator 131b generates the YA and YB signals. The YA and YB signals are fed to the motor 129 of the belt motor control 130 to generate the actual stepping signals for moving the control belt 130.

The YA and —YA signals are generated by the set dominant flip flop 34122. The output terminal of the gate 34120 is coupled to the set terminal of the flip flop 34122, and the output terminal of the buffer 34124 is coupled to the reset terminal of the flip flop 34122. The gate 34120 receives, as inputs, the —MZ and MW signals through the buffer 34119, the t44⅔ pulse, and the CQ, —YB, and —MX signals. The buffer 34124 receives, as inputs, the —CS and —YB signals. The YB and —YB signals are generated by the set dominant flip flop 34128. The output terminals of the gate 34126 and the buffer 34130 are coupled respectively to the set and reset terminals of the flip flop 34128. The gate 34126 receives, as inputs, the YA and CSD signals. The buffer 34129 receives, as inputs, the YA signal after a ¾ pulse time delay in the delay line 34125 and the —CS signal. The —MX signal fed to respective reset terminals of each of the flip flops 34122 and 34128 is used for manual continuous operations during the testing of the computer. The —MX signal has no effect during normal machine operation. This also applies to the —MZ and MW signals fed to the input terminals of the buffer 3119.

During normal operation the CQ signal is generated at the end of a program instruction. The CQ signal generates the YA and —YA signals by allowing a t44⅔ pulse to set the set dominant flip flop 34122. The YA signal in addition to being fed to the belt motor control 130 is fed to the add-one register where a minor cycle counting operation associated with determining the width of the stepping signals is initiated. When the count reaches a predetermined value, the —CS and CSD signals are generated by the arithmetic control 116. The CSD signal is passed through the gate 34126 to set the set dominant flip flop 34128 causing the generation of the YB and —YB signals. The YB signal in addition to being fed to the belt motor control 130 is fed to the add-one register to sustain the counting operation.

When the count reaches a second predetermined value, the —CS and CSD signals are again generated. The —CS signal and the —YB signals are fed to the input terminals of the buffer 34124 to reset the set dominant flip flop 34122 thus terminating the YA and the —YA signals.

As the counting continues a third predetermined value is detected and the —CS and CSD signals are generated for the third time. The presence of the —CS signal and the absence of the YAD signal at the input terminals of the buffer 34129 resets the set dominant flip flop 34128 to terminate the YB and —YB signals. The control belt 130 is at its new position. The termination of both the —YA and —YB signals permits the generation of the CB signal (see the gate 31100 in the control cycle generator (a)) and a new program instruction commences.

LXXXIb. PRINT CYCLE GENERATOR 131c
(FIG. 45)

The print cycle generator comprises the reset dominant flip flop 3413 which generates the CK and —CK signals; the reset dominant flip flop 3421 which generates the DZ and —DZ signals, the logical network associated with their set and reset terminals, and the WJ, —WJ, CX and —CX signal generators.

These four signals are characteristic of the print operations and are derived from the W and the X signals from the control belt 130 that indicate the print operations and the ET signal from the keyboard 142 that indicates possible editing operations associated with the paper tape. The WJ signal is either the W or the ET signal and the CX signal is either the W, the ET or the X signals (see the buffers 3730 and 3717 and the gates 3731 and 3718).

The input terminals of the buffer 3730 are coupled to receive the W and ET signals. The WJ signal appears at the output terminal of the buffer 3730. The WJ and X signals are fed to the input terminals of the buffer 3717, and the CX signal appears at its output terminal.

The input terminals of the gate 3731 are coupled to receive the —W and —ET signals. The —WJ signal appears at the output terminal of the gate 3731. The —WJ and —X signals are fed to the input terminals of the gate 3718, and the —CX signal appears at its output terminal.

The CK (intend to print) signal generated by the reset dominant flip flop 3413 is characteristic of most print-out operations. It should be recalled that the CK signal was used in the format control 136 to aid in the generation of nearly all format control and precondition signals.

The reset dominant flip flop 3413 has four input terminals coupled respectively to the output terminals of the gates 3410, 3408, 3406 and to the CH signal line from the enter and index control 143. The gate 3406 receives, as inputs, the t44¾ pulse, the M and H signals through the buffer 3401, and the CB and —CE signals. The gate 3410 receives, as inputs, the V, DU, and U signals through the buffer 3409, and the AG, and CX signals.

The gate 3410 feeds a signal to a set terminal of the flip flop 3413 when indexing is complete (all the digits are set up for printing as characterized by AG signal) during a printing operation (CX signal). The gate 3408 feeds a signal to a set terminal of the flip flop 3413 after all the digits have been entered and are to be printed. The presence of the EP signal indicates that all the digits have been entered, and the presence of the CX signal indicates that the digits are to be printed. The output terminal of the buffer 3409 permits the operation of the gates 3408 and 3410 only when one or more non-zero digits are present in the information to be printed (the DU signal from the enter and index control 143); or when instructed to print even if all the digits are zero (the U signal from the control belt 130), or when instructed to print the date (the V signal from the control belt 130).

The gate 3406 operates when line feeds of either printer are called for (the M and H signals from the control belt 130) even though no actual printing is to be performed.

The buffer 3423 will reset the reset dominant flip flop 3413 when the control belt 130 movement is initiated by the generation of the —CQ signal. The —t41¼ pulse and the —CQ signals are fed to the reset terminal of the flip flop 3413 through the buffer 3423.

The reset dominant flip flop 3421 generates the DZ and —DZ signals that are characteristic of the print cycle. A first set terminal of the flip flop 3421 is coupled to an output terminal of the gate 3415 and a second set terminal is coupled to an output terminal of the gate 34131. The gate 3415 receives as inputs, the CK and CE signals. The gate 34131 receives, as inputs, the BE and MK signals.

The gate 3415 operates when the CE signal occurs after the generation of the CK signal. The gate 34131 operates during an enter operation indicated by the presence of the BE signal when the figure correct switch has been thrown to permit the clearing of the printers of undesired information. The presence of the MK signal indicates that the figure correct switch has been thrown.

At the end of the mechanical portion of the print cycle a DF signal is fed from the printers to activate the ten millisecond delay flop 3490 a well-known monostable multivibrator. After about ten milliseconds the delay flop 3490 causes the resetting of the reset dominant flip flop 3421. The delay flop 3490 feeds the reset terminal of the flip flop 3421 and is fed by the t24¾ pulse and the DF signal.

LXXXIc. END PRINT CYCLE GENERATOR 131(d)

The end print cycle generator 131(d) comprises the relays 3130 and 3124. The switch 5410 is part of the main printer 154 and the switch 5510 is part of the auxiliary printer 155. There switches are included in the figure to facilitate the disclosure.

The relay 3130 has a coil 3130a, one end of which is coupled to the NAA signal line, and the other end is coupled to ground. A first moving contact 3130b is coupled to the CL signal line, a first fixed contact 3130c is coupled to a positive potential of 125 volts; a second moving contact 3130e is coupled to the EU signal line, a second fixed contact 3130d is coupled to the NAA signal line; a third moving contact 3130g is coupled to one end of the coil 3124a, a third stationary contact 3130f is coupled to the NAM signal line; a fourth moving contact 3130k is coupled through a condenser 3130m to ground, a fourth fixed contact (normally open) 3030h is coupled through a resistor 3130n to a positive potential of 65 volts; and a fifth fixed contact 3130j (normally closed) is coupled to the DF signal line.

The relay 3124 has a coil 3124a, one end of which is coupled to the moving contact 3130g of the relay 3130, the other end of the relay coil is coupled to the NBM signal line and to ground through the resistor 3124d; a moving contact 3124b is coupled to the EU signal line; and a fixed contact 3124c coupled to a positive potential of 125 volts.

The main switch 5410 contains a moving contact 5410a coupled to a positive potential of 125 volts, a first fixed contact 5410b coupled to the NAM signal line, and a second fixed contact 5410c coupled to the NBM signal line. The normal position of the switch 5410 is with the moving contact 5410a in contact with the first fixed contact 3410b.

The auxiliary switch 5510 contains a moving contact 5510a coupled to the NAA signal line, a first fixed contact 5510b that is unconnected, and a second fixed contact 5510c that is coupled to the NBM signal line. The normal position of the switch 5510 is with the moving contact 5510a in contact with the unused contact 5510b.

At the end of the mechanical portion of the print cycles each switch is mechanically moved to the second or activated position. When the switches are in their second position, the contact 5410a applies a positive potential of 125 volts to the NBM signal line through the contact 5410a. The contact 5510a is shorted to the contact 5510c allowing this potential of 125 volts to appear on the NAA signal line to activate the relay 3130 by energizing the coil 3130a.

When the relay 3130 is energized, contact between the fixed contact 3130c and the moving contact 3130b is broken and the positive potential of 125 volts is removed from the CL signal line. The CL signal line controls the plate power for some of the thyratrons in the format control 136. By removing the plate power, it is possible to reset the thyratrons that were set during the print operation.

The moving contact 3130e that is connected to the EU signal line is shorted to the NAA signal via the fixed contact 3130d to provide a holding circuit for the relay 3130. The moving contact 3130g is coupled to the fixed contact 3130f thus connecting one end of the coil 3124a of the relay 3124 to the NAM signal line. The moving contact 3130k is coupled to the fixed contact 3130h thus allowing the condenser 3130m to be charged to a predetermined positive potential via the resistor 3130n.

When the switch 5510 snaps back to its original position, the relay 3130 remains energized through the holding circuit which includes the contacts 3130d, 3130e and the EU signal line. When the switch 5410 snaps back to its original position, a positive potential of 125 volts is fed from the moving contact 5410a through the fixed contact 5410b, the NAM signal line, the fixed contact 3130f, and the moving contact 3130g to the coil 3124a of the relay 3124.

The relay 3124 is energized and the connection between the moving contact 3130b and 3130c is broken thus removing the positive potential from the EU signal line. The EU signal line also supplies the plate power for some of the thyratrons in the Format Control 136. Whichever of these thyratrons that are in a set condition are reset.

The EU signal line also supplies the potential for the holding circuit of the relay 3130. This relay now becomes deenergized.

The deenergization of the relay 3130 causes the following: the reapplication of the positive potential of one hundred twenty-five volts to the CL signal line through the contacts 3130b and 3130c; the breaking of the holding circuit when the contacts 3130d and 3130e open; the removal of energizing potential to the relay 3124 when the contacts 3130f and 3130g open; and the generation of a positive transient that is fed to the DF signal line when the contacts 3130h and 3130k open as the contacts 3130k and 3130j make contact. The DF signal is fed to the delay flop 3490 of the print cycle generator 131c. After ten milliseconds the DF signal resets the reset dominant flip flop 3421 to terminate the DZ signal and to end the overall print cycle.

When the relay 3124 is deenergized, all the switches and relays have returned to their initial conditions, the contacts 3124b and 3124c close, and the positive potential of one hundred twenty-five volts is fed to the EU signal line.

LXXXII. PROGRAM SELECTOR 132 (FIG. 46)

The program selector 132 is primarily employed to find a manual selected program. The number representing the selected program is encoded by closing the appropriate switches in a switching matrix. This coded combination is then compared with a combination of signals from the control belt 130 which represents the coded program number. When both combinations are identical the selected program has been located.

The moving contact of each of the single-pole single-throw switches 3250 is coupled to an input terminal of the reshaper 32103 and the fixed contact of each of the switches is coupled to a timing signal through an isolation diode 3254. The timing signals $t8\tfrac{3}{4}$, $t12\tfrac{3}{4}$, $t24\tfrac{3}{4}$, $t26\tfrac{3}{4}$, $t40\tfrac{3}{4}$ are fed respectively to the input terminal of each of the switches 3250a, 3250b, 3250c, 3250d and 3250e. The $t8\tfrac{3}{4}$ pulse and the A signal are fed into the gate 3201a. The $t12\tfrac{3}{4}$ pulse and the B signal are fed into the gate 3201b. The $t24\tfrac{3}{4}$ pulse and the C signal are fed into the gate 3201c. The $t26\tfrac{3}{4}$ pulse and the D signal are fed into the gate 3201d. The $t40\tfrac{3}{4}$ pulse and the E signal are fed into the gate 3201e. The A, B, C, D and E signals originate from the control belt 130. The output terminals of the gates 3201 are coupled to input terminals of the reshaper 3207. Thus, the manual closing of the switch 3250c results in the $t24\tfrac{3}{4}$ pulse being fed to the reshaper 32103, and the feeding of the C signal to the gate 3201c passes a $t24\tfrac{3}{4}$ pulse signal to an input terminal of the reshaper 3207. In this manner the switches 3250 are used to locate the combination of signals from the control belt 130 representing the number of the desired program.

The actual comparison operation is initiated by the N and P signals from the control belt 130 which cooperate with a CB signal from the cycle generators 131 at the gate 32128 to cause the generation of the CW signal having a duration of one minor cycle. The CW signal, in addition to gating a $t8\tfrac{3}{4}$ pulse through to gate 32129, causes the generation of the CM and —CM signals in the pulse amplifier 32130. These signals are fed to the blocking terminals of the reshapers 3207 and 32103. The presence of the CW signal at both these blocking terminals permits the reshapers to pass any pulses received at their respective input terminals.

The positive output terminal of the reshaper 3207 is coupled to a first input terminal of the gate 3208 and the negative output terminal of the reshaper 3207 is coupled to a first input terminal of the gate 32104. The positive output terminal of the reshaper 32103 is coupled to a second input terminal of the gate 32104 and the negative output terminal of the reshaper 32103 is coupled to a second input terminal of the gate 3208. The third input terminals of each of the gates 3208 and 32104 are coupled to the N02 signal line.

The output terminal of the gate 3208 is coupled to the set terminal of the set dominant flip flop 3211 which generates the DD and —DD signals. One reset terminal of this flip flop is coupled to the —DC signal line. The output terminal of the gate 32104 is coupled to a set terminal of the set dominant flip flop 32107. One reset terminal of this flip flop is coupled to the —DD signal line. The positive output terminals of the flip flops 3211 and 32107 are coupled to the input terminals of the buffer 32126. The negative output terminals of the flip flops 3211 and 32107 are coupled to the input terminals of the buffer 32127.

The operation of the comparator will be described for one of the five possible probing times ($t8\tfrac{3}{4}$, $t12\tfrac{3}{4}$, $t24\tfrac{3}{4}$, $t26\tfrac{3}{4}$ and $t40\tfrac{3}{4}$). Assumed that a $t24\tfrac{3}{4}$ pulse signal is fed to both the gate 3201c and to the input terminal of the switch 3250c. Four cases are possible:

(1) The C signal is not present at the gate 3201c, and the switch 3250c is open, thus indicating both are equivalent to binary zero. No pulse is passed by either the reshaper 3207 or the reshaper 32103. The positive output terminal of the reshaper 3207 is at a negative potential blocking the gate 3208 and the positive output terminal of the reshaper 32103 is at a negative potential blocking the gate 32104.

(2) The C signal is present at the gate 3201c and the switch 3250c is closed, thus indicating both are equivalent to binary once.

A pulse is passed by both the reshaper 3207 and the reshaper 32103. The negative output of the reshaper 3207 is therefore at a negative potential blocking the gate 32104 and the negative output terminal of the reshaper 32103 is also at a negative potential blocking the gate 3208. Neither the gate 3208 nor the gate 32104 passes an N02 pulse signal.

(3) A C signal is present at the gate 3201c indicating binary one, and the switch 3250c is open indicating binary zero. The number received from the control belt 130 is greater than the number set up by the switches at this time. The reshaper 3207 receives the t24¾ pulse via the gate 3201c to generate a positive potential at the positive output terminal and a negative potential at the negative output terminal.

At the same time, the reshaper 32103 does not receive nor pass a pulse (the switch 3050c is open), and therefore there is a negative potential present at its positive output terminal and a positive potential at its negative output terminal. The gate 32104 is blocked but the gate 3208 passes an N02 pulse which sets the set dominant flip flop 3211 to generate the DD and —DD signals respectively at its positive and negative output terminals. If the set dominant flip flop 3211 had been set, it remains set. If the set dominant flip flop 32107 had been set the —DD signal fed to one of its reset terminals would then reset it.

(4) A C signal is not present at the gate 3201c indicating binary zero and the switch 3250c is closed indicating binary one. The number received from the control belt 130 is smaller than the number set up by the switches at this time.

The reshaper 3207 receives no t24¾ pulse and therefore its positive output terminal is at a negative potential and its negative output terminal is at a positive potential. At the same time, the reshaper 32103 receives the t24¾ pulse to generate a positive potential at its positive output terminal and a negative potential at its negative output terminal.

The gate 3208 is blocked and the gate 32104 passes an N02 pulse which is fed to and sets the set dominant flip flop 32107 to generate the DC and —DC signals respectively at its positive and negative output terminals. If the set dominant flip flop 32107 had been set, it remains set. If the set dominant flip flop 3211 had been set the —DC signal fed to one of its reset terminals would reset it.

The comparison operation occurs in the same way for all five pulse times. The final state of the set dominant flip flops indicate the result of the comparison. If neither flip flop is set then the numbers are equal. If the set dominant flip flop 3211 is set the number from the control belt 130 is greater. If the set dominant flip flop 32107 is set the number set up on the switch matrix is greater. The generation of the DD and DC signals, fed to the computer, indicates in which direction the control belt 130 is to be stepped to seek the desired program.

The DD and DC signals are fed to inputs of the buffer 32126 to generate a CP signal, and the —DD and —DC signals are fed to the gate 32127 to generate the —CP signal. The CP and —CP signals are fed to the computer to indicate that a program search is being performed.

The —CM signal is fed to the second reset terminal of each of the set dominant flip flops 3211 and 32107 to initially reset them just prior to starting the comparisons.

An initial program search can be started by manually initiating the switch 32110. This switch is depressed and then released to permit the gating of a t44¾ pulse, by the gating of 32105, to the second set terminal of the set dominant flip flop 32107 to start a movement of the control belt 130 for the search of a program.

LXXXIII. BELT MOTOR CONTROL 133 (FIG. 47)

The belt motor control 133 moves the program tape in either direction (backwards or forwards) to a desired area of information. The location of the desired area of information can be adjacent to or remote from the last area of information utilized. The linear distance travelled by the tape is controlled by a plurality of signals YA, —YA, YB, and —YB generated in the cycle generators 131. The direction of movement of the tape is controlled by the MH and —MH signals generated in the keyboard 142.

The YB and —MH signals are fed into the two input gate 3307. The —YB and MH signals are fed into a two input gate 3308. A buffer 3306 is coupled to receive, as inputs, the output signals from the gates 3307 and 3308, the —YA signal and a potential of minus five volts. The output of the buffer 3306 is coupled to the control grid of a vacuum tube 3322 having a cathode that is coupled to ground and an anode that is coupled to a potential of plus two hundred and fifty volts through a resistance of 100K ohms. The control grid of a vacuum tube 3326 is coupled to ground through a 1M ohm resistor and to the anode of the vacuum tube 3322 through a 10K ohm resistor. The anode of the vacuum tube 3326 is coupled directly to a potential of two hundred and fifty volts.

The YB, and MH signals are fed into a two input gate 3303; and the —YB and —MH signals are fed into the gate 3304. The output signals from the gates 3303 and 3304, the —YA signal and a potential of minus five volts are fed to four input terminals of the buffer 3302. The output terminal of the buffer 3302 is coupled to the control grid of the vacuum tube 3324. The cathode of this vacuum tube is coupled directly to ground and the anode is coupled to a potential of plus two hundred and fifty volts through a 100K ohm resistor. The anode of the vacuum tube 3324 is coupled to the control grid of the vacuum tube 3328 through a condenser and resistor in series. The junction point of the condenser and resistor is coupled to a potential of minus seventy volts through a 470K ohms resistor. The cathode of the vacuum tube 3328 is coupled directly to ground and the anode of this tube is coupled to the cathode of the vacuum tube 3326.

A —YA signal and a potential of minus five volts are fed into the buffer 3332. The control grid of the vacuum tube 3324 is coupled to the output terminal of the buffer 3332. The vacuum tube 3334 contains a cathode coupled directly to ground and an anode coupled to a potential of plus two hundred and fifty volts through a 100K ohm resistor. The control grid of the vacuum tube 3342 is coupled to ground through a 1M ohm resistor and coupled to the anode of the vacuum tube 3334 through a 10K ohm resistor. The anode of the vacuum tube 3342 is coupled directly to a potential of plus two hundred and fifty volts.

The YA and —YB signal are fed to the two input terminals of the gate 3310. A buffer 3336 is coupled to receive at its input terminals the output signal from the gate 3310 and a potential of minus five volts. The control grid of the vacuum tube 3338 is coupled to the output terminal of the buffer 3336. The cathode of the vacuum tube 3338 is coupled directly to ground and the anode is coupled to a potential of plus two hundred fifty volts through a 100K ohm resistor. The anode is also coupled to the control grid of the vacuum tube 3348 through a condenser and resistor connected in series. The junction point of the series coupled condenser and resistor is coupled to ground through a 470K ohm resistor. The cathode of the vacuum tube 3348 is coupled to ground and its anode is coupled to the cathode of the vacuum tube 3342 through two fifty ohm resistors connected in series.

A program stepping motor 129 contains the stepping winding 3333 and a holding winding 3335. One end of the stepping winding is connected to the anode of vacuum tube 3328 through a 130 ohm resistor. One end of the holding winding is coupled to the junction point of the two fifty ohm series coupled resistors. The other ends of the stepping winding and the holding winding are connected together and to a potential of plus one hundred twenty-five volts.

The stepping motor 129 is manufactured by The General Electric Company under Model Number 55MY54HB1.

The vacuum tubes 3348 and 3326 may be considered to be normally conducting and the vacuum tubes 3328 and 3342 are normally cut off. Therefore, the presence of a signal at the output terminal of the buffer 3306 (a positive potential) will cause the vacuum tube 3326 to stop conducting. The presence of a signal (a positive potential) at the output terminal of the buffer 3302 will cause the vacuum tube 3328 to conduct. The absence of a signal (no positive potential) at the output terminal of the buffer 3332 will cause the vacuum tube 3342 to conduct. The presence of a signal (a positive potential) at the output of the buffer 3336 will stop the vacuum tube 3348 from conducting.

In the operation of this unit, if the MH signal is not present the control belt will move in a forward direction. The MH signal is either on or off depending upon the direction in which the tape is to move. The YA and YB signals are generated in the cycle generators 131. These signals orient or step the stepping motor 129 one forty-eighth of a complete revolution.

The time occurrence of the YA and YB signals relative to each other during the stepping of the motor is as follows:

First the YA signal appears. Approximately ten milliseconds later the YB signal appears. Approximately ten milliseconds after the start of the YB signal the YA signal stops. Thus, the YA signal has a duration of about twenty milliseconds. Approximately ten milliseconds after the ending of the YA signal the YB signal stops. Thus, the YB signal has a duration of about twenty milliseconds. During the first ten millisecond period, or during the occurrence of the YA signal only, acceleration of the stepping motor 129 occurs. During the second ten millisecond period, or during the simultaneous occurrence of the YA and the YB signals, deceleration of the stepping motor occurs. During the third ten millisecond period, or during the occurrence of the YB signal only, the stepping motor is brought to a stop.

The values of the electrical components are representative only, and are not meant as a limitation, it being understood that components having other values may be substituted for the components shown.

The signals from the control belt 130 are generated by means of small pins that contact discretely located holes in the program tape. Thus a particular control belt signal is indicated by a hole in a particular location and is sensed by a particular pin. The pins contact the tape and are actuated by a solenoid. However, when the control belt 130 is stepped from one position to another the pins must be withdrawn from the holes to prevent destruction of the control belt 130. This is done by deenergizing the solenoids and allowing preloaded springs to return the pins to the withdrawn position. The amplifier that feeds the pin-activating solenoids is normally conducting. This amplifier becomes nonconducting when the YA signal is present.

The YA signal is fed through an isolation gate 3352 to an input terminal of a buffer 3354 that is also coupled to receive a potential of minus five volts. The ouput terminal of the buffer 3354 is coupled to the control grid of the vacuum tube 3356. The cathode of the vacuum tube is connected to ground and the anode is connected to a potential of plus two hundred and fifty volts through a 100K ohm resistor. The grid of the vacuum tube 3358 is connected to the plate of the vacuum tube 3356 through a resistor and is coupled to ground through a 1M ohm reistor. The cathode of the vacuum tube 3358 is coupled to a potential of one hundred and twenty-five volts and the plate is coupled to a potential of plus two hundred and fifty volts through solenoid coils 3360. The vacuum tube 3358 is normally conducting. However, the presence of the YA signal allows the vacuum tube 3356 to conduct which in turn cuts off the vacuum tube 3358.

Under normal operating conditions the stepping motor 129 will be stepped by the occurrence of a YA signal. However, it is possible that the stepping motor 129 will not be stepped by the occurrence of the YA signal. Therefore, to prevent the generation of spurious results that can be caused by the non-movement of the stepping motor in response to the YA signal, a scanning device has been incorporated to sense the movement of the program stepping motor. If the motor does not step at the first occurrence of the YA and YB signals, these signals will be regenerated until the motor steps.

A switch 3364 having a movable contact 3366 and two stationary contacts 3368 and 3370 is activated by the movement of the program stepping motor 129. Each step position that the program stepping motor makes the movable contact 3366 is moved left or right to contact the stationary contacts 3368 or 3370. Thus if the switch is initially in the position as shown, the movement of the program stepping motor will reorient the movable contact 3366 to the right to contact the stationary contact 3368; and the next step position of the program stepping motor 129 will orient the movable contact 3366 to the left to contact the stationary contact 3370. The stationary contacts 3370 and 3368 are coupled respectively to the −OD and OD signal lines. The stationary contact 3368 is also coupled to an input terminal of the gate 3372. A second input terminal of the gate 3372 is coupled to receive the CE signal. The movable contact 3366 is coupled to a positive potential and the stationary contacts 3368 and 3370 are coupled to a negative potential through a resistor.

The output of the gate 3372 is fed into a set dominant flip flop 3374 having a positive output terminal DO and a negative output terminal −DO. A buffer 3376, coupled to receive the −CB signal and the −t41¼ pulse, feeds the reset terminal of the set dominant flip flop 3374.

The YA and YB signals that step the control belt 130 are generated in the cycle generators 131 under the control of the presence of a CQ signal. The YA and YB signals will be continuously generated as long as the CQ signal is present. The CQ signal is initiated in the cycle generators 131 by a CE signal. The CQ signal is terminated in the cycle generators 131 by the generation of a −CB signal.

The −CB signal is generated at the termination of a cycle of YA and YB signals provided one of the two following conditions is satisfied after the motor 129 has moved:

(1) The flip flop 3374 is set and the movable contact 3366 of the switch 3364 is in contact with the contact 3370, or (2) The flip flop 3374 is reset and the movable contact 3366 is in contact with the stationary contact 3368.

To describe the sequence of events during operation it will be assumed that towards the end of a cycle of YA and YB signals when the control belt 130 is stopping at a new position, the flip flop 3374 is in a set condition and the movable contact 3366 is in contact with the stationary contact 3370. Thus, there is a positive potential at the −OD terminal and a negative potential at the OD terminal. The above first conditions are satisfied and permit the generation of the −CB signal which resets the flip flop 3374 and terminates the CQ signal in the cycle generators 131.

The computer now performs the program step designated by the new position of the control belt 130. At the end of the program step another CE signal which initiates a CQ signal is generated. The CE signal fed to an input terminal of the gate 3372 attempts to set the flip flop 3374; however the OD signal feeding a second input to the gate 3372 is at a negative potential and a set pulse does not pass to the gate 3372.

The CQ signal causes the generation of the YA and YB signals and the control belt 130 now starts stepping to a new position. In the course of stepping to the new position the movable contact 3366 of the switch 3364 is transferred from the stationary contact 3370 to the stationary contact 3368. Towards the end of this YA and YB signal cycle it is seen that the flip flop 3374 is reset and the movable contact 3366 is in contact with the stationary contact 3368 to satisfy the second condition. Thus, the —CB signal in the cycle generators 131 is generated. The —CB signal terminates the CQ signal and the control belt 130 is at its new position. The computer then proceeds to perform the program instruction as directed by the control belt 130. At the end of this program instruction another CE signal is generated. The CE signal causes the generation of the CQ signal. The CE signal is also fed to an input terminal of the gate 3372. Since the movable contact 3366 is in contact with the stationary contact 3368 the OD signal fed to the second input terminal of the gate 3372 is positive and the flip flop 3374 is set.

The CQ signal causes its usual generation of the YA and YB signals and the control belt 130 is stepped to a new position. During the stepping to the new position, the movable contact 3366 transfers to contact the stationary contact 3370. At the end of the YA and the YB signals it is seen that the flip flop 3374 is set and the movable contact 3366 of the switch 3364 is in contact with the stationary contact 3370 and the first condition for generating a —CB signal is once more satisfied. These operations will continue as the control belt 130 is stepped from one position to another position. If during one of the stepping operations the control belt 130 does not move after the generation of the YA and the YB signals, it then becomes necessary to regenerate these signals.

The conditions in which the program stepping motor was not responsive to the YA and the YB signals will now be considered. It will be assumed that the movable contact 3366 is in contact with the stationary contact 3370 and a program instruction is being terminated. Therefore the CE signal is generated which initiates the CQ signal. The CE signal is also fed to the gate 3372 to cause the flip flop 3374 to set. The CQ signal causes the generation of the YA and YB signals but the stepper motor 129 and therefore the control belt 130 fail to move in response. Therefore, the movable contact 3366 remains in contact with the stationary contact 3368. At the end of the generation of the YA and YB signals, it is seen that the flip flop 3374 is still set and the movable contact 3366 is still in contact with the stationary contact 3368. This arrangement of the position of the switch and the state of the flip flop 3374 does not satisfy the first of the two conditions normally required at this stage to generate the —CB signal, and incidentally also fails to satisfy the second condition. The —CB signal is therefore not generated and consequently the CQ signal is not terminated, nor is the flip flop 3374 reset. The presence of the CQ signal causes the generation of the YA and YB signals for a second time. These signals again attempt to move the control belt 130. If the control belt 130 moves as a result of this attempt the first condition for generating the —CB signal will be satisfied and normal operation will again be initiated.

It is readily seen that a similar regeneration of YA and YB signals will occur in the alternate set of circumstances of failure of response of the motor 129. Here we begin with engagement of the contacts 3364 and 3370. The CE signal cannot set flip flop 3374. The motor 129 should move at the termination of the YA and YB signals, but fails to do so. Thus the second condition is violated, signal —CB is not generated and the YA and YB signals are regenerated until the motor does respond.

Thus each time the YA and YB signals are generated the program stepping motor 129 will step one position. However if the motor 129 does not cause a step when the YA and YB signals are generated, these signals will be regenerated until the motor 129 and the control belt 130 are responsive. This prevents false reperformance of the previous program.

LXXXIV. FORMAT CONTROL 136 (Fig. 48)

The format control 136 consists of a plurality of thyratrons that feed solenoids located in the main printer 154 and in the auxiliary printer 155. The solenoids activate mechanical linkages which set up particular printing sectors or cause particular carriage movements.

The output terminal of the thyratron 3601 is fed by the LG signal line to the main printer 154 to precondition the dollars sector of its print bars. The input terminal of the thyratron 3601 is coupled to the output terminal of the gate 3602. One input terminal of the gate 3602 is coupled via the S signal line to the control belt 130. The second input terminal is coupled to the output terminal of the gate 3621.

The output of the thyratron 3603 is coupled via the LH signal line to the main printer 154 to precondition the cents sector of its print bars. The input terminal of the thyratron 3603 is coupled to the output terminal of the gate 3604. One input terminal of the gate 3604 is coupled via the T signal line to the control belt 130. The second input terminal of the gate 3604 is coupled to the output terminal of the gate 3621 and the third input terminal of the gate 3604 is coupled to an output terminal of the buffer 3611. The DU and the V signal lines function as inputs to the buffer 3611.

The thyratron 3605 has its output terminal coupled via the LJ signal line to the main printer 154 for preconditioning the date sector of the print bars. The input terminal of the thyratron 3605 is coupled to the output terminal of the gate 3606. One input terminal of the gate 3606 is coupled to the control belt 130 through the U signal line. The second input terminal of the gate 3606 is coupled to the output terminal of the gate 3621. The CK, the CE, and the WJ signal lines function as inputs to the gate 3621. The WJ signal is characteristic of print operations associated with the main printer 154, and the CE and CK signals generated by the cycle generators 131 are associated with printing operations in general. Thus, when the printing operation is in progress a signal passes from the gate 3621 to condition the gates 3602, 3604, and 3606. Signals will pass through these gates whenever the appropriate signals from the control belt 130 are present at the other input terminals. It should be noted that the buffer 3611 is fed by a DU signal from the enter and index control 143 and a V signal from the control belt 130. This prevents printing of the cents portion of the number unless the number being printed is other than zero as indicated by the presence of the DU signal, or the printing operation is called for regardless of the value of the number. The V signal represents the program instruction entitled "Print Even if Zero."

The output terminal of the thyratron 3607 is fed by the LK signal line to the auxiliary printer 155 to precondition the dollars sector of its print bars. The input terminal of the thyratron 3607 is coupled to the output terminal of the gate 3608. One input terminal of the gate 3608 is coupled via the S signal line to the control belt 130. The second input terminal is coupled to the output terminal of the gate 3622.

The output of the thyratron 3609 is coupled via the LM signal line to the auxiliary printer 155 to precondition the cents sector of its print bars. The input terminal of the thyratron 3609 is coupled to the output terminal of the gate 3610. One input terminal of the gate 3610 is coupled via the T signal line to the control belt 130. The second input terminal of the gate 3610 is coupled to the output terminal of the gate 3622 and the third input terminal of the gate 3604 is coupled to an output terminal of the buffer 3611.

The thyratron 3612 has its output terminal coupled via the LN signal line to the auxiliary printer 155 for preconditioning the date sector of its print bars. The input terminal of the thyratron 3612 is coupled to the output terminal of the gate 3613. One input terminal of the gate 3613 is coupled via the U signal line to the control belt 130. The second input terminal of the gate 3613 is coupled to the output terminal of the gate 3622. The CK, the CE and the X signal lines function as inputs to the gate 3622. The X signal from the control belt 130 is characteristic of print operations associated with the auxiliary printer 155, the CE and CK signals generated by the cycle generators 131 are associated with printing operations in general. Thus when the printing operation is in progress a signal passes from the gate 3622 to the gates 3608, 3610 and 3613. Signals will pass through these gates whenever the appropriate signals from the control belt 130 are present at the other input terminals. It should be noted that the buffer 3611 is fed by a DU signal from the enter and index control 143 and a V signal from the control belt 130. This prevents printing of the cents portion of the number unless the number is other than zero as indicated by the presence of the DU signal, or the printing operation is called for regardless of the value of the number. The presence of the V signal indicates a print operation regardless of the value of the number.

The output signal of the thyratron 3614 activates the color shift mechanism of the main printer 154 and the auxiliary printer 155 via the LP signal line. The input terminal of the thyratron 3614 is coupled to the output terminal of the buffer 3615. One input terminal of the buffer 3615 is coupled to the output terminal of the gate 3616. The second input terminal of the gate 3615 is coupled to the output terminal of the gate 3617. The —R, —CH, Q, CE, and CK signals are fed to the input terminals of the gate 3616, and the —Q, CH, CE and CK signals are fed to the input terminals of the gate 3617. A color shift will occur during the print operation when the CE and CK signals are fed to two of the input terminals of each of the gates. The presence of a Q signal from the control belt 130 indicates a "Color Shift Operation" if a positive number is being printed as indicated by the presence of the absence of the —CH signal from the enter and index control 143. With these conditions, the thyratron 3614 is set by the gate 3616. The absence of a —Q signal and the presence of the CH signal indicates that a negative number is to be printed, and the thyratron 3614 is set by the gate 3617.

The —R signal is fed to the gate 3616 to prevent the color from shifting during a "Print Collating Symbol Operation" which is characterized by the presence of both the R and the Q signals from the control belt 130.

The output terminal of the thyratron 3703 is coupled via the LQ signal line to the main printer 154 to activate the bail open solenoid during a print operation. The input terminal of the thyratron 3703 is coupled to the output terminal of the gate 3704. The H, J, K, CE and CK signals are fed to the input terminals of the gate 3704. The CE and CK signals which feed the gate perform the usual functions. The H, J, and K signals are from the control belt 130 and are characteristic of the bail open operation.

The output terminal of the thyratron 3705 is coupled to activate the line feed solenoid of the main printer 154. The input terminal of the thyratron 3705 is coupled to the output terminal of the gate 3706. Two input terminals of the gate 3706 are respectively coupled to the CE and CK signals which perform the usual function. The third input terminal is fed by the H signal from the control belt 130. The H signal indicates "The Main Printer Line Feed" program instruction.

The output terminal of the thyratron 3707 is coupled to the reverse line feed solenoid of the auxiliary printer 155 by the LS signal line. The input terminal of the thyratron 3707 is coupled to the output terminal of the buffer 3710. One input terminal of the buffer 3710 is coupled to the output terminal of the gate 3709. The second input terminal of the buffer 3710 is coupled to the output terminal of the gate 3712. Each of the gates 3709 and 3712 has an input terminal connected to the output terminal of the gate 3710. A second input terminal of the gate 3709 is coupled to the —MH signal from the keyboard 142 and a third input terminal is coupled through the P signal line to the control belt 130. A second input terminal of the gate 3712 is coupled to the MH signal line from the keyboard 142, and a third input terminal is coupled to the —P signal line from the control belt 130. During a printing operation the thyratron 3707 conducts and produces an "Auxiliary Printer Reverse Line Feed" if the control belt is moving in the forward direction. The forward direction is indicated by the absence of the —MH and +MH signals; and the "Auxiliary Printer Reverse Line Feed" is indicated by the presence of the M and the P signals.

The output terminal of the thyratron 3715 is coupled to the Forward Line Feed solenoid of the auxiliary printer 154 by the LT signal line. The input terminal of the thyratron 3715 is coupled to the output terminal of the buffer 3714. One input terminal of the buffer 3714 is coupled to the output of the gate 3711. The second input terminal of the buffer 3714 is coupled to the output terminal of the gate 3713. The output terminal of the gate 3710 is coupled to an input terminal of each of the gates 3711 and 3713. A second input terminal of the gate 3711 is coupled to the P signal line, and a third input terminal is coupled to the MH signal line. A second input terminal of the gate 3713 is coupled to the —P signal line, and a third input terminal is coupled to the —MH signal line. The thyratron 3715 conducts when the following conditions are satisfied: The control belt 130 moves in the forward direction, the M signal is present, and the —P signal is absent. The forward direction of the control belt is indicated by the absence of the MH and —MH signals.

The output terminal of the thyratron 3701 is coupled to asterisks solenoids of both the main printer 154 and the auxiliary printer 155 by the LU signal line. The input terminal to the thyratron 3701 is coupled to the output terminal of the gate 3702. The input terminals of the gate 3702 are fed by the CE and CK signals which perform their usual function, and the R and —Q signals from the control belt 130. The presence of the R signal and the absence of the —Q signal during a print operation will cause the thyratron 3701 to conduct.

The output terminal of the thyratron 34133 is coupled to the long feed solenoid of the auxiliary printer 155 by the LW signal line. The input terminal of the thyratron 34133 is coupled to the output terminal of the gate 34132. One input terminal of the gate 34132 is coupled to the P signal line originating from the control belt 130. A second input terminal of the gate 34132 is coupled to the GX signal line from the carriage control 152, and a third input terminal is coupled to receive the CE signal. The thyratron 34133 will conduct during an "Initiate Operation" program instruction that is indicated partially by the presence of the P signal and partially by the presence of the GX signal.

The output terminal of the thyratron 3730 is connected to the "Print Collating Symbol Operation" solenoid of the main printer 154 by the LX signal line. The input terminal of the thyratron 3730 is coupled to the output terminal of the gate 3732. Two of the input terminals of the gate 3732 are coupled to receive the CE and CK signals which perform the usual function. A third and fourth input terminals of the gate 3732 are connected respectively to the R and Q signal lines originating from the control belt 130. The thyratron 3730 will conduct during a print operation when both the R and the Q signals are present. The "Print Collating Symbol Operation" program instruction is indicated by the occurrence of the R and the Q signals. The thyratron 34200 has its output terminal connected to the print cycle solenoids of both the main printer 154 and the auxiliary printer 155 by the LV signal line. The input terminal of the thyratron 34200 is coupled to the cycle generators 131 via the DZ signal line. The thyratron 34200 will conduct when trigged by the DZ input signal during the print operation.

LXXXV. NUMBER THYRATRONS 141 (FIG. 49)

The number thyratrons 141 comprises a thyratron matrix 141a and an encoder 141b.

The thyratron matrix is composed of ten thyratrons units, wherein one unit is assigned to each of the possible digits 0, 1, 2, 3, 4, 5, 6, 7, 8 and 9. The thyratron 4036a, when triggered, generates the FA and —FA signals representing the digit 0. The thyratron 4036b, when triggered, generates the FB and —FB signals representing the digit 1, and the like, to the thyratron 4036k, when triggered, generates the FK and —FK signals representing the digit 9.

Each of the thyratrons 4036 is fed by a buffer 4026. One input terminal of the buffer 4026 is coupled to the output terminal of an index gate 4016 and the other input terminal is coupled to the output terminal of an enter gate 4006.

Each of the enter gates 4006 has one input terminal connected to a specific signal line from the keyboard 142, for example, the FA1 signal line is coupled to the number key zero of the keyboard 142, the FB1 signal line is coupled to the number key one of the keyboard 142, and the like to the FK1 signal line that is coupled to the number key nine of the keyboard 142.

The second input terminal of each of the enter gates 4006 is coupled to the DP signal line. The DP signal from the enter and index control 143 acts as a sampling signal which probes each of the enter gates 4006 during the "Enter" program instructions.

Each of the index gates 4016 receives a discrete combination of the AX, —AX, AY, —AY, AU, —AU, AV and —AV signals from the left-shift register in-out control 115 to uniquely determine a particular digit. For example, the —AX, —AY, —AU, —AV signals fed to the index gate 4016a will decode the binary number 0000 which is the binary coded representation of the digit zero. It should be noted that some of the binary coded representations are uniquely determined by less than four binary digits as, for example, the digit nine. This digit needs the AX and AV signals only for unique determination.

Each of the index gates 4016 has an input terminal connected to the DQ signal line. The DQ signal from the enter and index control 143 is a synchronous sampling pulse which simultaneously probes all the index gates 4016 at the proper time to permit the accurate decoding of the utilized AX, —AX, AY, —AY, AU, —AU, AV, and —AV signals.

The encoder 141b receives signals representing digits from the thyratron matrix 141a (the FA, FB, FC, FD, FE, FF, FG, FH, FJ, and FK signals) or the JA, JB, JC and JD signals from the paper tape input-output 145.

Primarily, the encoder generates synchronous serial combinations of pulse signals to form binary coded representations of the digits. The synchronous serial combinations of pulse signals are fed via the DB signal line to the left-shift register in-out control.

The DB pulse amplifier 4410 is fed by the buffer 4409. Each of the input terminals of this buffer is coupled respectively to the output terminal of the timing gates 4405, 4406, 4407 and 4408. The output signal from the buffer 4461 and the $t44¾$ pulse are fed to the input terminals of the gate 4405. The signal appearing at the output of the buffer 4403 and the $t2¾$ pulse are fed to the input terminal of the gate 4407. The output signal from the buffer 4404 and the $t3¾$ pulse are fed to the gate 4408. The output signal from the buffer 4462 and the $t1¾$ pulse are fed to the gate 4406. The timing pulses serially probe the gates in the above order. The output signal from the buffer 4401 and the JA signal are fed to the input terminals of the buffer 4461. The output signal from the buffer 4402 and the JB signal are fed to the input terminals of the buffer 4462. Thus, whenever an F signal is fed to the encoder 141b, a characteristic pulse pattern is fed to the DB signal line. For example, the digit 7, represented by the FH signal, is fed to the encoder 141b. This signal is present at the input, and subsequently the output terminals of the buffers 4401, 4402, and 4403. These signals are serial probed at the timing gates 4405, 4406, 4407 and 4408. Therefore, the pattern generated by the pulse amplifier 4410 is pulse, pulse, pulse, no pulse or 0111 which is the binary coded combination for the digit seven (the least significant binary digit occurring first in time).

It should be noted that the output terminal of the buffer 4401 is also coupled to the FM signal line, and the output terminal of the buffer 4402 is coupled to the FN signal line. The FM and FN signals are fed to the enter and index control 143 to provide an indication that one of the thyratrons has fired.

LXXXVI. THE KEYBOARD 142 (FIG. 50)

The keyboard 142 comprises three parts, the number keys 4270 for inserting digits, the motor bars 4271 to indicate the end of an insertion, and the manual switches 4272 for test and editing operations.

The number keys 4270 are a plurality of switches connected in a modified series arrangement such that the moving contact on one is connected to the normally closed contact of the next lower one and the normally open contact of each switch is coupled to the output terminal. For example, the number key for the digit one is the switch 4270b. The normally closed contact of the switch is connected to the moving contact of the switch 4270a, and the moving contact of the switch 4270b is coupled to the normally closed contact of the switch 4270c. The normally open contact of the switch 4270b is coupled to the FB1 line. This line is considered to be the output terminal of the number key for the digit one.

The moving contact of the switch 4270k is coupled to the timing pulse line $t41¼$, while the normally closed contact of the switch 4270a is coupled to the signal line FL. When all of the keys are in their normal or deactivated position, a closed circuit exists between the input terminal that feeds the $t41¼$ pulse signal and the output terminal FL. Thus, a series of timing signals are transmitted by the FL signal line. The presence of these timing signals indicates that none of the number keys 4270 are depressed.

When a number key is depressed (consider the number key for the digit one) the timing signal disappears from the FL line and is fed to the appropriate output terminal (for this case the FB1 signal line). The timing signal is then sent via the appropriate output terminal to the number thyratrons 141 to set the appropriate thyratron. The reoccurrence of the timing signals on the FL signal line indicate that the key has returned to its reset position.

The motor bars 4271 control the movement of the control belt 130 after a number has been entered via the number keys 4270.

Several types of movement of the control belt 130 are possible. A single forward step is initiated by depressing the end entry key associated with the switch 4271a. Several forward steps are initiated by depressing the express end entry key associated with the switch 4271b and a single reverse step is initiated by depressing the reverse one entry key associated with the switch 4271c.

The negative end entry key 4271d is depressed to indicate that the number being entered is negative. It should be noted that the switches 4271 are connected in the same type of serial arrangement as the switches 4270. A voltage is fed from the EW signal line through the switches to an input terminal of the gate 4256 provided a motor bar key is not depressed. The voltage will have a positive value when no paper tape or carriage interlocks are broken. It will be assumed that the interlocks are not broken and an entry operation is being performed. Therefore, a positive potential is present at one input terminal of the gate 4256 to prime the gate for an MB signal. The MB signal is a series of $t3\frac{3}{4}$ pulses passed by the gate 4227 during the enter program instructions (characterized by the BE signal) when all input-output apparatus is ready to proceed (characterized by the presence of the DP signal, and the absence of both the —DZ and —CX signals). Thus, the gate 4227 receives, as inputs, the —DZ and —CX signals through the buffer 4243, and the DP, BE, and $t3\frac{3}{4}$ signals. The MB signal appears at the output terminal of the gate 4227.

When one of the pulses passes through the gate 4256 it sets the reset dominant flip flop 4208. The positive voltage appearing at the positive output terminal of the flip flop 4208 is delayed three quarters of a pulse time by the delay line 4239 and is fed to the blocking terminals of the flip flops 4218, 4221, and 4224.

The gate 4252 receives, as inputs, the $t4\frac{3}{4}$ pulse, and the BG, Y, DP, and BE signals. The input terminals of the gate 4254 are coupled to the normally open stationary contact of the switch 4271a, and the MB signal line. The gate 4251 receives, as inputs, the $t43\frac{3}{4}$ pulse, and the JC, JD, and IJ signals. The input terminal of the gate 4255 is coupled to receive the normally open stationary contact of the switch 4271b, and the MB signal line. The MN signal line and the output terminals of the gates 4252, 4254, and 4251 are coupled to the input terminals of the reset dominant flip flop 4218. The output terminal of the gate 4251 and the ET signal line are coupled to the input terminals of the gate 4253. The output terminals of the gates 4253 and 4255, and the CP, BN and CZ signal lines are coupled to the input terminals of the reset dominant flip flop 4221.

The input terminals of the gate 4258 are coupled to the normally open stationary contact of the switch 4271c, and to the MB signal line. The E and BN signal lines are coupled to the input terminals of the gate 4215. The output terminals of the gates 4215 and 4258, and the CZ and DD signal lines are fed to the set terminals of the reset dominant flip-flop 4224. The input terminals of the gate 4257 are coupled to the normally open stationary contact of the switch 4271d, and to the MB signal line. The MN signal appears at the output terminal of the gate 4257.

The input terminals of the gate 4256 are coupled to the normally closed stationary contact of the switch 4271d, and to the MB signal line. The gate 4244 receives, as inputs, the $t41\frac{1}{4}$ and the CP signals. The signals appearing at the output terminals of the gates 4256 and 4244, and the CZ, CR, and DE signals are fed to set terminals of the reset dominant flip flop 4208.

The buffer 4202 receives, as inputs, the —CB, BP, CP, and —$t28\frac{3}{4}$ signals. The output terminal of the buffer 4202 and the —MF signal line are coupled to the input terminals of the buffer 4207. The output terminal of the buffer 4202, and the MH, —MG, and —F signal lines are coupled to the input terminals of the buffer 4204. The output terminal of the buffer 4202, and the —MH, —MG, and —G signal lines are coupled to the input terminals of the buffer 4205. The output terminals of the buffer 4202, and the —A, —MH, MG, B, and —E signal lines are coupled to the input terminals of the buffer 4206. The buffer 4209 receives, as inputs, the BC, —BP, and —$t28\frac{3}{4}$ signals. The output terminals of the buffers 4203, 4204, 4205, 4206, and 4209, and the —CM signal line are coupled to the reset terminals of the reset dominant flip flop 4208. The signal appearing at the output terminal of the flip flop 4208 is fed through the delay line 4239 to the reset terminals of the reset dominant flip flops 4218, 4221 and 4224.

After the numbers have been entered, one of the motor bar keys is depressed. If the end entry key 4271a is depressed, the potential at one input terminal of the gate 4254 goes positive and the next occurring MB signal sets the reset dominant flip flop 4218 to generate the MF and —MF signals. These signals prime the apparatus to step the control belt 130 one step forward. If the express end entry key 4271b was depressed, the MB signal would pass through the gate 4255 to set the reset dominant flip flop 4221 thus generating the MG and —MG signals that are characteristic of the signal for multistepping the control belt 130.

If the reverse one entry key 4271c is depressed the MB signal will pass through the gate 4258 to set the reset dominant flip flop 4224 to generate the MH and —MH signals which indicate a reverse movement of the control belt 130.

A fourth motor bar key associated with the switch 4271 is called the negative end entry and performs a dual role. It activated the end entry apparatus and generates a signal that indicates that the number that has been entered is to be considered as a negative number. When the negative and entry key is depressed an MB signal is passed through the gate 4257 and appears at the output terminal as an MN signal. The MN signal is fed to a set terminal of the reset dominant flip flop 4218 to cause the generation of the MF and —MF signals. The MN signal also alerts the computer to complement the entered number.

After the control belt 130 has moved the specified number of steps, the flip flops are reset. Under usual conditions a —CB signal permits a —$t28\frac{3}{4}$ signal, that functions as a reset pulse, to pass through the buffer 4202. If the flip flop 4218 is set then the —MF signal at an input terminal of the buffer 4203 permits a reset pulse to pass through to a reset terminal of the reset dominant flip flop 4208. The flip flop resets and the potential at its positive output terminal goes negative. The negative potential is fed to the blocking terminals of the reset dominant flip flops 4218, 4221, and 4224 to reset those which are set.

During a reverse one entry the reset pulse passes through the buffer 4206. The —A, —E and B signals ensure the occurrence of the reset pulse after an entry operation only.

If the express end entry motor had been depressed, the reset pulse passes the buffer 4204 when a forward control stop (indicated by a —F signal from the belt zone 137) is detected.

Besides the manual motor bar operations there are computer controlled motor bar operations. The reset dominant flip flop 4208 must be set for other program instructions requiring movement of the control belt 130. During a "Proof Figure Check" program instruction it may be necessary to step the control belt 130 a plurality of steps in the reverse direction. The CZ signal fed to a set terminal of the reset dominant flip flop 4208 activates the flip flop, while the CZ signal (differentiated to form a single pulse) sets the reset dominant flip flops 4221 and 4224. At the end of this operation, the reset pulse passes through the buffer 4205 when a reverse control stop (as indicated by a —G signal from the belt zone 137) is detected.

The DE signal occurring during an "Initiate" program instruction which is manually activated is also fed to a set terminal of the reset dominant flip flop 4208. During an automatic "Initiate" operation the CP signal passes as a set pulse at the pulse time 41¼ to a set terminal of the reset dominant flip flop 4208.

During the skip program instructions the CR3 signal is fed to a set terminal of the reset dominant flip flop 4208 to initiate movement of the control belt 130.

Since during the "Skip" and "Initiate Operation" program instructions it is possible to step over program instructions containing control stops, it is necessary to prevent the generation of the reset pulses. The BP signal that occurs during the "Skip" program instructions and the CP signal that occurs during the "Initiate Operation" program instructions are fed to input terminals of the buffer 4202 to prevent generation of the reset pulse.

At the end of the "Skip" program instructions a —t28¾ pulse signal passes through the buffer 4209 as a reset pulse and, at the end of an "Initiate" program instruction a —CM signal reset pulse is fed to a reset terminal of the reset dominant flip flop 4208.

As has been shown, the setting of the set dominant flip flop 4208 resets the flip flops 4218, 4221, and 4224. These flip flops actually control the movement of the control belt 130.

The gate 4236 receives, as inputs, the —MG and —MH signals. The —MJ signal appears at the output terminal of the gate.

The actual setting of these flip flops during the automatic operations is via separate input paths. During the "Memory Register Selection via Keyboard or via Paper Tape" program instructions the automatic motor bar action is initiated by passing a t44¾ pulse through the gate 4252 to set the reset dominant flip flop 4218. The reset dominant flip flop 4218 is set during enter program instructions involving the paper tape by a set pulse from the gate 4251.

A pulse through the gates 4251 and 4253 substitutes for the manual depressing of the express end entry motor bar key during paper tape operations where editing may occur. A CP signal is fed to one set terminal and a BN signal is fed to another set terminal to perform the same type of substitution for the "Initiate" program instructions and the "Skip" program instructions respectively.

When the control belt 130 is to be automatically stepped in the reverse direction the reset dominant flip flop 4224 is set by feeding a DD signal to a set terminal during an "Initiate Operation" program instruction or the BN signal through the gate 4215 during a "Reverse Conditional Skip" program instruction to another set terminal.

The third portion of the keyboard 142 comprises the manual switches 4272. The figure correct switch 4272a is normally in contact with the positive potential when the operator detects an error in a manual entry before depressing the motor bar.

The mode selector switch 4272b is used solely for trouble shooting and governs the type of control belt 130 stepping. In the normal position the control belt 130 stepping follows computer operation. In either of the other two positions the stepping is manually controlled by the switches 4272c and 4272d. When the switch 4272b is in the one step position, the same program instruction is performed each time the switch 4272c is thrown. When the switch 4272b is in the one step position the control belt 130 is stepped one step each time that the switch 4272d is thrown.

If the switch 4272b is in the continuous position and the switch 4272d is thrown once, then the same program instruction will be repeated continuously.

The edit, non-edit switch 4272e permits the editing of punched paper tape. Normally the switch is in the non-edit position to cause the ET signal to be at a negative potential and the —ET at a positive potential. When the need for editing arises the potentials of the ET signals become dependent on the potentials of the IJ signals characteristic of paper tape entry.

LXXXVII. ENTER AND INDEX CONTROL 143 (FIG. 51)

The enter and index control 143 generates the control and synchronizing signals associated with the enter (input) operations and the indexing (setting up digits to be printed) operations. The unit as shown will be described in terms of the signals that are generated.

The set dominant flip flop 4320 generates the CG and —CG signals. These signals control the left shift operation when a number is entered into the left shift register during the enter program instructions and during the indexing or punching out of a number that is in the left shift register. Whenever these signals are present the contents in the left shift register are shifted left one digit position.

The set dominant flip flop 4320 has two set terminals one coupled to the output terminal of the gate 4314 and the second coupled to the output terminal of the gate 4316.

The gate 4314 operates during the indexing portion output operations as characterized by the DA signal feeding one input terminal of the gate to pass a t44¾ pulse signal whenever the DP signal is present. The —CA signal is also fed to an input terminal of the gate 4314. The gate 4316 operates during the enter operations as characterized by the BE signal from the arithmetic control 116 to pass a t44¾ pulse signal whenever the DP signal is present provided the signals —MH and —MF from the motor bar flip flops of the keyboard 142 are not present indicating that the control belt 130 is not in an express movement. The buffer 4312 whose output terminal feeds an input terminal of the gate 4316 permits the left shift to occur only after a digit has been sensed.

The JA, JB, JC, JD, and JE signals that feed the input terminals of the buffer 4312 are from the thyratrons in the paper tape input-output 145. A signal will be present on at least one of these lines whenever a digit is read. The remaining input terminal is fed by the DV signal line from the gate 4313. The signals FA, FE, FJ, FM, and FN that feed the input terminals of the gate 4313 are from the number thyratrons 141. One of these signals will be present whenever a character has been entered via the keyboard 142.

The reset terminal of the set dominant flip flop 4320 is coupled to the buffer 4322 which receives the —t44¾ and N13 pulse signals. The set dominant flip flop 4320 is set by a t44¾ pulse signal and the following —t44¾ pulse signal resets the flip flop hence the CG and —CG signals last one minor cycle (forty-four pulse times). The output terminal of the gate 4314 is coupled to an input terminal of the flip flop 4320. The gate 4314 receives, as inputs, the t44¾ pulse and the DP, DA, and —CA signals.

The reset dominant flip flop 4658 generates the DP signal whenever a series of interlock conditions are satisfied. During the enter and indexing operations one DP signal will be generated per digit entered or indexed. The DP signal is fed as a sampling signal to the number thyratrons 141 during manual entry operations to set a thyratron as determined by the key depressed on the keyboard 142.

The set terminal of the reset dominant flip flop 4658 is coupled to the output terminal of the gate 4652. The FL signal line from the keyboard 142 feeding one input terminal of the gate 4652 will always have a signal as long as no key is depressed.

A second input terminal of the gate 4652 is coupled to the output terminal of the gate 4658 to prevent generation of the DP signal until the action caused by the previous DP's accomplished. The output terminal of the buffer 4651 is coupled to the third input terminal of the buffer 4651. The gate 4658 receives, as inputs, the ZA, ZM, and RY signals. The ZM signal from the main printer 154 will be negative until a digit has been mechanically indexed by the mechanical indexing mechanism of the main printer 154. The ZA signal from the auxiliary printer 155 acts in a similar manner. The R4 signal is from a cam operated switch in the motorized paper tape reader. The signal on the R4 signal line will be negative until practically the end of the mechanical punch cycle. The gate 4649 receives, as inputs, the TT and P2 signals. The gate 4650 receives, as inputs, the —TT and P3 signals. The output terminals of the gates 4649 and 4650 are coupled to input terminals of the buffer 4651.

During a paper punch operation which might be operating in parallel with a paper tape read operation the gate 4649 operates. When there is a possibility that some of the information will be changed in such an operation the gate 4649 functions, otherwise the gate 4650 functions. The P2 and P3 signal lines are coupled to cam operated switches in the motorized paper tape punch. The P2 signal ceases to be negative at an earlier time in a mechanical punch cycle than the P3 signal so that when possible changing may occur the time between reading and punching is efficiently used.

The reset dominant flip flop 4658 has its reset terminal coupled to the DPR signal line. The DPR signal is generated by a ten millisecond delay flop 4648, which may be a standard monostable multivibrator having a suitable time constant that generates signals having voltage levels compatible with the gating circuitry of the system. The ten multisecond delay flop 4648 which proves a suitable time delay for mechanical operations to settle down is triggered by the signal that appears at the output terminal of the buffer 4647.

The first input terminal of the buffer 4647 is coupled to the output terminal of the gate 4646 which provided a trigger pulse when an end of word character is sensed by the paper tape input-output 145 (the JC and JD signals sensed by the RX signal). The —BQ from the arithmetic control 116 signal is differentiated and fed to a second input terminal of the buffer 4647 to prevent a possible fast mutiplication operation that is sandwiched between two input operations from causing synchronizing errors. The DQ signal is fed to a third input terminal to provide a trigger after a digit has been indexed. The AD signal from the paper tape input-output 145 provides a trigger whenever the punch clutch is operated indicating a digit is being punched. The last input terminal is coupled to the output terminal of the gate 4657 to provide a trigger during manual operations of the control belt 130 during test procedures associated with trouble shooting (the MZ and MY signals from the keyboard 142).

In an output operation the number to be printed or punched is first transferred from the accumulator register to the left shift register before the actual shifting, sensing and indexing of the number begins. The DA signal which characterizes this portion of the operation is generated by the reset dominant flip flop 4349. The reset dominant flip flop 4349 has its set terminal coupled to the output terminal of the gate 4346. The gate 4346 receives, as inputs, the $t4\frac{3}{4}$ pulse and the DP, EL, —BE and —DY signals. The gate 4346 passes a set pulse ($t4\frac{3}{4}$ pulse signal) during the information transfer operation between the accumulator register and the left shift register (the EL signal controls the transfer) provided an enter program instruction is not operating in parallel (the presence of the —BE signal is characteristic of entry operations) nor is the actual printing from a preceding program instruction in progress (the —DZ signal). Once the flip flop 4349 is set it will remain set until the control belt 130 is stepped to the next position. The —CQ signal is fed to the reset terminal of the flip flop 4349.

One important function of the DA signal is to alert the gate 4343. The gate 4343 receives, as inputs, the $t4\frac{3}{4}$ pulse and the BG and BJ signals. The gate 4343 passes a pulse that becomes the AG signal when ten digits have been indexed. The left shift register counts the number of digits sampled and indexed. The coincidence of the BG and BJ signals from the add-one register indicates binary ten implying that the complete number has been set up.

To speed up the printing operations no actual mechanical indexing is performed in the printers until the first nonzero digit in a number to be printed out is detected. This permits fast cycling not limited by mechanical interlocks. The DU signal generated by the reset dominant flip flop 4437 indicates when the mechanical indexing is to be performed. The reset dominant flip flop 4437 has three set terminals, the first of which is coupled to the output terminal of the gate 4432. The gate 4432 receives, as inputs, the CX and DJ signals through the gate 4433, and the TT, CG, and DB signals. Whenever a nonzero digit is sensed a signal will be present on the DB signal line from the number thyratrons 141. The CG signal indicates when to test for a signal on the DB signal line. The output of the buffer 4463 limits this test to either a punch out program instruction (the OJ signal) or a print program instruction (the CX signal). The TT signal permits operation of this gate during an operation which may comprise both the paper tape reading and possible changing of the read in information before punching.

The second set terminal is coupled to the output terminal of the gate 4433. The gate 4433 receives, as inputs, the $t(40\frac{3}{4}$ to $43\frac{3}{4})$ pulse, and the AW and DA signals. The AW signal line from the left-shift register will have signals present during the digit sampling signal time (the $t40\frac{3}{4}$ to $43\frac{3}{4}$ signal) when nonzero digits are being sampled for indexing. The DA signal permits the sampling to occur only during the indexing time.

Under particular circumstances it is desirable to actually print the zeros. The R and V signals from the control belt 130 force this unusual printing. The R and V signals from the control belt 130 are fed to input terminals of the gate 4434 to permit the setting of the flip flop 4437 during the indexing so that the last two zeros of the number having all zeros may be printed. The presence of the AC signal from the add-one register at the pulse time $t3\frac{3}{4}$ indicates that only two digits remain to be indexed. The DA signal is also fed to an input terminal of the gate 4434.

The —CB signal is fed from the cycle generators 131 to the reset terminal of the reset dominant flip flop 4437 to terminate the DU signal at the start of the next program instruction.

The DQ signal generated by the pulse amplifier 4452 is primarily fed to the number thyratrons 141 as a sampling signal to determine which of the number thyratrons is to be set when indexing digits. The pulse amplifier 4452 has an input terminal coupled to the output terminal of the buffer 4451. The output terminal of the gate 4439 is coupled to the input terminal of the buffer 4451 to activate this sampling signal as each new digit becomes available (the CG signal). The gate 4439 receives, as inputs, the $t44\frac{3}{4}$ and N02 pulses, and the DU, DA, and CG signals. The DA and DU signals restrict the sampling to indexing of nonzero digits.

The second input terminal is coupled to the output terminal of the gate 4450 and is used during input operations (i.e. the BE signal) to generate DQ signals for resetting the reset dominant flip flop 4658 via the delay flip flop 4648. The gate 4450 receives, as inputs, the $t4\frac{3}{4}$ and N02 pulses, and the BE and CG signals.

The EL signal generated by the set dominant flip flop 4342 controls the transfer of information between the accumulator register and the left-shift register during input or output operations (either print out or punch out).

The set dominant flip flop 4342 has two set terminals, the first of which is coupled to the output terminal of the gate 4335. The gate 4335 receives, as inputs, the OJ and CX signals through the gate 4331, and the —TT, SE, —BP, and —MH signals. The gate 4335 only operates on program steps calling for a print out or punch out operation (i.e. OJ and CX feeding the buffer 4331). The —BP and —MH signal prevent spurious setting of the flip flop 4342 during express movements of the control belt 130.

The second set terminal is connected to the output terminal of the pulse amplifier 4354 which operates during the enter program instructions to give an EP signal. The buffer 4356 which feeds the pulse amplifier 4356 has two input terminals one of which is connected to the output terminal of the gate 4355 and the second connected to the output terminal of the gate 4333. The gate 4355 receives, as inputs, the t44⅔ pulse, and the ET, BE, MG, and MF signals. The gate 4333 receives, as inputs, the MF and MG signals through the buffer 4332, and the t44⅔ pulse, and the —ET, —MH, and BE signals. The gate 4355 operates when there is a possibility of changing the information being entered via the paper tape as characterized by the ET signal from a manual switch on the keyboard 142. The gate 4333 operates when the switch is not being used.

The thyratron 4556 generating the CH and —CH signals may be called the credit thyratron. Normally when the thyratron is set the number being entered or indexed is considered negative. During a print out or punch out operation a negative indicator will be included with the number. When an entered number is negative a negative motor bar key is depressed. The negative output terminal of the thyratron is coupled to the parallel combination of the resistor 5471 and the solenoid coil 5470. The solenoid coil 5470 is included in the main printer 154 to activate a negative indicator when the number is printed out. The CH signal is fed to the computer to indicate that the number being handled is a negative number and that it should be complemented. The thyratron 4556 has a set terminal coupled to the output terminal of the buffer 4555.

The buffer 4555 has three input terminals the first of which is coupled to the keyboard 142 via the MN signal line. When a negative number is entered manually, the negative and entry switch is depressed to generate the MN signal. The second input terminal is coupled to the output terminal of the gate 4553 which operates when a negative number is entered via the paper tape input-output 145. The JC, JD, JE signals indicate a negative number has been read by the motorized paper tape reader. The third input terminal is coupled to the output terminal of the gate 4554 which operates when a negative number is being indexed out. The gate 4554 receives, as inputs, the t44⅔ pulse and the EL, EM, and —BE signals. The EM signal from the accumulator register is tested by a t44⅔ pulse signal to determine whether the number to be printed or punched out is negative.

The D.C. amplifier 44138 generates the DN signal which activates the relay 5472. When the relay 5472 is activated the contacts 5472c and 5472d are shorted together and most of the current passing from the CHR signal line to the —CH signal line is shunted around the solenoid coil 5470, and the solenoid is not activated even though the thyratron 4556 may be set. Also when the relay 5472 is activated the contacts 5472a and 5472b are shorted together, the current limiting resistor 5473 is shorted out, and maximum current will pass to the DTM signal line which feeds the number thyratrons 141 via the solenoid coils of the main printer 154 and the auxiliary printer 155 to permit mechanical indexing to occur.

The D.C. amplifier 44138 has its input terminal coupled to the output terminal of the buffer 44137. The buffer 44137 has two input terminals one of which is coupled to the output terminal of the gate 44136, and the other coupled to the output terminal of the gate 44134. The gate 44136 receives, as inputs, the SB, EL, and DA signals through the buffer 44135, and the CY, and —TT signals. The gate 44134 receives, as inputs, the CX and TT signals. The CX signal indicates a print out while the absence of the —TT signal indicates there is no change in the information being printed out. The buffer 44135 provides a constant signal from the start of the program instruction until the termination of the indexing portion.

The gate 44134 operates during print out operations in which the information might have been changed as characterized by the CX and TT signals.

The D.C. amplifier 4357 generates the DVA signal which controls the relay 5473. The relay 5473 when activated removes the positive potential of one hundred and twenty-five volts from the DTM signal line and effectively resets the number thyratrons 141 by removing their plate potential.

The input terminal of the D.C. amplifier 4357 is coupled to the output terminal of the buffer 4358. The output terminals of the gates 4361 and 4362 are coupled to the input terminals of the buffer 4358. The gate 4361 operates in most enter or print out operations. The gate 4361 receives, as inputs, the DV and DPR signals. The DPR signal is fed to the gate 4361, after each digit is entered or indexed to permit resetting of the number thyratrons 141 so they may be prepared to accept the next digit. The gate 4362 receives, as inputs, the BE and MK signals. This gate operates during an enter program instruction (indicated by a BE signal from the arithmetic control 116) when the operator depresses a figure correct key (indicated by the MK signal from the keyboard 142) to manually clear out the entered number.

The D.C. amplifier 4557 controls the relay 4280 which unlocks the keys of the keyboard 142. When the relay 4280 is energized, current flows from a source of positive potential through the solenoid coil 4283 via the shorted contacts 4280a and 4280b. The neon glow tube 4281 is also ignited to indicate to the operator that a number may be entered.

The input terminal of the D.C. amplifier 4557 is coupled to the output terminal of the gate 4458. The gate 44 receives, as inputs, the output signal from the buffer 4460 and the BE and —DX signals. The —DZ signal from the cycle generators 131 prevents activation during a print cycle. The BE signal from the arithmetic control 116 permits activation only during entry operations. The signal from the output terminal of the buffer 4460 restricts the operation to certain entry operations. The —IJ signal from the paper tape input-output 145 feeds one input terminal of the buffer 4460. The gate 4461 is activated by the —IJ signal only during an edited paper tape entry (the ET signal). Thus, whenever the possibility arises for changing the information that is being entered via a paper tape, the keyboard is unlocked so that the new information can be manually entered. The signal appearing at the output terminal of the gate 4461 is fed to the input terminal of the buffer 4460. The gate 4461 receives, as inputs, the —TT and ET signals.

The reset dominant flip flop 44149 generates the TT and —TT signals. These signals determine the conditions under which entering and indexing are to proceed. The reset dominant flip flop 44149 has three set terminals. The first is connected to the output terminal of the gate 44141 which receives, as inputs, the MG and —ET signals through the buffer 44139, and the IJ, and —MF signals. The gate operates when the paper tape input data is actually being read into the computer (characterized by the IJ signal from paper tape input-output 145). Changing of the paper tape information does not occur at this time. The second input terminal is coupled to the output terminal of the gate 44140 which receives, as inputs, the —ET, —OJ, and BE signals. This gate operates during a manual entry operation (the BE signal from the arithemtic control 116) when the punch out operation is not called for (the absence of the —OJ signal from the paper tape input-output 145).

The third set terminal is coupled via the Y signal line to the control belt 130 to permit the setting of the reset dominant flip flop 44149 during the "Memory Register Selection" program instructions.

LXXXVIII. PAPER TAPE INPUT-OUTPUT 145
(FIG. 52)

The figure shows primarily the electronic portion of the paper tape input output. The motorized paper tape reader and motorized paper tape punch are commercially available pieces of equipment that are modified slightly as hereinafter described.

The paper tape input-output 145 either reads from a paper tape having a five hole code or punches a five hole code on a paper tape. The first four positions of the hole code of the paper tape is the same as the binary coded decimal digits used in the computer. The hole code representation of numbers greater than binary nine are used to indicate some control functions and negative number representation.

The binary digit orders $2^0$, $2^1$, $2^2$, $2^3$, and $2^4$, are represented by the binary order units 4500; for example the binary digit order $2^0$ is represented by the binary unit order $4500^a$, etc. Each binary order unit 4500 comprises a thyratron 4503 having its input terminal connected to the output terminal of a buffer 4502 which is fed by a read gate 4541 and a punch gate 4501. The thyratron 4503 has a positive output terminal coupled to a signal line (JA, JB, JC, JD, and JE), and a negative output terminal coupled to one end of a resistor 4550 and to one end of a solenoid coil 4551. The other end of the solenoid coil is connected to a normally open fixed contact 4542 of a relay 4538. The other end of the resistor 4550 is coupled to a moving contact 4543 of the relay 4538 and to the P1 signal line. The solenoid coil 4551, when energized, activates a digit punch in the motorized paper tape punch unit. During the punch operation the relay contacts 4542 and 4543 are closed and the solenoid coil 4551 is part of the current carrying circuit between the P1 signal line and the thyratron 4503 (the solenoid coil 4551 is in parallel with the resistor 4550). During the reading of the paper tape, the relay contacts 4542 and 4543 are open and the solenoid coil 4551 is not part of the circuit. During the reading of the paper tape the gate 4514 is employed to set the thyratron 4503. One input terminal of the gate 4514 is connected via a JA1 (or JB1, or JC1, or JD1, or JE1) signal line to an appropriate reader contact 4600 in the motorized paper tape reader. The second input terminal is coupled via the signal line RW to the output terminal of the read sampling gate 4540.

During the punching of the paper tape, the gate 4501 is employed to set the thyratron 4503. One input terminal is connected to the left shift register via the AV (or AU, or AY, or AX, or OJ signal line). The second input terminal is connected to the output terminal of the punch sampling gate 4539.

Several special hole combinations are possible other than the hole combinations representing the digits. When the error thyratron which generates the CZ signal is set during a punch out program instruction a pulse passes through the gate 4547 to generate the PD signal. The PD signal is fed via the buffer 4502a to set the thyratron 4503a, and is fed via the buffer 4502e to set the thyratron 4503e to punch the hole combinations for a code delete.

When the end of a word is reached, an AD signal is fed from the gate 4645 to the buffers 4502c and 4502d to set the thyratrons 4503c and 4503d to punch the end of the entry character.

When a negative number is to be punched at the end of the entry character, the punches resulting from the setting of the thyratrons 4503d (JC signal), 4503d (JD signal), and 4503e (JE signal) are also included. The thyratron 4503 is sent by a pulse fed through the gate 4530, the buffer 4531, the gate 4501e, and the buffer 4502e. The presence of the CH signal at the input terminal of the gate 4530 indicates the number is negative. The gate 4530 receives, as inputs, the CH, JC and JD signals. The gate 4546 receives, as inputs, the FH, and DU signals. The output signals from the gate 4530 and 4541 are fed through the buffer 4531 to an input terminal of the gate 4501e. The OJ signal is also fed to an input terminal of the gate 4501e. The gate 4547 receives, as inputs, the OJ, the CZ signals. The gate 4514e receives, as inputs, the output signal of the gate 4540, that receives the t41¼ pulse and the RX signals, and the JE1 signal. The output signals of the gates 4514e, 4501e, and 4547 are fed through the buffer 4502e to the thyratron 4503e to generate the JE signal.

When a zero is to be punched the thyratron 4503e is set. The FA signal from the number thyratrons 141 and the DV signal from the enter and index control 143 cooperate to feed a signal through the gate 4546 which sets the thyratron 4503e via the buffer 4531, the gate 4501e, and the buffer 4502d.

The punch sample gate 4539 has three input terminals. The first input terminal is connected to the DU signal line from the enter index control 143. The second input terminal is connected to receive the DQ signal from the enter and index control 143, and the OJ signal is generated internally. This permits the sampling of each digit (the DQ signal) during the punch-out operation (the OJ signal) after the sensing of the first non-zero digit in the word to be punched out (the DU signal).

The relay 4538 controls when the solenoid coils 4551 are to be part of the current circuits of the thyratrons 4503. When the relay 4538 is energized by a CV signal from the D.C. amplifier 4359, the relay coils are a part of the current circuit during the punching of the paper tape. The input terminal of the D.C. amplifier 4359 is coupled to the output terminal of the gate 4360. The gate 4360 has one input terminal coupled to the OJ signal line which restricts activation of the D.C. amplifier 4359 to print out operations. The second input terminal of the gate 4360 is coupled to the output terminal of the buffer 4361. The buffer 4361 has three input terminals. The first input terminal is coupled to the −ET signal line to the keyboard 142 to permit punching during nonedited operations. The second input terminal is coupled to the DA signal line from the enter and index control 143 to permit punching during an indexing operation. The third input terminal is coupled to the TT signal line from the enter and index control 143 to permit punching during a specific portion of an edited operation.

During a punch operation it is necessary to activate the punch clutch of the motorized paper tape punch. This clutch is energized as each digit is punched out. The clutch is energized by passing current through its solenoid coil 4701 under the control of the thyratron 4628. The thyratron 4628 has its input terminal connected to the output terminal of the buffer 4629. The buffer 4629 has five input terminals. The first input terminal is coupled to the AD signal line to permit clutch operation when end of word characters are being punched. The second input terminal is coupled to the CM signal line so as to provide a space on the paper tape during an initiate program instruction. The third input terminal is coupled to the PD signal line to activate the clutch and provide a space in the paper tape when the error flip flop has been set. The fourth input terminal is coupled to the output terminal of the gate 4627 that receives, as inputs, the OJ, DQ, and DU signals. This gate provides the clutch operation during a normal punch-out operation after the sensing of the first non-zero digit stored in the left-shift register. The fifth input terminal is coupled to the output terminal of the gate 4657 that receives, as inputs, the t8¾ pulse and the PT signals. This gate provides clutch operation and paper tape movement when the tape feed switch of the motorized paper tape punch is depressed.

During a punch operation the relay 4538 is energized permitting the thyratrons 4503 and the thyratron 4628 controlling the punch clutch to receive their plate power from the P1 signal line which is coupled to the moving contact 4702a of the switch 4702. The moving contact 4702a will be shorted to the fixed contact 4702b through the contacts 4538a and 4538b of the relay 4538 to a source of positive potential. The opening and closing of the switch 4702 is controlled by the cam 47P1 incorporated in the motorized paper tape punch. The cam 47P1 will open the switch 4702 once per punch cycle to remove the plate power from all the thyratrons 4503 and 4628 after the actual punching has occurred. When the punch is in the rest position, the contacts of the switch 4702 are closed.

During a paper tape read operation it is necessary to operate the read clutch of the motorized paper tape reader. This clutch is activated by passing current through its solenoid coil 4704 under the control of the thyratron 4620. Whenever the thyratron 4620 is set current will pass through the coil 4704 to activate the read clutch. The input terminal of the thyratron 4620 is coupled to the output terminal of the gate 4619 to permit activation of the read clutch during a paper tape enter operation as characterized by the presence of the BE and IJ signals. The —DX signal from the keyboard 142 prevents reading of the paper tape during a print cycle. A fourth input terminal of the gate 4619 is connected to the output terminal of the buffer 4618 to further limit the operation of the reader clutch. One input terminal of the buffer 4618 is coupled to the output terminal of the gate 4622 to limit paper tape reading to a particular portion of the paper tape enter operation as characterized by the occurrence of the DP and TT signals. The second input terminal of the buffer 4618 is coupled to the output terminal of the gate 4623 that receives, as inputs, the $t(44¾$ to $3¾)$ pulse and the ET, MF, and —MG signals. This operation of the gate permits the occurrence of the read clutch operation during particular portions of an edited operation.

The read clutch is pulsed once per digit read. The cam 47R1 controls the switch 4705 that interrupts the plate power to the thyratron 4620 after a certain portion of the read cycle has occurred. Later on in the read cycle the cam 47R2 operates to open the switch 4703 to remove the plate power from the thyratrons 4503.

As has been stated above, the RW signal from the gate 4540 samples the binary order units 4500 during the reading of paper tape. The RX signal fed to a terminal of the gate 4540 permits the passage of a $t41¼$ pulse through the gate to perform the actual sampling. The RX signal is generated by the pulse amplifier 4612. The input terminal of the pulse amplifier 4612 is connected via the buffer 4613 to the output terminal of the gate 4656. One input terminal of the gate 4656 receives a $t40¾$ pulse signal. The second input terminal is coupled to the switch 4706. The operation of the switch 4706 is controlled by the cam 47R3 in the motorized paper tape reader. The cam 47R3 permits closing of the switch during a portion of a paper tape read cycle to permit the sampling to occur.

Included in the paper tape input-output 145 are the switches 4720, 4721, and 4722. The switch 4720 is the punch code delete switch. When a code delete is to occur the moving contact 4720a is shorted to the fixed contact 4720b to cause the generation of a PC signal. The other times the moving contact 4720a is shorted to the fixed contact 4720c and a negative potential is present on the PC signal line. The switch 4721 is the reader on-off switch. When the switch is closed, the I and —I signals received from the control belt 130 passed through to become the IJ and —IJ signals. When the switch is open, the I and —I signals do not pass through. The switch 4722 is the punch on-off switch. When the switch is closed the O and —O signals from the control belt 130 pass through to become the OJ and —OJ signals. Thus the switches 4721 and 4722 provide manual control for the paper tape input output.

The motorized paper tape punch is the standard Motorized Punch Model 2 manufactured by Commercial Control. The motorized paper tape reader is the Motorized Reader Model 2 manufactured by Commercial Control. The reading contacts 4600, the cams 47R1, 47R2, 47R3 and 47R4, the switches 4705, 4703, 4706, the solenoid coils 4704, 4551, 4701, the cams 47P1, 47P2 and 47P3 and the switch 4702 are actually part of the motorized punch and the motorized reader but are included to simplify the disclosure.

The cams are arranged to operate the switches as follows:

|  | Opens | Closes |
| --- | --- | --- |
| Reader Cams: | Degrees | Degrees |
| 47R1 | 30 | 220 |
| 47R2 | 210 | 260 |
| 47R3 | 150 | 110 |
| 47R4 | 15 | 300 |
| Punch Cams: |  |  |
| 47P1 | 110 | 210 |
| 47P2 | 15 | 90 |
| 47P3 | 30 | 330 |

All having tolerances of plus or minus 10° of rotation.

LXXXIX. TAB COUNTER 151 (FIG. 53)

The tab counter 151 is used to store a count of the number of tabs to be performed just prior to printing on the main printer 154. The stored number as a binary number represents the tabs to be performed. When building up a tab count one is added to the number for each forward tab recorded, and one is subtracted from the number for each reverse tab recorded. During tabulation, one is subtracted from the number as each forward tab stop is sensed and one is added to the number as each reverse tab stop is sensed. The tabulation terminates when the number in the tab counter 151 becomes zero. Negative numbers are stored as complements.

The tab counter 151 has a standard binary unit adder-subtractor comprising the number reshaper 5116, the unit change reshaper 5113, the carry-borrow delay lines 5108 and 5109 each being three quarters of a pulse time long, the pulse amplifier 5129, the buffers 5117 and 5119 and the output gate 5118. The output gate 5118 has its output terminal coupled to the KR signal line and to the input terminal of the reshaper 5122.

The output terminal of the reshaper 5122 is coupled to the delay line 5123 having a three and one-half pulse time delay. The output terminal of the delay line 5123 is coupled to the input terminal of the number reshaper 5116. It should be noted that the number reshaper 5116, the buffer 5117, the output gate 5118, the reshaper 5122, and the delay line 5123 are connected in series to form a recirculation path as indicated by the heavy lines. Any number stored in the tab counter continues to circulate as a pulse pattern through this path until changed by signals from the output terminals of the unit change reshaper 5113.

The unit change reshaper 5113 has four input terminals. The first input terminal is coupled to the output terminal of the carry gate 5105. The second input terminal is coupled to the output terminal of the build-up unit change gate 5128. The third input terminal is coupled to the output terminal of the count down unit change gate 5127. And the fourth input terminal is coupled to the output terminal of the borrow gate 5106.

As has been previously stated unit changes in the count occur whenever a tab (forward or reverse) program instruction is called for. Therefore the J signal and the K signals (characteristic of main printer tab) are fed from the control belt 130 to input terminals of the buffer 5129. The output terminal of the buffer 5129 is fed to an input terminal of the gate 5128 to cooperate with a CB signal from the cycle generators 131 in introducing a $t44¾$ signal into the unit change reshaper 5113. The —CP and —BP signals fed to the remaining two input terminals of the build-up unit change gate 5128 prevent the possibility of such action during the "initiate" and "skip" program instructions respectively.

During the actual movements, unit changes in the count occur whenever a mechanical tab stop is sensed in the main printer 154. The coincidence of the HG and KL signal from the carriage control 152 feeding input terminals of the count down unit change gate 5127 permit a t44¾ pulse to enter the unit change reshaper 5113. The —EF signal characteristic of the main printer carriage return prevents any pulse inputs during a carriage return movement.

Two types of unit change may be performed by the unit-adder subtractor, a unit addition or a unit subtraction. During a unit addition the carry gate 5105 operates and the borrow gate 5106 is blocked. During a unit subtraction the carry gate 5105 is blocked and the borrow gate 5106 operates. Each gate has an input terminal coupled to receive the N0 signal line to insure proper gating. Each gate also has a second input terminal coupled to the —4¾D signal lines to prevent any end around carries (or borrows). The signal appearing at the positive output terminal of the reshaper 5113 is fed through the three-quarter pulse delay line 5109 to an input terminal of each of the gates 5105 and 5106. The signal appearing at the positive output terminal of the reshaper 5116 is fed through the three-quarter pulse delay line 5108 to the input terminal of the pulse amplifier 5129. The positive and negative output terminals of the pulse amplifier 5129 are fed respectively to an input terminal of each of the gates 5105 and 5106.

The control input terminal of the carry gate 5105 is coupled to the output terminal of the buffer 5104. The three input terminals of the buffer 5104 are coupled respectively to the output terminals of the gates 5101, 5102 and 5103. Each of these three gates define a particular operation when a unit addition may be performed. The gate 5101 permits unit addition when a forward tab is called for (K signal from control belt 130) when the control belt 130 is moving in the forward direction (absences of —MH from keyboard 142) and when the carriage of the main printer 154 is not moving (absence of —FQ from the carriage control 152).

The gate 5102 permits a unit addition when a reverse tab is called for (J signal) during a reverse movement of the control belt 130 (indicated by the presence of the MH signal) provided the carriage of the main printer 154 is not moving (absence of the —FQ signal).

The gate 5103 permits a unit addition when the carriage of main printer 154 is moving (indicated by the presence of the FQ signal) in the reverse direction (indicated by the presence of the EE signal from carriage control 152).

The control input terminal of the borrow gate 5106 is coupled to the output terminal of the buffer 5124. The three input terminals of the buffer 5124 are coupled respectively to the output terminals of the gates 5125, 5126, and 5127. Each of these gates define a particular operation when a unit subtraction can be performed.

The gate 5125 permits a unit subtraction when a reverse tab is called for (J signal from control belt 130 is present) during the forward control belt 130 movement (indicated by the absence of the —MH signal) provided the carriage of main printer 154 is not moving (indicated by the absence of —FQ signal).

The gate 5126 permits a unit subtraction when a forward tab is called for (the K signal is present) during reverse control belt 130 movement (indicated by the presence of the MH signal) provided the carriage of the main printer 154 is not moving (absence of —FQ signal).

The gate 5127 permits a unit subtraction when the carriage of the main printer 154 is moving in the forward direction as indicated by the presence of the FQ signal. The —EE signal from the carriage control 152 is also fed to an input terminal of the gate 5127.

In any of these three operations the output of the buffer 5124 also passes a signal to the carriage control 152 via KE signal line.

The KR, KQ, KS and KU signal lines are spaced one pulse time apart to provide sampling of the four binary digits that are circulating in the line. If the number stored is greater than zero a pulse will be present on at least one of the lines. When the number is zero no pulses are present at any of the lines. These signal lines are fed to the carriage control 152 to indicate when a zero is stored in the tab counter 151.

The —J and —K signals feeding the buffer 51130 which feeds a blocking terminal of the number reshaper 5116 and the —EF signal from the carriage control 152 feeding a second blocking terminal of the reshaper 5116 clears the tab counter 151 when a carriage return is called for.

XC. CARRIAGE CONTROL 152 (Fig. 54)

The carriage control 152 comprises the auxiliary carriage control 152a which controls the tab and carriage return movements of the auxiliary printer 155; the main carriage initiate control 152b which controls the carriage movements of the main printer 154, and the main carriage terminate control 152c which senses the tab movements of the main printer 154.

Portions of both the main printer 154 and the auxiliary printer 155 are included in the figure. Such inclusions are duly noted and are not to be considered as part of the carriage control 152. They are included to permit a clearer disclosure of the operation carriage control 152.

The auxiliary carriage control 152a comprises the gate 5305, the thyratron 5346, the gate 5345, the thyratron 5306, and the set dominant flip flop 5314 connected in series; the gate 3128, the buffer 5307, the thyratron 5370, the gate 5310 and the thyratron 5311 connected in series; the buffer 5315; and the thyratron 5347.

The gate 5305 receives, as inputs, the t4¾ pulse, and the CB, —BP, P, —CP, —M, and —N signals. The output terminal of the gate 5205 is coupled to the input terminal of the thyratron 5346. The signal appearing at the positive output terminal of the thyratron 5246, the t26¾ pulse, and the —DZ signals are fed to the input terminals of the gate 5345. The output terminal of the gate 5345 is coupled to the input terminal of the thyratron 5306. The gate 3128 receives, as inputs, the t4¾ pulse, the N, —CP, CB, and —BP signals.

The buffer 5307 receives, as inputs, the DG signal from the gate 3128, and the DE signal. The output terminal of the buffer 5307 is coupled to the input terminal of the thyratron 5370. The GX signal appearing at the output terminal of the thyratron 5370, the t26¾ pulse, and the —DZ signals are fed to input terminals of the gate 5310. The signal appearing at the output terminal of the gate 5310 is fed to the input terminal of the thyratron 5311. The signals appearing at the positive output terminals of the thyratrons 5306 and 5311 are fed to the set input terminals of the set dominant flip flop 5314.

The portion of the auxiliary printer 155 shown comprises the coil 5501 of the tab solenoid, the coil 5502 of the carriage return solenoid, the ganged single pole double throw switches 5503 and 5504, and the resistors 5505 and 5506. The signal appearing at the negative output terminal of the thyratron 5306 is fed through the coil 5501 to the movable contact 5504a of the switch 5504. The signal appearing at the negative output terminal of the thyratron 5311 is fed through the coil 5502 to the movable contact 5504a of the switch 5504.

When a tab movement of the auxiliary printer is called for, the P signal from the control belt 130 and the CB signal from the cycle generators 131 cooperate to pass a t4¾ pulse through the gate 5305 to set the thyratron 5346. The —BP signal prevents the setting of the thyratron 5346 during the "skip" program instructions. The —M and —N signals block the gate during other program instructions involving the auxiliary printer 155.

After the thyratron 5346 is set, the first t26¾ pulse signal that occurs will pass through the gate 5345 if a print cycle is not in progress to set the thyratrons 5306. The —DZ signal indicates that a print cycle is not in progress.

When the thyratron 5306 is set the —GB signal line activates the solenoid coil 5501. The other end of the solenoid coil 5501 is connected to a positive potential through the contacts 5504a and 5504b of the switch 5504. The setting of the thyratron 5306 initiates a tab of the carriage of the auxiliary printer 155. The positive output terminal of the thyratron 5306 feeds a GB signal to, and sets the reset dominant flip flop 5314. The GL and —GL signals are generated and the carriage is moving. The signal appearing at the positive output terminal of the thyratron 5347, the —$t3¾$ pulse, and the signal at the contact 5503b of the switch 5503 are fed to the input terminals of the buffer 5315.

The GL signal sets the thyratron 5347. The output signal from the thyratron prevents an early reset of the reset dominant flip flop 5314. The output terminal of the buffer 5315 is coupled to the reset terminal of the reset dominant flip flop 5314. At the end of the carriage movement the ganged switches 5503 and 5504 momentarily assume the down position. The moving contact 5504a is connected to ground through the contact 5504c to reset the thyratron 5306 by removing the plate power. At the same time, the moving contact 5503a of the switch 5503 is connected to the fixed contact 5503c to reset the thyratron 5347 by lowering its plate voltage to a level that is below the maintaining potential.

When the carriage movement is completed, the ganged switches 5503 and 5504 are returned to their normal positions. Thus a voltage having a negative potential is fed from the moving contact 5503a through the fixed contact 5503c to an input terminal of the buffer 5315. The next —$t3¾$ pulse that appears is fed through the buffer 5315 to the reset terminal of the reset dominant flip flop 5314 and the GL signal terminates.

It should be noted that the switch movement which causes the thyratrons to reset is controlled mechanically by the carriage movement. Thus a positive indication of actual carriage movement is obtained.

When a carriage return of the auxiliary printer 155 is desired, a DE signal from the program selector 132 or a DG signal from the gate 3128 is fed through the buffer 5307 to set the thyratron 5370.

The next $t26¾$ pulse signal that occurs after the thyratron 5370 has been set is passed through the gate 5310 provided a print cycle is not in progress to set the thyratron 5311. The absence of a —DZ signal indicates that a print cycle is not in progress.

A GC signal from the positive output terminal of the thyratron 5311 is fed to a set terminal of the reset dominant flip flop 5314. The current return path consisting of the negative output terminal, the —GC signal line, and the coil of the carriage return solenoid of the auxiliary printer 153 whose other end is coupled to a positive potential by the switch 5503 is closed. This flow of current initiates the carriage return movement. The remainder of the operation is similar to the auxiliary carriage tab operation.

The main carriage initiate control 152(b) comprises the thyratrons 5210, 5221 and 5226; the set dominant flip flops 5213, 5217 and 5227; the reshaper 5205; the gates 5207, 5209, 5218, 5219, 5214, 5225, 5229, and 5231; and the buffers 5204, 5208, 5220, and 5228. A portion of the main printer 154 is shown comprising the solenoid coils 5402, 5403, and 5404 the single pole single throw switch 5405 and the single pole double throw switch 5401.

The thyratron 5210 when set permits current to flow via the —FR signal line through the coil 5402 of the forward motion solenoid and the carriage will be moved forward until the thyratron 5210 is reset.

The thyratron 5221 when set permits current to flow via the —FS signal line through the coils 5403 and 5404 of the reverse motion solenoid and the carriage will move in the reverse direction until the thyratron 5221 is reset.

The positive output terminal of each of the thyratrons is coupled to an input terminal of the reset dominant flip flop 5227. Thus, when either of the thyratrons is set the flip flop 5227 is also set, and the FQ and —FQ signals are generated to indicate that the carriage of the main printer 154 is moving.

The thyratron 5210 is set whenever forward tabulation is to be performed, and the thyratron 5221 is set whenever reverse tabulation or a carriage return is to be performed. The state reset dominant flip flop 5213 which generates the EE and —EE signals determines which of the two thyratrons 5210 and 5221 can be set. The positive output terminal of the reset dominant flip flop 5213 is coupled via the EE signal line to an input terminal of the gate 5218 the output terminal of which is coupled to the input terminal of the thyratron 5221 via the buffer 5220. The negative output terminal of the reset dominant flip flop 5213 is coupled via the —EE signal line to an input terminal of the gate 5209 whose output terminal is coupled to an input terminal of thyratron 5210.

The gate 5207 receives, as inputs, the BE and —DZ signals. The gate 5229 receives, as inputs, the output signal of the gate 5207 and the DA signal through the buffer 5208, the EG signal from the positive output terminal of the reshaper 5205, the $t4¾$ pulse, and the WJ signals. The signal appearing at the output terminal of the gate 5229 is fed to an input terminal of the gate 5209 and 5218.

Thus when the reset dominant flip flop 5213 is set, the gate 5218 is activated and the gate 5209 is blocked. When the reset dominant flip flop 5213 is reset, the gate 5209 is activated and the gate 5218 is blocked.

During tabulation operations a signal is fed from the output terminal of the gate 5229 to an input terminal of both the gates 5209 and 5218 to set one of the thyratrons 5210 or 5221 as determined by the state of the reset dominant flip flop 5213. The WJ signal limits the tabulation to a print-out operation. The DA signal limits the tabulation to the indexing portion of the print out, and the signal appearing at the output terminal of the gate 5207 limits the tabulation to an enter and print operation. The $t4¾$ pulse probes the gate 5229 to sample the contents of the tab counter 151 as indicated by the EG signal present on the positive output terminal of the reshaper 5205. As long as the count in the tab counter 151 is anything but zero, a positive signal will be present at the positive output terminal of the reshaper 5205. The input terminals of the reshaper 5205 are coupled to receive, as inputs, the KR, KQ, KS and KU signals from the tab counter 151. When the count in the tab counter 151 is zero, no signals are fed to the input terminals of the reshaper 5205. When the count is not zero, at least one input terminal receives a signal.

When, during the storage of a tab count, the count in the tab counter 151 is zero but is going negative as the result of a subtraction, a signal is fed via the KE signal line from the tab counter 151 to an input terminal of the gate 5231. The N2 and $t8¾$ pulses, the —EG, and CB signals are also fed to input terminal of the reshaper 5205. The signal appearing at the output terminal of the gate 5231 is fed to the set terminal of the reset dominant flip flop 5213 to cause the generation of the EE and —EE signals such that when the tabulation is called for to be carried out it will be a reverse tabulation.

The gate 5214 receives, as inputs, the $t4¾$ pulse and the J, CB, K, and —CP signals. This gate is used when a carriage return is called for by the simultaneous occurrence of the J and K signals fed from the control belt 130. The —CP signal from the program selector 133 prevents spurious gating when a program search is being performed during the "initiate Operation" program instruction. The $t4¾$ pulse is passed to a set terminal of the reset dominant flip flop 5217 to cause the generation of the EF and —EF signals which are characteristic of the carriage return of the main printer 154.

The EF signal at the positive output terminal of the flip flop 5217 gates a t26¾ through the gate 5219 and the buffer 5220 to set the thyratron 5221. The thyratron initiates a reverse carriage motion provided the carriage is not in motion or a print cycle is not in progress as indicated by the presence of the —FQ or —DZ signals at the input terminals of the gate 5219. The gate 5219 also receives, as inputs, the —FQ and —DZ signals.

The FR, FS or EF signals fed to the input terminals of the buffer 5228 set the thyratron 5226. The positive output terminal of the thyratron 5226, the —t41¼ and N02 pulse, and the KF signals are fed to the input terminals of the buffer 5225. The signal at the output terminal of the buffer 5225 is fed to and controls the resetting of the reset dominant flip flops 5217 and 5227.

To terminate the operation it is first necessary to reset the thyratron 5210 or 5221 that is set. This is accomplished by terminating the voltage on the KN signal line when the count in the tab counter reaches zero. This voltage is fed via the coils 5402, 5403 and 5404 to the plates of the thyratrons 5210 and 5221.

The next step in the termination of the operation is to reset the thyratron 5226 and the reset dominant flip flops 5227 and 5217. When the carriage begins to stop the contacts 5401a and 5401c of the switch 5401 contact each other for a short instant of time to lower the potential on the anode of the thyratron 5226 to a negative voltage. Thus the thyratron resets. When the switch goes back to its normal position, a negative voltage is fed via the KF signal line to an input terminal of the buffer 5225. The next —t41¾ pulse that occurs is fed through the buffer 5225 to the reset terminals of each of the reset dominant flip flops 5217 and 5227.

If the reset dominant flip flop 5213 had been set, thus indicating that a reverse carriage motion was called for then this flip flop must be reset. When the count in the tab counter 151 reaches zero during the tabulation operation the positive output terminal of the reshaper 5205 which is coupled to an input terminal of the buffer 5204 is at negative potential and the next appearing —t4¾ pulse passes through the buffer 5204 to reset the flip flop 5213.

The main carriage termination control 152c comprises the relay 5334; the reset dominant flip flop 5326 having the buffers 5323 and 5350 feeding its reset terminals and the gate 5322 feeding its set terminal; the reset dominant flip flop 5320 having the buffer 5318 feeding its reset terminal and the gates 5340, 5341 and 5316 feeding its set terminals; and the buffer 5321 feeding an input terminal of the gate 5322, the buffer 5321 having the gates 5342, 5343 and 5344 feeding its input terminals. Included in the figure is a portion of the main printer 154 showing the tab forward switch 5406, the tab reverse switch 5407 and the carriage return switch 5408.

The gate 5344 receives, as inputs, the FR, —KL, and FT1 signals. The gate 5343 receives, as inputs, the FS, —EF, and FU1 signals. The gate 5342 receives, as inputs, the EF and FV1 signals. The gate 5341 receives, as inputs, the FV2 and EF signals. The gate 5316 receives, as inputs, the FU2, —EF and FS signals. The gate 5340 receives, as inputs, the FT2, —KL, and FR signals. The signals appearing at the output terminals of the gates 5341, 5316 and 5340 are fed into set terminals of the reset dominant flip flop 5320. The gate 5322 receives, as inputs, the signals appearing at the output terminals of the gates 5342, 5343, and 5344 through the buffer 5321, the t41¼ pulse, and the HG signal appearing at the positive output terminal of the flip flop 5320. The output terminal of the gate 5322 is coupled to the set terminal of the reset dominant flip flop 5326. The —t4¾ pulse, —EG and EF signals are fed through the buffer 5323 to a first reset terminal of the flip flop 5326; and the —t4¾ pulse and KM signals are fed through the buffer 5350 to a second reset terminal of the flip flop 5326. The —KL signal appearing at the negative output terminal of the flip flop 5326, and the —t44¾ pulse are fed through the buffer 5718 to a reset terminal of the flip flop 5320. The KL signal appearing at the positive output terminal of the flip flop 5326 is coupled to one end of the coil of the relay 5334, the other end being coupled to ground.

During a forward tab operation, the forward tab switch 5406 is moved to the down position by the mechanical tab stop on the carriage to feed a positive voltage via the FT2 signal line through the gate 5340 to set the reset dominant flip flop 5320. Thus, the HG signal is generated provided the carriage is moving forward and the flip flop 5326 is not set. The FR signal indicates that the carriage is moving forward and the —KL signal indicates that the flip flop is not set. The HG signal is fed to the tab counter 151 where a unit change occurs in the count. The HG signal is also fed to an input terminal of the gate 5322 to alert the gate. When the switch snaps back to its original position after moving over a mechanical tab stop, a positive voltage is fed over the FT1 signal line to an input terminal of the gate 5344. This positive voltage passes through the gate 5344 if the carriage is moving in a forward direction (indicated by the presence of the FR signal) and the set dominant flip flop 5326 is not set (indicated by the presence of the —KL signal).

The positive voltage then passes through the buffer 5321 to gate a t41¼ pulse through the gate 5322 and the reset dominant flip flop 5326 is set. If the count in the tab counter is not zero (as indicated by the presence of the —EG signal) and a carriage return has not been called for (indicated by the absence of the EF signal) a —t4¾ pulse is fed through the gate 5323 to immediately reset the reset dominant flip flop 5326. This operation continues until the count in the tab counter 151 finally reaches the value of zero at which time the —EG signal feeding the buffer 5323 disappears and the reset dominant flip flop 5326 is not reset.

The positive output terminal of the reset dominant flip flop 5326 is coupled to and energizes the coil of the relay 5334. When the relay is energized, a positive potential of 125 volts is removed from the KN signal line. It should be noted that the KN signal is coupled via the coils of the solenoids 5402, 5403 and 5404 to the plates of the carriage movement thyratron in the main carriage initiate control 152b. Thus, these thyratrons are reset. At the same time a negative potential is fed via the KM signal line to an input terminal of the buffer 5350. This negative potential of 10 volts permits a —t4¾ pulse to reset the reset dominant flip flop 5326 via a second reset terminal.

When a reverse tab is called for the switch 5407 operates and feeds the gates 5316 and 5343 in the same manner as the switch 5406 operated and feeds the gates 5344 and 5340 during the forward tab operation.

When a carriage return is called for, the switch 5408 operates. As the switch 5408 passes over the mechanical carriage return stop a positive potential is fed to the gate 5343. This positive potential in cooperation with an EF signal sets the flip flop 5320. The EF signal indicates the carriage return operation. When the switch 5408 snaps back to its original position, the positive potential is fed to the gate 5342. The simultaneous occurrence of an EF signal and the positive potential produces a pulse that passes through the buffer 5321 to an input terminal of the gate 5322. The gate 5322 then passes a t41¼ pulse to set the flip flop 5326. The EF signal that is fed to an input terminal of the gate 5323 prevents the resetting of the reset dominant flip flop 5326 and the previously described relay action takes place.

XCI. THE MAIN PRINTER 154 (FIGS. 55 AND 56)

The main printer 154 is a Sundstrand Model C with the calculating apparatus removed. The printing and carriage apparatus are retained. Several switches concerned with carriage movement have been added. These are the switches 5401, 5406, 5407 and 5408.

The switch 5401 is the tab end switch which operates at the end of a tab operation. The switch 5406 is the forward tab switch which operates during forward tabbing to count tab stops. The switch 5407 is a reverse tab switch which operates during reverse tabbing to count tab stops. The switch 5408 is a carriage return terminating switch which operates when the carriage have travelled to the return position.

A forward tabulation and the operation of the switch 5406 will now be described. As solenoid 5409 is energized by a −FR signal from the carriage control 152, a stop or trigger 5412 is rotated about a pivot 5413, anchored in a plate 5414, in a counterclockwise direction. The carriage draw band (not shown) is now permitted to draw the carriage supported magazine plate 5415 to the left. A tabulation terminating pawl 5417 is now rendered ineffective by the removal of the stop 5412 and is rotated in a counterclockwise direction by the magazine 5419 together with its mounting plate 5418 about pivot 5420, mounted on plate 5414, against the force of a spring 5416 (not shown).

As the carriage, magazine plate 5414, and the magazines continue the leftward movement, the magazine 5419 rides beyond the pawl 5417 and allows a spring to return the pawl to the rest position. At this time plate 5414 is no longer under the influence of the carriage and is drawn towards the right, against a bumper 5444 by a square stud 5425 that is secured to an arm 5426 pivoted at 5428 and under the influence of a spring 5427.

However, the carriage and magazine plate 5415 continue to move towards the left. Each magazine has a lug similar to the lug 5470. This lug operates the switch 5406 for forward tabulation by generating the FT1 and FT2 signals and will thereby register the first counting step. Succeeding magazines will repeat the above immediate operation and further counting steps will be accomplished.

If the operation is such that a second step forward tabulating movement had been called for, then, when the magazine 5422 operates the switch 5406, the solenoid 5409 is deenergized by the carriage control 152 and the trigger 5412 is positioned to intercept and prevent counterclockwise movement of the pawl 5417. The magazine 5422 continues to move to the left and to contact the pawl 5417, carrying the entire plate 5414 towards the left. The carriage will stop smoothly in home position with the plate 5414 against a stop. Smooth settling of the carriage is made possible when the plate 5414 is carried towards the left by the magazine 5422. The arm 5426 is pivoted by the action of the plate 5414 through the square stud 5425 and against the action of a dash-pot (not shown) attached to arm 5426. A similar dash-pot operating arm (660) to that of arm 5426 is more fully described in patent to Sundstrand 2,194,270 and shown in Figs. 4 and 64 of that patent.

During reverse tabulation or carriage returning, the solenoids 5450, and 5460 are operated simultaneously by the −FS signnal from the carriage control 152. Solenoid 5450 will prevent the reverse tabulating stop 5430 from operating while the solenoid 5460 will free an arm 5462 by removing the stop 5463 to allow a strong spring 5459 to pivot the arm 5462 counterclockwise about the pivot 5461. A slot 5464 in the arm 5462 carries a stud 5465 that lifts a clutch engaging finger (not shown) to close the carriage return clutch. The operation of the shaft 5465 is similar to the operation of shaft 493 in patent to Anderson 2,536,524. This shaft closes the carriage return clutch in a similar manner.

As the carriage return clutch is closed the carriage and plate 5415 moves to the right. The switch 5407 is to the left of the switch 5406 and is operated by a lug similar to the lug 5470 but associated with the magazine 5419 and registers the first counting step. As the carriage and plate 5415 continue to move another lug operates the switch 5407 for the second step of movement. After the desired number of lugs have activated the switch 5407 the solenoids 5450 and 5460 are deenergized. The reverse tab stop 5430 is returned to the carriage arresting position by the springs 5431 and 5441 while the carriage and plate 5415 continue to move towards the right. Further movement of the carriage carries the magazine 5419 into contact with the stop 5430 and the plate 5414 is moved to the right to contact the bumper 5444. As the plate 5414 moves towards the left the cam plate 5445 which normally holds the plate 5414 is moved to the left, the spring 5459 being stronger than spring 5427. When plate 5414 is moved to the right, the cam plate 5445 acts on a roller 5446 of arm 5462 to rotate the arm clockwise to position the arm 5462 above its stop 5463 (stop 63 being yieldable), in the meantime disengaging the carriage return clutch. The carriage draw band (not shown) draws the carriage and plate 5415 towards the left. The magazine 5419 contacts the pawl 5417 and the return plate 5414 to the home position as described above.

During a carriage return movement the solenoids 5450 and 5460 are also energized by the −FS signal from the carriage control 152. These solenoids remain energized until the −FS signal is terminated. The activation of the solenoids 5450 and 5460 cause the carriage and the magazine plate 5415 to move in the reverse direction. This movement continues until the carriage return terminating lug 5471 activates the switch 5408 to cause the generation of the sequential FV1 and FV2 signals. These signals are fed to the carriage control 152 to terminate the −FS signal thus deenergizing the solenoids 5450 and 5460. After the deenergization of these solenoids the mechanical carriage action is the same as the action described above for the reverse tabulation.

The action of the switch 5401 will now be described. When the carriage motion starts the plate 5414 is moved to the right by the spring 5427 via the square 5425. Stud 54100 follows the plate 5414 under the urge of spring 54102 on the switch closing arm 54103 about the pivot shift 54105. The movement of the switch closing arm 54103 causes the generation of a KG signal which is fed to the carriage control 152. When the carriage movement is completed the plate 5414 returns to its original position and strikes the stud 54100 to pivot the arm 54113 in a counterclockwise direction. This action opens the switch 5401 to cause the generation of a KF signal which is fed to the carriage control 152 to indicate that the carriage movement has terminated.

The switch 5410 indicates the mechanical end of a print cycle and is shown in Fig. 56. The spring leaf 5474 is normally restrained from depressing the plunger 5472 of the switch 5410 by the cam 5476, and a positive potential is present on the NAM signal line. During the first half of the mechanical print cycle the shaft 5478 rotates 90° in a counterclockwise direction. The cam 5476 follows the rotation (the inhibition of the leaf spring 5474 is removed) to cause the depression of the plunger 5472. The positive voltage is transferred to the NBM signal line. During the second half of the mechanical print cycle the shaft 5478 is returned to its reset position and the cam 5476 again urges the spring leaf away from the plunger 5472. The plunger 5472 is no longer depressed and the positive potential is transferred from the NBM signal line to the NAM signal line. A similar shaft to that of the shaft 5478 is more fully described in the patent to Sundstrand 2,194,270.

XCII. THE AUXILIARY PRINTER 155 (FIGS. 55, 56)

The auxiliary printer 155 is also a Sundstrand Model C with only the printing apparatus and the carriage apparatus.

Three switches 5510, 5503 and 5504 have been added. The switch 5510 indicates the end of a mechanical print cycle in the auxiliary printer 155 is operated by the same type of mechanism, and is similar in all respects to the switch 5410 of the main printer 154. The switches 5503 and 5504 which are ganged together and are mechanically similar to the switch 5408 of the main printer 154. The switches 5503 and 5504 are activated by a mechanism similar to the activating mechanism of the switch 5408 that is located in the main printer 154.

XCIII. TIMER (160) (FIGS. 57 AND 58)

The timing unit converts discrete signals into a plurality of timing pulses which are utilized throughout the computer system to retime and reshape other signals.

Because of the large number of output signals involved, the output signals of the timing units are shown as being conducted to output terminals. It should be understood that, in the figures associated with the description which follows, a line which is illustrated as carrying a particular timing signal is connected to the corresponding output terminal of the timing unit 34.

Pulses are transmitted from the magnetic drum to the Tr signal line of the timing unit at the rate of sixty-seven thousand three hundred twenty cycles per second. These pulses are sequentially fed through the conductive line A to a tank circuit 6406 that resonates at the frequency of the input signal. The input signal that is fed to the resonant tank circuit is lacking a single pulse. A portion of the input signal showing the missing pulse (reference position) is shown by the curve Tr. The output signal of the resonant tank circuit is represented by the curve RTo. It should be noted that the resonant tank has replaced the missing pulse. The output of the tank circuit 6406 is fed to a pulse amplifier 6407 that has a positive and a negative output terminal.

The pulses which constitute the signal at the positive output terminal of the amplifier 6407 are hereinafter identified as C0 pulses. The positive portion of each of the pulses that constitutes the signal at the negative output terminal of the amplifier 6407 are hereinafter designated C2 pulses. The C0 and C2 pulses are one hundred and eighty degrees out of phase relative to each other. The phase relationship is shown by the curves C0 and C2. The duration of a C pulse determines the period of a pulse time.

The C0 pulses or the signal from the positive output terminal of the amplifier 6407 is fed through a delay line 6419 where the pulses are delayed approximately one-quarter of a pulse time by two variable taps and are then fed to the gate 6415. The output signal from the gate is fed to and amplified by the pulse amplifier 6408. The pulses that constitute the signal at the positive output terminal of the pulse amplifier 6408 are hereinafter identified as C1 pulses. Pulses that constitute the signal at the negative output terminal of the amplifier 6408 are hereinafter designated C3 pulses. As were the C0 and C2 pulses, the C1 and C3 pulses are one hundred and eighty degrees out of phase with each other. Furthermore, the C1 pulses lag their originating C0 pulses by one-quarter of a pulse time or ninety degrees, and the C3 pulses lag their corresponding C2 pulses by one-quarter of a pulse time or ninety degrees. These phase relationships are shown by the curves C0, C1, C2, and C3.

The C0 pulses from the positive output terminal of the pulse amplifier 6407 are also fed to the gate 6423 after approximately one-eighth of a pulse time delay in the delay line 6419; and the C3 pulses from the negative output terminal of the pulse amplifier 6408 are fed to the gate 6423 after being delayed in the delay line 6424. Since corresponding C0 and C3 pulses are ninety degrees out of phase and overlap each other for a quarter-pulse period, there is an output signal from the gate 6423 of pulses having a width that is equal to one-half of the width of C0 or C3 pulses. These narrow pulses begin at the earliest coincidence of a C0 and C3 pulse at the input terminals of the gate 6423 and terminate when the C3 pulse terminates.

More particularly, the presence of the positive potential portion of the C3 pulse at one of the input terminals of the gate 6423 primes the gate such that the arrival of the positive potential portion of the C0 pulse one-quarter of a pulse time later is gated through. The termination of the C3 pulse one-quarter of a pulse time after the initiation of the narrowed pulse blocks the C0 pulse at the gate 6423 and terminates the narrow pulse. The output pulses of the gate 6423 are fed to a frequency doubler 6409, the output of which is fed to a pulse amplifier 6410 having a positive and a negative output terminal. The pulses which constitute the signal at the positive output terminal of the pulse amplifier 6410 are hereinafter identified as N02 pulses and those signals appearing at the negative output terminal of the pulse amplifier 6410 are hereinafter identified as N13 pulses. These signals are shown in Fig. 160D as curves N02 and N13.

The N02 and N13 narrow pulses are one hundred and eighty degrees out of phase with each other as shown by the indicated curves. They are utilized as inputs to numerous gates and function to remove objectionable spikes from circulating in the computer system by permitting these gates to pass signals for the duration of the N pulses only. It should be noted that a positive portion of the N02 pulse is always centered in the positive potential portion of the C0 pulse, and that a positive potential portion of the N13 signal is centered in the positive potential portion of the C1 signal pulse.

The C0, C1, C2, and C3 signals are clocking pulses which establish the basic timing of the computer system and which are used to synchronize other pulses with this basic timing. C pulses are also utilized for reshaping purposes.

A two input gate 6411 is coupled to receive the C0 pulse signals from the positive output terminal of the pulse amplifier 6407 and the N02 pulse signals from the positive output terminal of the pulse amplifier 6410. The positive potential pulse of the C0 signal primes the gate 6411. Thus, each positive potential portion of the N02 pulses that are in coincidence with the positive potential portion of the C0 pulses pass through the gate 6411 to the output terminal. The signal appearing at the output terminal of the gate 6411 is hereinafter identified as N0 pulses.

The N13 pulses that appear at the negative output terminal of the pulse amplifier 6410 are fed into one of two input terminals of the gate 6412. The C1 pulses that appear at the positive output terminal of the pulse amplifier 6408 are fed into the other input terminal of the gate 6412. At coincidence a signal is passed through the gate 6412. This signal has the wave shape of the N13 pulse and the frequency of the C1 curve and is hereinafter identified as the N1 pulse.

The N02 pulses appearing at the positive output terminal of the pulse amplifier 6410, and the C2 pulses appearing at the negative output terminal of the pulse amplifier 6407 are fed into the two input terminals of the gate 6413. At coincidence, a signal having the wave shape of the N02 pulse is passed through the gate 6413. The narrow output pulse has the frequency of the C2 signal, is centered within each positive pulse of the C2 signal, and is hereinafter referred to as the N2 pulse.

The N13 pulses appearing at the negative output terminal of the pulse amplifier 6410 and the C3 pulses appearing at the negative output terminal of the pulse amplifier 6408 are fed into the two input terminals of the gate 6414. At coincidence, a signal having the wave shape of the N13 pulse is passed through the gate 6414. The narrow output pulse is centered within the positive portion of each C3 pulse and is hereinafter referred to as the N3 pulse. The N0, N1, N2, and N3 pulses are shown as curves N0, N1, N2, and N3.

The signal from the Tr signal line is inverted by a transformer or the equivalent and is then fed into one of the input terminals of the gate 6402. The N0 signal from the output terminal of the gate 6411 is fed into the other input terminal of the gate 6402. Because of the inversion of the Tr signal, coincidence of the two input signals occurs only once each drum revolution. This coincidence is defined to occur at time $t44$. Thus, at pulse time $t44$, a pulse is gated through 6402 and is fed to the reshaper 6405 where it is timed with a C1 pulse to emerge at the output terminal one-quarter of a pulse time later at pulse time $t44\frac{1}{4}$. This signal is hereinafter identified as the EB pulse, occurs once each drum revolution and is shown as curve EB.

The EB pulse that appears at the output terminal of the reshaper 6405 is fed simultaneously to a first or upper, and a second or lower, recirculation loop. The first or upper recirculation loop comprises the series combination of the reshaper 6103, the $5\frac{1}{4}$ pulse delay line 6113, the reshaper 6106, and the $5\frac{1}{4}$ pulse delay line 6114. The signal appearing at the $5\frac{1}{4}$ pulse delay tap on the delay line 6114 is fed back to the input of the reshaper 6103 to complete the loop. A pulse circulating in the first or upper recirculation loop will require eleven pulse times to complete one cycle.

The EB pulse that is fed into the reshaper 6103 at the defined pulse time $t44\frac{1}{4}$ is shaped and delayed one-quarter of a pulse time to coincide with the C2 pulse, and appears at the output terminal of the reshaper 6103 at pulse time $t44\frac{2}{4}$. This shaped and delayed signal is hereinafter referred to as a TA pulse and is shown as curve TA.

The TA pulse is fed into the input terminal of a $5\frac{1}{4}$ pulse delay line 6113 to appear at various output taps of the delay line 6113 at pulse times $t1\frac{2}{4}$, $t1\frac{3}{4}$, $t2\frac{3}{4}$, $t3\frac{3}{4}$, $t4\frac{1}{4}$, $t4\frac{3}{4}$, and $t5\frac{3}{4}$; or at $1\frac{0}{4}$, $1\frac{1}{4}$, $2\frac{1}{4}$, $3\frac{0}{4}$, $3\frac{3}{4}$, $4\frac{1}{4}$, and $5\frac{1}{4}$ pulse times after insertion. The signals appearing at the first six mentioned pulse times are hereinafter referred to respectively as TV, TB, TC, TD, TE, and TF pulses and are shown as curves TV, TB, TC, TD, TE, and TF. The output pulse that appears at the pulse time $t5\frac{3}{4}$, or $5\frac{1}{4}$ pulse times after insertion into the delay line 6113, is fed into the reshaper 6106 where it is shaped and delayed one-quarter of a pulse time to coincide with the C0 pulse. The reshaper 6106 has a positive and a negative output terminal. The signal that appears at the positive output terminal of the reshaper 6106 is hereinafter referred to as a TX pulse, and the signal that appears at the negative output terminal of the reshaper 6106 is hereinafter referred to as a —TX pulse. The wave shape of the TX pulse is shown as curve TX.

The TX pulse from the positive output terminal of the reshaper 6106 is fed into the input terminal of a $5\frac{1}{4}$ pulse delay line 6114 to appear at various output taps of the delay line 6114 at pulse times $t7\frac{2}{4}$, $t7\frac{3}{4}$, $t8\frac{0}{4}$, $t8\frac{2}{4}$, $t8\frac{3}{4}$, $t10\frac{0}{4}$, and $t11\frac{1}{4}$; or at $1\frac{2}{4}$, $1\frac{3}{4}$, $2\frac{0}{4}$, $2\frac{2}{4}$, $2\frac{3}{4}$, $4\frac{2}{4}$, and $5\frac{1}{4}$ pulse times after insertion. The signals appearing at the first six mentioned pulse times are hereinafter referred to respectively as TM, TH, TJ, TK, TN, and TL pulses and are shown as curves TM, TH, TJ, TK, TN, and TL. The output pulse that appears at pulse time $t11\frac{1}{4}$, or $5\frac{1}{4}$ pulse times after insertion of a signal into the delay line 6114 is fed into the reshaper 6103 to complete the recirculation loop.

The second or lower recirculation loop comprises the series combination of the reshaper 6109, the $3\frac{3}{4}$ pulse time delay line 6115, and the reshaper 6112. The output signal that appears at the positive output terminal of the reshaper 6112 is fed back to the input of the reshaper 6109 to complete the loop. A pulse circulating in the second or lower recirculation loop will require $4\frac{2}{4}$ pulse times to complete one cycle.

The EB pulse is fed into the reshaper 6109 where it is shaped, and it appears at the negative and positive output terminals as a well defined pulse signal. The signal appearing at the negative output terminal of the reshaper 6109 is hereinafter referred to as a $-4\frac{1}{4}$D pulse; and the signal appearing at the positive output terminal of the reshaper 6109 is hereinafter referred to as a $4\frac{1}{4}$D pulse. The $4\frac{1}{4}$D pulse is shown as curve $4\frac{1}{4}$D.

The $4\frac{1}{4}$D pulse appearing on the positive output terminal of the reshaper 6109 is fed into the input terminal of a $3\frac{3}{4}$ pulse delay line 6115 to appear at various output taps of the delay line 6115 at pulse times $t0\frac{3}{4}$, $t1\frac{0}{4}$, $t1\frac{1}{4}$, $t1\frac{2}{4}$, $t2\frac{0}{4}$, $t3\frac{0}{4}$, $t3\frac{3}{4}$, and $t4\frac{0}{4}$; or at $0\frac{1}{4}$, $0\frac{2}{4}$, $0\frac{3}{4}$, $1\frac{0}{4}$, $1\frac{1}{4}$, $2\frac{1}{4}$, $3\frac{1}{4}$, and $3\frac{2}{4}$ pulse times after insertion. The signals appearing at the first seven mentioned pulse times are hereinafter referred to, respectively, as $4\frac{2}{4}$D, $4\frac{3}{4}$D, $1\frac{0}{4}$D, $1\frac{1}{4}$D, $1\frac{3}{4}$D, $2\frac{3}{4}$D, and $3\frac{2}{4}$D pulses and are shown as curves $4\frac{2}{4}$D, $4\frac{3}{4}$D, $1\frac{0}{4}$D, $1\frac{1}{4}$D, $1\frac{3}{4}$D, $2\frac{3}{4}$D and $3\frac{2}{4}$D. The output pulse that appears at the pulse time $t\frac{0}{4}$, or $3\frac{2}{4}$ pulse times after insertion into the delay line 6115, is fed into the reshaper 6112 where it is shaped and delayed one-quarter of a pulse time to coincide with the C0 pulse.

The reshaper 6112 has a positive and a negative output terminal. The signal that appears at the positive output terminal of the reshaper 6112 is hereinafter referred to as a $4\frac{0}{4}$D pulse, and the signal that appears at the negative output terminal of the reshaper 6112 is hereinafter referred to as a $-4\frac{0}{4}$D pulse. The $4\frac{0}{4}$D pulse that appears at the positive output terminal of the reshaper 6112 is fed into the reshaper 6109 to complete the recirculation loop. The $4\frac{0}{4}$D pulse is shown as curve $4\frac{0}{4}$D.

The TB pulse from a tap on the delay line 6113, and the $1\frac{3}{4}$D pulse from a tap on the delay line 6115 are fed into the gate 6117. At coincidence, which occurs once during each minor cycle, a signal is passed through the gate 6117 at $1\frac{3}{4}$ pulse times after the start of the minor cycle. This signal is hereinafter referred to as a $t1\frac{3}{4}$ pulse and is shown as curve $t1\frac{3}{4}$.

The TC pulse from a tap on the delay line 6113, and the $2\frac{3}{4}$D pulse from a tap on the delay line 6115 are fed into the gate 6118. At coincidence, which occurs once during each minor cycle, a signal is passed through the gate 6118 at $2\frac{3}{4}$ pulse times after the start of the minor cycle. This signal is hereinafter referred to as a $t2\frac{3}{4}$ pulse and is shown as curve $t2\frac{3}{4}$.

The TK pulse from the positive output terminal of the reshaper 6106, and the $4\frac{2}{4}$D pulse from a tap on the delay line 6115 are fed into the gate 6124. At coincidence, which occurs once during each minor cycle, a signal is passed through the gate 6124 at $8\frac{2}{4}$ pulse times after the start of the minor cycle. This signal is hereinafter referred to as a $t8\frac{2}{4}$ pulse and is shown as curve $t8\frac{2}{4}$.

The —TX pulse from the negative output terminal of the reshaper 6112, and the —$4\frac{0}{4}$D pulse from the negative output terminal of the reshaper 6112 are fed into the buffer 6301. At coincidence, which occurs once during each minor cycle, a signal is not passed through the buffer 6301 only at $28\frac{0}{4}$ pulse times after the start of the minor cycle. This signal is hereinafter referred to as a —$t28\frac{0}{4}$ pulse and is shown as curve —$t28\frac{0}{4}$.

The TB pulse from a tap on the delay line 6113, and the $4\frac{3}{4}$D pulse from the delay line 6115 are fed into the gate 6501. At coincidence, which occurs once during each minor cycle, a signal is passed through the gate 6501 at $12\frac{3}{4}$ pulse times after the start of the minor cycle. This signal is then fed into a pulse amplifier 6502; the output of which is hereinafter referred to as a $t12\frac{3}{4}$ pulse and is shown as curve $t12\frac{3}{4}$.

The TN pulse from a tap on the delay line 6114, and the $4\frac{3}{4}$D pulse from the delay line 6115 are fed into the gate 6503. At coincidence, which occurs once during each minor cycle, a signal is passed through the gate 6503 at 8¾ pulse times after the start of the minor cycle. This signal is then fed into a pulse amplifier 6504, the output of which is hereinafter referred to as a t8¾ pulse and is shown as curve t8¾.

The TC pulse from a tap on the delay line 6113, and the 4¾D pulse from the delay line 6115 are fed into the gate 6505. At coincidence, which occurs once during each minor cycle, a signal is passed through the gate 6505 at 24¾ pulse times after the start of the minor cycle. This signal is then fed into a pulse amplifier 6505, the output of which is hereinafter referred to as a t24¾ pulse and is shown as curve t24¾.

The TF pulse from a tap on the delay line 6113, and the 2¾D pulse from the delay line 6115 are fed into the gate 6507. At coincidence, which occurs once during each minor cycle, a signal is passed through the gate 6507 at 26¾ pulse times after the start of the minor cycle. This signal is then fed into an amplifier 6508, the output of which is hereinafter referred to as a t26¾ pulse and is shown as curve t26¾.

The TH pulse from a tap on the delay line 6114, and the 4¾D pulse from the delay line 6115 are fed into the gate 6509. At coincidence, which occurs once during each minor cycle, a signal is passed through the gate 6509 at 40¾ pulse times after the start of the minor cycle. This signal is then fed into a pulse amplifier 6510 having a positive output terminal and a negative output terminal. The signal appearing at the positive output terminal is hereinafter referred to as a t40¾ pulse; and the signal appearing at the negative output terminal is hereinafter referred to as a —t40¾ pulse. The t40¾ pulse is shown as curve t40¾.

The TE pulse from a tap on the delay line 6113, and the 4¼D pulse from the positive output terminal of the reshaper 6109 are fed into the gate 6119. At coincidence, which occurs once during each minor cycle, a signal is passed through the gate 6119 at 4¼ pulse times after the start of the minor cycle. This signal is hereinafter referred to as a t4¼ pulse. The output of the gate 6119 is then fed into a reshaper 6122 where it is shaped and delayed one-quarter of a pulse time to coincide with the C2 pulse. The signal appearing at the positive output terminal of the reshaper 6122 is hereinafter referred to as a t4¾ pulse. The t4¼ pulse and the t4¾ pulse are shown as curves t4¼ and t4¾ respectively.

The TD pulse from a tap on the delay line 6113, and the 3¾D pulse from a tap on the delay line 6115 are fed into the gate 6511. At coincidence, which occurs once during each minor cycle, a signal is passed through the gate 6511 at 3¾ pulse times after the start of the minor cycle. The output signal from the gate 6511 is fed into a reshaper 6514 where it is shaped and delayed one-quarter of a pulse time to coincide with the C3 pulse. The signal appearing at the positive output terminal of the reshaper 6514 is hereinafter referred to as a t3¾ pulse; and the signal appearing at the negative output terminal of the reshaper is hereinafter referred to as a —t3¾ pulse. The t3¾ pulse is shown as curve t3¾.

The TJ pulse from a tap on the delay line 6114, and the 1¾D pulse from a tap on the delay line 6115 are fed into the gate 6303. At coincidence, which occurs once during each minor cycle, a signal is passed through the gate 6303 at 41¼ pulse times after the start of the major cycle. This signal is then fed into a reshaper 6306 where it is shaped and delayed one-quarter of a pulse time to coincide with the C1 pulse. The signal appearing at the positive output terminal of the reshaper 6306 is hereinafter referred to as a t41¼ pulse, and the signal appearing at the negative output terminal of the reshaper is hereinafter referred to as a —t41¼ pulse. The t41¼ pulse is shown as curve t41¼.

The 3¾D pulse from a tap on the delay line 6115, and the TL pulse from a tap on the delay line 6114 are fed into the gate 6318. At coincidence, which occurs once during each minor cycle at 44¾ pulse times after the start of a minor cycle, a signal is passed through the gate 6318. This signal is fed into a reshaper 6321 where it is shaped and delayed one-quarter of a pulse time to coincide with the C3 pulse. The signal appearing at the positive output terminal of the reshaper 6321 is hereinafter referred to as a t43¾ pulse and is shown as curve t43¾. The signal appearing at the negative output terminal of the reshaper 6321 is hereinafter referred to as a —t43¾ pulse.

The t43¾ pulse from the positive output terminal of the reshaper 6321 is fed to the reshaper 6324 where it is shaped and delayed one-quarter of a pulse time to coincide with the C0 pulse. The signal appearing at the positive output terminal of the reshaper 6324 is hereinafter referred to as a t44¼ pulse and is shown as curve t44¼.

The t44¼ output pulse from the reshaper 6324 is fed to the reshaper 6311 where it is shaped and delayed one-quarter of a pulse time to coincide with the C1 pulse. The signal appearing at the positive output terminal of the reshaper 6311 is hereinafter referred to as a t44¼ pulse and is shown as curve t44¼. The signal appearing at the negative output terminal of the reshaper 6311 is hereinafter referred to as a —t44¼ pulse.

The t44¼ pulse appearing at the positive output terminal of the reshaper 6311 is fed to the reshaper 6314 where it is shaped and delayed one-quarter of a pulse time to coincide with the C2 pulse. The signal appearing at the positive output terminal of the reshaper 6314 is hereinafter referred to as a t44¾ pulse and is shown as curve t44¾. The signal appearing at the negative output terminal of the reshaper 6314 is hereinafter referred to as a —t44¾ pulse.

The t44¾ pulse appearing at the positive output terminal of the reshaper 6314 is fed to the reshaper 6317 where it is shaped and delayed one-quarter of a pulse time to coincide with the C3 pulse. The signal appearing at the positive output terminal of the reshaper 6317 is hereinafter referred to as a t44¾ pulse and is shown as curve t44¾. The signal appearing at the negative output terminal of the reshaper 6317 is hereinafter referred to as a —t44¾ pulse.

The TM pulse from a tap on the delay line 6114, and the 4¾D pulse from a tap on the delay line 6115 are fed into the gate 6325. At coincidence, which occurs once during each minor cycle, a signal is passed through the gate 6325 at 40¾ pulse times after the start of the minor cycle. This signal is fed into and sets a set dominant flip flop 6327. The input signal first appears at the output terminals of the flip flop, in usable form, one-quarter of a pulse time later or at 40¾ pulse times after the start of the minor cycle. The flip flop remains in the set condition and continues to conduct (producing a positive pulse at the positive output terminal) until reset by the reset pulse —t44¼ which occurs 44¼ pulse times after the start of the minor cycle. Thus, the flip flop is in the set or conducting condition from 40¾ to 44¼ pulse times after the start of the minor cycle. However, since the positive portion of a pulse is one-half a pulse time in width, the last pulse that can be coincident with the set condition of the flip flop 6327 is that pulse that occurs at 43¾ pulse times after the start of the minor cycle. The duration of the set condition of the flip flop is indicated by the pulse time position of the positive potential portions of pulses that are coincident with the set position of the flip flop. Thus, the signal appearing on the positive output terminal of the flip flop 6327 is hereinafter referred to as a t40¾ to a t43¾ pulse, and the signal appearing on the negative output terminal of the flip flop 6327 is hereinafter referred to as a —t40¾ to a —t43¾ pulse. The signal from the positive output terminal of the set dominant flip flop 6327 is shown as curve t44¾ to 3¾.

The $t44\frac{2}{4}$ pulse from the positive output terminal of the reshaper 6314 is fed into the set terminal of the set dominant flip flop 6126. This signal sets the flip flop to produce a usable positive potential at the positive output terminal one-quarter of a pulse time later or at $44\frac{3}{4}$ pulse times after the start of the minor cycle. The minor cycle is forty-four pulse times in length; thus, a pulse that starts at $44\frac{3}{4}$ pulse times after the start of the minor cycle is actually $0\frac{3}{4}$ of a pulse time after the start of the next minor cycle. The $-4\frac{1}{4}$D pulse from the negative output terminal of the reshaper 6109 is fed into the reset terminal of the set dominant flip flop 6126 to reset the set dominant flip flop circuit 6126 at $4\frac{1}{4}$ pulse times after the start of the next minor cycle. Thus, all positive pulses occurring from $44\frac{3}{4}$ to $3\frac{3}{4}$ pulse times are coincident with the positive potential appearing on the positive output terminal of the flip flop and this signal is hereinafter referred to as a $t(44\frac{3}{4}$ to $3\frac{3}{4})$ pulse. This pulse is shown as curve $t(44\frac{3}{4}$ to $3\frac{3}{4})$. The signal appearing at the negative output terminal of the flip flop circuit 6126 is hereinafter referred to as a $-t44\frac{3}{4}$ to $-t3\frac{3}{4}$ pulse.

The $t44\frac{3}{4}$ to $t3\frac{3}{4}$ pulse from the positive output terminal of the set dominant flip flop 6126, and the $4\frac{3}{4}$D pulse from the positive output terminal of the reshaper 6112 are fed into the gate 6123. At coincidence which occurs once during each minor cycle at $4\frac{3}{4}$ pulse times after the start of the minor cycle, a pulse is passed through the gate 6123. The signal appearing at the output terminal of the gate 6123 is hereinafter referred to as a $t4\frac{3}{4}$ pulse and is shown as curve $t4\frac{3}{4}$.

XCIV. MAGNETIC DISK 165 (FIGS. 59a AND 59b)

The magnetic disk 165 comprises a disk 184, a first bank of magnetic heads 6504, a second bank of magnetic heads 6510, and a shaft 192. The disk 184, as shown in Fig. 2, is rigidly fixed to one end of the shaft 192 which is coupled to the motor 190, and the apertured cylinder 194 is also coupled to the shaft 192.

The disk 184 is coated with a suitable magnetizable material such as an iron oxide to form six channels 6502. The channels trace concentric circles on the face of the disk 184. In close proximity to each channel 6502 is one of the magnetic heads 6504. Linearly displaced along the channels and in close proximity to each of the channels 6502 is one of the magnetic heads 6510. The gap portion of the magnetic heads 6504a, b and c of the bank of magnetic heads 6504 is disposed along a radial line d of the disk 184 and the gap portion of the magnetic heads 6510a, b and c of the bank of magnetic heads 6510 is disposed along a second radial line b of the magnetic disk 184. The two lines d and b subtend an angle $\phi$. The angle $\phi$ is devised so that the time required for a point on the channels 6502a, 6502b or 6502c to pass from a magnetic head 6504a, 6504b or 6504c to a magnetic head 6510a, 6510b or 6510c is ten-elevenths of a minor cycle, or the time required for ten digits.

Each of the magnetic heads 6504 and 6510 is alike. The gap portion of the magnetic head 6504d is separated from the gap portion of the magnetic head 6510d by a distance p along the channel 6502d. Similarly the magnetic head 6504e is separated by a distance q along the channel 6502e from the magnetic head 6510e. The distances p and q are devised so that the time required for a point on the channels 6502d or 6502e to pass from a magnetic head 6504d or 6504e to a magnetic head 6510d or 6510e is one minor cycle. Although the magnetic heads in both banks appear colinear, it should be realized that their gaps are not necessarily so. Fig. 59b shows a typical magnetic head comprising a magnetic core 6506 and a coil 6508. The magnetic heads 6504 and 6510 are used either for recording or reproducing.

The channels 6502a, 6502b, and 6502c are associated with the three recirculating working registers. The channel 6502a is associated with the accumulator register. The magnetic head 6504a is the recording head for this channel. The magnetic head 6510a is the reproducing head for this channel. Signals are fed to the magnetic head 6504a from the accumulator register in-out control 112 via the W1O signal line. Signals are fed back to the accumulator register in-out control 112 via the W1I signal line. Incorporated in the accumulator register in-out control 112 is a delay equal to one-eleventh of a minor cycle (one digit time). Thus when information circulates in the accumulator register a total delay of one minor cycle is obtained and it is possible to store one complete word in the accumulator register.

The channel 6502b is associated with the add-one register. The magnetic head 6504b is the recording head for this channel. The magnetic head 6510b is the reproducing head for this channel. Signals are fed to the magnetic head 6504b from the add-one register in-out control 113 via the W2O signal line. Signals are fed back to the add-one register in-out control 113 via the W2I signal line. Incorporated in the add-one register in-out control 113 is a delay equal to one-eleventh of a minor cycle (one digit time). Thus when information circulates in the add-one register a total delay of one minor cycle is obtained and it is possible to store one complete word in the add-one register.

The channel 6502c is associated with the left-shift register. The magnetic head 6504c is the recording head for this channel. The magnetic head 6510c is the reproducing head for this channel. Signals are fed to the magnetic head 6504c from the left-shift register in-out control 115 via the W3O signal line. Signals are fed back to the left-shift register in-out control 115 via the W3I signal line. Incorporated in the left-shift register in-out control 115 is a delay equal to one-eleventh of a minor cycle (one digit time). Thus when information circulates in the left-shift register a total delay of one minor cycle is obtained and it is possible to store one complete word in the left-shift register.

The channel 6502d is used as storage for the first fifty memory registers. Information is recorded on the channel 6502d by means of the magnetic head 6510d. The information to be recorded is received from the memory in-out control 111 via the ROA signal line. When the contents of any one of these registers is called for by the computer the information is read by the magnetic head 6504d and fed back to the memory in-out control 111 via the R alpha signal line.

The channel 6502e is used as storage for the second fifty memory registers. Information is recorded on the channel 6502e by means of the magnetic head 6510e. The information to be recorded is received from the memory in-out control 111 via the ROB signal line. When the contents of any one of these registers is called for by the computer the information is read by the magnetic head 6504e and fed back to the memory in-out control 111 via the R beta signal line.

The channel 6502f is the timing signal channel. A continuous square wave with one pulse missing is recorded on this channel. The magnetization pattern of this square wave is sensed by the magnetic head 6504f and fed via the Tr signal line to the timer 160. This channel provides the clock pulse signals for synchronizing the computer. The deleted single pulse causes the generation of the EB signal by the timer 160 to provide a means for synchronizing the position of rotation of the magnetic disk 165 with the remainder of the computer.

Each of the channels 6502 is capable of accepting fifty-one numbers having ten digits and a sign digit. The channels 6502a, 6502d and 6502c are recirculating channels; that is, one word of information is usually recorded via one of the magnetic heads 6504a, 6504b or 6504c and is reproduced by one of the reproducing heads 6510a, 6510b or 6510c and fed back to its appropriate in-out control to again be recorded. In this way these three channels are used to substitute for the well-known delay line type recirculating registers.

Although the channels 6502d and 6502e are capable of accepting fifty-one numbers, only fifty are actually used. The fifty-first position remains blank and is used solely as a disk revolution switching blank. At the start of a scan cycle, gating means dependent on the EB signal are provided to permit the feeding of the contents of the memory register stored in the channels 6502d and 6502e to the computer. One complete disk revolution later these gating means are terminated. Since the recording and reproducing heads are approximately one number apart this switching blank is required to insure that the contents of the fifty registers and only the fifty registers recorded and reproduced one per scan cycle.

The disk 184 is rotated at a constant frequency by the motor 6522 and therefore the frequency of the clock pulse signals and the repetitive occurrence of the memory register are constant.

XCV. CONCLUSION

A compact, fully-automatic digital computer system of relatively low cost has been provided in accordance with the invention. The computer system is especially suitable for solving many of the data processing and business problems of small and medium sized companies. In addition, the computer system may readily be employed for solving scientific problems.

While the novel features of the invention as applied to a preferred embodiment have been shown and described, it will be understood that various omissions and substitutions in the form and details of the device illustrated and changes in its operation may be made by those skilled in the art without departing from the spirit of the invention.

What is claimed is:

1. In a data processor, a first output means having a carriage for accepting record medium, said carriage being capable of moving the record medium in a vertical or horizontal direction, said first output means having first format composing means for determining the format of the record medium, a second output means having a carriage for accepting a second record medium, said carriage being capable of moving the second record medium in a vertical or horizontal direction, said second output means having a second format composing means for determining the format of the record medium, and a control unit for controlling the carriages of said first and second output means and said first and second format composing means, said control unit having means selectively operable to cause simultaneous movements in the same direction of both carriages, or simultaneous movements in different directions of both carriages, said unit concurrently therewith controlling said first and second format composing means.

2. In a data processor, a main printer having a carriage for accepting record medium, said carriage being capable of performing the motions of carriage return, tab and line feed, said main printer having first format composing means for setting up a date, dollars and cents print bars, an auxiliary printer having a carriage for accepting a second record medium, said carriage being capable of performing the motions of carriage return, tab and line feed, said auxiliary printer having a second format composing means for setting up a date, dollars and cents print bars, and a control unit for controlling the carriages of said main and auxiliary printers and said first and second format composing means, said control unit having means selectively operable to cause simultaneous, motions of both carriages in the same direction, or simultaneous motions of both carriages in different directions, said unit concurrently therewith controlling said first and second format composing means.

References Cited by the Examiner

UNITED STATES PATENTS

| | | | |
|---|---|---|---|
| 2,484,649 | 10/1949 | Root | 197—19 |
| 2,540,030 | 1/1951 | Hamilton et al. | 197—20 |
| 2,543,435 | 2/1951 | Buckley | 197—20 |
| 2,609,907 | 9/1952 | Lynch | 197—19 |
| 2,684,745 | 7/1954 | Blodgett | 197—19 |
| 2,788,878 | 4/1957 | Gould | 197—19 |
| 2,860,325 | 11/1958 | Welsh et al. | 197—19 |
| 2,860,756 | 11/1958 | Wilson et al. | 197—19 |
| 2,864,078 | 12/1958 | Seader | 340—174.1 |
| 2,886,642 | 5/1959 | Morris et al. | |
| 2,892,997 | 6/1959 | Yandell | 340—174.1 |
| 2,905,298 | 9/1959 | Blodgett et al. | 197—20 |
| 2,905,299 | 9/1959 | Hildebrandt | 197—20 |
| 2,980,225 | 4/1961 | Intagliata et al. | 197—20 X |
| 3,012,713 | 12/1961 | Richards | 197—20 X |

ROBERT E. PULFREY, *Primary Examiner.*

IRVING L. SRAGOW, ROBERT A. LEIGHEY,
*Examiners.*